US011649298B2

(12) United States Patent
Cao et al.

(10) Patent No.: US 11,649,298 B2
(45) **Date of Patent: *May 16, 2023**

(54) WET MILLING PROCESS

(71) Applicant: Novozymes A/S, Bagsvaerd (DK)

(72) Inventors: Yi Cao, Beijing (CN); James Lavigne, Wake Forest, NC (US); Bernardo Vidal, Jr., Wake Forest, NC (US); Thomas Patrick Gibbons, Wake Forest, NC (US); Chee-Leong Soong, Raleigh, NC (US); Brian R. Scott, West Sacramento, CA (US); Randall Scott Deinhammer, Wake Forest, NC (US); Zhen Long, Beijing (CN); Michael John Akerman, Wake Forest, NC (US); Xinyu Shen, Wake Forest, NC (US); Yu Zhang, Beijing (CN)

(73) Assignee: Novozymes A/S, Bagsvaerd (DK)

( * ) Notice: Subject to any disclaimer, the term of this patent is extended or adjusted under 35 U.S.C. 154(b) by 33 days.

This patent is subject to a terminal disclaimer.

(21) Appl. No.: 17/060,477

(22) Filed: Oct. 1, 2020

(65) Prior Publication Data

US 2021/0017297 A1 Jan. 21, 2021

Related U.S. Application Data

(62) Division of application No. 15/773,083, filed as application No. PCT/CN2016/107282 on Nov. 25, 2016, now Pat. No. 10,836,837.

(30) Foreign Application Priority Data

Nov. 26, 2015 (WO) ................ PCT/CN2015/095621

(51) Int. Cl.
*C08B 30/04* (2006.01)
*C08H 99/00* (2010.01)
*C08B 30/02* (2006.01)

(52) U.S. Cl.
CPC ............ *C08B 30/044* (2013.01); *C08B 30/02* (2013.01); *C08H 99/00* (2013.01)

(58) Field of Classification Search
None
See application file for complete search history.

(56) References Cited

U.S. PATENT DOCUMENTS

| | | | | |
|---|---|---|---|---|
| 5,066,218 | A | 11/1991 | Silver | |
| 5,693,518 | A | 12/1997 | Kofod | |
| 6,562,340 | B1 | 5/2003 | Bedford | |
| 6,566,125 | B2 | 5/2003 | Johnston | |
| 7,666,648 | B2 | 2/2010 | Foreman et al. | |
| 10,711,259 | B2 | 7/2020 | Peng | |
| 11,180,786 | B2 * | 11/2021 | Cao | C12P 19/14 |
| 2008/0171360 | A1 | 7/2008 | Lange | |
| 2008/0274527 | A1 | 11/2008 | Soerensen | |
| 2009/0117630 | A1 | 5/2009 | Olsen | |
| 2011/0086408 | A1 | 4/2011 | Power | |
| 2011/0111453 | A1 * | 5/2011 | McBrayer | C12P 19/02 435/243 |
| 2015/0315297 | A1 | 11/2015 | Han et al. | |
| 2017/0335302 | A1 | 11/2017 | Peng et al. | |
| 2019/0002592 | A1 | 1/2019 | Cao | |
| 2020/0291372 | A1 | 9/2020 | Peng | |
| 2021/0079368 | A9 | 3/2021 | Zhu et al. | |

FOREIGN PATENT DOCUMENTS

| | | | |
|---|---|---|---|
| WO | 94/21785 | A1 | 9/1994 |
| WO | 96/23062 | A1 | 8/1996 |
| WO | 02/00910 | A2 | 1/2002 |
| WO | 02/00911 | A1 | 1/2002 |
| WO | 02/02644 | A1 | 1/2002 |
| WO | 92/00731 | A1 | 1/2002 |
| WO | 2005/059084 | A1 | 6/2005 |
| WO | 2006/125438 | A1 | 11/2006 |
| WO | 2009/018537 | A2 | 2/2009 |
| WO | 2009/108941 | A2 | 9/2009 |
| WO | 2009108941 | A2 | 9/2009 |
| WO | 2011/057140 | A1 | 5/2011 |
| WO | 2011/153516 | A2 | 12/2011 |
| WO | 2012/011130 | A2 | 1/2012 |
| WO | 2012/103288 | A1 | 8/2012 |
| WO | 2013/182669 | A2 | 12/2013 |
| WO | 2014/082564 | A1 | 6/2014 |
| WO | 2014/202716 | A1 | 12/2014 |
| WO | 2016/082771 | A1 | 6/2016 |
| WO | 2017/088820 | A1 | 6/2017 |

OTHER PUBLICATIONS

Yang et al. Appl Biochem Biotechnol. Feb. 2015;175(4):1960-70. Epub Nov. 29, 2014. (Year: 2014).*
Chica et al. Curr Opin Biotechnol. Aug. 2005;16(4):378-84. (Year: 2005).*
Singh et al. Curr Protein Pept Sci. 2017, 18, 1-11 (Year: 2017).*
Kubicek et al., Genbank accession No. EHK20487 (2011).
Ottenheim et al., EBI Accession No. A0A0S2CWJ5 (2016).
Anonymous, NCBI Reference sequence No. XP_001389998.1 (2011).
Anonymous, NCBI Reference sequence No. XP_001389996.2 (2011).
Anonymous, NCBI Reference sequence No. WP_003231534.1 (2015).
Futagami et al., GenBank Accession No. GAA92551 (2015).
Futagami et al., EBI Accession No. G7Y053 (2016).
Gielkens et al., GenBank Accession No. Z78010.1 (2006).

(Continued)

*Primary Examiner* — Christian L Fronda
(74) *Attorney, Agent, or Firm* — David A. Fazzolare

(57) ABSTRACT

The present invention provides process for treating crop kernels, comprising the steps of a) soaking kernels in water to produce soaked kernels; b) grinding the soaked kernels; c) treating the soaked kernels in the presence of an effective amount of GH62 polypeptide having arabinofuranosidase activity or a GH43 polypeptide having arabinofuranosidase activity, wherein step c) is performed before, during or after step b).

18 Claims, No Drawings

Specification includes a Sequence Listing.

(56) References Cited

OTHER PUBLICATIONS

Pel et al., EBI Accession No. A2QFV9 (2010).
Takahashi et al., GenBank Accession No. AB821370.1 (2013).
Agger et al., Journal of Agricultural and Food Chemistry, vol. 58, pp. 6141-6148 (2010).
Chica et al., Current Opinion in Biotechnology, vol. 16, pp. 378-384 (2005).
Gao et al., Grain Distribution Technology, vol. 6, pp. 36-42 (2012).
Hashimoto et al., Journal of Bioscience and Bioengineering, vol. 95, No. 2, pp. 164-169 (2003).
Huismann et al., Carbohydrate Polymers, vol. 43, pp. 269-279 (2000).
Ichikawa et al., EBI Accession No. E4NJK0 (2011).
Johnston et al., Cereal Chemistry, vol. 81, pp. 626-632 (2004).
Jordan et al., Biochem. J., vol. 442, pp. 241-252 (2012).
Kaur et al., Microbial Biotechnology, vol. 8, No. 3, pp. 419-433 (2014).
Liu et al., UniProt Accession No. S7ZW00 (2014).
Nielsen et al., UniProt Accession No. A0A1V6NXM6 (2018).
Popper et al., Plant Physiology, vol. 153, pp. 373-383 (2010).
Rantanen et al., Carbohydrate Polymers, vol. 68, pp. 350-359 (2007).
Sakamoto et al., Appl. Microbiol. Biotechnol., vol. 90, pp. 137-146 (2011).
Sakamoto et al., UniProt Accession No. B5MGR2 (2014).
Singh et al., Current Protein and Peptide Science, vol. 18, pp. 1-11 (2017).
Soerensen et al., EBI Accession No. CS459135 (2007).
Wahl et al., Methods in Enzymology, vol. 152, pp. 399-407 (1987).
Liao et al., 2013, GenBank No. AGW24288.1.
He et al, 2015, Metallurgical industry press, 211.
Zhao, 2015, Food anti nutritional factor, China Agricultural University Press, 33-34.
Couturier et al, BMC Genomics, 2012, 1-14, 13(57).
Kaemper et al, 2014, Uniprot Access No. Q4P902.
Kamper et al, 2014, Uniprot Access No. Q4P6F4.
Yang 2015 Appl Biochem Biotechnol 175 1960-1970, 1960-1970, 175.
Fujii et al, 2022, Uniprot access No. A0A2H5BN17.
Moroz et al, 2018, Acta Cryst F74, 490-495.

* cited by examiner

SEQUENCE LISTING

```
<160> NUMBER OF SEQ ID NOS: 119

<210> SEQ ID NO 1
<211> LENGTH: 9
<212> TYPE: PRT
<213> ORGANISM: Artificial Sequence
<220> FEATURE:
<223> OTHER INFORMATION: Conserved motif:
      [H/Y][L/M]F[F/S][A/C/H/S/T/V][A/D/G/N/R]D[D/E/N]G
<220> FEATURE:
<221> NAME/KEY: misc_feature
<222> LOCATION: (1)..(1)
<223> OTHER INFORMATION: The amino acid in position 1 of the conserved
      motif is either histidine (His, H) or tyrosine (Tyr, Y).
<220> FEATURE:
<221> NAME/KEY: misc_feature
<222> LOCATION: (2)..(2)
<223> OTHER INFORMATION: The amino acid in position 2 of the conserved
      motif is either leucine (Leu, L) or methionine (Met, M).
<220> FEATURE:
<221> NAME/KEY: misc_feature
<222> LOCATION: (4)..(4)
```

```
<223> OTHER INFORMATION: The amino acid in position 4 of the conserved
      motif is either phenylalanine (Phy, F) or serine (Ser, S).
<220> FEATURE:
<221> NAME/KEY: misc_feature
<222> LOCATION: (5)..(5)
<223> OTHER INFORMATION: The amino acid in position 5 of the conserved
      motif is either alanine (Ala, A), cysteine (Cys, C), histidine
      (His, H), serine (Ser, S), threonine (Thr, T) or valine (Val, V).
<220> FEATURE:
<221> NAME/KEY: misc_feature
<222> LOCATION: (6)..(6)
<223> OTHER INFORMATION: The amino acid in position 6 of the conserved
      motif is either alanine (Ala, A), aspartic acid (Asp, D), glycine
      (Gly, G), asparagine (Asn, N) or arginine (Arg, R).
<220> FEATURE:
<221> NAME/KEY: misc_feature
<222> LOCATION: (8)..(8)
<223> OTHER INFORMATION: The amino acid in position 8 of the conserved
      motif is either aspartic acid (Asp, D), glutamic acid (Glu, E) or
      asparagine (Asn, N).

<400> SEQUENCE: 1

Xaa Xaa Phe Xaa Xaa Xaa Asp Xaa Gly
1               5


<210> SEQ ID NO 2
<211> LENGTH: 9
<212> TYPE: PRT
<213> ORGANISM: Artificial Sequence
<220> FEATURE:
<223> OTHER INFORMATION: Conserved motif: [H/Y]LF[F/S][A/S/V][A/D/G]DNG
<220> FEATURE:
<221> NAME/KEY: misc_feature
<222> LOCATION: (1)..(1)
<223> OTHER INFORMATION: The amino acid in position 1 of the conserved
      motif is either histidine (His, H) or tyrosine (Tyr, Y).
<220> FEATURE:
<221> NAME/KEY: misc_feature
<222> LOCATION: (4)..(4)
<223> OTHER INFORMATION: The amino acid in position 4 of the conserved
      motif is either phenylalanine (Phy, F) or serine (Ser, S).
<220> FEATURE:
<221> NAME/KEY: misc_feature
<222> LOCATION: (5)..(5)
<223> OTHER INFORMATION: The amino acid in position 5 of the conserved
      motif is either Alanine (Ala, A), Serine (Ser, S) or Valine (Val,
      V).
<220> FEATURE:
<221> NAME/KEY: misc_feature
<222> LOCATION: (6)..(6)
<223> OTHER INFORMATION: The amino acid in position 6 of the conserved
      motif is either Alanine (Ala, A), aspartic acid (Asp, D) or
      Glycine (Gly, G).

<400> SEQUENCE: 2

Xaa Leu Phe Xaa Xaa Xaa Asp Asn Gly
1               5


<210> SEQ ID NO 3
<211> LENGTH: 9
<212> TYPE: PRT
<213> ORGANISM: Artificial Sequence
<220> FEATURE:
<223> OTHER INFORMATION: Conserved motif: YLFF[A/V][A/G]DNG
<220> FEATURE:
<221> NAME/KEY: misc_feature
<222> LOCATION: (5)..(5)
<223> OTHER INFORMATION: The amino acid in position 5 of the conserved
      motif is either Alanine (Ala, A) or Valine (Val, V).
<220> FEATURE:
<221> NAME/KEY: misc_feature
<222> LOCATION: (6)..(6)
<223> OTHER INFORMATION: The amino acid in position 6 of the conserved
      motif is either Alanine (Ala, A) or Glycine (Gly, G).
```

```
<400> SEQUENCE: 3

Tyr Leu Phe Phe Xaa Xaa Asp Asn Gly
1               5


<210> SEQ ID NO 4
<211> LENGTH: 9
<212> TYPE: PRT
<213> ORGANISM: Artificial Sequence
<220> FEATURE:
<223> OTHER INFORMATION: Conserved motif: YLFFAGDNG

<400> SEQUENCE: 4

Tyr Leu Phe Phe Ala Gly Asp Asn Gly
1               5


<210> SEQ ID NO 5
<211> LENGTH: 9
<212> TYPE: PRT
<213> ORGANISM: Artificial Sequence
<220> FEATURE:
<223> OTHER INFORMATION: Conserved motif: [H/Y]LFSSDDNG
<220> FEATURE:
<221> NAME/KEY: misc_feature
<222> LOCATION: (1)..(1)
<223> OTHER INFORMATION: The amino acid in position 1 of the conserved
      motif is either histidine (His, H) or tyrosine (Tyr, Y).

<400> SEQUENCE: 5

Xaa Leu Phe Ser Ser Asp Asp Asn Gly
1               5


<210> SEQ ID NO 6
<211> LENGTH: 9
<212> TYPE: PRT
<213> ORGANISM: Artificial Sequence
<220> FEATURE:
<223> OTHER INFORMATION: Conserved motif: YLFSSDDNG

<400> SEQUENCE: 6

Tyr Leu Phe Ser Ser Asp Asp Asn Gly
1               5


<210> SEQ ID NO 7
<211> LENGTH: 987
<212> TYPE: DNA
<213> ORGANISM: Penicillium capsulatum
<220> FEATURE:
<221> NAME/KEY: CDS
<222> LOCATION: (1)..(984)
<220> FEATURE:
<221> NAME/KEY: sig_peptide
<222> LOCATION: (1)..(78)
<220> FEATURE:
<221> NAME/KEY: mat_peptide
<222> LOCATION: (79)..(984)

<400> SEQUENCE: 7

atg aga ttc ttc caa gcg aaa gct ggc ctg ata tca tca ggg ata act       48
Met Arg Phe Phe Gln Ala Lys Ala Gly Leu Ile Ser Ser Gly Ile Thr
    -25                 -20                 -15

ttg ctc gcg tca gtg cca gta gtc atc gcc aat tgc gcc ctt cca tcg       96
Leu Leu Ala Ser Val Pro Val Val Ile Ala Asn Cys Ala Leu Pro Ser
-10                 -5              -1  1               5

aca tat agc tgg aca tca act agc gct tta gcg aat ccc aag ccc ggg      144
Thr Tyr Ser Trp Thr Ser Thr Ser Ala Leu Ala Asn Pro Lys Pro Gly
            10                  15                  20

tgg aca gca atc aag gat ttt acc aat gtg gtc ttc aat aac agg cat      192
```

```
Trp Thr Ala Ile Lys Asp Phe Thr Asn Val Val Phe Asn Asn Arg His
        25                  30                  35

gtc gtc tat gca tct acc acc gac aca agt ggg aac tac ggc gca atg      240
Val Val Tyr Ala Ser Thr Thr Asp Thr Ser Gly Asn Tyr Gly Ala Met
    40                  45                  50

agc ttc ggt gtc ttt tcg gat tgg cct ggc atg gca tct gcg agc caa      288
Ser Phe Gly Val Phe Ser Asp Trp Pro Gly Met Ala Ser Ala Ser Gln
55                  60                  65                  70

aac gca ttg agc ttt gca gcc gtc gca ccc acc ttg ttc tac ttt cag      336
Asn Ala Leu Ser Phe Ala Ala Val Ala Pro Thr Leu Phe Tyr Phe Gln
                75                  80                  85

cca aaa agt ata tgg gtt ctg gcc tat caa tgg ggc tct agc acg ttt      384
Pro Lys Ser Ile Trp Val Leu Ala Tyr Gln Trp Gly Ser Ser Thr Phe
            90                  95                  100

acc tac cga aca tca agt gat ccc acc aat gcc tat gga tgg tca tcg      432
Thr Tyr Arg Thr Ser Ser Asp Pro Thr Asn Ala Tyr Gly Trp Ser Ser
        105                 110                 115

gag caa gcc ctt ttc tct ggg aaa gtt acc ggc tcg agc act ggc gcc      480
Glu Gln Ala Leu Phe Ser Gly Lys Val Thr Gly Ser Ser Thr Gly Ala
    120                 125                 130

att gat cag aca ctt atc ggt gac gcc acg cat atg tat ctt ttc ttt      528
Ile Asp Gln Thr Leu Ile Gly Asp Ala Thr His Met Tyr Leu Phe Phe
135                 140                 145                 150

gcc gga gac aat ggc aaa ata tat cgc tct agc atg ccc atc agc aat      576
Ala Gly Asp Asn Gly Lys Ile Tyr Arg Ser Ser Met Pro Ile Ser Asn
                155                 160                 165

ttc cct gga aac ttt gga aca gtg tca gag gtg gta cta agt gac act      624
Phe Pro Gly Asn Phe Gly Thr Val Ser Glu Val Val Leu Ser Asp Thr
            170                 175                 180

cag aat aat cta ttt gag gcg gtc caa gtg tac act gtg aaa ggt caa      672
Gln Asn Asn Leu Phe Glu Ala Val Gln Val Tyr Thr Val Lys Gly Gln
        185                 190                 195

aac cag tac ctg atg atc gtt gag gca att gga tca gaa ggg cgg tat      720
Asn Gln Tyr Leu Met Ile Val Glu Ala Ile Gly Ser Glu Gly Arg Tyr
    200                 205                 210

ttc cgt tca ttc act gcc agc agt ctt ggt ggt ttg tgg act gcc cag      768
Phe Arg Ser Phe Thr Ala Ser Ser Leu Gly Gly Leu Trp Thr Ala Gln
215                 220                 225                 230

gca gca agc gag act aag ccc ttt gct ggt aaa gcc aat agc ggt gca      816
Ala Ala Ser Glu Thr Lys Pro Phe Ala Gly Lys Ala Asn Ser Gly Ala
                235                 240                 245

acc tgg acc aac gac atc agt cac ggc gat ttg gtt cgt tcc aac cct      864
Thr Trp Thr Asn Asp Ile Ser His Gly Asp Leu Val Arg Ser Asn Pro
            250                 255                 260

gac caa aca atg acg atc gat cca tgc aac ctg caa ttc ctc tac cag      912
Asp Gln Thr Met Thr Ile Asp Pro Cys Asn Leu Gln Phe Leu Tyr Gln
        265                 270                 275

gga cga aat cct ggc gca agt ggc aac tac aat acc tta ccg tgg agg      960
Gly Arg Asn Pro Gly Ala Ser Gly Asn Tyr Asn Thr Leu Pro Trp Arg
    280                 285                 290

ccg ggt gtg ctc act ttg aat aat taa                                  987
Pro Gly Val Leu Thr Leu Asn Asn
295                 300


<210> SEQ ID NO 8
<211> LENGTH: 328
<212> TYPE: PRT
<213> ORGANISM: Penicillium capsulatum

<400> SEQUENCE: 8
```

```
Met Arg Phe Phe Gln Ala Lys Ala Gly Leu Ile Ser Ser Gly Ile Thr
    -25                 -20                 -15

Leu Leu Ala Ser Val Pro Val Val Ile Ala Asn Cys Ala Leu Pro Ser
-10                 -5                  -1  1               5

Thr Tyr Ser Trp Thr Ser Thr Ser Ala Leu Ala Asn Pro Lys Pro Gly
            10                  15                  20

Trp Thr Ala Ile Lys Asp Phe Thr Asn Val Val Phe Asn Asn Arg His
        25                  30                  35

Val Val Tyr Ala Ser Thr Thr Asp Thr Ser Gly Asn Tyr Gly Ala Met
    40                  45                  50

Ser Phe Gly Val Phe Ser Asp Trp Pro Gly Met Ala Ser Ala Ser Gln
55                  60                  65                  70

Asn Ala Leu Ser Phe Ala Ala Val Ala Pro Thr Leu Phe Tyr Phe Gln
                75                  80                  85

Pro Lys Ser Ile Trp Val Leu Ala Tyr Gln Trp Gly Ser Ser Thr Phe
            90                  95                  100

Thr Tyr Arg Thr Ser Ser Asp Pro Thr Asn Ala Tyr Gly Trp Ser Ser
        105                 110                 115

Glu Gln Ala Leu Phe Ser Gly Lys Val Thr Gly Ser Ser Thr Gly Ala
    120                 125                 130

Ile Asp Gln Thr Leu Ile Gly Asp Ala Thr His Met Tyr Leu Phe Phe
135                 140                 145                 150

Ala Gly Asp Asn Gly Lys Ile Tyr Arg Ser Ser Met Pro Ile Ser Asn
                155                 160                 165

Phe Pro Gly Asn Phe Gly Thr Val Ser Glu Val Val Leu Ser Asp Thr
            170                 175                 180

Gln Asn Asn Leu Phe Glu Ala Val Gln Val Tyr Thr Val Lys Gly Gln
        185                 190                 195

Asn Gln Tyr Leu Met Ile Val Glu Ala Ile Gly Ser Glu Gly Arg Tyr
    200                 205                 210

Phe Arg Ser Phe Thr Ala Ser Ser Leu Gly Gly Leu Trp Thr Ala Gln
215                 220                 225                 230

Ala Ala Ser Glu Thr Lys Pro Phe Ala Gly Lys Ala Asn Ser Gly Ala
                235                 240                 245

Thr Trp Thr Asn Asp Ile Ser His Gly Asp Leu Val Arg Ser Asn Pro
            250                 255                 260

Asp Gln Thr Met Thr Ile Asp Pro Cys Asn Leu Gln Phe Leu Tyr Gln
        265                 270                 275

Gly Arg Asn Pro Gly Ala Ser Gly Asn Tyr Asn Thr Leu Pro Trp Arg
    280                 285                 290

Pro Gly Val Leu Thr Leu Asn Asn
295                 300
```

<210> SEQ ID NO 9
<211> LENGTH: 302
<212> TYPE: PRT
<213> ORGANISM: Penicillium capsulatum

<400> SEQUENCE: 9

```
Asn Cys Ala Leu Pro Ser Thr Tyr Ser Trp Thr Ser Thr Ser Ala Leu
1               5                   10                  15

Ala Asn Pro Lys Pro Gly Trp Thr Ala Ile Lys Asp Phe Thr Asn Val
            20                  25                  30

Val Phe Asn Asn Arg His Val Val Tyr Ala Ser Thr Thr Asp Thr Ser
        35                  40                  45
```

```
Gly Asn Tyr Gly Ala Met Ser Phe Gly Val Phe Ser Asp Trp Pro Gly
    50                  55                  60

Met Ala Ser Ala Ser Gln Asn Ala Leu Ser Phe Ala Ala Val Ala Pro
65                  70                  75                  80

Thr Leu Phe Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
            100                 105                 110

Ala Tyr Gly Trp Ser Ser Glu Gln Ala Leu Phe Ser Gly Lys Val Thr
        115                 120                 125

Gly Ser Ser Thr Gly Ala Ile Asp Gln Thr Leu Ile Gly Asp Ala Thr
    130                 135                 140

His Met Tyr Leu Phe Phe Ala Gly Asp Asn Gly Lys Ile Tyr Arg Ser
145                 150                 155                 160

Ser Met Pro Ile Ser Asn Phe Pro Gly Asn Phe Gly Thr Val Ser Glu
                165                 170                 175

Val Val Leu Ser Asp Thr Gln Asn Asn Leu Phe Glu Ala Val Gln Val
            180                 185                 190

Tyr Thr Val Lys Gly Gln Asn Gln Tyr Leu Met Ile Val Glu Ala Ile
        195                 200                 205

Gly Ser Glu Gly Arg Tyr Phe Arg Ser Phe Thr Ala Ser Ser Leu Gly
    210                 215                 220

Gly Leu Trp Thr Ala Gln Ala Ala Ser Glu Thr Lys Pro Phe Ala Gly
225                 230                 235                 240

Lys Ala Asn Ser Gly Ala Thr Trp Thr Asn Asp Ile Ser His Gly Asp
                245                 250                 255

Leu Val Arg Ser Asn Pro Asp Gln Thr Met Thr Ile Asp Pro Cys Asn
            260                 265                 270

Leu Gln Phe Leu Tyr Gln Gly Arg Asn Pro Gly Ala Ser Gly Asn Tyr
        275                 280                 285

Asn Thr Leu Pro Trp Arg Pro Gly Val Leu Thr Leu Asn Asn
    290                 295                 300


<210> SEQ ID NO 10
<211> LENGTH: 990
<212> TYPE: DNA
<213> ORGANISM: Penicillium aurantiogriseum
<220> FEATURE:
<221> NAME/KEY: CDS
<222> LOCATION: (1)..(987)
<220> FEATURE:
<221> NAME/KEY: sig_peptide
<222> LOCATION: (1)..(78)
<220> FEATURE:
<221> NAME/KEY: mat_peptide
<222> LOCATION: (79)..(987)

<400> SEQUENCE: 10

atg aaa ttc tcc aag gca aaa gct ggc ctg gtg tca tct ggc atg ctg       48
Met Lys Phe Ser Lys Ala Lys Ala Gly Leu Val Ser Ser Gly Met Leu
    -25                 -20                 -15

ttg ctc gca tca gta cca gtt gcc gtc gcc gac tgc gcg ctt cca tca       96
Leu Leu Ala Ser Val Pro Val Ala Val Ala Asp Cys Ala Leu Pro Ser
-10                 -5              -1  1               5

act tat act tgg aca tca act ggc gct cta gcg aat cca aag tcc gga      144
Thr Tyr Thr Trp Thr Ser Thr Gly Ala Leu Ala Asn Pro Lys Ser Gly
            10                  15                  20

tgg acc gca atc aag gat ttc acc aac gtt gtt gtt aac aat aag cat      192
```

```
Trp Thr Ala Ile Lys Asp Phe Thr Asn Val Val Val Asn Asn Lys His
        25                  30                  35

ctc gta tat gca tca acc acc gac gca agt ggg aac tac ggc gcg atg      240
Leu Val Tyr Ala Ser Thr Thr Asp Ala Ser Gly Asn Tyr Gly Ala Met
    40                  45                  50

aac ttc ggt ccc ttt tcg gat tgg tct ggc atg gca act gcg agt caa      288
Asn Phe Gly Pro Phe Ser Asp Trp Ser Gly Met Ala Thr Ala Ser Gln
55                  60                  65                  70

atc aaa acg agc ttt aac gct gtt gcg ccc act ttg ttc tac ttc cag      336
Ile Lys Thr Ser Phe Asn Ala Val Ala Pro Thr Leu Phe Tyr Phe Gln
                75                  80                  85

cca aag gac att tgg gtc ata gcc tac caa tgg ggc tca agc acg ttt      384
Pro Lys Asp Ile Trp Val Ile Ala Tyr Gln Trp Gly Ser Ser Thr Phe
            90                  95                  100

acc tat cga aca tca agt gat cct acc aat gcc aat gga tgg tca tcg      432
Thr Tyr Arg Thr Ser Ser Asp Pro Thr Asn Ala Asn Gly Trp Ser Ser
        105                 110                 115

gag caa gcc ctt ttt tcc ggg aag atc acc gcc ccg gat gct gct att      480
Glu Gln Ala Leu Phe Ser Gly Lys Ile Thr Ala Pro Asp Ala Ala Ile
    120                 125                 130

gat cag acc gtt atc ggt gac tct acg cac atg tac ctt ttc ttc gct      528
Asp Gln Thr Val Ile Gly Asp Ser Thr His Met Tyr Leu Phe Phe Ala
135                 140                 145                 150

ggg gac aat ggc aag atc tat cgc agc agc atg tct atc gac aag ttc      576
Gly Asp Asn Gly Lys Ile Tyr Arg Ser Ser Met Ser Ile Asp Lys Phe
                155                 160                 165

cct gga aac ttc gga aca agt tcg gaa ata gta ctg agt ggc gct agg      624
Pro Gly Asn Phe Gly Thr Ser Ser Glu Ile Val Leu Ser Gly Ala Arg
            170                 175                 180

aac gac ctg ttc gaa gca gtt caa gtg tac act gtt aag ggt cag aac      672
Asn Asp Leu Phe Glu Ala Val Gln Val Tyr Thr Val Lys Gly Gln Asn
        185                 190                 195

aag tac ctt atg ctt gtc gaa gca att gga gca caa ggg cag cgg tat      720
Lys Tyr Leu Met Leu Val Glu Ala Ile Gly Ala Gln Gly Gln Arg Tyr
    200                 205                 210

ttc cgt tca ttc gtc tcc agc agt ctc ggc ggt aag tgg gaa ccg cag      768
Phe Arg Ser Phe Val Ser Ser Ser Leu Gly Gly Lys Trp Glu Pro Gln
215                 220                 225                 230

gca gca agc gag agc aag ccc ttc gcc gga aaa gcc aat gtc ggt gca      816
Ala Ala Ser Glu Ser Lys Pro Phe Ala Gly Lys Ala Asn Val Gly Ala
                235                 240                 245

acc tgg acc aag gac ttc agt cac ggt gat ttg gtt cga acc aac cct      864
Thr Trp Thr Lys Asp Phe Ser His Gly Asp Leu Val Arg Thr Asn Pro
            250                 255                 260

gac caa aca atg acc gtc gat cca tgc aac ctg caa ctc ctc tac cag      912
Asp Gln Thr Met Thr Val Asp Pro Cys Asn Leu Gln Leu Leu Tyr Gln
        265                 270                 275

gga cgg gat ccc acc gcc acc agt agt aac tac aat acc ata ccg tgg      960
Gly Arg Asp Pro Thr Ala Thr Ser Ser Asn Tyr Asn Thr Ile Pro Trp
    280                 285                 290

cag ccc gcc gtt ctc acc ctg aag aag taa                              990
Gln Pro Ala Val Leu Thr Leu Lys Lys
295                 300


<210> SEQ ID NO 11
<211> LENGTH: 329
<212> TYPE: PRT
<213> ORGANISM: Penicillium aurantiogriseum

<400> SEQUENCE: 11
```

```
Met Lys Phe Ser Lys Ala Lys Ala Gly Leu Val Ser Ser Gly Met Leu
    -25                 -20                 -15

Leu Leu Ala Ser Val Pro Val Ala Val Ala Asp Cys Ala Leu Pro Ser
-10                 -5                  -1  1               5

Thr Tyr Thr Trp Thr Ser Thr Gly Ala Leu Ala Asn Pro Lys Ser Gly
            10                  15                  20

Trp Thr Ala Ile Lys Asp Phe Thr Asn Val Val Val Asn Asn Lys His
        25                  30                  35

Leu Val Tyr Ala Ser Thr Thr Asp Ala Ser Gly Asn Tyr Gly Ala Met
    40                  45                  50

Asn Phe Gly Pro Phe Ser Asp Trp Ser Gly Met Ala Thr Ala Ser Gln
55                  60                  65                  70

Ile Lys Thr Ser Phe Asn Ala Val Ala Pro Thr Leu Phe Tyr Phe Gln
                75                  80                  85

Pro Lys Asp Ile Trp Val Ile Ala Tyr Gln Trp Gly Ser Ser Thr Phe
            90                  95                  100

Thr Tyr Arg Thr Ser Ser Asp Pro Thr Asn Ala Asn Gly Trp Ser Ser
        105                 110                 115

Glu Gln Ala Leu Phe Ser Gly Lys Ile Thr Ala Pro Asp Ala Ala Ile
    120                 125                 130

Asp Gln Thr Val Ile Gly Asp Ser Thr His Met Tyr Leu Phe Phe Ala
135                 140                 145                 150

Gly Asp Asn Gly Lys Ile Tyr Arg Ser Ser Met Ser Ile Asp Lys Phe
                155                 160                 165

Pro Gly Asn Phe Gly Thr Ser Ser Glu Ile Val Leu Ser Gly Ala Arg
            170                 175                 180

Asn Asp Leu Phe Glu Ala Val Gln Val Tyr Thr Val Lys Gly Gln Asn
        185                 190                 195

Lys Tyr Leu Met Leu Val Glu Ala Ile Gly Ala Gln Gly Gln Arg Tyr
    200                 205                 210

Phe Arg Ser Phe Val Ser Ser Ser Leu Gly Gly Lys Trp Glu Pro Gln
215                 220                 225                 230

Ala Ala Ser Glu Ser Lys Pro Phe Ala Gly Lys Ala Asn Val Gly Ala
                235                 240                 245

Thr Trp Thr Lys Asp Phe Ser His Gly Asp Leu Val Arg Thr Asn Pro
            250                 255                 260

Asp Gln Thr Met Thr Val Asp Pro Cys Asn Leu Gln Leu Leu Tyr Gln
        265                 270                 275

Gly Arg Asp Pro Thr Ala Thr Ser Ser Asn Tyr Asn Thr Ile Pro Trp
    280                 285                 290

Gln Pro Ala Val Leu Thr Leu Lys Lys
295                 300
```

<210> SEQ ID NO 12
<211> LENGTH: 303
<212> TYPE: PRT
<213> ORGANISM: Penicillium aurantiogriseum

<400> SEQUENCE: 12

```
Asp Cys Ala Leu Pro Ser Thr Tyr Thr Trp Thr Ser Thr Gly Ala Leu
1               5                   10                  15

Ala Asn Pro Lys Ser Gly Trp Thr Ala Ile Lys Asp Phe Thr Asn Val
            20                  25                  30

Val Val Asn Asn Lys His Leu Val Tyr Ala Ser Thr Thr Asp Ala Ser
        35                  40                  45
```

```
Gly Asn Tyr Gly Ala Met Asn Phe Gly Pro Phe Ser Asp Trp Ser Gly
    50                  55                  60

Met Ala Thr Ala Ser Gln Ile Lys Thr Ser Phe Asn Ala Val Ala Pro
65                  70                  75                  80

Thr Leu Phe Tyr Phe Gln Pro Lys Asp Ile Trp Val Ile Ala Tyr Gln
                85                  90                  95

Trp Gly Ser Ser Thr Phe Thr Tyr Arg Thr Ser Ser Asp Pro Thr Asn
            100                 105                 110

Ala Asn Gly Trp Ser Ser Glu Gln Ala Leu Phe Ser Gly Lys Ile Thr
        115                 120                 125

Ala Pro Asp Ala Ala Ile Asp Gln Thr Val Ile Gly Asp Ser Thr His
    130                 135                 140

Met Tyr Leu Phe Phe Ala Gly Asp Asn Gly Lys Ile Tyr Arg Ser Ser
145                 150                 155                 160

Met Ser Ile Asp Lys Phe Pro Gly Asn Phe Gly Thr Ser Ser Glu Ile
                165                 170                 175

Val Leu Ser Gly Ala Arg Asn Asp Leu Phe Glu Ala Val Gln Val Tyr
            180                 185                 190

Thr Val Lys Gly Gln Asn Lys Tyr Leu Met Leu Val Glu Ala Ile Gly
        195                 200                 205

Ala Gln Gly Gln Arg Tyr Phe Arg Ser Phe Val Ser Ser Ser Leu Gly
    210                 215                 220

Gly Lys Trp Glu Pro Gln Ala Ala Ser Glu Ser Lys Pro Phe Ala Gly
225                 230                 235                 240

Lys Ala Asn Val Gly Ala Thr Trp Thr Lys Asp Phe Ser His Gly Asp
                245                 250                 255

Leu Val Arg Thr Asn Pro Asp Gln Thr Met Thr Val Asp Pro Cys Asn
            260                 265                 270

Leu Gln Leu Leu Tyr Gln Gly Arg Asp Pro Thr Ala Thr Ser Ser Asn
        275                 280                 285

Tyr Asn Thr Ile Pro Trp Gln Pro Ala Val Leu Thr Leu Lys Lys
    290                 295                 300


<210> SEQ ID NO 13
<211> LENGTH: 1212
<212> TYPE: DNA
<213> ORGANISM: Artificial Sequence
<220> FEATURE:
<223> OTHER INFORMATION: codon optimised DNA sequence
<220> FEATURE:
<221> NAME/KEY: CDS
<222> LOCATION: (1)..(1209)
<220> FEATURE:
<221> NAME/KEY: sig_peptide
<222> LOCATION: (1)..(63)
<220> FEATURE:
<221> NAME/KEY: mat_peptide
<222> LOCATION: (64)..(1209)

<400> SEQUENCE: 13

atg atc ttg tcg gcg aag atg ctc gga gcg att ctc ttg gag ttg gcc       48
Met Ile Leu Ser Ala Lys Met Leu Gly Ala Ile Leu Leu Glu Leu Ala
    -20                 -15                 -10

ctc aca gca gca gcg cag cag act ctc tac ggc cag tgt gga ggc aac       96
Leu Thr Ala Ala Ala Gln Gln Thr Leu Tyr Gly Gln Cys Gly Gly Asn
-5              -1  1               5                   10

ggc tgg aca gga ccc acc cag tgt gtg tcg gga gcc tgt tgt cag atc      144
Gly Trp Thr Gly Pro Thr Gln Cys Val Ser Gly Ala Cys Cys Gln Ile
            15                  20                  25
```

```
cag aac ccc tgg tat tcg cag tgt ctc cct ggc tcc tgt tcc ccc tcc      192
Gln Asn Pro Trp Tyr Ser Gln Cys Leu Pro Gly Ser Cys Ser Pro Ser
        30                  35                  40

acc act ttg aca cgg gtc aca aca acc gca aca tcc act gca tcc aca      240
Thr Thr Leu Thr Arg Val Thr Thr Thr Ala Thr Ser Thr Ala Ser Thr
    45                  50                  55

gcc act tcc ggc aca gga ggc tcc ttg ccc tcg tcc ttc aag tgg tcg      288
Ala Thr Ser Gly Thr Gly Gly Ser Leu Pro Ser Ser Phe Lys Trp Ser
60                  65                  70                  75

tcg tcc gga ccc ttg gtc gac cct aag aac gac ggt cga ggc atc gca      336
Ser Ser Gly Pro Leu Val Asp Pro Lys Asn Asp Gly Arg Gly Ile Ala
                80                  85                  90

gcg ttg aaa gat ccg tcg atc gtc gag gtc gat ggc aca tat cac gtg      384
Ala Leu Lys Asp Pro Ser Ile Val Glu Val Asp Gly Thr Tyr His Val
            95                  100                 105

ttc gca tcg act gca act tcg gca ggc tac aac atg gtg tat ttc aac      432
Phe Ala Ser Thr Ala Thr Ser Ala Gly Tyr Asn Met Val Tyr Phe Asn
        110                 115                 120

ttc acc gat ttc aac cag gca aac aac gca ccc ttc ttc tat ttg gac      480
Phe Thr Asp Phe Asn Gln Ala Asn Asn Ala Pro Phe Phe Tyr Leu Asp
    125                 130                 135

aaa tcg cct att ggc tcg gga tac cga gcc gca ccc cag gtc ttc ttc      528
Lys Ser Pro Ile Gly Ser Gly Tyr Arg Ala Ala Pro Gln Val Phe Phe
140                 145                 150                 155

ttc aag ccc cag aac ttg tgg tac ctc gtc tac cag aac ggc aac gca      576
Phe Lys Pro Gln Asn Leu Trp Tyr Leu Val Tyr Gln Asn Gly Asn Ala
                160                 165                 170

gcc tac tcg acc aac aaa gat atc tcc aac cct gca ggc tgg tcc gca      624
Ala Tyr Ser Thr Asn Lys Asp Ile Ser Asn Pro Ala Gly Trp Ser Ala
            175                 180                 185

ccc aag aca ttc tac tcg tcg cag ccc tcg atc atc aca gag aac atc      672
Pro Lys Thr Phe Tyr Ser Ser Gln Pro Ser Ile Ile Thr Glu Asn Ile
        190                 195                 200

ggt aac ggt tac tgg gtc gat atg tgg gtc atc tgt gat tcg gcc aac      720
Gly Asn Gly Tyr Trp Val Asp Met Trp Val Ile Cys Asp Ser Ala Asn
    205                 210                 215

tgt cac ttg ttc tcg tcc gac gat aac ggc cat ttg tac cgc tcg cag      768
Cys His Leu Phe Ser Ser Asp Asp Asn Gly His Leu Tyr Arg Ser Gln
220                 225                 230                 235

acg acg ttg gcg aac ttc ccc aac ggt atg acc aac aca gtg atc gcg      816
Thr Thr Leu Ala Asn Phe Pro Asn Gly Met Thr Asn Thr Val Ile Ala
                240                 245                 250

atg cag gac tcg aac ccc aac aac ttg ttc gag gca tcc aac gtc tac      864
Met Gln Asp Ser Asn Pro Asn Asn Leu Phe Glu Ala Ser Asn Val Tyr
            255                 260                 265

cat gtg gga ggc ggt aag tat ctc ctc att gtc gag gcc atc ggc tcc      912
His Val Gly Gly Gly Lys Tyr Leu Leu Ile Val Glu Ala Ile Gly Ser
        270                 275                 280

gga ggc gac cga tac ttc cgg tcg tgg acg tcg acg tcc ctc act ggt      960
Gly Gly Asp Arg Tyr Phe Arg Ser Trp Thr Ser Thr Ser Leu Thr Gly
    285                 290                 295

acc tgg act gca ctc gca gca tcg gaa tcg aac cct ttc gca ggt gcc     1008
Thr Trp Thr Ala Leu Ala Ala Ser Glu Ser Asn Pro Phe Ala Gly Ala
300                 305                 310                 315

aag aac gtg gcc ttc tcc ggc aac gtc tgg acc aaa tcc atc tcg cac     1056
Lys Asn Val Ala Phe Ser Gly Asn Val Trp Thr Lys Ser Ile Ser His
                320                 325                 330

gga gag atg atc cga gac cag gtg gat cag acc ttg aca atc tcc ccg     1104
Gly Glu Met Ile Arg Asp Gln Val Asp Gln Thr Leu Thr Ile Ser Pro
```

```
            335                 340                 345

tgt aag ctc agg tac ttg tac cag ggc gtc gat ccg gca gca acc ggt      1152
Cys Lys Leu Arg Tyr Leu Tyr Gln Gly Val Asp Pro Ala Ala Thr Gly
        350                 355                 360

aac tac aac tcg ttg ccg tgg aag ctc gcg ctc ctc acg cag acg aac      1200
Asn Tyr Asn Ser Leu Pro Trp Lys Leu Ala Leu Leu Thr Gln Thr Asn
    365                 370                 375

tcg gca tgt tga                                                      1212
Ser Ala Cys
380


<210> SEQ ID NO 14
<211> LENGTH: 403
<212> TYPE: PRT
<213> ORGANISM: Artificial Sequence
<220> FEATURE:
<223> OTHER INFORMATION: Synthetic Construct

<400> SEQUENCE: 14

Met Ile Leu Ser Ala Lys Met Leu Gly Ala Ile Leu Leu Glu Leu Ala
    -20                 -15                 -10

Leu Thr Ala Ala Ala Gln Gln Thr Leu Tyr Gly Gln Cys Gly Gly Asn
-5              -1  1               5                   10

Gly Trp Thr Gly Pro Thr Gln Cys Val Ser Gly Ala Cys Cys Gln Ile
            15                  20                  25

Gln Asn Pro Trp Tyr Ser Gln Cys Leu Pro Gly Ser Cys Ser Pro Ser
        30                  35                  40

Thr Thr Leu Thr Arg Val Thr Thr Thr Ala Thr Ser Thr Ala Ser Thr
    45                  50                  55

Ala Thr Ser Gly Thr Gly Gly Ser Leu Pro Ser Ser Phe Lys Trp Ser
60                  65                  70                  75

Ser Ser Gly Pro Leu Val Asp Pro Lys Asn Asp Gly Arg Gly Ile Ala
                80                  85                  90

Ala Leu Lys Asp Pro Ser Ile Val Glu Val Asp Gly Thr Tyr His Val
            95                  100                 105

Phe Ala Ser Thr Ala Thr Ser Ala Gly Tyr Asn Met Val Tyr Phe Asn
        110                 115                 120

Phe Thr Asp Phe Asn Gln Ala Asn Asn Ala Pro Phe Phe Tyr Leu Asp
    125                 130                 135

Lys Ser Pro Ile Gly Ser Gly Tyr Arg Ala Ala Pro Gln Val Phe Phe
140                 145                 150                 155

Phe Lys Pro Gln Asn Leu Trp Tyr Leu Val Tyr Gln Asn Gly Asn Ala
                160                 165                 170

Ala Tyr Ser Thr Asn Lys Asp Ile Ser Asn Pro Ala Gly Trp Ser Ala
            175                 180                 185

Pro Lys Thr Phe Tyr Ser Ser Gln Pro Ser Ile Ile Thr Glu Asn Ile
        190                 195                 200

Gly Asn Gly Tyr Trp Val Asp Met Trp Val Ile Cys Asp Ser Ala Asn
    205                 210                 215

Cys His Leu Phe Ser Ser Asp Asp Asn Gly His Leu Tyr Arg Ser Gln
220                 225                 230                 235

Thr Thr Leu Ala Asn Phe Pro Asn Gly Met Thr Asn Thr Val Ile Ala
                240                 245                 250

Met Gln Asp Ser Asn Pro Asn Asn Leu Phe Glu Ala Ser Asn Val Tyr
            255                 260                 265

His Val Gly Gly Gly Lys Tyr Leu Leu Ile Val Glu Ala Ile Gly Ser
```

```
        270                 275                 280

Gly Gly Asp Arg Tyr Phe Arg Ser Trp Thr Ser Thr Ser Leu Thr Gly
    285                 290                 295

Thr Trp Thr Ala Leu Ala Ala Ser Glu Ser Asn Pro Phe Ala Gly Ala
300                 305                 310                 315

Lys Asn Val Ala Phe Ser Gly Asn Val Trp Thr Lys Ser Ile Ser His
                320                 325                 330

Gly Glu Met Ile Arg Asp Gln Val Asp Gln Thr Leu Thr Ile Ser Pro
            335                 340                 345

Cys Lys Leu Arg Tyr Leu Tyr Gln Gly Val Asp Pro Ala Ala Thr Gly
        350                 355                 360

Asn Tyr Asn Ser Leu Pro Trp Lys Leu Ala Leu Leu Thr Gln Thr Asn
    365                 370                 375

Ser Ala Cys
380


<210> SEQ ID NO 15
<211> LENGTH: 382
<212> TYPE: PRT
<213> ORGANISM: Aspergillus clavatus

<400> SEQUENCE: 15

Gln Gln Thr Leu Tyr Gly Gln Cys Gly Gly Asn Gly Trp Thr Gly Pro
1               5                   10                  15

Thr Gln Cys Val Ser Gly Ala Cys Cys Gln Ile Gln Asn Pro Trp Tyr
            20                  25                  30

Ser Gln Cys Leu Pro Gly Ser Cys Ser Pro Ser Thr Thr Leu Thr Arg
        35                  40                  45

Val Thr Thr Thr Ala Thr Ser Thr Ala Ser Thr Ala Thr Ser Gly Thr
    50                  55                  60

Gly Gly Ser Leu Pro Ser Ser Phe Lys Trp Ser Ser Ser Gly Pro Leu
65                  70                  75                  80

Val Asp Pro Lys Asn Asp Gly Arg Gly Ile Ala Ala Leu Lys Asp Pro
                85                  90                  95

Ser Ile Val Glu Val Asp Gly Thr Tyr His Val Phe Ala Ser Thr Ala
            100                 105                 110

Thr Ser Ala Gly Tyr Asn Met Val Tyr Phe Asn Phe Thr Asp Phe Asn
        115                 120                 125

Gln Ala Asn Asn Ala Pro Phe Phe Tyr Leu Asp Lys Ser Pro Ile Gly
    130                 135                 140

Ser Gly Tyr Arg Ala Ala Pro Gln Val Phe Phe Phe Lys Pro Gln Asn
145                 150                 155                 160

Leu Trp Tyr Leu Val Tyr Gln Asn Gly Asn Ala Ala Tyr Ser Thr Asn
                165                 170                 175

Lys Asp Ile Ser Asn Pro Ala Gly Trp Ser Ala Pro Lys Thr Phe Tyr
            180                 185                 190

Ser Ser Gln Pro Ser Ile Ile Thr Glu Asn Ile Gly Asn Gly Tyr Trp
        195                 200                 205

Val Asp Met Trp Val Ile Cys Asp Ser Ala Asn Cys His Leu Phe Ser
    210                 215                 220

Ser Asp Asp Asn Gly His Leu Tyr Arg Ser Gln Thr Thr Leu Ala Asn
225                 230                 235                 240

Phe Pro Asn Gly Met Thr Asn Thr Val Ile Ala Met Gln Asp Ser Asn
                245                 250                 255
```

```
Pro Asn Asn Leu Phe Glu Ala Ser Asn Val Tyr His Val Gly Gly Gly
            260                 265                 270

Lys Tyr Leu Leu Ile Val Glu Ala Ile Gly Ser Gly Gly Asp Arg Tyr
        275                 280                 285

Phe Arg Ser Trp Thr Ser Thr Ser Leu Thr Gly Thr Trp Thr Ala Leu
    290                 295                 300

Ala Ala Ser Glu Ser Asn Pro Phe Ala Gly Ala Lys Asn Val Ala Phe
305                 310                 315                 320

Ser Gly Asn Val Trp Thr Lys Ser Ile Ser His Gly Glu Met Ile Arg
                325                 330                 335

Asp Gln Val Asp Gln Thr Leu Thr Ile Ser Pro Cys Lys Leu Arg Tyr
            340                 345                 350

Leu Tyr Gln Gly Val Asp Pro Ala Ala Thr Gly Asn Tyr Asn Ser Leu
        355                 360                 365

Pro Trp Lys Leu Ala Leu Leu Thr Gln Thr Asn Ser Ala Cys
    370                 375                 380


<210> SEQ ID NO 16
<211> LENGTH: 1188
<212> TYPE: DNA
<213> ORGANISM: Artificial Sequence
<220> FEATURE:
<223> OTHER INFORMATION: codon optimised DNA sequence
<220> FEATURE:
<221> NAME/KEY: CDS
<222> LOCATION: (1)..(1185)
<220> FEATURE:
<221> NAME/KEY: sig_peptide
<222> LOCATION: (1)..(51)
<220> FEATURE:
<221> NAME/KEY: mat_peptide
<222> LOCATION: (52)..(1185)

<400> SEQUENCE: 16

atg aag gcg atc gga gcg acc ctc ctc gga ttg gcc ctc gcg gtg cag       48
Met Lys Ala Ile Gly Ala Thr Leu Leu Gly Leu Ala Leu Ala Val Gln
        -15                 -10                 -5

gca cag cag ccg ctc tat gca cag tgt gga ggc aac gga tgg acc ggt       96
Ala Gln Gln Pro Leu Tyr Ala Gln Cys Gly Gly Asn Gly Trp Thr Gly
-1  1               5                   10                  15

tcg acg cag tgt gtg gca ggt gcc tgt tgt tcg tcc att aac gcc tgg      144
Ser Thr Gln Cys Val Ala Gly Ala Cys Cys Ser Ser Ile Asn Ala Trp
                20                  25                  30

tac tat cag tgt ttg tcc gga aac tgt atg ccc tcg aca acg atg acg      192
Tyr Tyr Gln Cys Leu Ser Gly Asn Cys Met Pro Ser Thr Thr Met Thr
            35                  40                  45

aca acc gca act agg acc aca tcg acc tcc acg tcc gga ccc acg ggc      240
Thr Thr Ala Thr Arg Thr Thr Ser Thr Ser Thr Ser Gly Pro Thr Gly
        50                  55                  60

tcc ttg cct cct tcc ttc aag tgg tcc tcg acc aac gcc ctc gtg ggt      288
Ser Leu Pro Pro Ser Phe Lys Trp Ser Ser Thr Asn Ala Leu Val Gly
    65                  70                  75

cct aag aac gat ggc cga aac ctc gca ggt atc aaa gat ccg tcc atc      336
Pro Lys Asn Asp Gly Arg Asn Leu Ala Gly Ile Lys Asp Pro Ser Ile
80                  85                  90                  95

atc gaa gtg gac ggc aca tac cat gtg ttc gcc tcg aca gcg cag gcc      384
Ile Glu Val Asp Gly Thr Tyr His Val Phe Ala Ser Thr Ala Gln Ala
                100                 105                 110

tcc ggc tat aac ttg gtc tac ttc aac ttc acc gac ttc aac cag gca      432
Ser Gly Tyr Asn Leu Val Tyr Phe Asn Phe Thr Asp Phe Asn Gln Ala
            115                 120                 125
```

```
ggt aac gca ccc ttc ttc tac ttg gat cag tcg ggc att ggc aca ggt      480
Gly Asn Ala Pro Phe Phe Tyr Leu Asp Gln Ser Gly Ile Gly Thr Gly
        130                 135                 140

tat cgg gca gca ccc cag gtg ttc tac ttc cag cct cag cag ttg tgg      528
Tyr Arg Ala Ala Pro Gln Val Phe Tyr Phe Gln Pro Gln Gln Leu Trp
    145                 150                 155

tac ctc atc ttc cag aac gga aac gca gca tac tcg acc aac aag gat      576
Tyr Leu Ile Phe Gln Asn Gly Asn Ala Ala Tyr Ser Thr Asn Lys Asp
160                 165                 170                 175

atc tcc aac cct gca ggt tgg tcc gca ccg aaa aac ttc ttc tcc tcg      624
Ile Ser Asn Pro Ala Gly Trp Ser Ala Pro Lys Asn Phe Phe Ser Ser
                180                 185                 190

gtc cct tcc att atc acg cag aac atc ggt aac ggc tac tgg gtc gat      672
Val Pro Ser Ile Ile Thr Gln Asn Ile Gly Asn Gly Tyr Trp Val Asp
            195                 200                 205

atg tgg gtc atc tgt gac tcg tcc aac tgt tac ttg ttc tcc tcg gat      720
Met Trp Val Ile Cys Asp Ser Ser Asn Cys Tyr Leu Phe Ser Ser Asp
        210                 215                 220

gac aac ggc cat ctc tac cga tcc cag acg acg ttg tcg aac ttc ccc      768
Asp Asn Gly His Leu Tyr Arg Ser Gln Thr Thr Leu Ser Asn Phe Pro
    225                 230                 235

aac ggc atg ggt aac acc gtc atc gcc ctc tcg gat tcc aac ccc aac      816
Asn Gly Met Gly Asn Thr Val Ile Ala Leu Ser Asp Ser Asn Pro Asn
240                 245                 250                 255

aac ttg ttc gag gcc tcg aac gtc tac cgg gtg ggc aac gag tac ctc      864
Asn Leu Phe Glu Ala Ser Asn Val Tyr Arg Val Gly Asn Glu Tyr Leu
                260                 265                 270

ctc atc gtc gag gca atc ggt tcc gat gga aac agg tat ttc cgc tcg      912
Leu Ile Val Glu Ala Ile Gly Ser Asp Gly Asn Arg Tyr Phe Arg Ser
            275                 280                 285

tgg aca gca ccg tcg ctc aca ggt acg tgg aca ggc ctc gca aac aca      960
Trp Thr Ala Pro Ser Leu Thr Gly Thr Trp Thr Gly Leu Ala Asn Thr
        290                 295                 300

gaa gcc aac ccc ttc gcc agg tgg aac aac gtc gtg ttc tcc ggc acg     1008
Glu Ala Asn Pro Phe Ala Arg Trp Asn Asn Val Val Phe Ser Gly Thr
    305                 310                 315

gcc tgg act aag tcg atc tcg cac ggc gag atg gtg cga tcc cag gtc     1056
Ala Trp Thr Lys Ser Ile Ser His Gly Glu Met Val Arg Ser Gln Val
320                 325                 330                 335

gac cag acg atg aca att tcg ccg tgt aag ttg agg tac ttg tat cag     1104
Asp Gln Thr Met Thr Ile Ser Pro Cys Lys Leu Arg Tyr Leu Tyr Gln
                340                 345                 350

ggc ttg tcg ccc act gca aca ggc gac tat aac tcc ttg ccc tgg aag     1152
Gly Leu Ser Pro Thr Ala Thr Gly Asp Tyr Asn Ser Leu Pro Trp Lys
            355                 360                 365

ttg gcc ctc ctc acc cag aca aac tcg gca tgt tag                     1188
Leu Ala Leu Leu Thr Gln Thr Asn Ser Ala Cys
        370                 375
```

<210> SEQ ID NO 17
<211> LENGTH: 395
<212> TYPE: PRT
<213> ORGANISM: Artificial Sequence
<220> FEATURE:
<223> OTHER INFORMATION: Synthetic Construct

<400> SEQUENCE: 17

```
Met Lys Ala Ile Gly Ala Thr Leu Leu Gly Leu Ala Leu Ala Val Gln
        -15                 -10                 -5

Ala Gln Gln Pro Leu Tyr Ala Gln Cys Gly Gly Asn Gly Trp Thr Gly
-1  1               5                   10                  15
```

Ser Thr Gln Cys Val Ala Gly Ala Cys Cys Ser Ser Ile Asn Ala Trp
20 25 30

Tyr Tyr Gln Cys Leu Ser Gly Asn Cys Met Pro Ser Thr Thr Met Thr
35 40 45

Thr Thr Ala Thr Arg Thr Thr Ser Thr Ser Thr Ser Gly Pro Thr Gly
50 55 60

Ser Leu Pro Pro Ser Phe Lys Trp Ser Ser Thr Asn Ala Leu Val Gly
65 70 75

Pro Lys Asn Asp Gly Arg Asn Leu Ala Gly Ile Lys Asp Pro Ser Ile
80 85 90 95

Ile Glu Val Asp Gly Thr Tyr His Val Phe Ala Ser Thr Ala Gln Ala
100 105 110

Ser Gly Tyr Asn Leu Val Tyr Phe Asn Phe Thr Asp Phe Asn Gln Ala
115 120 125

Gly Asn Ala Pro Phe Phe Tyr Leu Asp Gln Ser Gly Ile Gly Thr Gly
130 135 140

Tyr Arg Ala Ala Pro Gln Val Phe Tyr Phe Gln Pro Gln Gln Leu Trp
145 150 155

Tyr Leu Ile Phe Gln Asn Gly Asn Ala Ala Tyr Ser Thr Asn Lys Asp
160 165 170 175

Ile Ser Asn Pro Ala Gly Trp Ser Ala Pro Lys Asn Phe Phe Ser Ser
180 185 190

Val Pro Ser Ile Ile Thr Gln Asn Ile Gly Asn Gly Tyr Trp Val Asp
195 200 205

Met Trp Val Ile Cys Asp Ser Ser Asn Cys Tyr Leu Phe Ser Ser Asp
210 215 220

Asp Asn Gly His Leu Tyr Arg Ser Gln Thr Thr Leu Ser Asn Phe Pro
225 230 235

Asn Gly Met Gly Asn Thr Val Ile Ala Leu Ser Asp Ser Asn Pro Asn
240 245 250 255

Asn Leu Phe Glu Ala Ser Asn Val Tyr Arg Val Gly Asn Glu Tyr Leu
260 265 270

Leu Ile Val Glu Ala Ile Gly Ser Asp Gly Asn Arg Tyr Phe Arg Ser
275 280 285

Trp Thr Ala Pro Ser Leu Thr Gly Thr Trp Thr Gly Leu Ala Asn Thr
290 295 300

Glu Ala Asn Pro Phe Ala Arg Trp Asn Asn Val Val Phe Ser Gly Thr
305 310 315

Ala Trp Thr Lys Ser Ile Ser His Gly Glu Met Val Arg Ser Gln Val
320 325 330 335

Asp Gln Thr Met Thr Ile Ser Pro Cys Lys Leu Arg Tyr Leu Tyr Gln
340 345 350

Gly Leu Ser Pro Thr Ala Thr Gly Asp Tyr Asn Ser Leu Pro Trp Lys
355 360 365

Leu Ala Leu Leu Thr Gln Thr Asn Ser Ala Cys
370 375

<210> SEQ ID NO 18
<211> LENGTH: 378
<212> TYPE: PRT
<213> ORGANISM: Neosartorya fischeri

<400> SEQUENCE: 18

Gln Gln Pro Leu Tyr Ala Gln Cys Gly Gly Asn Gly Trp Thr Gly Ser

```
1               5                   10                  15

Thr Gln Cys Val Ala Gly Ala Cys Cys Ser Ser Ile Asn Ala Trp Tyr
            20                  25                  30

Tyr Gln Cys Leu Ser Gly Asn Cys Met Pro Ser Thr Thr Met Thr Thr
        35                  40                  45

Thr Ala Thr Arg Thr Thr Ser Thr Ser Thr Ser Gly Pro Thr Gly Ser
    50                  55                  60

Leu Pro Pro Ser Phe Lys Trp Ser Ser Thr Asn Ala Leu Val Gly Pro
65                  70                  75                  80

Lys Asn Asp Gly Arg Asn Leu Ala Gly Ile Lys Asp Pro Ser Ile Ile
                85                  90                  95

Glu Val Asp Gly Thr Tyr His Val Phe Ala Ser Thr Ala Gln Ala Ser
            100                 105                 110

Gly Tyr Asn Leu Val Tyr Phe Asn Phe Thr Asp Phe Asn Gln Ala Gly
        115                 120                 125

Asn Ala Pro Phe Phe Tyr Leu Asp Gln Ser Gly Ile Gly Thr Gly Tyr
    130                 135                 140

Arg Ala Ala Pro Gln Val Phe Tyr Phe Gln Pro Gln Gln Leu Trp Tyr
145                 150                 155                 160

Leu Ile Phe Gln Asn Gly Asn Ala Ala Tyr Ser Thr Asn Lys Asp Ile
                165                 170                 175

Ser Asn Pro Ala Gly Trp Ser Ala Pro Lys Asn Phe Phe Ser Ser Val
            180                 185                 190

Pro Ser Ile Ile Thr Gln Asn Ile Gly Asn Gly Tyr Trp Val Asp Met
        195                 200                 205

Trp Val Ile Cys Asp Ser Ser Asn Cys Tyr Leu Phe Ser Ser Asp Asp
    210                 215                 220

Asn Gly His Leu Tyr Arg Ser Gln Thr Thr Leu Ser Asn Phe Pro Asn
225                 230                 235                 240

Gly Met Gly Asn Thr Val Ile Ala Leu Ser Asp Ser Asn Pro Asn Asn
                245                 250                 255

Leu Phe Glu Ala Ser Asn Val Tyr Arg Val Gly Asn Glu Tyr Leu Leu
            260                 265                 270

Ile Val Glu Ala Ile Gly Ser Asp Gly Asn Arg Tyr Phe Arg Ser Trp
        275                 280                 285

Thr Ala Pro Ser Leu Thr Gly Thr Trp Thr Gly Leu Ala Asn Thr Glu
    290                 295                 300

Ala Asn Pro Phe Ala Arg Trp Asn Asn Val Val Phe Ser Gly Thr Ala
305                 310                 315                 320

Trp Thr Lys Ser Ile Ser His Gly Glu Met Val Arg Ser Gln Val Asp
                325                 330                 335

Gln Thr Met Thr Ile Ser Pro Cys Lys Leu Arg Tyr Leu Tyr Gln Gly
            340                 345                 350

Leu Ser Pro Thr Ala Thr Gly Asp Tyr Asn Ser Leu Pro Trp Lys Leu
        355                 360                 365

Ala Leu Leu Thr Gln Thr Asn Ser Ala Cys
    370                 375
```

<210> SEQ ID NO 19
<211> LENGTH: 996
<212> TYPE: DNA
<213> ORGANISM: Artificial Sequence
<220> FEATURE:
<223> OTHER INFORMATION: codon optimised DNA sequence
<220> FEATURE:

```
<221> NAME/KEY: CDS
<222> LOCATION: (1)..(993)
<220> FEATURE:
<221> NAME/KEY: sig_peptide
<222> LOCATION: (1)..(60)
<220> FEATURE:
<221> NAME/KEY: mat_peptide
<222> LOCATION: (61)..(993)

<400> SEQUENCE: 19

atg aaa ttg tcc tgt gca ttc gtc gca gtg gca gca ttg gtg gcg acc       48
Met Lys Leu Ser Cys Ala Phe Val Ala Val Ala Ala Leu Val Ala Thr
-20                 -15                 -10                 -5

gca gtg gag gcc aac ccc gag acc gaa cga agg cgg tcc tgt gcg ctc       96
Ala Val Glu Ala Asn Pro Glu Thr Glu Arg Arg Arg Ser Cys Ala Leu
            -1  1               5                   10

cct aca aca tat cgg tgg acg tcc tcg gca ccg ctc gcc cag ccc aag      144
Pro Thr Thr Tyr Arg Trp Thr Ser Ser Ala Pro Leu Ala Gln Pro Lys
        15                  20                  25

gat ggc tgg gtc tcc ttg aaa gat ttc act cat gtc ccg tac aac gga      192
Asp Gly Trp Val Ser Leu Lys Asp Phe Thr His Val Pro Tyr Asn Gly
    30                  35                  40

cag cac ttg gtg tat gca tcc tac cat gat tcg acc aag tat gga tcg      240
Gln His Leu Val Tyr Ala Ser Tyr His Asp Ser Thr Lys Tyr Gly Ser
45                  50                  55                  60

atg gca ttc tcc ccc ttc aag cac tgg gca gat atg gcg aca gca acc      288
Met Ala Phe Ser Pro Phe Lys His Trp Ala Asp Met Ala Thr Ala Thr
                65                  70                  75

cag acg gga atg aca cag gca gcc gtg gca ccg acg gtg ttc tac ttc      336
Gln Thr Gly Met Thr Gln Ala Ala Val Ala Pro Thr Val Phe Tyr Phe
            80                  85                  90

aca ccc aaa aag ctc tgg ttc ttg gtg tcc cag tgg ggt tcg gca ccc      384
Thr Pro Lys Lys Leu Trp Phe Leu Val Ser Gln Trp Gly Ser Ala Pro
        95                  100                 105

ttc aca tac cgg act tcg acg gac cct aca aaa gtc aac ggc tgg tcg      432
Phe Thr Tyr Arg Thr Ser Thr Asp Pro Thr Lys Val Asn Gly Trp Ser
    110                 115                 120

gca ccc cag ccc ctc ttc acg ggc aaa gtg gca gat tcc ggc aca gga      480
Ala Pro Gln Pro Leu Phe Thr Gly Lys Val Ala Asp Ser Gly Thr Gly
125                 130                 135                 140

ccg atc gat cag aca gtg atc gcg gat gac cgg aag gtc tac ttg ttc      528
Pro Ile Asp Gln Thr Val Ile Ala Asp Asp Arg Lys Val Tyr Leu Phe
                145                 150                 155

ttc gtc gca gac aac gga aag gtg tac cgc aca tcc atg gca att gga      576
Phe Val Ala Asp Asn Gly Lys Val Tyr Arg Thr Ser Met Ala Ile Gly
            160                 165                 170

gac ttc cct gcc aac ttc ggc aca gcc tcc gag gtg att ttg tcg gat      624
Asp Phe Pro Ala Asn Phe Gly Thr Ala Ser Glu Val Ile Leu Ser Asp
        175                 180                 185

acc cag gca aag ttg ttc gaa gca gtc cag gtc tac acc gtg gca ggt      672
Thr Gln Ala Lys Leu Phe Glu Ala Val Gln Val Tyr Thr Val Ala Gly
    190                 195                 200

cag aac cag tac ctc atg atc gtg gag gcc cag ggt acc aac gga agg      720
Gln Asn Gln Tyr Leu Met Ile Val Glu Ala Gln Gly Thr Asn Gly Arg
205                 210                 215                 220

tac ttc cgg tcc ttc act gca aac tcg ttg gat gga gag tgg aag gtg      768
Tyr Phe Arg Ser Phe Thr Ala Asn Ser Leu Asp Gly Glu Trp Lys Val
                225                 230                 235

cag gca ggc tcg gag tcc gca cct ttc gca ggc aag gcc aac tcg gga      816
Gln Ala Gly Ser Glu Ser Ala Pro Phe Ala Gly Lys Ala Asn Ser Gly
            240                 245                 250
```

```
gcg tcc tgg acc aac gat gtc tcc cac ggt gat ctc att agg tcc aac      864
Ala Ser Trp Thr Asn Asp Val Ser His Gly Asp Leu Ile Arg Ser Asn
        255                 260                 265

ccg gat cag aca atg acc atc gat cct tgt cgc ctc cag ctc ctc tac      912
Pro Asp Gln Thr Met Thr Ile Asp Pro Cys Arg Leu Gln Leu Leu Tyr
    270                 275                 280

cag gga cgc gac aag aac aag gtc ccg tcg tcc tat gat ttg gca ccg      960
Gln Gly Arg Asp Lys Asn Lys Val Pro Ser Ser Tyr Asp Leu Ala Pro
285                 290                 295                 300

tat cgc cct ggc ctc ctc acc ttg tat ggc ctc tag                      996
Tyr Arg Pro Gly Leu Leu Thr Leu Tyr Gly Leu
                305                 310


<210> SEQ ID NO 20
<211> LENGTH: 331
<212> TYPE: PRT
<213> ORGANISM: Artificial Sequence
<220> FEATURE:
<223> OTHER INFORMATION: Synthetic Construct

<400> SEQUENCE: 20

Met Lys Leu Ser Cys Ala Phe Val Ala Val Ala Ala Leu Val Ala Thr
-20                 -15                 -10                 -5

Ala Val Glu Ala Asn Pro Glu Thr Glu Arg Arg Arg Ser Cys Ala Leu
            -1  1               5                   10

Pro Thr Thr Tyr Arg Trp Thr Ser Ser Ala Pro Leu Ala Gln Pro Lys
        15                  20                  25

Asp Gly Trp Val Ser Leu Lys Asp Phe Thr His Val Pro Tyr Asn Gly
    30                  35                  40

Gln His Leu Val Tyr Ala Ser Tyr His Asp Ser Thr Lys Tyr Gly Ser
45                  50                  55                  60

Met Ala Phe Ser Pro Phe Lys His Trp Ala Asp Met Ala Thr Ala Thr
                65                  70                  75

Gln Thr Gly Met Thr Gln Ala Ala Val Ala Pro Thr Val Phe Tyr Phe
            80                  85                  90

Thr Pro Lys Lys Leu Trp Phe Leu Val Ser Gln Trp Gly Ser Ala Pro
        95                  100                 105

Phe Thr Tyr Arg Thr Ser Thr Asp Pro Thr Lys Val Asn Gly Trp Ser
    110                 115                 120

Ala Pro Gln Pro Leu Phe Thr Gly Lys Val Ala Asp Ser Gly Thr Gly
125                 130                 135                 140

Pro Ile Asp Gln Thr Val Ile Ala Asp Asp Arg Lys Val Tyr Leu Phe
                145                 150                 155

Phe Val Ala Asp Asn Gly Lys Val Tyr Arg Thr Ser Met Ala Ile Gly
            160                 165                 170

Asp Phe Pro Ala Asn Phe Gly Thr Ala Ser Glu Val Ile Leu Ser Asp
        175                 180                 185

Thr Gln Ala Lys Leu Phe Glu Ala Val Gln Val Tyr Thr Val Ala Gly
    190                 195                 200

Gln Asn Gln Tyr Leu Met Ile Val Glu Ala Gln Gly Thr Asn Gly Arg
205                 210                 215                 220

Tyr Phe Arg Ser Phe Thr Ala Asn Ser Leu Asp Gly Glu Trp Lys Val
                225                 230                 235

Gln Ala Gly Ser Glu Ser Ala Pro Phe Ala Gly Lys Ala Asn Ser Gly
            240                 245                 250

Ala Ser Trp Thr Asn Asp Val Ser His Gly Asp Leu Ile Arg Ser Asn
        255                 260                 265
```

```
Pro Asp Gln Thr Met Thr Ile Asp Pro Cys Arg Leu Gln Leu Leu Tyr
    270                 275                 280

Gln Gly Arg Asp Lys Asn Lys Val Pro Ser Ser Tyr Asp Leu Ala Pro
285                 290                 295                 300

Tyr Arg Pro Gly Leu Leu Thr Leu Tyr Gly Leu
                305                 310


<210> SEQ ID NO 21
<211> LENGTH: 311
<212> TYPE: PRT
<213> ORGANISM: Ustilago maydis

<400> SEQUENCE: 21

Asn Pro Glu Thr Glu Arg Arg Arg Ser Cys Ala Leu Pro Thr Thr Tyr
1               5                   10                  15

Arg Trp Thr Ser Ser Ala Pro Leu Ala Gln Pro Lys Asp Gly Trp Val
            20                  25                  30

Ser Leu Lys Asp Phe Thr His Val Pro Tyr Asn Gly Gln His Leu Val
        35                  40                  45

Tyr Ala Ser Tyr His Asp Ser Thr Lys Tyr Gly Ser Met Ala Phe Ser
    50                  55                  60

Pro Phe Lys His Trp Ala Asp Met Ala Thr Ala Thr Gln Thr Gly Met
65                  70                  75                  80

Thr Gln Ala Ala Val Ala Pro Thr Val Phe Tyr Phe Thr Pro Lys Lys
                85                  90                  95

Leu Trp Phe Leu Val Ser Gln Trp Gly Ser Ala Pro Phe Thr Tyr Arg
            100                 105                 110

Thr Ser Thr Asp Pro Thr Lys Val Asn Gly Trp Ser Ala Pro Gln Pro
        115                 120                 125

Leu Phe Thr Gly Lys Val Ala Asp Ser Gly Thr Gly Pro Ile Asp Gln
    130                 135                 140

Thr Val Ile Ala Asp Asp Arg Lys Val Tyr Leu Phe Phe Val Ala Asp
145                 150                 155                 160

Asn Gly Lys Val Tyr Arg Thr Ser Met Ala Ile Gly Asp Phe Pro Ala
                165                 170                 175

Asn Phe Gly Thr Ala Ser Glu Val Ile Leu Ser Asp Thr Gln Ala Lys
            180                 185                 190

Leu Phe Glu Ala Val Gln Val Tyr Thr Val Ala Gly Gln Asn Gln Tyr
        195                 200                 205

Leu Met Ile Val Glu Ala Gln Gly Thr Asn Gly Arg Tyr Phe Arg Ser
    210                 215                 220

Phe Thr Ala Asn Ser Leu Asp Gly Glu Trp Lys Val Gln Ala Gly Ser
225                 230                 235                 240

Glu Ser Ala Pro Phe Ala Gly Lys Ala Asn Ser Gly Ala Ser Trp Thr
                245                 250                 255

Asn Asp Val Ser His Gly Asp Leu Ile Arg Ser Asn Pro Asp Gln Thr
            260                 265                 270

Met Thr Ile Asp Pro Cys Arg Leu Gln Leu Leu Tyr Gln Gly Arg Asp
        275                 280                 285

Lys Asn Lys Val Pro Ser Ser Tyr Asp Leu Ala Pro Tyr Arg Pro Gly
    290                 295                 300

Leu Leu Thr Leu Tyr Gly Leu
305                 310
```

```
<210> SEQ ID NO 22
<211> LENGTH: 996
<212> TYPE: DNA
<213> ORGANISM: Penicillium oxalicum
<220> FEATURE:
<221> NAME/KEY: CDS
<222> LOCATION: (1)..(993)
<220> FEATURE:
<221> NAME/KEY: sig_peptide
<222> LOCATION: (1)..(87)
<220> FEATURE:
<221> NAME/KEY: mat_peptide
<222> LOCATION: (88)..(993)

<400> SEQUENCE: 22

atg cgt tcc cct atc tct aac ctc gac ctg tgg tcg tct ttc act gtg       48
Met Arg Ser Pro Ile Ser Asn Leu Asp Leu Trp Ser Ser Phe Thr Val
                -25                 -20                 -15

ctt ctc gca tcg gct ggt acc ctt gcg agt gcc gcg tgc ccc gtc ccc       96
Leu Leu Ala Ser Ala Gly Thr Leu Ala Ser Ala Ala Cys Pro Val Pro
            -10                 -5              -1  1

tcc cag ggt caa tac cgc tgg tct tcc acc ggt gcc ctg gct cag cct      144
Ser Gln Gly Gln Tyr Arg Trp Ser Ser Thr Gly Ala Leu Ala Gln Pro
    5                   10                  15

cag cac ggc tgg act tcc atc aag gac ttc acc aac gtt gtc tac aac      192
Gln His Gly Trp Thr Ser Ile Lys Asp Phe Thr Asn Val Val Tyr Asn
20                  25                  30                  35

ggc aag cac ctt gtc tac gcc tcc gtg gcc gac tcc aag ggc aac tac      240
Gly Lys His Leu Val Tyr Ala Ser Val Ala Asp Ser Lys Gly Asn Tyr
                40                  45                  50

cac tcc atg aac ttc ggt ctc ttc agt gac tgg tcc cag atg gcc tcc      288
His Ser Met Asn Phe Gly Leu Phe Ser Asp Trp Ser Gln Met Ala Ser
            55                  60                  65

gcc agc cag aac ccc atg aac ttc aac gct gtc gcc ccg act ctg ttc      336
Ala Ser Gln Asn Pro Met Asn Phe Asn Ala Val Ala Pro Thr Leu Phe
        70                  75                  80

ttc ttc gct ccc aag aac gtc tgg gtt ctc gcc tac cag tgg ggc gcc      384
Phe Phe Ala Pro Lys Asn Val Trp Val Leu Ala Tyr Gln Trp Gly Ala
    85                  90                  95

aac gcc ttc tcc tac cgt acc tcc aac gac ccc gcc aat gcc aat gga      432
Asn Ala Phe Ser Tyr Arg Thr Ser Asn Asp Pro Ala Asn Ala Asn Gly
100                 105                 110                 115

tgg tcg tct gag cac ccg ctg ttc acc gga aag atc gcc aac agc ggt      480
Trp Ser Ser Glu His Pro Leu Phe Thr Gly Lys Ile Ala Asn Ser Gly
                120                 125                 130

acc ggc ccc atc gac cag acc ctg atc ggt gac aac cag aac atg tac      528
Thr Gly Pro Ile Asp Gln Thr Leu Ile Gly Asp Asn Gln Asn Met Tyr
            135                 140                 145

ctg ttc ttc gcc ggt gat aac ggc aag atc tac cgg tcc agc atg ccc      576
Leu Phe Phe Ala Gly Asp Asn Gly Lys Ile Tyr Arg Ser Ser Met Pro
        150                 155                 160

ctc aac aac ttc ccc gga tcc ttc ggc ggt gcc tcc gag gtc atc ctg      624
Leu Asn Asn Phe Pro Gly Ser Phe Gly Gly Ala Ser Glu Val Ile Leu
    165                 170                 175

agc gac acc acc gcc aac ctc ttc gag gcc gtc cag gtc tac aag gtt      672
Ser Asp Thr Thr Ala Asn Leu Phe Glu Ala Val Gln Val Tyr Lys Val
180                 185                 190                 195

gcc ggt gag aac aag tat ctc atg atc gtc gag gcc atg ggt gcc cac      720
Ala Gly Glu Asn Lys Tyr Leu Met Ile Val Glu Ala Met Gly Ala His
                200                 205                 210

ggc cgc tac ttc cgc tcc ttc act gcc acc agc ctc aac ggc aag tgg      768
Gly Arg Tyr Phe Arg Ser Phe Thr Ala Thr Ser Leu Asn Gly Lys Trp
            215                 220                 225
```

```
acc ctc aac gct ggc tcc gag ggt gct ccc ttc gcc ggc aag gcc aac      816
Thr Leu Asn Ala Gly Ser Glu Gly Ala Pro Phe Ala Gly Lys Ala Asn
        230                 235                 240

agc ggt gct ggc tgg acc aac gac atc agc cac ggt gac ctc gtc cgt      864
Ser Gly Ala Gly Trp Thr Asn Asp Ile Ser His Gly Asp Leu Val Arg
    245                 250                 255

acc aac cct gac cag acc atg acc gtc gac atg tgc aac ctc cag ttc      912
Thr Asn Pro Asp Gln Thr Met Thr Val Asp Met Cys Asn Leu Gln Phe
260                 265                 270                 275

ctg tac cag ggc cgt gac ccc aac gcc aac ccc acc tac aac gct ctg      960
Leu Tyr Gln Gly Arg Asp Pro Asn Ala Asn Pro Thr Tyr Asn Ala Leu
                280                 285                 290

cct tac cgc ccc ggt gtt ctc acc ctg aag cac tag                      996
Pro Tyr Arg Pro Gly Val Leu Thr Leu Lys His
            295                 300


<210> SEQ ID NO 23
<211> LENGTH: 331
<212> TYPE: PRT
<213> ORGANISM: Penicillium oxalicum

<400> SEQUENCE: 23

Met Arg Ser Pro Ile Ser Asn Leu Asp Leu Trp Ser Ser Phe Thr Val
                -25                 -20                 -15

Leu Leu Ala Ser Ala Gly Thr Leu Ala Ser Ala Ala Cys Pro Val Pro
            -10                 -5              -1  1

Ser Gln Gly Gln Tyr Arg Trp Ser Ser Thr Gly Ala Leu Ala Gln Pro
    5                   10                  15

Gln His Gly Trp Thr Ser Ile Lys Asp Phe Thr Asn Val Val Tyr Asn
20                  25                  30                  35

Gly Lys His Leu Val Tyr Ala Ser Val Ala Asp Ser Lys Gly Asn Tyr
                40                  45                  50

His Ser Met Asn Phe Gly Leu Phe Ser Asp Trp Ser Gln Met Ala Ser
            55                  60                  65

Ala Ser Gln Asn Pro Met Asn Phe Asn Ala Val Ala Pro Thr Leu Phe
        70                  75                  80

Phe Phe Ala Pro Lys Asn Val Trp Val Leu Ala Tyr Gln Trp Gly Ala
    85                  90                  95

Asn Ala Phe Ser Tyr Arg Thr Ser Asn Asp Pro Ala Asn Ala Asn Gly
100                 105                 110                 115

Trp Ser Ser Glu His Pro Leu Phe Thr Gly Lys Ile Ala Asn Ser Gly
                120                 125                 130

Thr Gly Pro Ile Asp Gln Thr Leu Ile Gly Asp Asn Gln Asn Met Tyr
            135                 140                 145

Leu Phe Phe Ala Gly Asp Asn Gly Lys Ile Tyr Arg Ser Ser Met Pro
        150                 155                 160

Leu Asn Asn Phe Pro Gly Ser Phe Gly Gly Ala Ser Glu Val Ile Leu
    165                 170                 175

Ser Asp Thr Thr Ala Asn Leu Phe Glu Ala Val Gln Val Tyr Lys Val
180                 185                 190                 195

Ala Gly Glu Asn Lys Tyr Leu Met Ile Val Glu Ala Met Gly Ala His
                200                 205                 210

Gly Arg Tyr Phe Arg Ser Phe Thr Ala Thr Ser Leu Asn Gly Lys Trp
            215                 220                 225

Thr Leu Asn Ala Gly Ser Glu Gly Ala Pro Phe Ala Gly Lys Ala Asn
        230                 235                 240
```

```
Ser Gly Ala Gly Trp Thr Asn Asp Ile Ser His Gly Asp Leu Val Arg
    245                 250                 255

Thr Asn Pro Asp Gln Thr Met Thr Val Asp Met Cys Asn Leu Gln Phe
260                 265                 270                 275

Leu Tyr Gln Gly Arg Asp Pro Asn Ala Asn Pro Thr Tyr Asn Ala Leu
                280                 285                 290

Pro Tyr Arg Pro Gly Val Leu Thr Leu Lys His
            295                 300


<210> SEQ ID NO 24
<211> LENGTH: 302
<212> TYPE: PRT
<213> ORGANISM: Penicillium oxalicum

<400> SEQUENCE: 24

Pro Val Pro Ser Gln Gly Gln Tyr Arg Trp Ser Ser Thr Gly Ala Leu
1               5                   10                  15

Ala Gln Pro Gln His Gly Trp Thr Ser Ile Lys Asp Phe Thr Asn Val
            20                  25                  30

Val Tyr Asn Gly Lys His Leu Val Tyr Ala Ser Val Ala Asp Ser Lys
        35                  40                  45

Gly Asn Tyr His Ser Met Asn Phe Gly Leu Phe Ser Asp Trp Ser Gln
    50                  55                  60

Met Ala Ser Ala Ser Gln Asn Pro Met Asn Phe Asn Ala Val Ala Pro
65                  70                  75                  80

Thr Leu Phe Phe Phe Ala Pro Lys Asn Val Trp Val Leu Ala Tyr Gln
                85                  90                  95

Trp Gly Ala Asn Ala Phe Ser Tyr Arg Thr Ser Asn Asp Pro Ala Asn
            100                 105                 110

Ala Asn Gly Trp Ser Ser Glu His Pro Leu Phe Thr Gly Lys Ile Ala
        115                 120                 125

Asn Ser Gly Thr Gly Pro Ile Asp Gln Thr Leu Ile Gly Asp Asn Gln
    130                 135                 140

Asn Met Tyr Leu Phe Phe Ala Gly Asp Asn Gly Lys Ile Tyr Arg Ser
145                 150                 155                 160

Ser Met Pro Leu Asn Asn Phe Pro Gly Ser Phe Gly Gly Ala Ser Glu
                165                 170                 175

Val Ile Leu Ser Asp Thr Thr Ala Asn Leu Phe Glu Ala Val Gln Val
            180                 185                 190

Tyr Lys Val Ala Gly Glu Asn Lys Tyr Leu Met Ile Val Glu Ala Met
        195                 200                 205

Gly Ala His Gly Arg Tyr Phe Arg Ser Phe Thr Ala Thr Ser Leu Asn
    210                 215                 220

Gly Lys Trp Thr Leu Asn Ala Gly Ser Glu Gly Ala Pro Phe Ala Gly
225                 230                 235                 240

Lys Ala Asn Ser Gly Ala Gly Trp Thr Asn Asp Ile Ser His Gly Asp
                245                 250                 255

Leu Val Arg Thr Asn Pro Asp Gln Thr Met Thr Val Asp Met Cys Asn
            260                 265                 270

Leu Gln Phe Leu Tyr Gln Gly Arg Asp Pro Asn Ala Asn Pro Thr Tyr
        275                 280                 285

Asn Ala Leu Pro Tyr Arg Pro Gly Val Leu Thr Leu Lys His
    290                 295                 300
```

```
<210> SEQ ID NO 25
<211> LENGTH: 1030
<212> TYPE: DNA
<213> ORGANISM: Talaromyces pinophilus
<220> FEATURE:
<221> NAME/KEY: CDS
<222> LOCATION: (1)..(70)
<220> FEATURE:
<221> NAME/KEY: sig_peptide
<222> LOCATION: (1)..(48)
<220> FEATURE:
<221> NAME/KEY: mat_peptide
<222> LOCATION: (49)..(1027)
<220> FEATURE:
<221> NAME/KEY: CDS
<222> LOCATION: (123)..(1027)

<400> SEQUENCE: 25

atg cat ttc ctc gcc gcg ttg ctc gcg gtt ctg cca ctt gta tct ggg       48
Met His Phe Leu Ala Ala Leu Leu Ala Val Leu Pro Leu Val Ser Gly
    -15                 -10                 -5                  -1

tct cca gta ccc gag aaa cga t gtaagttgta tccacctgaa cagtgaaagc      100
Ser Pro Val Pro Glu Lys Arg
1               5

tggacggtat tgacaatcac ag cc  gga tgc gca ctt ccc tct acg tac aag     151
                         Ser Gly Cys Ala Leu Pro Ser Thr Tyr Lys
                                 10                  15

tgg aca tcc act ggc ccg ctg gca agc ccc aag tcg ggt ttg gtt gct      199
Trp Thr Ser Thr Gly Pro Leu Ala Ser Pro Lys Ser Gly Leu Val Ala
        20                  25                  30

ctg aga gac tat agc cat gtc atc tac aac ggc caa cat ctc gta tac      247
Leu Arg Asp Tyr Ser His Val Ile Tyr Asn Gly Gln His Leu Val Tyr
    35                  40                  45

gga tcg acc gcc aac aca gct ggc agc tat ggt tcc atg aac ttt ggc      295
Gly Ser Thr Ala Asn Thr Ala Gly Ser Tyr Gly Ser Met Asn Phe Gly
50                  55                  60                  65

ctg ttt tcg gac tgg tct gag atg tca tct gcc agc caa aac acg atg      343
Leu Phe Ser Asp Trp Ser Glu Met Ser Ser Ala Ser Gln Asn Thr Met
                70                  75                  80

agc act ggc gcc gtc gct ccc acg atc ttc tac ttt gca cca aag agt      391
Ser Thr Gly Ala Val Ala Pro Thr Ile Phe Tyr Phe Ala Pro Lys Ser
            85                  90                  95

gtc tgg atc ctt gcc tat caa tgg ggt cca tat gcg ttt tcc tac agg      439
Val Trp Ile Leu Ala Tyr Gln Trp Gly Pro Tyr Ala Phe Ser Tyr Arg
        100                 105                 110

act tct acc gat cct tcc aat gcc aat ggc tgg tca tcg cca cag cct      487
Thr Ser Thr Asp Pro Ser Asn Ala Asn Gly Trp Ser Ser Pro Gln Pro
    115                 120                 125

ctt ttc acg gga act att tcc ggc tcc agt acc ggt gtc atc gat cag      535
Leu Phe Thr Gly Thr Ile Ser Gly Ser Ser Thr Gly Val Ile Asp Gln
130                 135                 140                 145

aca gtt att ggc gat agc gaa aac atg tat ctc ttc ttt gct gga gat      583
Thr Val Ile Gly Asp Ser Glu Asn Met Tyr Leu Phe Phe Ala Gly Asp
                150                 155                 160

aat ggc cat att tac cgt gct agc atg ccc att gga gac ttt cct gga      631
Asn Gly His Ile Tyr Arg Ala Ser Met Pro Ile Gly Asp Phe Pro Gly
            165                 170                 175

agt ttc ggc tca gca tcg acg att gtc ctc agc gac tcg act aac aac      679
Ser Phe Gly Ser Ala Ser Thr Ile Val Leu Ser Asp Ser Thr Asn Asn
        180                 185                 190

ttg ttc gag gcg gta gag gtc tac acc gtc gag ggt caa aat caa tac      727
Leu Phe Glu Ala Val Glu Val Tyr Thr Val Glu Gly Gln Asn Gln Tyr
    195                 200                 205
```

```
ctc atg att gtc gag gca att ggt gcc aat gga cgt tat ttc cgc tcc      775
Leu Met Ile Val Glu Ala Ile Gly Ala Asn Gly Arg Tyr Phe Arg Ser
210                 215                 220                 225

ttc aca gct agt agt ctg gga ggc aca tgg acg gcg cag gct tca acc      823
Phe Thr Ala Ser Ser Leu Gly Gly Thr Trp Thr Ala Gln Ala Ser Thr
                230                 235                 240

gag tcc aac cca ttc gct ggc aag gct aac agt ggc gcc acc tgg acc      871
Glu Ser Asn Pro Phe Ala Gly Lys Ala Asn Ser Gly Ala Thr Trp Thr
            245                 250                 255

aac gac atc agc agc ggc gat ttg gtc cgt act aat ccc gat cag aca      919
Asn Asp Ile Ser Ser Gly Asp Leu Val Arg Thr Asn Pro Asp Gln Thr
        260                 265                 270

cag acg atc gat gcc tgc aat cta caa ttc ctc tat caa gga cga tcc      967
Gln Thr Ile Asp Ala Cys Asn Leu Gln Phe Leu Tyr Gln Gly Arg Ser
    275                 280                 285

acc agc tcc ggc ggc gac tac aac ctt ctt cct tac cag cct ggt ctg     1015
Thr Ser Ser Gly Gly Asp Tyr Asn Leu Leu Pro Tyr Gln Pro Gly Leu
290                 295                 300                 305

ttg aca ctt gct tag                                                 1030
Leu Thr Leu Ala


<210> SEQ ID NO 26
<211> LENGTH: 325
<212> TYPE: PRT
<213> ORGANISM: Talaromyces pinophilus

<400> SEQUENCE: 26

Met His Phe Leu Ala Ala Leu Leu Ala Val Leu Pro Leu Val Ser Gly
    -15                 -10                 -5                  -1

Ser Pro Val Pro Glu Lys Arg Ser Gly Cys Ala Leu Pro Ser Thr Tyr
1               5                   10                  15

Lys Trp Thr Ser Thr Gly Pro Leu Ala Ser Pro Lys Ser Gly Leu Val
            20                  25                  30

Ala Leu Arg Asp Tyr Ser His Val Ile Tyr Asn Gly Gln His Leu Val
        35                  40                  45

Tyr Gly Ser Thr Ala Asn Thr Ala Gly Ser Tyr Gly Ser Met Asn Phe
    50                  55                  60

Gly Leu Phe Ser Asp Trp Ser Glu Met Ser Ser Ala Ser Gln Asn Thr
65                  70                  75                  80

Met Ser Thr Gly Ala Val Ala Pro Thr Ile Phe Tyr Phe Ala Pro Lys
                85                  90                  95

Ser Val Trp Ile Leu Ala Tyr Gln Trp Gly Pro Tyr Ala Phe Ser Tyr
            100                 105                 110

Arg Thr Ser Thr Asp Pro Ser Asn Ala Asn Gly Trp Ser Ser Pro Gln
        115                 120                 125

Pro Leu Phe Thr Gly Thr Ile Ser Gly Ser Ser Thr Gly Val Ile Asp
    130                 135                 140

Gln Thr Val Ile Gly Asp Ser Glu Asn Met Tyr Leu Phe Phe Ala Gly
145                 150                 155                 160

Asp Asn Gly His Ile Tyr Arg Ala Ser Met Pro Ile Gly Asp Phe Pro
                165                 170                 175

Gly Ser Phe Gly Ser Ala Ser Thr Ile Val Leu Ser Asp Ser Thr Asn
            180                 185                 190

Asn Leu Phe Glu Ala Val Glu Val Tyr Thr Val Glu Gly Gln Asn Gln
        195                 200                 205

Tyr Leu Met Ile Val Glu Ala Ile Gly Ala Asn Gly Arg Tyr Phe Arg
    210                 215                 220
```

```
Ser Phe Thr Ala Ser Ser Leu Gly Gly Thr Trp Thr Ala Gln Ala Ser
225                 230                 235                 240

Thr Glu Ser Asn Pro Phe Ala Gly Lys Ala Asn Ser Gly Ala Thr Trp
                245                 250                 255

Thr Asn Asp Ile Ser Ser Gly Asp Leu Val Arg Thr Asn Pro Asp Gln
            260                 265                 270

Thr Gln Thr Ile Asp Ala Cys Asn Leu Gln Phe Leu Tyr Gln Gly Arg
        275                 280                 285

Ser Thr Ser Ser Gly Gly Asp Tyr Asn Leu Leu Pro Tyr Gln Pro Gly
    290                 295                 300

Leu Leu Thr Leu Ala
305


<210> SEQ ID NO 27
<211> LENGTH: 309
<212> TYPE: PRT
<213> ORGANISM: Talaromyces pinophilus

<400> SEQUENCE: 27

Ser Pro Val Pro Glu Lys Arg Ser Gly Cys Ala Leu Pro Ser Thr Tyr
1               5                   10                  15

Lys Trp Thr Ser Thr Gly Pro Leu Ala Ser Pro Lys Ser Gly Leu Val
            20                  25                  30

Ala Leu Arg Asp Tyr Ser His Val Ile Tyr Asn Gly Gln His Leu Val
        35                  40                  45

Tyr Gly Ser Thr Ala Asn Thr Ala Gly Ser Tyr Gly Ser Met Asn Phe
    50                  55                  60

Gly Leu Phe Ser Asp Trp Ser Glu Met Ser Ser Ala Ser Gln Asn Thr
65                  70                  75                  80

Met Ser Thr Gly Ala Val Ala Pro Thr Ile Phe Tyr Phe Ala Pro Lys
                85                  90                  95

Ser Val Trp Ile Leu Ala Tyr Gln Trp Gly Pro Tyr Ala Phe Ser Tyr
            100                 105                 110

Arg Thr Ser Thr Asp Pro Ser Asn Ala Asn Gly Trp Ser Ser Pro Gln
        115                 120                 125

Pro Leu Phe Thr Gly Thr Ile Ser Gly Ser Ser Thr Gly Val Ile Asp
    130                 135                 140

Gln Thr Val Ile Gly Asp Ser Glu Asn Met Tyr Leu Phe Phe Ala Gly
145                 150                 155                 160

Asp Asn Gly His Ile Tyr Arg Ala Ser Met Pro Ile Gly Asp Phe Pro
                165                 170                 175

Gly Ser Phe Gly Ser Ala Ser Thr Ile Val Leu Ser Asp Ser Thr Asn
            180                 185                 190

Asn Leu Phe Glu Ala Val Glu Val Tyr Thr Val Glu Gly Gln Asn Gln
        195                 200                 205

Tyr Leu Met Ile Val Glu Ala Ile Gly Ala Asn Gly Arg Tyr Phe Arg
    210                 215                 220

Ser Phe Thr Ala Ser Ser Leu Gly Gly Thr Trp Thr Ala Gln Ala Ser
225                 230                 235                 240

Thr Glu Ser Asn Pro Phe Ala Gly Lys Ala Asn Ser Gly Ala Thr Trp
                245                 250                 255

Thr Asn Asp Ile Ser Ser Gly Asp Leu Val Arg Thr Asn Pro Asp Gln
            260                 265                 270

Thr Gln Thr Ile Asp Ala Cys Asn Leu Gln Phe Leu Tyr Gln Gly Arg
```

```
        275                 280                 285

Ser Thr Ser Ser Gly Gly Asp Tyr Asn Leu Leu Pro Tyr Gln Pro Gly
    290                 295                 300

Leu Leu Thr Leu Ala
305


<210> SEQ ID NO 28
<211> LENGTH: 1425
<212> TYPE: DNA
<213> ORGANISM: Streptomyces nitrosporeus
<220> FEATURE:
<221> NAME/KEY: CDS
<222> LOCATION: (1)..(1422)
<220> FEATURE:
<221> NAME/KEY: sig_peptide
<222> LOCATION: (1)..(108)
<220> FEATURE:
<221> NAME/KEY: mat_peptide
<222> LOCATION: (109)..(1422)

<400> SEQUENCE: 28

atg tac aga gga agt ctc agc cgc ggg cgc acg ccc gcg gtg ctc gcc      48
Met Tyr Arg Gly Ser Leu Ser Arg Gly Arg Thr Pro Ala Val Leu Ala
    -35                 -30                 -25

gcc gcg gtc gcg gtc ctg gcg gcg ctg gcg gcg atg ctt gtc gcc acc      96
Ala Ala Val Ala Val Leu Ala Ala Leu Ala Ala Met Leu Val Ala Thr
-20                 -15                 -10                 -5

ccg gcc cag gcg gcc gcc agc ggc gcc ctg cgc ggt gcc ggt tcg ggc     144
Pro Ala Gln Ala Ala Ala Ser Gly Ala Leu Arg Gly Ala Gly Ser Gly
            -1  1               5                   10

cgg tgc gtc gac gtg acg ggc ggc gaa cgg acc gac ggc act acc ctc     192
Arg Cys Val Asp Val Thr Gly Gly Glu Arg Thr Asp Gly Thr Thr Leu
        15                  20                  25

cag ctc tac gac tgc tgg ggc ggg acc aac cag cag tgg acg tcg acg     240
Gln Leu Tyr Asp Cys Trp Gly Gly Thr Asn Gln Gln Trp Thr Ser Thr
    30                  35                  40

gac agc ggc cag ctg acc gtg tac ggc gac aag tgc ctg gac gtt ccg     288
Asp Ser Gly Gln Leu Thr Val Tyr Gly Asp Lys Cys Leu Asp Val Pro
45                  50                  55                  60

ggc cac gcc acc aca ccc ggt acc agg gtg cag atc tgg ggc tgc tcc     336
Gly His Ala Thr Thr Pro Gly Thr Arg Val Gln Ile Trp Gly Cys Ser
                65                  70                  75

ggc ggt gcg aac cag cag tgg cgg gtg aac tcc gac ggc acg gtc gtc     384
Gly Gly Ala Asn Gln Gln Trp Arg Val Asn Ser Asp Gly Thr Val Val
            80                  85                  90

ggc gtg gag tcc ggg ctg tgc ctg gag gcc gcg ggc gcc ggt acg gcc     432
Gly Val Glu Ser Gly Leu Cys Leu Glu Ala Ala Gly Ala Gly Thr Ala
        95                  100                 105

aac ggc aca gcg gtc cag ctc tgg acg tgc aac ggc ggc agc aac cag     480
Asn Gly Thr Ala Val Gln Leu Trp Thr Cys Asn Gly Gly Ser Asn Gln
    110                 115                 120

aag tgg acc ggt ctg ccc gcg acg ccg ccg acg gac ggc acg tgt tcc     528
Lys Trp Thr Gly Leu Pro Ala Thr Pro Pro Thr Asp Gly Thr Cys Ser
125                 130                 135                 140

ctt ccg tcg gcg tac cgg tgg acg tct acg ggc gtg ctg gcg cag ccg     576
Leu Pro Ser Ala Tyr Arg Trp Thr Ser Thr Gly Val Leu Ala Gln Pro
                145                 150                 155

gcg aac ggg tgg gcc gcg gtg aag gac ttc acc acc gtg acc cac aac     624
Ala Asn Gly Trp Ala Ala Val Lys Asp Phe Thr Thr Val Thr His Asn
            160                 165                 170

ggc aag cac ctg gtc tac gcg tcg aac gtg tcg ggg tcg tcg tac ggt     672
Gly Lys His Leu Val Tyr Ala Ser Asn Val Ser Gly Ser Ser Tyr Gly
```

```
        175                 180                 185

tcg atg atg ttc agt ccc ttc acg gac tgg ccg gac atg gcg tcg gcc      720
Ser Met Met Phe Ser Pro Phe Thr Asp Trp Pro Asp Met Ala Ser Ala
    190                 195                 200

ggc cag acg gga atg agc cag gcc gcg gtg gcg ccc acg ctg ttc tac      768
Gly Gln Thr Gly Met Ser Gln Ala Ala Val Ala Pro Thr Leu Phe Tyr
205                 210                 215                 220

ttc gcg ccc aag aac atc tgg gta ctg gcg tac cag tgg ggc gcg tgg      816
Phe Ala Pro Lys Asn Ile Trp Val Leu Ala Tyr Gln Trp Gly Ala Trp
            225                 230                 235

ccc ttc atc tac cgc acg tcg agc aac ccc gcc gac ccc aac ggc tgg      864
Pro Phe Ile Tyr Arg Thr Ser Ser Asn Pro Ala Asp Pro Asn Gly Trp
            240                 245                 250

tcc tcc ccg cag ccg ctg ttc acc ggg agc atc tcc gga tcc gac acc      912
Ser Ser Pro Gln Pro Leu Phe Thr Gly Ser Ile Ser Gly Ser Asp Thr
        255                 260                 265

ggc ccg atc gat cag acc ctg atc gcc gac gga cag aac atg tac ctg      960
Gly Pro Ile Asp Gln Thr Leu Ile Ala Asp Gly Gln Asn Met Tyr Leu
    270                 275                 280

ttc ttc gcc ggt gac aac ggg aag atc tac cgg gcg agc atg ccg atc     1008
Phe Phe Ala Gly Asp Asn Gly Lys Ile Tyr Arg Ala Ser Met Pro Ile
285                 290                 295                 300

ggg aac ttc ccg ggc agc ttc ggc tcg tcg tac acg acg gtc atg agc     1056
Gly Asn Phe Pro Gly Ser Phe Gly Ser Ser Tyr Thr Thr Val Met Ser
            305                 310                 315

gac acg aag gcc aac ctg ttc gag ggc gtc cag gtc tac aag gtc aag     1104
Asp Thr Lys Ala Asn Leu Phe Glu Gly Val Gln Val Tyr Lys Val Lys
            320                 325                 330

gac cgg agc cag tac ctc atg atc gtc gag gcg atg ggt gcg aac ggg     1152
Asp Arg Ser Gln Tyr Leu Met Ile Val Glu Ala Met Gly Ala Asn Gly
        335                 340                 345

cgc tac ttc cgc tcc ttc acg gcc tcc agc ctg aac ggg acg tgg acc     1200
Arg Tyr Phe Arg Ser Phe Thr Ala Ser Ser Leu Asn Gly Thr Trp Thr
    350                 355                 360

ccg cag gcc gcc acc gag agc agc ccc ttc gcg ggc aag gcc aac agc     1248
Pro Gln Ala Ala Thr Glu Ser Ser Pro Phe Ala Gly Lys Ala Asn Ser
365                 370                 375                 380

ggt gcc acc tgg acc aac gac atc agc cac ggc gac ctg gtc cgc gac     1296
Gly Ala Thr Trp Thr Asn Asp Ile Ser His Gly Asp Leu Val Arg Asp
            385                 390                 395

aac ccc gac cag acc atg acc gtc gac ccc tgc aac ctg cgg ttc ctc     1344
Asn Pro Asp Gln Thr Met Thr Val Asp Pro Cys Asn Leu Arg Phe Leu
            400                 405                 410

tac cag ggc aag gcg ccc gac gcg ggc ggc gag tac aac cgg ctg ccg     1392
Tyr Gln Gly Lys Ala Pro Asp Ala Gly Gly Glu Tyr Asn Arg Leu Pro
        415                 420                 425

tgg cgg ccg ggg gtc ctc acc ctg cgg cgc tga                         1425
Trp Arg Pro Gly Val Leu Thr Leu Arg Arg
    430                 435
```

<210> SEQ ID NO 29
<211> LENGTH: 474
<212> TYPE: PRT
<213> ORGANISM: Streptomyces nitrosporeus

<400> SEQUENCE: 29

```
Met Tyr Arg Gly Ser Leu Ser Arg Gly Arg Thr Pro Ala Val Leu Ala
    -35                 -30                 -25

Ala Ala Val Ala Val Leu Ala Ala Leu Ala Ala Met Leu Val Ala Thr
-20                 -15                 -10                 -5
```

```
Pro Ala Gln Ala Ala Ala Ser Gly Ala Leu Arg Gly Ala Gly Ser Gly
            -1  1               5                   10

Arg Cys Val Asp Val Thr Gly Gly Glu Arg Thr Asp Gly Thr Thr Leu
        15                  20                  25

Gln Leu Tyr Asp Cys Trp Gly Gly Thr Asn Gln Gln Trp Thr Ser Thr
    30                  35                  40

Asp Ser Gly Gln Leu Thr Val Tyr Gly Asp Lys Cys Leu Asp Val Pro
45                  50                  55                  60

Gly His Ala Thr Thr Pro Gly Thr Arg Val Gln Ile Trp Gly Cys Ser
                65                  70                  75

Gly Gly Ala Asn Gln Gln Trp Arg Val Asn Ser Asp Gly Thr Val Val
            80                  85                  90

Gly Val Glu Ser Gly Leu Cys Leu Glu Ala Ala Gly Ala Gly Thr Ala
        95                  100                 105

Asn Gly Thr Ala Val Gln Leu Trp Thr Cys Asn Gly Gly Ser Asn Gln
    110                 115                 120

Lys Trp Thr Gly Leu Pro Ala Thr Pro Pro Thr Asp Gly Thr Cys Ser
125                 130                 135                 140

Leu Pro Ser Ala Tyr Arg Trp Thr Ser Thr Gly Val Leu Ala Gln Pro
                145                 150                 155

Ala Asn Gly Trp Ala Ala Val Lys Asp Phe Thr Thr Val Thr His Asn
            160                 165                 170

Gly Lys His Leu Val Tyr Ala Ser Asn Val Ser Gly Ser Ser Tyr Gly
        175                 180                 185

Ser Met Met Phe Ser Pro Phe Thr Asp Trp Pro Asp Met Ala Ser Ala
    190                 195                 200

Gly Gln Thr Gly Met Ser Gln Ala Ala Val Ala Pro Thr Leu Phe Tyr
205                 210                 215                 220

Phe Ala Pro Lys Asn Ile Trp Val Leu Ala Tyr Gln Trp Gly Ala Trp
                225                 230                 235

Pro Phe Ile Tyr Arg Thr Ser Ser Asn Pro Ala Asp Pro Asn Gly Trp
            240                 245                 250

Ser Ser Pro Gln Pro Leu Phe Thr Gly Ser Ile Ser Gly Ser Asp Thr
        255                 260                 265

Gly Pro Ile Asp Gln Thr Leu Ile Ala Asp Gly Gln Asn Met Tyr Leu
    270                 275                 280

Phe Phe Ala Gly Asp Asn Gly Lys Ile Tyr Arg Ala Ser Met Pro Ile
285                 290                 295                 300

Gly Asn Phe Pro Gly Ser Phe Gly Ser Ser Tyr Thr Thr Val Met Ser
                305                 310                 315

Asp Thr Lys Ala Asn Leu Phe Glu Gly Val Gln Val Tyr Lys Val Lys
            320                 325                 330

Asp Arg Ser Gln Tyr Leu Met Ile Val Glu Ala Met Gly Ala Asn Gly
        335                 340                 345

Arg Tyr Phe Arg Ser Phe Thr Ala Ser Ser Leu Asn Gly Thr Trp Thr
    350                 355                 360

Pro Gln Ala Ala Thr Glu Ser Ser Pro Phe Ala Gly Lys Ala Asn Ser
365                 370                 375                 380

Gly Ala Thr Trp Thr Asn Asp Ile Ser His Gly Asp Leu Val Arg Asp
                385                 390                 395

Asn Pro Asp Gln Thr Met Thr Val Asp Pro Cys Asn Leu Arg Phe Leu
            400                 405                 410
```

Tyr Gln Gly Lys Ala Pro Asp Ala Gly Gly Glu Tyr Asn Arg Leu Pro
415 420 425

Trp Arg Pro Gly Val Leu Thr Leu Arg Arg
430 435

<210> SEQ ID NO 30
<211> LENGTH: 438
<212> TYPE: PRT
<213> ORGANISM: Streptomyces nitrosporeus

<400> SEQUENCE: 30

Ala Ala Ser Gly Ala Leu Arg Gly Ala Gly Ser Gly Arg Cys Val Asp
1 5 10 15

Val Thr Gly Gly Glu Arg Thr Asp Gly Thr Thr Leu Gln Leu Tyr Asp
20 25 30

Cys Trp Gly Gly Thr Asn Gln Gln Trp Thr Ser Thr Asp Ser Gly Gln
35 40 45

Leu Thr Val Tyr Gly Asp Lys Cys Leu Asp Val Pro Gly His Ala Thr
50 55 60

Thr Pro Gly Thr Arg Val Gln Ile Trp Gly Cys Ser Gly Gly Ala Asn
65 70 75 80

Gln Gln Trp Arg Val Asn Ser Asp Gly Thr Val Val Gly Val Glu Ser
85 90 95

Gly Leu Cys Leu Glu Ala Ala Gly Ala Gly Thr Ala Asn Gly Thr Ala
100 105 110

Val Gln Leu Trp Thr Cys Asn Gly Gly Ser Asn Gln Lys Trp Thr Gly
115 120 125

Leu Pro Ala Thr Pro Pro Thr Asp Gly Thr Cys Ser Leu Pro Ser Ala
130 135 140

Tyr Arg Trp Thr Ser Thr Gly Val Leu Ala Gln Pro Ala Asn Gly Trp
145 150 155 160

Ala Ala Val Lys Asp Phe Thr Thr Val Thr His Asn Gly Lys His Leu
165 170 175

Val Tyr Ala Ser Asn Val Ser Gly Ser Ser Tyr Gly Ser Met Met Phe
180 185 190

Ser Pro Phe Thr Asp Trp Pro Asp Met Ala Ser Ala Gly Gln Thr Gly
195 200 205

Met Ser Gln Ala Ala Val Ala Pro Thr Leu Phe Tyr Phe Ala Pro Lys
210 215 220

Asn Ile Trp Val Leu Ala Tyr Gln Trp Gly Ala Trp Pro Phe Ile Tyr
225 230 235 240

Arg Thr Ser Ser Asn Pro Ala Asp Pro Asn Gly Trp Ser Ser Pro Gln
245 250 255

Pro Leu Phe Thr Gly Ser Ile Ser Gly Ser Asp Thr Gly Pro Ile Asp
260 265 270

Gln Thr Leu Ile Ala Asp Gly Gln Asn Met Tyr Leu Phe Phe Ala Gly
275 280 285

Asp Asn Gly Lys Ile Tyr Arg Ala Ser Met Pro Ile Gly Asn Phe Pro
290 295 300

Gly Ser Phe Gly Ser Ser Tyr Thr Thr Val Met Ser Asp Thr Lys Ala
305 310 315 320

Asn Leu Phe Glu Gly Val Gln Val Tyr Lys Val Lys Asp Arg Ser Gln
325 330 335

Tyr Leu Met Ile Val Glu Ala Met Gly Ala Asn Gly Arg Tyr Phe Arg
340 345 350

```
Ser Phe Thr Ala Ser Ser Leu Asn Gly Thr Trp Thr Pro Gln Ala Ala
        355                 360                 365

Thr Glu Ser Ser Pro Phe Ala Gly Lys Ala Asn Ser Gly Ala Thr Trp
    370                 375                 380

Thr Asn Asp Ile Ser His Gly Asp Leu Val Arg Asp Asn Pro Asp Gln
385                 390                 395                 400

Thr Met Thr Val Asp Pro Cys Asn Leu Arg Phe Leu Tyr Gln Gly Lys
                405                 410                 415

Ala Pro Asp Ala Gly Gly Glu Tyr Asn Arg Leu Pro Trp Arg Pro Gly
            420                 425                 430

Val Leu Thr Leu Arg Arg
        435


<210> SEQ ID NO 31
<211> LENGTH: 1422
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1419)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1419)

<400> SEQUENCE: 31

atg aag aaa ccg ttg ggg aaa att gtc gca agc acc gca cta ctc att      48
Met Lys Lys Pro Leu Gly Lys Ile Val Ala Ser Thr Ala Leu Leu Ile
        -25                 -20                 -15

tct gtt gct ttt agt tca tcg ata gca tca gca cat cat cat cac cat      96
Ser Val Ala Phe Ser Ser Ser Ile Ala Ser Ala His His His His His
    -10                 -5              -1  1               5

cat cct agg gcc gcc agc ggc gcc ctg cgc ggt gcc ggt tcg ggc cgg     144
His Pro Arg Ala Ala Ser Gly Ala Leu Arg Gly Ala Gly Ser Gly Arg
                10                  15                  20

tgc gtc gac gtg acg ggc ggc gaa cgg acc gac ggc act acc ctc cag     192
Cys Val Asp Val Thr Gly Gly Glu Arg Thr Asp Gly Thr Thr Leu Gln
            25                  30                  35

ctc tac gac tgc tgg ggc ggg acc aac cag cag tgg acg tcg acg gac     240
Leu Tyr Asp Cys Trp Gly Gly Thr Asn Gln Gln Trp Thr Ser Thr Asp
        40                  45                  50

agc ggc cag ctg acc gtg tac ggc gac aag tgc ctg gac gtt ccg ggc     288
Ser Gly Gln Leu Thr Val Tyr Gly Asp Lys Cys Leu Asp Val Pro Gly
    55                  60                  65

cac gcc acc aca ccc ggt acc agg gtg cag atc tgg ggc tgc tcc ggc     336
His Ala Thr Thr Pro Gly Thr Arg Val Gln Ile Trp Gly Cys Ser Gly
70                  75                  80                  85

ggt gcg aac cag cag tgg cgg gtg aac tcc gac ggc acg gtc gtc ggc     384
Gly Ala Asn Gln Gln Trp Arg Val Asn Ser Asp Gly Thr Val Val Gly
                90                  95                  100

gtg gag tcc ggg ctg tgc ctg gag gcc gcg ggc gcc ggt acg gcc aac     432
Val Glu Ser Gly Leu Cys Leu Glu Ala Ala Gly Ala Gly Thr Ala Asn
            105                 110                 115

ggc aca gcg gtc cag ctc tgg acg tgc aac ggc ggc agc aac cag aag     480
Gly Thr Ala Val Gln Leu Trp Thr Cys Asn Gly Gly Ser Asn Gln Lys
        120                 125                 130

tgg acc ggt ctg ccc gcg acg ccg ccg acg gac ggc acg tgt tcc ctt     528
```

```
Trp Thr Gly Leu Pro Ala Thr Pro Pro Thr Asp Gly Thr Cys Ser Leu
    135                 140                 145

ccg tcg gcg tac cgg tgg acg tct acg ggc gtg ctg gcg cag ccg gcg      576
Pro Ser Ala Tyr Arg Trp Thr Ser Thr Gly Val Leu Ala Gln Pro Ala
150                 155                 160                 165

aac ggg tgg gcc gcg gtg aag gac ttc acc acc gtg acc cac aac ggc      624
Asn Gly Trp Ala Ala Val Lys Asp Phe Thr Thr Val Thr His Asn Gly
                170                 175                 180

aag cac ctg gtc tac gcg tcg aac gtg tcg ggg tcg tcg tac ggt tcg      672
Lys His Leu Val Tyr Ala Ser Asn Val Ser Gly Ser Ser Tyr Gly Ser
            185                 190                 195

atg atg ttc agt ccc ttc acg gac tgg ccg gac atg gcg tcg gcc ggc      720
Met Met Phe Ser Pro Phe Thr Asp Trp Pro Asp Met Ala Ser Ala Gly
        200                 205                 210

cag acg gga atg agc cag gcc gcg gtg gcg ccc acg ctg ttc tac ttc      768
Gln Thr Gly Met Ser Gln Ala Ala Val Ala Pro Thr Leu Phe Tyr Phe
    215                 220                 225

gcg ccc aag aac atc tgg gta ctg gcg tac cag tgg ggc gcg tgg ccc      816
Ala Pro Lys Asn Ile Trp Val Leu Ala Tyr Gln Trp Gly Ala Trp Pro
230                 235                 240                 245

ttc atc tac cgc acg tcg agc aac ccc gcc gac ccc aac ggc tgg tcc      864
Phe Ile Tyr Arg Thr Ser Ser Asn Pro Ala Asp Pro Asn Gly Trp Ser
                250                 255                 260

tcc ccg cag ccg ctg ttc acc ggg agc atc tcc gga tcc gac acc ggc      912
Ser Pro Gln Pro Leu Phe Thr Gly Ser Ile Ser Gly Ser Asp Thr Gly
            265                 270                 275

ccg atc gat cag acc ctg atc gcc gac gga cag aac atg tac ctg ttc      960
Pro Ile Asp Gln Thr Leu Ile Ala Asp Gly Gln Asn Met Tyr Leu Phe
        280                 285                 290

ttc gcc ggt gac aac ggg aag atc tac cgg gcg agc atg ccg atc ggg     1008
Phe Ala Gly Asp Asn Gly Lys Ile Tyr Arg Ala Ser Met Pro Ile Gly
    295                 300                 305

aac ttc ccg ggc agc ttc ggc tcg tcg tac acg acg gtc atg agc gac     1056
Asn Phe Pro Gly Ser Phe Gly Ser Ser Tyr Thr Thr Val Met Ser Asp
310                 315                 320                 325

acg aag gcc aac ctg ttc gag ggc gtc cag gtc tac aag gtc aag gac     1104
Thr Lys Ala Asn Leu Phe Glu Gly Val Gln Val Tyr Lys Val Lys Asp
                330                 335                 340

cgg agc cag tac ctc atg atc gtc gag gcg atg ggt gcg aac ggg cgc     1152
Arg Ser Gln Tyr Leu Met Ile Val Glu Ala Met Gly Ala Asn Gly Arg
            345                 350                 355

tac ttc cgc tcc ttc acg gcc tcc agc ctg aac ggg acg tgg acc ccg     1200
Tyr Phe Arg Ser Phe Thr Ala Ser Ser Leu Asn Gly Thr Trp Thr Pro
        360                 365                 370

cag gcc gcc acc gag agc agc ccc ttc gcg ggc aag gcc aac agc ggt     1248
Gln Ala Ala Thr Glu Ser Ser Pro Phe Ala Gly Lys Ala Asn Ser Gly
    375                 380                 385

gcc acc tgg acc aac gac atc agc cac ggc gac ctg gtc cgc gac aac     1296
Ala Thr Trp Thr Asn Asp Ile Ser His Gly Asp Leu Val Arg Asp Asn
390                 395                 400                 405

ccc gac cag acc atg acc gtc gac ccc tgc aac ctg cgg ttc ctc tac     1344
Pro Asp Gln Thr Met Thr Val Asp Pro Cys Asn Leu Arg Phe Leu Tyr
                410                 415                 420

cag ggc aag gcg ccc gac gcg ggc ggc gag tac aac cgg ctg ccg tgg     1392
Gln Gly Lys Ala Pro Asp Ala Gly Gly Glu Tyr Asn Arg Leu Pro Trp
            425                 430                 435

cgg ccg ggg gtc ctc acc ctg cgg cgc tga                             1422
Arg Pro Gly Val Leu Thr Leu Arg Arg
        440                 445
```

<210> SEQ ID NO 32
<211> LENGTH: 473
<212> TYPE: PRT
<213> ORGANISM: Artificial Sequence
<220> FEATURE:
<223> OTHER INFORMATION: Synthetic Construct

<400> SEQUENCE: 32

Met Lys Lys Pro Leu Gly Lys Ile Val Ala Ser Thr Ala Leu Leu Ile
-25 -20 -15

Ser Val Ala Phe Ser Ser Ser Ile Ala Ser Ala His His His His His
-10 -5 -1 1 5

His Pro Arg Ala Ala Ser Gly Ala Leu Arg Gly Ala Gly Ser Gly Arg
10 15 20

Cys Val Asp Val Thr Gly Gly Glu Arg Thr Asp Gly Thr Thr Leu Gln
25 30 35

Leu Tyr Asp Cys Trp Gly Gly Thr Asn Gln Gln Trp Thr Ser Thr Asp
40 45 50

Ser Gly Gln Leu Thr Val Tyr Gly Asp Lys Cys Leu Asp Val Pro Gly
55 60 65

His Ala Thr Thr Pro Gly Thr Arg Val Gln Ile Trp Gly Cys Ser Gly
70 75 80 85

Gly Ala Asn Gln Gln Trp Arg Val Asn Ser Asp Gly Thr Val Val Gly
90 95 100

Val Glu Ser Gly Leu Cys Leu Glu Ala Ala Gly Ala Gly Thr Ala Asn
105 110 115

Gly Thr Ala Val Gln Leu Trp Thr Cys Asn Gly Gly Ser Asn Gln Lys
120 125 130

Trp Thr Gly Leu Pro Ala Thr Pro Pro Thr Asp Gly Thr Cys Ser Leu
135 140 145

Pro Ser Ala Tyr Arg Trp Thr Ser Thr Gly Val Leu Ala Gln Pro Ala
150 155 160 165

Asn Gly Trp Ala Ala Val Lys Asp Phe Thr Thr Val Thr His Asn Gly
170 175 180

Lys His Leu Val Tyr Ala Ser Asn Val Ser Gly Ser Ser Tyr Gly Ser
185 190 195

Met Met Phe Ser Pro Phe Thr Asp Trp Pro Asp Met Ala Ser Ala Gly
200 205 210

Gln Thr Gly Met Ser Gln Ala Ala Val Ala Pro Thr Leu Phe Tyr Phe
215 220 225

Ala Pro Lys Asn Ile Trp Val Leu Ala Tyr Gln Trp Gly Ala Trp Pro
230 235 240 245

Phe Ile Tyr Arg Thr Ser Ser Asn Pro Ala Asp Pro Asn Gly Trp Ser
250 255 260

Ser Pro Gln Pro Leu Phe Thr Gly Ser Ile Ser Gly Ser Asp Thr Gly
265 270 275

Pro Ile Asp Gln Thr Leu Ile Ala Asp Gly Gln Asn Met Tyr Leu Phe
280 285 290

Phe Ala Gly Asp Asn Gly Lys Ile Tyr Arg Ala Ser Met Pro Ile Gly
295 300 305

Asn Phe Pro Gly Ser Phe Gly Ser Ser Tyr Thr Thr Val Met Ser Asp
310 315 320 325

Thr Lys Ala Asn Leu Phe Glu Gly Val Gln Val Tyr Lys Val Lys Asp
330 335 340

```
Arg Ser Gln Tyr Leu Met Ile Val Glu Ala Met Gly Ala Asn Gly Arg
            345                 350                 355

Tyr Phe Arg Ser Phe Thr Ala Ser Ser Leu Asn Gly Thr Trp Thr Pro
        360                 365                 370

Gln Ala Ala Thr Glu Ser Ser Pro Phe Ala Gly Lys Ala Asn Ser Gly
    375                 380                 385

Ala Thr Trp Thr Asn Asp Ile Ser His Gly Asp Leu Val Arg Asp Asn
390                 395                 400                 405

Pro Asp Gln Thr Met Thr Val Asp Pro Cys Asn Leu Arg Phe Leu Tyr
                410                 415                 420

Gln Gly Lys Ala Pro Asp Ala Gly Gly Glu Tyr Asn Arg Leu Pro Trp
            425                 430                 435

Arg Pro Gly Val Leu Thr Leu Arg Arg
        440                 445


<210> SEQ ID NO 33
<211> LENGTH: 446
<212> TYPE: PRT
<213> ORGANISM: Artificial Sequence
<220> FEATURE:
<223> OTHER INFORMATION: Mature sequence with His-tag

<400> SEQUENCE: 33

His His His His His His Pro Arg Ala Ala Ser Gly Ala Leu Arg Gly
1               5                   10                  15

Ala Gly Ser Gly Arg Cys Val Asp Val Thr Gly Gly Glu Arg Thr Asp
            20                  25                  30

Gly Thr Thr Leu Gln Leu Tyr Asp Cys Trp Gly Gly Thr Asn Gln Gln
        35                  40                  45

Trp Thr Ser Thr Asp Ser Gly Gln Leu Thr Val Tyr Gly Asp Lys Cys
    50                  55                  60

Leu Asp Val Pro Gly His Ala Thr Thr Pro Gly Thr Arg Val Gln Ile
65                  70                  75                  80

Trp Gly Cys Ser Gly Gly Ala Asn Gln Gln Trp Arg Val Asn Ser Asp
                85                  90                  95

Gly Thr Val Val Gly Val Glu Ser Gly Leu Cys Leu Glu Ala Ala Gly
            100                 105                 110

Ala Gly Thr Ala Asn Gly Thr Ala Val Gln Leu Trp Thr Cys Asn Gly
        115                 120                 125

Gly Ser Asn Gln Lys Trp Thr Gly Leu Pro Ala Thr Pro Pro Thr Asp
    130                 135                 140

Gly Thr Cys Ser Leu Pro Ser Ala Tyr Arg Trp Thr Ser Thr Gly Val
145                 150                 155                 160

Leu Ala Gln Pro Ala Asn Gly Trp Ala Ala Val Lys Asp Phe Thr Thr
                165                 170                 175

Val Thr His Asn Gly Lys His Leu Val Tyr Ala Ser Asn Val Ser Gly
            180                 185                 190

Ser Ser Tyr Gly Ser Met Met Phe Ser Pro Phe Thr Asp Trp Pro Asp
        195                 200                 205

Met Ala Ser Ala Gly Gln Thr Gly Met Ser Gln Ala Ala Val Ala Pro
    210                 215                 220

Thr Leu Phe Tyr Phe Ala Pro Lys Asn Ile Trp Val Leu Ala Tyr Gln
225                 230                 235                 240

Trp Gly Ala Trp Pro Phe Ile Tyr Arg Thr Ser Ser Asn Pro Ala Asp
                245                 250                 255
```

```
Pro Asn Gly Trp Ser Ser Pro Gln Pro Leu Phe Thr Gly Ser Ile Ser
            260                 265                 270

Gly Ser Asp Thr Gly Pro Ile Asp Gln Thr Leu Ile Ala Asp Gly Gln
        275                 280                 285

Asn Met Tyr Leu Phe Phe Ala Gly Asp Asn Gly Lys Ile Tyr Arg Ala
    290                 295                 300

Ser Met Pro Ile Gly Asn Phe Pro Gly Ser Phe Gly Ser Ser Tyr Thr
305                 310                 315                 320

Thr Val Met Ser Asp Thr Lys Ala Asn Leu Phe Glu Gly Val Gln Val
                325                 330                 335

Tyr Lys Val Lys Asp Arg Ser Gln Tyr Leu Met Ile Val Glu Ala Met
            340                 345                 350

Gly Ala Asn Gly Arg Tyr Phe Arg Ser Phe Thr Ala Ser Ser Leu Asn
        355                 360                 365

Gly Thr Trp Thr Pro Gln Ala Ala Thr Glu Ser Ser Pro Phe Ala Gly
    370                 375                 380

Lys Ala Asn Ser Gly Ala Thr Trp Thr Asn Asp Ile Ser His Gly Asp
385                 390                 395                 400

Leu Val Arg Asp Asn Pro Asp Gln Thr Met Thr Val Asp Pro Cys Asn
                405                 410                 415

Leu Arg Phe Leu Tyr Gln Gly Lys Ala Pro Asp Ala Gly Gly Glu Tyr
            420                 425                 430

Asn Arg Leu Pro Trp Arg Pro Gly Val Leu Thr Leu Arg Arg
        435                 440                 445


<210> SEQ ID NO 34
<211> LENGTH: 1425
<212> TYPE: DNA
<213> ORGANISM: Streptomyces beijiangensis
<220> FEATURE:
<221> NAME/KEY: CDS
<222> LOCATION: (1)..(1422)
<220> FEATURE:
<221> NAME/KEY: sig_peptide
<222> LOCATION: (1)..(108)
<220> FEATURE:
<221> NAME/KEY: mat_peptide
<222> LOCATION: (109)..(1422)

<400> SEQUENCE: 34

atg agc aga cga act ttc agt cgc agg cat cca tct gct gtg ctc gcc       48
Met Ser Arg Arg Thr Phe Ser Arg Arg His Pro Ser Ala Val Leu Ala
    -35                 -30                 -25

gcc gtg atc gcg gct ctg gga gca ttg gcg gcg atg ctc gtc gcc acc       96
Ala Val Ile Ala Ala Leu Gly Ala Leu Ala Ala Met Leu Val Ala Thr
-20                 -15                 -10                 -5

ccg gct cag gcg gct gcc ggc ggc gcc ctg cgc cag gcc gct tcc ggc      144
Pro Ala Gln Ala Ala Ala Gly Gly Ala Leu Arg Gln Ala Ala Ser Gly
            -1  1               5                   10

cgg tgc ctc gat gtg ccg ggc gcc gtc cag acc gac ggt acg tcc gtg      192
Arg Cys Leu Asp Val Pro Gly Ala Val Gln Thr Asp Gly Thr Ser Val
        15                  20                  25

cag atc tat gac tgc tgg agt gga acc aac cag cag tgg acg tcg acg      240
Gln Ile Tyr Asp Cys Trp Ser Gly Thr Asn Gln Gln Trp Thr Ser Thr
    30                  35                  40

gac gcc aac cag ctc acc gtg tac ggc aac aag tgc ctg gat gtc ccc      288
Asp Ala Asn Gln Leu Thr Val Tyr Gly Asn Lys Cys Leu Asp Val Pro
45                  50                  55                  60

ggt cac gcc acc acg gcc ggg acc cgg gtg cag ata tgg agc tgt tcc      336
Gly His Ala Thr Thr Ala Gly Thr Arg Val Gln Ile Trp Ser Cys Ser
```

```
                65                  70                  75

ggc ggt gcg aac cag cag tgg agg gtg aac tcc gac ggc acg gtc acc      384
Gly Gly Ala Asn Gln Gln Trp Arg Val Asn Ser Asp Gly Thr Val Thr
            80                  85                  90

ggc gtg gag tca ggg ctg tgc ctg gag gcc gcg ggc gcc gcc acg gcc      432
Gly Val Glu Ser Gly Leu Cys Leu Glu Ala Ala Gly Ala Ala Thr Ala
        95                  100                 105

aac gga acg gcg gtg cag ctg gga acg tgc aac cag gga agc aac cag      480
Asn Gly Thr Ala Val Gln Leu Gly Thr Cys Asn Gln Gly Ser Asn Gln
    110                 115                 120

aaa tgg agc ggt ctg acc ggg acg ccg ccg acg gac ggc tcg tgt tcc      528
Lys Trp Ser Gly Leu Thr Gly Thr Pro Pro Thr Asp Gly Ser Cys Ser
125                 130                 135                 140

ctg ccg tcg acg tac cgc tgg tcg tcg acg ggt gtg ctg gcg cag cct      576
Leu Pro Ser Thr Tyr Arg Trp Ser Ser Thr Gly Val Leu Ala Gln Pro
                145                 150                 155

gcg aac ggg tgg gcg gcg gtg aag gac ttc acc acc gtg acc tac aac      624
Ala Asn Gly Trp Ala Ala Val Lys Asp Phe Thr Thr Val Thr Tyr Asn
            160                 165                 170

ggc aag cac ctg gtc tac gcc tcg aac gtg tcg gga tcg tcg tac ggc      672
Gly Lys His Leu Val Tyr Ala Ser Asn Val Ser Gly Ser Ser Tyr Gly
        175                 180                 185

tcg atg atg ttc agt ccc ttc acg aac tgg tcg gac atg gcg tcg gcc      720
Ser Met Met Phe Ser Pro Phe Thr Asn Trp Ser Asp Met Ala Ser Ala
    190                 195                 200

ggc cag agc ggg atg agc cag gcc gcg gtg gca ccc acg ctg ttc tac      768
Gly Gln Ser Gly Met Ser Gln Ala Ala Val Ala Pro Thr Leu Phe Tyr
205                 210                 215                 220

ttc gcg ccc aag aac atc tgg gtg ctg gcg tac cag tgg ggc gcg tcg      816
Phe Ala Pro Lys Asn Ile Trp Val Leu Ala Tyr Gln Trp Gly Ala Ser
                225                 230                 235

ccc ttc gtc tac cgc acg tcg agc gac ccc acc aac ccc aac ggc tgg      864
Pro Phe Val Tyr Arg Thr Ser Ser Asp Pro Thr Asn Pro Asn Gly Trp
            240                 245                 250

tca tca ccg cag cca ctg ttc acc ggg agc atc tcc ggc tcc gac acc      912
Ser Ser Pro Gln Pro Leu Phe Thr Gly Ser Ile Ser Gly Ser Asp Thr
        255                 260                 265

gga ccg atc gac cag acc ctg atc gcc gac ggc cag aac atg tac ctg      960
Gly Pro Ile Asp Gln Thr Leu Ile Ala Asp Gly Gln Asn Met Tyr Leu
    270                 275                 280

ttc ttc gcc ggc gac aac ggc aag atc tac cgg gcg agc atg ccg atc     1008
Phe Phe Ala Gly Asp Asn Gly Lys Ile Tyr Arg Ala Ser Met Pro Ile
285                 290                 295                 300

ggg aac ttc ccg ggc aac ttc ggc tcg tcg tac acg acg gtc atg agc     1056
Gly Asn Phe Pro Gly Asn Phe Gly Ser Ser Tyr Thr Thr Val Met Ser
                305                 310                 315

gac acc aag gcc aac ctg ttc gag ggc gta cag gtc tac aag gtc cag     1104
Asp Thr Lys Ala Asn Leu Phe Glu Gly Val Gln Val Tyr Lys Val Gln
            320                 325                 330

ggc cag aac cag tac ctc atg atc gtc gag gcg atg ggt gcg aac ggg     1152
Gly Gln Asn Gln Tyr Leu Met Ile Val Glu Ala Met Gly Ala Asn Gly
        335                 340                 345

cgc tac ttc cgc tcc ttc acc gcc tcc agt ctg aac ggg tca tgg gcc     1200
Arg Tyr Phe Arg Ser Phe Thr Ala Ser Ser Leu Asn Gly Ser Trp Ala
    350                 355                 360

ccg cag gcg gca acc gag agc aac ccc ttc gcg ggc aag gcc aac agc     1248
Pro Gln Ala Ala Thr Glu Ser Asn Pro Phe Ala Gly Lys Ala Asn Ser
365                 370                 375                 380

ggt gcc acc tgg acc aac gac atc agc cac ggg gac ctg gtc cgg ggc     1296
```

```
Gly Ala Thr Trp Thr Asn Asp Ile Ser His Gly Asp Leu Val Arg Gly
                385                 390                 395

aac ccg gat cag acc atg acg atc gat cct tgc aac ctg caa ctc ctc      1344
Asn Pro Asp Gln Thr Met Thr Ile Asp Pro Cys Asn Leu Gln Leu Leu
            400                 405                 410

tac cag ggg aaa tct ccc acc gcg ggc ggc ccc tac gac caa ctg ccg      1392
Tyr Gln Gly Lys Ser Pro Thr Ala Gly Gly Pro Tyr Asp Gln Leu Pro
        415                 420                 425

tgg cgg cca ggc gtc ctc tcc ctt cag cgc tga                          1425
Trp Arg Pro Gly Val Leu Ser Leu Gln Arg
    430                 435


<210> SEQ ID NO 35
<211> LENGTH: 474
<212> TYPE: PRT
<213> ORGANISM: Streptomyces beijiangensis

<400> SEQUENCE: 35

Met Ser Arg Arg Thr Phe Ser Arg Arg His Pro Ser Ala Val Leu Ala
    -35                 -30                 -25

Ala Val Ile Ala Ala Leu Gly Ala Leu Ala Ala Met Leu Val Ala Thr
-20                 -15                 -10                 -5

Pro Ala Gln Ala Ala Ala Gly Gly Ala Leu Arg Gln Ala Ala Ser Gly
            -1  1               5                   10

Arg Cys Leu Asp Val Pro Gly Ala Val Gln Thr Asp Gly Thr Ser Val
        15                  20                  25

Gln Ile Tyr Asp Cys Trp Ser Gly Thr Asn Gln Gln Trp Thr Ser Thr
    30                  35                  40

Asp Ala Asn Gln Leu Thr Val Tyr Gly Asn Lys Cys Leu Asp Val Pro
45                  50                  55                  60

Gly His Ala Thr Thr Ala Gly Thr Arg Val Gln Ile Trp Ser Cys Ser
                65                  70                  75

Gly Gly Ala Asn Gln Gln Trp Arg Val Asn Ser Asp Gly Thr Val Thr
            80                  85                  90

Gly Val Glu Ser Gly Leu Cys Leu Glu Ala Ala Gly Ala Ala Thr Ala
        95                  100                 105

Asn Gly Thr Ala Val Gln Leu Gly Thr Cys Asn Gln Gly Ser Asn Gln
    110                 115                 120

Lys Trp Ser Gly Leu Thr Gly Thr Pro Pro Thr Asp Gly Ser Cys Ser
125                 130                 135                 140

Leu Pro Ser Thr Tyr Arg Trp Ser Ser Thr Gly Val Leu Ala Gln Pro
                145                 150                 155

Ala Asn Gly Trp Ala Ala Val Lys Asp Phe Thr Thr Val Thr Tyr Asn
            160                 165                 170

Gly Lys His Leu Val Tyr Ala Ser Asn Val Ser Gly Ser Ser Tyr Gly
        175                 180                 185

Ser Met Met Phe Ser Pro Phe Thr Asn Trp Ser Asp Met Ala Ser Ala
    190                 195                 200

Gly Gln Ser Gly Met Ser Gln Ala Ala Val Ala Pro Thr Leu Phe Tyr
205                 210                 215                 220

Phe Ala Pro Lys Asn Ile Trp Val Leu Ala Tyr Gln Trp Gly Ala Ser
                225                 230                 235

Pro Phe Val Tyr Arg Thr Ser Ser Asp Pro Thr Asn Pro Asn Gly Trp
            240                 245                 250

Ser Ser Pro Gln Pro Leu Phe Thr Gly Ser Ile Ser Gly Ser Asp Thr
        255                 260                 265
```

Gly Pro Ile Asp Gln Thr Leu Ile Ala Asp Gly Gln Asn Met Tyr Leu
270 275 280

Phe Phe Ala Gly Asp Asn Gly Lys Ile Tyr Arg Ala Ser Met Pro Ile
285 290 295 300

Gly Asn Phe Pro Gly Asn Phe Gly Ser Ser Tyr Thr Thr Val Met Ser
305 310 315

Asp Thr Lys Ala Asn Leu Phe Glu Gly Val Gln Val Tyr Lys Val Gln
320 325 330

Gly Gln Asn Gln Tyr Leu Met Ile Val Glu Ala Met Gly Ala Asn Gly
335 340 345

Arg Tyr Phe Arg Ser Phe Thr Ala Ser Ser Leu Asn Gly Ser Trp Ala
350 355 360

Pro Gln Ala Ala Thr Glu Ser Asn Pro Phe Ala Gly Lys Ala Asn Ser
365 370 375 380

Gly Ala Thr Trp Thr Asn Asp Ile Ser His Gly Asp Leu Val Arg Gly
385 390 395

Asn Pro Asp Gln Thr Met Thr Ile Asp Pro Cys Asn Leu Gln Leu Leu
400 405 410

Tyr Gln Gly Lys Ser Pro Thr Ala Gly Gly Pro Tyr Asp Gln Leu Pro
415 420 425

Trp Arg Pro Gly Val Leu Ser Leu Gln Arg
430 435

<210> SEQ ID NO 36
<211> LENGTH: 438
<212> TYPE: PRT
<213> ORGANISM: Artificial Sequence
<220> FEATURE:
<223> OTHER INFORMATION: Mature sequence with His-tag

<400> SEQUENCE: 36

Ala Ala Gly Gly Ala Leu Arg Gln Ala Ala Ser Gly Arg Cys Leu Asp
1 5 10 15

Val Pro Gly Ala Val Gln Thr Asp Gly Thr Ser Val Gln Ile Tyr Asp
20 25 30

Cys Trp Ser Gly Thr Asn Gln Gln Trp Thr Ser Thr Asp Ala Asn Gln
35 40 45

Leu Thr Val Tyr Gly Asn Lys Cys Leu Asp Val Pro Gly His Ala Thr
50 55 60

Thr Ala Gly Thr Arg Val Gln Ile Trp Ser Cys Ser Gly Gly Ala Asn
65 70 75 80

Gln Gln Trp Arg Val Asn Ser Asp Gly Thr Val Thr Gly Val Glu Ser
85 90 95

Gly Leu Cys Leu Glu Ala Ala Gly Ala Ala Thr Ala Asn Gly Thr Ala
100 105 110

Val Gln Leu Gly Thr Cys Asn Gln Gly Ser Asn Gln Lys Trp Ser Gly
115 120 125

Leu Thr Gly Thr Pro Pro Thr Asp Gly Ser Cys Ser Leu Pro Ser Thr
130 135 140

Tyr Arg Trp Ser Ser Thr Gly Val Leu Ala Gln Pro Ala Asn Gly Trp
145 150 155 160

Ala Ala Val Lys Asp Phe Thr Thr Val Thr Tyr Asn Gly Lys His Leu
165 170 175

Val Tyr Ala Ser Asn Val Ser Gly Ser Ser Tyr Gly Ser Met Met Phe
180 185 190

```
Ser Pro Phe Thr Asn Trp Ser Asp Met Ala Ser Ala Gly Gln Ser Gly
        195                 200                 205

Met Ser Gln Ala Ala Val Ala Pro Thr Leu Phe Tyr Phe Ala Pro Lys
    210                 215                 220

Asn Ile Trp Val Leu Ala Tyr Gln Trp Gly Ala Ser Pro Phe Val Tyr
225                 230                 235                 240

Arg Thr Ser Ser Asp Pro Thr Asn Pro Asn Gly Trp Ser Ser Pro Gln
                245                 250                 255

Pro Leu Phe Thr Gly Ser Ile Ser Gly Ser Asp Thr Gly Pro Ile Asp
            260                 265                 270

Gln Thr Leu Ile Ala Asp Gly Gln Asn Met Tyr Leu Phe Phe Ala Gly
        275                 280                 285

Asp Asn Gly Lys Ile Tyr Arg Ala Ser Met Pro Ile Gly Asn Phe Pro
    290                 295                 300

Gly Asn Phe Gly Ser Ser Tyr Thr Thr Val Met Ser Asp Thr Lys Ala
305                 310                 315                 320

Asn Leu Phe Glu Gly Val Gln Val Tyr Lys Val Gln Gly Gln Asn Gln
                325                 330                 335

Tyr Leu Met Ile Val Glu Ala Met Gly Ala Asn Gly Arg Tyr Phe Arg
            340                 345                 350

Ser Phe Thr Ala Ser Ser Leu Asn Gly Ser Trp Ala Pro Gln Ala Ala
        355                 360                 365

Thr Glu Ser Asn Pro Phe Ala Gly Lys Ala Asn Ser Gly Ala Thr Trp
    370                 375                 380

Thr Asn Asp Ile Ser His Gly Asp Leu Val Arg Gly Asn Pro Asp Gln
385                 390                 395                 400

Thr Met Thr Ile Asp Pro Cys Asn Leu Gln Leu Leu Tyr Gln Gly Lys
                405                 410                 415

Ser Pro Thr Ala Gly Gly Pro Tyr Asp Gln Leu Pro Trp Arg Pro Gly
            420                 425                 430

Val Leu Ser Leu Gln Arg
        435


<210> SEQ ID NO 37
<211> LENGTH: 1422
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1419)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1419)

<400> SEQUENCE: 37

atg aag aaa ccg ttg ggg aaa att gtc gca agc acc gca cta ctc att        48
Met Lys Lys Pro Leu Gly Lys Ile Val Ala Ser Thr Ala Leu Leu Ile
        -25                 -20                 -15

tct gtt gct ttt agt tca tcg ata gca tca gca cat cat cat cac cat        96
Ser Val Ala Phe Ser Ser Ser Ile Ala Ser Ala His His His His His
    -10                 -5              -1  1               5

cat cct agg gct gcc ggc ggc gcc ctg cgc cag gcc gct tcc ggc cgg       144
His Pro Arg Ala Ala Gly Gly Ala Leu Arg Gln Ala Ala Ser Gly Arg
                10                  15                  20
```

```
tgc ctc gat gtg ccg ggc gcc gtc cag acc gac ggt acg tcc gtg cag      192
Cys Leu Asp Val Pro Gly Ala Val Gln Thr Asp Gly Thr Ser Val Gln
            25                  30                  35

atc tat gac tgc tgg agt gga acc aac cag cag tgg acg tcg acg gac      240
Ile Tyr Asp Cys Trp Ser Gly Thr Asn Gln Gln Trp Thr Ser Thr Asp
        40                  45                  50

gcc aac cag ctc acc gtg tac ggc aac aag tgc ctg gat gtc ccc ggt      288
Ala Asn Gln Leu Thr Val Tyr Gly Asn Lys Cys Leu Asp Val Pro Gly
    55                  60                  65

cac gcc acc acg gcc ggg acc cgg gtg cag ata tgg agc tgt tcc ggc      336
His Ala Thr Thr Ala Gly Thr Arg Val Gln Ile Trp Ser Cys Ser Gly
70                  75                  80                  85

ggt gcg aac cag cag tgg agg gtg aac tcc gac ggc acg gtc acc ggc      384
Gly Ala Asn Gln Gln Trp Arg Val Asn Ser Asp Gly Thr Val Thr Gly
                90                  95                  100

gtg gag tca ggg ctg tgc ctg gag gcc gcg ggc gcc gcc acg gcc aac      432
Val Glu Ser Gly Leu Cys Leu Glu Ala Ala Gly Ala Ala Thr Ala Asn
            105                 110                 115

gga acg gcg gtg cag ctg gga acg tgc aac cag gga agc aac cag aaa      480
Gly Thr Ala Val Gln Leu Gly Thr Cys Asn Gln Gly Ser Asn Gln Lys
        120                 125                 130

tgg agc ggt ctg acc ggg acg ccg ccg acg gac ggc tcg tgt tcc ctg      528
Trp Ser Gly Leu Thr Gly Thr Pro Pro Thr Asp Gly Ser Cys Ser Leu
    135                 140                 145

ccg tcg acg tac cgc tgg tcg tcg acg ggt gtg ctg gcg cag cct gcg      576
Pro Ser Thr Tyr Arg Trp Ser Ser Thr Gly Val Leu Ala Gln Pro Ala
150                 155                 160                 165

aac ggg tgg gcg gcg gtg aag gac ttc acc acc gtg acc tac aac ggc      624
Asn Gly Trp Ala Ala Val Lys Asp Phe Thr Thr Val Thr Tyr Asn Gly
                170                 175                 180

aag cac ctg gtc tac gcc tcg aac gtg tcg gga tcg tcg tac ggc tcg      672
Lys His Leu Val Tyr Ala Ser Asn Val Ser Gly Ser Ser Tyr Gly Ser
            185                 190                 195

atg atg ttc agt ccc ttc acg aac tgg tcg gac atg gcg tcg gcc ggc      720
Met Met Phe Ser Pro Phe Thr Asn Trp Ser Asp Met Ala Ser Ala Gly
        200                 205                 210

cag agc ggg atg agc cag gcc gcg gtg gca ccc acg ctg ttc tac ttc      768
Gln Ser Gly Met Ser Gln Ala Ala Val Ala Pro Thr Leu Phe Tyr Phe
    215                 220                 225

gcg ccc aag aac atc tgg gtg ctg gcg tac cag tgg ggc gcg tcg ccc      816
Ala Pro Lys Asn Ile Trp Val Leu Ala Tyr Gln Trp Gly Ala Ser Pro
230                 235                 240                 245

ttc gtc tac cgc acg tcg agc gac ccc acc aac ccc aac ggc tgg tca      864
Phe Val Tyr Arg Thr Ser Ser Asp Pro Thr Asn Pro Asn Gly Trp Ser
                250                 255                 260

tca ccg cag cca ctg ttc acc ggg agc atc tcc ggc tcc gac acc gga      912
Ser Pro Gln Pro Leu Phe Thr Gly Ser Ile Ser Gly Ser Asp Thr Gly
            265                 270                 275

ccg atc gac cag acc ctg atc gcc gac ggc cag aac atg tac ctg ttc      960
Pro Ile Asp Gln Thr Leu Ile Ala Asp Gly Gln Asn Met Tyr Leu Phe
        280                 285                 290

ttc gcc ggc gac aac ggc aag atc tac cgg gcg agc atg ccg atc ggg     1008
Phe Ala Gly Asp Asn Gly Lys Ile Tyr Arg Ala Ser Met Pro Ile Gly
    295                 300                 305

aac ttc ccg ggc aac ttc ggc tcg tcg tac acg acg gtc atg agc gac     1056
Asn Phe Pro Gly Asn Phe Gly Ser Ser Tyr Thr Thr Val Met Ser Asp
310                 315                 320                 325

acc aag gcc aac ctg ttc gag ggc gta cag gtc tac aag gtc cag ggc     1104
Thr Lys Ala Asn Leu Phe Glu Gly Val Gln Val Tyr Lys Val Gln Gly
```

-continued 330 335 340 cag aac cag tac ctc atg atc gtc gag gcg atg ggt gcg aac ggg cgc 1152
Gln Asn Gln Tyr Leu Met Ile Val Glu Ala Met Gly Ala Asn Gly Arg
345 350 355 tac ttc cgc tcc ttc acc gcc tcc agt ctg aac ggg tca tgg gcc ccg 1200
Tyr Phe Arg Ser Phe Thr Ala Ser Ser Leu Asn Gly Ser Trp Ala Pro
360 365 370 cag gcg gca acc gag agc aac ccc ttc gcg ggc aag gcc aac agc ggt 1248
Gln Ala Ala Thr Glu Ser Asn Pro Phe Ala Gly Lys Ala Asn Ser Gly
375 380 385 gcc acc tgg acc aac gac atc agc cac ggg gac ctg gtc cgg ggc aac 1296
Ala Thr Trp Thr Asn Asp Ile Ser His Gly Asp Leu Val Arg Gly Asn
390 395 400 405 ccg gat cag acc atg acg atc gat cct tgc aac ctg caa ctc ctc tac 1344
Pro Asp Gln Thr Met Thr Ile Asp Pro Cys Asn Leu Gln Leu Leu Tyr
410 415 420 cag ggg aaa tct ccc acc gcg ggc ggc ccc tac gac caa ctg ccg tgg 1392
Gln Gly Lys Ser Pro Thr Ala Gly Gly Pro Tyr Asp Gln Leu Pro Trp
425 430 435 cgg cca ggc gtc ctc tcc ctt cag cgc tga 1422
Arg Pro Gly Val Leu Ser Leu Gln Arg
440 445

<210> SEQ ID NO 38
<211> LENGTH: 473
<212> TYPE: PRT
<213> ORGANISM: Artificial Sequence
<220> FEATURE:
<223> OTHER INFORMATION: Synthetic Construct

<400> SEQUENCE: 38

Met Lys Lys Pro Leu Gly Lys Ile Val Ala Ser Thr Ala Leu Leu Ile
-25 -20 -15

Ser Val Ala Phe Ser Ser Ser Ile Ala Ser Ala His His His His His
-10 -5 -1 1 5

His Pro Arg Ala Ala Gly Gly Ala Leu Arg Gln Ala Ala Ser Gly Arg
10 15 20

Cys Leu Asp Val Pro Gly Ala Val Gln Thr Asp Gly Thr Ser Val Gln
25 30 35

Ile Tyr Asp Cys Trp Ser Gly Thr Asn Gln Gln Trp Thr Ser Thr Asp
40 45 50

Ala Asn Gln Leu Thr Val Tyr Gly Asn Lys Cys Leu Asp Val Pro Gly
55 60 65

His Ala Thr Thr Ala Gly Thr Arg Val Gln Ile Trp Ser Cys Ser Gly
70 75 80 85

Gly Ala Asn Gln Gln Trp Arg Val Asn Ser Asp Gly Thr Val Thr Gly
90 95 100

Val Glu Ser Gly Leu Cys Leu Glu Ala Ala Gly Ala Ala Thr Ala Asn
105 110 115

Gly Thr Ala Val Gln Leu Gly Thr Cys Asn Gln Gly Ser Asn Gln Lys
120 125 130

Trp Ser Gly Leu Thr Gly Thr Pro Pro Thr Asp Gly Ser Cys Ser Leu
135 140 145

Pro Ser Thr Tyr Arg Trp Ser Ser Thr Gly Val Leu Ala Gln Pro Ala
150 155 160 165

Asn Gly Trp Ala Ala Val Lys Asp Phe Thr Thr Val Thr Tyr Asn Gly
170 175 180

```
Lys His Leu Val Tyr Ala Ser Asn Val Ser Gly Ser Ser Tyr Gly Ser
            185                 190                 195

Met Met Phe Ser Pro Phe Thr Asn Trp Ser Asp Met Ala Ser Ala Gly
        200                 205                 210

Gln Ser Gly Met Ser Gln Ala Ala Val Ala Pro Thr Leu Phe Tyr Phe
    215                 220                 225

Ala Pro Lys Asn Ile Trp Val Leu Ala Tyr Gln Trp Gly Ala Ser Pro
230                 235                 240                 245

Phe Val Tyr Arg Thr Ser Ser Asp Pro Thr Asn Pro Asn Gly Trp Ser
                250                 255                 260

Ser Pro Gln Pro Leu Phe Thr Gly Ser Ile Ser Gly Ser Asp Thr Gly
            265                 270                 275

Pro Ile Asp Gln Thr Leu Ile Ala Asp Gly Gln Asn Met Tyr Leu Phe
        280                 285                 290

Phe Ala Gly Asp Asn Gly Lys Ile Tyr Arg Ala Ser Met Pro Ile Gly
    295                 300                 305

Asn Phe Pro Gly Asn Phe Gly Ser Ser Tyr Thr Thr Val Met Ser Asp
310                 315                 320                 325

Thr Lys Ala Asn Leu Phe Glu Gly Val Gln Val Tyr Lys Val Gln Gly
                330                 335                 340

Gln Asn Gln Tyr Leu Met Ile Val Glu Ala Met Gly Ala Asn Gly Arg
            345                 350                 355

Tyr Phe Arg Ser Phe Thr Ala Ser Ser Leu Asn Gly Ser Trp Ala Pro
        360                 365                 370

Gln Ala Ala Thr Glu Ser Asn Pro Phe Ala Gly Lys Ala Asn Ser Gly
    375                 380                 385

Ala Thr Trp Thr Asn Asp Ile Ser His Gly Asp Leu Val Arg Gly Asn
390                 395                 400                 405

Pro Asp Gln Thr Met Thr Ile Asp Pro Cys Asn Leu Gln Leu Leu Tyr
                410                 415                 420

Gln Gly Lys Ser Pro Thr Ala Gly Gly Pro Tyr Asp Gln Leu Pro Trp
            425                 430                 435

Arg Pro Gly Val Leu Ser Leu Gln Arg
        440                 445
```

<210> SEQ ID NO 39
<211> LENGTH: 446
<212> TYPE: PRT
<213> ORGANISM: Artificial Sequence
<220> FEATURE:
<223> OTHER INFORMATION: Mature sequence with His-tag

<400> SEQUENCE: 39

```
His His His His His His Pro Arg Ala Ala Gly Gly Ala Leu Arg Gln
1               5                   10                  15

Ala Ala Ser Gly Arg Cys Leu Asp Val Pro Gly Ala Val Gln Thr Asp
            20                  25                  30

Gly Thr Ser Val Gln Ile Tyr Asp Cys Trp Ser Gly Thr Asn Gln Gln
        35                  40                  45

Trp Thr Ser Thr Asp Ala Asn Gln Leu Thr Val Tyr Gly Asn Lys Cys
    50                  55                  60

Leu Asp Val Pro Gly His Ala Thr Thr Ala Gly Thr Arg Val Gln Ile
65                  70                  75                  80

Trp Ser Cys Ser Gly Gly Ala Asn Gln Gln Trp Arg Val Asn Ser Asp
                85                  90                  95
```

```
Gly Thr Val Thr Gly Val Glu Ser Gly Leu Cys Leu Glu Ala Ala Gly
            100                 105                 110

Ala Ala Thr Ala Asn Gly Thr Ala Val Gln Leu Gly Thr Cys Asn Gln
        115                 120                 125

Gly Ser Asn Gln Lys Trp Ser Gly Leu Thr Gly Thr Pro Pro Thr Asp
    130                 135                 140

Gly Ser Cys Ser Leu Pro Ser Thr Tyr Arg Trp Ser Ser Thr Gly Val
145                 150                 155                 160

Leu Ala Gln Pro Ala Asn Gly Trp Ala Ala Val Lys Asp Phe Thr Thr
                165                 170                 175

Val Thr Tyr Asn Gly Lys His Leu Val Tyr Ala Ser Asn Val Ser Gly
            180                 185                 190

Ser Ser Tyr Gly Ser Met Met Phe Ser Pro Phe Thr Asn Trp Ser Asp
        195                 200                 205

Met Ala Ser Ala Gly Gln Ser Gly Met Ser Gln Ala Ala Val Ala Pro
    210                 215                 220

Thr Leu Phe Tyr Phe Ala Pro Lys Asn Ile Trp Val Leu Ala Tyr Gln
225                 230                 235                 240

Trp Gly Ala Ser Pro Phe Val Tyr Arg Thr Ser Ser Asp Pro Thr Asn
                245                 250                 255

Pro Asn Gly Trp Ser Ser Pro Gln Pro Leu Phe Thr Gly Ser Ile Ser
            260                 265                 270

Gly Ser Asp Thr Gly Pro Ile Asp Gln Thr Leu Ile Ala Asp Gly Gln
        275                 280                 285

Asn Met Tyr Leu Phe Phe Ala Gly Asp Asn Gly Lys Ile Tyr Arg Ala
    290                 295                 300

Ser Met Pro Ile Gly Asn Phe Pro Gly Asn Phe Gly Ser Ser Tyr Thr
305                 310                 315                 320

Thr Val Met Ser Asp Thr Lys Ala Asn Leu Phe Glu Gly Val Gln Val
                325                 330                 335

Tyr Lys Val Gln Gly Gln Asn Gln Tyr Leu Met Ile Val Glu Ala Met
            340                 345                 350

Gly Ala Asn Gly Arg Tyr Phe Arg Ser Phe Thr Ala Ser Ser Leu Asn
        355                 360                 365

Gly Ser Trp Ala Pro Gln Ala Ala Thr Glu Ser Asn Pro Phe Ala Gly
    370                 375                 380

Lys Ala Asn Ser Gly Ala Thr Trp Thr Asn Asp Ile Ser His Gly Asp
385                 390                 395                 400

Leu Val Arg Gly Asn Pro Asp Gln Thr Met Thr Ile Asp Pro Cys Asn
                405                 410                 415

Leu Gln Leu Leu Tyr Gln Gly Lys Ser Pro Thr Ala Gly Gly Pro Tyr
            420                 425                 430

Asp Gln Leu Pro Trp Arg Pro Gly Val Leu Ser Leu Gln Arg
        435                 440                 445
```

<210> SEQ ID NO 40
<211> LENGTH: 1011
<212> TYPE: DNA
<213> ORGANISM: Aspergillus clavatus
<220> FEATURE:
<221> NAME/KEY: CDS
<222> LOCATION: (1)..(1008)
<220> FEATURE:
<221> NAME/KEY: sig_peptide
<222> LOCATION: (1)..(54)
<220> FEATURE:
<221> NAME/KEY: mat_peptide

```
<222> LOCATION: (55)..(1008)

<400> SEQUENCE: 40

atg cgg tcg atc ctc ttc cta gtc act tcc acc ctc gct gct gct gct       48
Met Arg Ser Ile Leu Phe Leu Val Thr Ser Thr Leu Ala Ala Ala Ala
            -15                 -10                 -5

gct gct gct tcc tta ccc aga agc ttc aaa tgg agc tcc agc gcc gcc       96
Ala Ala Ala Ser Leu Pro Arg Ser Phe Lys Trp Ser Ser Ser Ala Ala
    -1   1              5                  10

ctc gtg ggc cct aag aac gat ggc cgc cat atc gag ggc atc aag gat      144
Leu Val Gly Pro Lys Asn Asp Gly Arg His Ile Glu Gly Ile Lys Asp
15                  20                  25                  30

ccc tcc atc gtc gag gtg gac ggc acc tac cac gtc ttc gct agc acc      192
Pro Ser Ile Val Glu Val Asp Gly Thr Tyr His Val Phe Ala Ser Thr
                35                  40                  45

gcc cag gcc tcc ggc tac aac ctg gtg tat ctt agc ttc acc gac ttc      240
Ala Gln Ala Ser Gly Tyr Asn Leu Val Tyr Leu Ser Phe Thr Asp Phe
            50                  55                  60

aat aag gct cac ctg gct cca ttc cac tac ctg gac cag acc cgg atc      288
Asn Lys Ala His Leu Ala Pro Phe His Tyr Leu Asp Gln Thr Arg Ile
        65                  70                  75

ggc aaa ggc tac cgc gcc gcg cca cag gtc ttc tac ttc aag ccc cac      336
Gly Lys Gly Tyr Arg Ala Ala Pro Gln Val Phe Tyr Phe Lys Pro His
    80                  85                  90

aaa ctg tgg tat ctg gtc tac cag aac ggc aac gca gcc tat tcc acc      384
Lys Leu Trp Tyr Leu Val Tyr Gln Asn Gly Asn Ala Ala Tyr Ser Thr
95                  100                 105                 110

aac ccc gac atc agc aac ccg gcc ggc tgg acc tct ccg cag aac ttc      432
Asn Pro Asp Ile Ser Asn Pro Ala Gly Trp Thr Ser Pro Gln Asn Phe
                115                 120                 125

ttc agc ggc aca ccc agc atc atc acc cac aac atg ggc cgc ggc gcc      480
Phe Ser Gly Thr Pro Ser Ile Ile Thr His Asn Met Gly Arg Gly Ala
            130                 135                 140

tgg gtg gac atg tgg acc atc tgc gac aca cgc aac tgc tac ctc ttc      528
Trp Val Asp Met Trp Thr Ile Cys Asp Thr Arg Asn Cys Tyr Leu Phe
        145                 150                 155

tcc tca gac gac aac gga cac ctc tac cgc tcc cag aca tcc ctg gcc      576
Ser Ser Asp Asp Asn Gly His Leu Tyr Arg Ser Gln Thr Ser Leu Ala
    160                 165                 170

gac ttc ccc cac ggc atg ggc aac act gct att gcc ctc gca gac cgc      624
Asp Phe Pro His Gly Met Gly Asn Thr Ala Ile Ala Leu Ala Asp Arg
175                 180                 185                 190

aac aag ttc agc ctc ttc gaa gca tcc aat gtc tac cac acc ggg gat      672
Asn Lys Phe Ser Leu Phe Glu Ala Ser Asn Val Tyr His Thr Gly Asp
                195                 200                 205

gga agc tat ctg ctc atc gtc gag gcg atc ggc aac gac ggc cag cgg      720
Gly Ser Tyr Leu Leu Ile Val Glu Ala Ile Gly Asn Asp Gly Gln Arg
            210                 215                 220

tac ttc cgc tcc tgg act gcg agc agc ttg gcc ggc cag tgg aag ccc      768
Tyr Phe Arg Ser Trp Thr Ala Ser Ser Leu Ala Gly Gln Trp Lys Pro
        225                 230                 235

ctg gcg gat acc gag tcg aac ccc ttc gcg cgc tcg aac aat gtt gcc      816
Leu Ala Asp Thr Glu Ser Asn Pro Phe Ala Arg Ser Asn Asn Val Ala
    240                 245                 250

ttc gct aat ggc cat gcc tgg acg aag agc atc agc cac ggc gag atg      864
Phe Ala Asn Gly His Ala Trp Thr Lys Ser Ile Ser His Gly Glu Met
255                 260                 265                 270

atc cga acc cag acg gat cag act atg act atc agc ccg tgc aag ctg      912
Ile Arg Thr Gln Thr Asp Gln Thr Met Thr Ile Ser Pro Cys Lys Leu
                275                 280                 285
```

```
cgg tat ctg tac cag ggg gtg gat cct gcg gct aag ggg gat tat aat      960
Arg Tyr Leu Tyr Gln Gly Val Asp Pro Ala Ala Lys Gly Asp Tyr Asn
            290                 295                 300

gcg ctt ccg tgg aag ctg ggc ttg ctg acc cag acg aac tcg gct tgt     1008
Ala Leu Pro Trp Lys Leu Gly Leu Leu Thr Gln Thr Asn Ser Ala Cys
        305                 310                 315

taa                                                                 1011


<210> SEQ ID NO 41
<211> LENGTH: 336
<212> TYPE: PRT
<213> ORGANISM: Aspergillus clavatus

<400> SEQUENCE: 41

Met Arg Ser Ile Leu Phe Leu Val Thr Ser Thr Leu Ala Ala Ala Ala
            -15                 -10                 -5

Ala Ala Ala Ser Leu Pro Arg Ser Phe Lys Trp Ser Ser Ser Ala Ala
    -1  1               5                   10

Leu Val Gly Pro Lys Asn Asp Gly Arg His Ile Glu Gly Ile Lys Asp
15                  20                  25                  30

Pro Ser Ile Val Glu Val Asp Gly Thr Tyr His Val Phe Ala Ser Thr
                35                  40                  45

Ala Gln Ala Ser Gly Tyr Asn Leu Val Tyr Leu Ser Phe Thr Asp Phe
            50                  55                  60

Asn Lys Ala His Leu Ala Pro Phe His Tyr Leu Asp Gln Thr Arg Ile
        65                  70                  75

Gly Lys Gly Tyr Arg Ala Ala Pro Gln Val Phe Tyr Phe Lys Pro His
    80                  85                  90

Lys Leu Trp Tyr Leu Val Tyr Gln Asn Gly Asn Ala Ala Tyr Ser Thr
95                  100                 105                 110

Asn Pro Asp Ile Ser Asn Pro Ala Gly Trp Thr Ser Pro Gln Asn Phe
                115                 120                 125

Phe Ser Gly Thr Pro Ser Ile Ile Thr His Asn Met Gly Arg Gly Ala
            130                 135                 140

Trp Val Asp Met Trp Thr Ile Cys Asp Thr Arg Asn Cys Tyr Leu Phe
        145                 150                 155

Ser Ser Asp Asp Asn Gly His Leu Tyr Arg Ser Gln Thr Ser Leu Ala
    160                 165                 170

Asp Phe Pro His Gly Met Gly Asn Thr Ala Ile Ala Leu Ala Asp Arg
175                 180                 185                 190

Asn Lys Phe Ser Leu Phe Glu Ala Ser Asn Val Tyr His Thr Gly Asp
                195                 200                 205

Gly Ser Tyr Leu Leu Ile Val Glu Ala Ile Gly Asn Asp Gly Gln Arg
            210                 215                 220

Tyr Phe Arg Ser Trp Thr Ala Ser Ser Leu Ala Gly Gln Trp Lys Pro
        225                 230                 235

Leu Ala Asp Thr Glu Ser Asn Pro Phe Ala Arg Ser Asn Asn Val Ala
    240                 245                 250

Phe Ala Asn Gly His Ala Trp Thr Lys Ser Ile Ser His Gly Glu Met
255                 260                 265                 270

Ile Arg Thr Gln Thr Asp Gln Thr Met Thr Ile Ser Pro Cys Lys Leu
                275                 280                 285

Arg Tyr Leu Tyr Gln Gly Val Asp Pro Ala Ala Lys Gly Asp Tyr Asn
            290                 295                 300
```

```
Ala Leu Pro Trp Lys Leu Gly Leu Leu Thr Gln Thr Asn Ser Ala Cys
        305                 310                 315


<210> SEQ ID NO 42
<211> LENGTH: 318
<212> TYPE: PRT
<213> ORGANISM: Aspergillus clavatus

<400> SEQUENCE: 42

Ala Ser Leu Pro Arg Ser Phe Lys Trp Ser Ser Ser Ala Ala Leu Val
1               5                   10                  15

Gly Pro Lys Asn Asp Gly Arg His Ile Glu Gly Ile Lys Asp Pro Ser
            20                  25                  30

Ile Val Glu Val Asp Gly Thr Tyr His Val Phe Ala Ser Thr Ala Gln
        35                  40                  45

Ala Ser Gly Tyr Asn Leu Val Tyr Leu Ser Phe Thr Asp Phe Asn Lys
    50                  55                  60

Ala His Leu Ala Pro Phe His Tyr Leu Asp Gln Thr Arg Ile Gly Lys
65                  70                  75                  80

Gly Tyr Arg Ala Ala Pro Gln Val Phe Tyr Phe Lys Pro His Lys Leu
                85                  90                  95

Trp Tyr Leu Val Tyr Gln Asn Gly Asn Ala Ala Tyr Ser Thr Asn Pro
            100                 105                 110

Asp Ile Ser Asn Pro Ala Gly Trp Thr Ser Pro Gln Asn Phe Phe Ser
        115                 120                 125

Gly Thr Pro Ser Ile Ile Thr His Asn Met Gly Arg Gly Ala Trp Val
    130                 135                 140

Asp Met Trp Thr Ile Cys Asp Thr Arg Asn Cys Tyr Leu Phe Ser Ser
145                 150                 155                 160

Asp Asp Asn Gly His Leu Tyr Arg Ser Gln Thr Ser Leu Ala Asp Phe
                165                 170                 175

Pro His Gly Met Gly Asn Thr Ala Ile Ala Leu Ala Asp Arg Asn Lys
            180                 185                 190

Phe Ser Leu Phe Glu Ala Ser Asn Val Tyr His Thr Gly Asp Gly Ser
        195                 200                 205

Tyr Leu Leu Ile Val Glu Ala Ile Gly Asn Asp Gly Gln Arg Tyr Phe
    210                 215                 220

Arg Ser Trp Thr Ala Ser Ser Leu Ala Gly Gln Trp Lys Pro Leu Ala
225                 230                 235                 240

Asp Thr Glu Ser Asn Pro Phe Ala Arg Ser Asn Asn Val Ala Phe Ala
                245                 250                 255

Asn Gly His Ala Trp Thr Lys Ser Ile Ser His Gly Glu Met Ile Arg
            260                 265                 270

Thr Gln Thr Asp Gln Thr Met Thr Ile Ser Pro Cys Lys Leu Arg Tyr
        275                 280                 285

Leu Tyr Gln Gly Val Asp Pro Ala Ala Lys Gly Asp Tyr Asn Ala Leu
    290                 295                 300

Pro Trp Lys Leu Gly Leu Leu Thr Gln Thr Asn Ser Ala Cys
305                 310                 315


<210> SEQ ID NO 43
<211> LENGTH: 1035
<212> TYPE: DNA
<213> ORGANISM: Artificial Sequence
<220> FEATURE:
<223> OTHER INFORMATION: Expression construct
<220> FEATURE:
```

```
<221> NAME/KEY: CDS
<222> LOCATION: (1)..(1032)
<220> FEATURE:
<221> NAME/KEY: sig_peptide
<222> LOCATION: (1)..(54)
<220> FEATURE:
<221> NAME/KEY: mat_peptide
<222> LOCATION: (55)..(1032)

<400> SEQUENCE: 43

atg cgg tcg atc ctc ttc cta gtc act tcc acc ctc gct gct gct gct       48
Met Arg Ser Ile Leu Phe Leu Val Thr Ser Thr Leu Ala Ala Ala Ala
            -15                 -10                 -5

gct gct gct tcc tta ccc aga agc ttc aaa tgg agc tcc agc gcc gcc       96
Ala Ala Ala Ser Leu Pro Arg Ser Phe Lys Trp Ser Ser Ser Ala Ala
    -1  1               5                   10

ctc gtg ggc cct aag aac gat ggc cgc cat atc gag ggc atc aag gat      144
Leu Val Gly Pro Lys Asn Asp Gly Arg His Ile Glu Gly Ile Lys Asp
15                  20                  25                  30

ccc tcc atc gtc gag gtg gac ggc acc tac cac gtc ttc gct agc acc      192
Pro Ser Ile Val Glu Val Asp Gly Thr Tyr His Val Phe Ala Ser Thr
                35                  40                  45

gcc cag gcc tcc ggc tac aac ctg gtg tat ctt agc ttc acc gac ttc      240
Ala Gln Ala Ser Gly Tyr Asn Leu Val Tyr Leu Ser Phe Thr Asp Phe
            50                  55                  60

aat aag gct cac ctg gct cca ttc cac tac ctg gac cag acc cgg atc      288
Asn Lys Ala His Leu Ala Pro Phe His Tyr Leu Asp Gln Thr Arg Ile
        65                  70                  75

ggc aaa ggc tac cgc gcc gcg cca cag gtc ttc tac ttc aag ccc cac      336
Gly Lys Gly Tyr Arg Ala Ala Pro Gln Val Phe Tyr Phe Lys Pro His
    80                  85                  90

aaa ctg tgg tat ctg gtc tac cag aac ggc aac gca gcc tat tcc acc      384
Lys Leu Trp Tyr Leu Val Tyr Gln Asn Gly Asn Ala Ala Tyr Ser Thr
95                  100                 105                 110

aac ccc gac atc agc aac ccg gcc ggc tgg acc tct ccg cag aac ttc      432
Asn Pro Asp Ile Ser Asn Pro Ala Gly Trp Thr Ser Pro Gln Asn Phe
                115                 120                 125

ttc agc ggc aca ccc agc atc atc acc cac aac atg ggc cgc ggc gcc      480
Phe Ser Gly Thr Pro Ser Ile Ile Thr His Asn Met Gly Arg Gly Ala
            130                 135                 140

tgg gtg gac atg tgg acc atc tgc gac aca cgc aac tgc tac ctc ttc      528
Trp Val Asp Met Trp Thr Ile Cys Asp Thr Arg Asn Cys Tyr Leu Phe
        145                 150                 155

tcc tca gac gac aac gga cac ctc tac cgc tcc cag aca tcc ctg gcc      576
Ser Ser Asp Asp Asn Gly His Leu Tyr Arg Ser Gln Thr Ser Leu Ala
    160                 165                 170

gac ttc ccc cac ggc atg ggc aac act gct att gcc ctc gca gac cgc      624
Asp Phe Pro His Gly Met Gly Asn Thr Ala Ile Ala Leu Ala Asp Arg
175                 180                 185                 190

aac aag ttc agc ctc ttc gaa gca tcc aat gtc tac cac acc ggg gat      672
Asn Lys Phe Ser Leu Phe Glu Ala Ser Asn Val Tyr His Thr Gly Asp
                195                 200                 205

gga agc tat ctg ctc atc gtc gag gcg atc ggc aac gac ggc cag cgg      720
Gly Ser Tyr Leu Leu Ile Val Glu Ala Ile Gly Asn Asp Gly Gln Arg
            210                 215                 220

tac ttc cgc tcc tgg act gcg agc agc ttg gcc ggc cag tgg aag ccc      768
Tyr Phe Arg Ser Trp Thr Ala Ser Ser Leu Ala Gly Gln Trp Lys Pro
        225                 230                 235

ctg gcg gat acc gag tcg aac ccc ttc gcg cgc tcg aac aat gtt gcc      816
Leu Ala Asp Thr Glu Ser Asn Pro Phe Ala Arg Ser Asn Asn Val Ala
    240                 245                 250
```

-continued

```
ttc gct aat ggc cat gcc tgg acg aag agc atc agc cac ggc gag atg      864
Phe Ala Asn Gly His Ala Trp Thr Lys Ser Ile Ser His Gly Glu Met
255                 260                 265                 270

atc cga acc cag acg gat cag act atg act atc agc ccg tgc aag ctg      912
Ile Arg Thr Gln Thr Asp Gln Thr Met Thr Ile Ser Pro Cys Lys Leu
                275                 280                 285

cgg tat ctg tac cag ggg gtg gat cct gcg gct aag ggg gat tat aat      960
Arg Tyr Leu Tyr Gln Gly Val Asp Pro Ala Ala Lys Gly Asp Tyr Asn
            290                 295                 300

gcg ctt ccg tgg aag ctg ggc ttg ctg acc cag acg aac tcg gct tgt     1008
Ala Leu Pro Trp Lys Leu Gly Leu Leu Thr Gln Thr Asn Ser Ala Cys
        305                 310                 315

cga cat cac cat cac cat cac cca tga                                 1035
Arg His His His His His His Pro
    320                 325


<210> SEQ ID NO 44
<211> LENGTH: 344
<212> TYPE: PRT
<213> ORGANISM: Artificial Sequence
<220> FEATURE:
<223> OTHER INFORMATION: Synthetic Construct

<400> SEQUENCE: 44

Met Arg Ser Ile Leu Phe Leu Val Thr Ser Thr Leu Ala Ala Ala Ala
            -15                 -10                 -5

Ala Ala Ala Ser Leu Pro Arg Ser Phe Lys Trp Ser Ser Ser Ala Ala
    -1  1               5                   10

Leu Val Gly Pro Lys Asn Asp Gly Arg His Ile Glu Gly Ile Lys Asp
15                  20                  25                  30

Pro Ser Ile Val Glu Val Asp Gly Thr Tyr His Val Phe Ala Ser Thr
                35                  40                  45

Ala Gln Ala Ser Gly Tyr Asn Leu Val Tyr Leu Ser Phe Thr Asp Phe
            50                  55                  60

Asn Lys Ala His Leu Ala Pro Phe His Tyr Leu Asp Gln Thr Arg Ile
        65                  70                  75

Gly Lys Gly Tyr Arg Ala Ala Pro Gln Val Phe Tyr Phe Lys Pro His
    80                  85                  90

Lys Leu Trp Tyr Leu Val Tyr Gln Asn Gly Asn Ala Ala Tyr Ser Thr
95                  100                 105                 110

Asn Pro Asp Ile Ser Asn Pro Ala Gly Trp Thr Ser Pro Gln Asn Phe
                115                 120                 125

Phe Ser Gly Thr Pro Ser Ile Ile Thr His Asn Met Gly Arg Gly Ala
            130                 135                 140

Trp Val Asp Met Trp Thr Ile Cys Asp Thr Arg Asn Cys Tyr Leu Phe
        145                 150                 155

Ser Ser Asp Asp Asn Gly His Leu Tyr Arg Ser Gln Thr Ser Leu Ala
    160                 165                 170

Asp Phe Pro His Gly Met Gly Asn Thr Ala Ile Ala Leu Ala Asp Arg
175                 180                 185                 190

Asn Lys Phe Ser Leu Phe Glu Ala Ser Asn Val Tyr His Thr Gly Asp
                195                 200                 205

Gly Ser Tyr Leu Leu Ile Val Glu Ala Ile Gly Asn Asp Gly Gln Arg
            210                 215                 220

Tyr Phe Arg Ser Trp Thr Ala Ser Ser Leu Ala Gly Gln Trp Lys Pro
        225                 230                 235

Leu Ala Asp Thr Glu Ser Asn Pro Phe Ala Arg Ser Asn Asn Val Ala
```

```
    240                 245                 250

Phe Ala Asn Gly His Ala Trp Thr Lys Ser Ile Ser His Gly Glu Met
255                 260                 265                 270

Ile Arg Thr Gln Thr Asp Gln Thr Met Thr Ile Ser Pro Cys Lys Leu
                275                 280                 285

Arg Tyr Leu Tyr Gln Gly Val Asp Pro Ala Ala Lys Gly Asp Tyr Asn
            290                 295                 300

Ala Leu Pro Trp Lys Leu Gly Leu Leu Thr Gln Thr Asn Ser Ala Cys
        305                 310                 315

Arg His His His His His His Pro
    320                 325


<210> SEQ ID NO 45
<211> LENGTH: 326
<212> TYPE: PRT
<213> ORGANISM: Artificial Sequence
<220> FEATURE:
<223> OTHER INFORMATION: Mature sequence with His-tag

<400> SEQUENCE: 45

Ala Ser Leu Pro Arg Ser Phe Lys Trp Ser Ser Ser Ala Ala Leu Val
1               5                   10                  15

Gly Pro Lys Asn Asp Gly Arg His Ile Glu Gly Ile Lys Asp Pro Ser
            20                  25                  30

Ile Val Glu Val Asp Gly Thr Tyr His Val Phe Ala Ser Thr Ala Gln
        35                  40                  45

Ala Ser Gly Tyr Asn Leu Val Tyr Leu Ser Phe Thr Asp Phe Asn Lys
    50                  55                  60

Ala His Leu Ala Pro Phe His Tyr Leu Asp Gln Thr Arg Ile Gly Lys
65                  70                  75                  80

Gly Tyr Arg Ala Ala Pro Gln Val Phe Tyr Phe Lys Pro His Lys Leu
                85                  90                  95

Trp Tyr Leu Val Tyr Gln Asn Gly Asn Ala Ala Tyr Ser Thr Asn Pro
            100                 105                 110

Asp Ile Ser Asn Pro Ala Gly Trp Thr Ser Pro Gln Asn Phe Phe Ser
        115                 120                 125

Gly Thr Pro Ser Ile Ile Thr His Asn Met Gly Arg Gly Ala Trp Val
    130                 135                 140

Asp Met Trp Thr Ile Cys Asp Thr Arg Asn Cys Tyr Leu Phe Ser Ser
145                 150                 155                 160

Asp Asp Asn Gly His Leu Tyr Arg Ser Gln Thr Ser Leu Ala Asp Phe
                165                 170                 175

Pro His Gly Met Gly Asn Thr Ala Ile Ala Leu Ala Asp Arg Asn Lys
            180                 185                 190

Phe Ser Leu Phe Glu Ala Ser Asn Val Tyr His Thr Gly Asp Gly Ser
        195                 200                 205

Tyr Leu Leu Ile Val Glu Ala Ile Gly Asn Asp Gly Gln Arg Tyr Phe
    210                 215                 220

Arg Ser Trp Thr Ala Ser Ser Leu Ala Gly Gln Trp Lys Pro Leu Ala
225                 230                 235                 240

Asp Thr Glu Ser Asn Pro Phe Ala Arg Ser Asn Asn Val Ala Phe Ala
                245                 250                 255

Asn Gly His Ala Trp Thr Lys Ser Ile Ser His Gly Glu Met Ile Arg
            260                 265                 270

Thr Gln Thr Asp Gln Thr Met Thr Ile Ser Pro Cys Lys Leu Arg Tyr
```

```
        275                 280                 285

Leu Tyr Gln Gly Val Asp Pro Ala Ala Lys Gly Asp Tyr Asn Ala Leu
    290                 295                 300

Pro Trp Lys Leu Gly Leu Leu Thr Gln Thr Asn Ser Ala Cys Arg His
305                 310                 315                 320

His His His His His Pro
                325


<210> SEQ ID NO 46
<211> LENGTH: 984
<212> TYPE: DNA
<213> ORGANISM: Aspergillus wentii
<220> FEATURE:
<221> NAME/KEY: CDS
<222> LOCATION: (1)..(981)
<220> FEATURE:
<221> NAME/KEY: sig_peptide
<222> LOCATION: (1)..(75)
<220> FEATURE:
<221> NAME/KEY: mat_peptide
<222> LOCATION: (76)..(981)

<400> SEQUENCE: 46

atg aaa ttc ttc aag gcg caa gct ggt gtg cca tct ggc ata ttc ttg       48
Met Lys Phe Phe Lys Ala Gln Ala Gly Val Pro Ser Gly Ile Phe Leu
-25                 -20                 -15                 -10

ctc tct ctg gca cca gtt gtc att gcc gac tgc gct ctt ccg tca acc       96
Leu Ser Leu Ala Pro Val Val Ile Ala Asp Cys Ala Leu Pro Ser Thr
                -5              -1  1               5

tat agc tgg aca tca act ggc tct ctg gca gat cca aag tct gga tgg      144
Tyr Ser Trp Thr Ser Thr Gly Ser Leu Ala Asp Pro Lys Ser Gly Trp
        10                  15                  20

acg gcg ctc aag gat ttt acc aat gtg gtc tcc aac aac aaa cat atc      192
Thr Ala Leu Lys Asp Phe Thr Asn Val Val Ser Asn Asn Lys His Ile
    25                  30                  35

gtc tat gca tca acc act gac gcc agt gga aac tac ggc tcg atg aat      240
Val Tyr Ala Ser Thr Thr Asp Ala Ser Gly Asn Tyr Gly Ser Met Asn
40                  45                  50                  55

ttt gcc tcc ttt tca gac tgg tct gac atg gca tct gca agt caa gcc      288
Phe Ala Ser Phe Ser Asp Trp Ser Asp Met Ala Ser Ala Ser Gln Ala
                60                  65                  70

gcg acg agc ttt acg gca gtt gcg ccc act ttg ctc tac ttc cag cca      336
Ala Thr Ser Phe Thr Ala Val Ala Pro Thr Leu Leu Tyr Phe Gln Pro
            75                  80                  85

aag agc atc tgg gtg ctg gcc tac caa tgg ggc tcg agt acg ttt acc      384
Lys Ser Ile Trp Val Leu Ala Tyr Gln Trp Gly Ser Ser Thr Phe Thr
        90                  95                  100

tac cga acg tca agc gat cct acc aat gcc aat gga tgg tca tcc gag      432
Tyr Arg Thr Ser Ser Asp Pro Thr Asn Ala Asn Gly Trp Ser Ser Glu
    105                 110                 115

aaa gct ctt ttc tct gga aag atc acc ggc tcg gac act ggc gcc att      480
Lys Ala Leu Phe Ser Gly Lys Ile Thr Gly Ser Asp Thr Gly Ala Ile
120                 125                 130                 135

gat cag acc ctt atc ggt gac gcc acg aat atg tat ctt ttc ttt gcg      528
Asp Gln Thr Leu Ile Gly Asp Ala Thr Asn Met Tyr Leu Phe Phe Ala
                140                 145                 150

gga gat aac ggc aag atc tat cgg tcg agc atg cca atc gcc aac ttc      576
Gly Asp Asn Gly Lys Ile Tyr Arg Ser Ser Met Pro Ile Ala Asn Phe
            155                 160                 165

cct gga gac ttc gga acg gcg tca gaa gtc gtt ctt agt gac agc cgg      624
Pro Gly Asp Phe Gly Thr Ala Ser Glu Val Val Leu Ser Asp Ser Arg
        170                 175                 180
```

```
aac aat ctc ttc gaa gca gtc caa gtt tac acc gtc gaa ggg caa aac      672
Asn Asn Leu Phe Glu Ala Val Gln Val Tyr Thr Val Glu Gly Gln Asn
    185                 190                 195

cag tat ctg atg atc gtc gag gca att gga aca aac ggc cgt tat ttc      720
Gln Tyr Leu Met Ile Val Glu Ala Ile Gly Thr Asn Gly Arg Tyr Phe
200                 205                 210                 215

cgt tca ttc acc gcc agc agt ctc gac ggt tcg tgg aca gag cag gca      768
Arg Ser Phe Thr Ala Ser Ser Leu Asp Gly Ser Trp Thr Glu Gln Ala
                220                 225                 230

gcc agc gag aac aat ccc ttc gct gga aag gcc aac agc ggt gcg acc      816
Ala Ser Glu Asn Asn Pro Phe Ala Gly Lys Ala Asn Ser Gly Ala Thr
            235                 240                 245

tgg acc aac gac atc agt cac ggc gat ttg gtt cgc aat aac cct gac      864
Trp Thr Asn Asp Ile Ser His Gly Asp Leu Val Arg Asn Asn Pro Asp
        250                 255                 260

caa aca atg act atc gac cca tgc aac ctg caa ttc ctc tac cag ggg      912
Gln Thr Met Thr Ile Asp Pro Cys Asn Leu Gln Phe Leu Tyr Gln Gly
    265                 270                 275

cgc gat gcg agt gcc ggt ggt aac tac aat acc ctg ccg tgg agg cca      960
Arg Asp Ala Ser Ala Gly Gly Asn Tyr Asn Thr Leu Pro Trp Arg Pro
280                 285                 290                 295

ggt gta ctg act ctg aag cac taa                                      984
Gly Val Leu Thr Leu Lys His
                300


<210> SEQ ID NO 47
<211> LENGTH: 327
<212> TYPE: PRT
<213> ORGANISM: Aspergillus wentii

<400> SEQUENCE: 47

Met Lys Phe Phe Lys Ala Gln Ala Gly Val Pro Ser Gly Ile Phe Leu
-25                 -20                 -15                 -10

Leu Ser Leu Ala Pro Val Val Ile Ala Asp Cys Ala Leu Pro Ser Thr
                -5                  -1  1               5

Tyr Ser Trp Thr Ser Thr Gly Ser Leu Ala Asp Pro Lys Ser Gly Trp
        10                  15                  20

Thr Ala Leu Lys Asp Phe Thr Asn Val Val Ser Asn Asn Lys His Ile
    25                  30                  35

Val Tyr Ala Ser Thr Thr Asp Ala Ser Gly Asn Tyr Gly Ser Met Asn
40                  45                  50                  55

Phe Ala Ser Phe Ser Asp Trp Ser Asp Met Ala Ser Ala Ser Gln Ala
                60                  65                  70

Ala Thr Ser Phe Thr Ala Val Ala Pro Thr Leu Leu Tyr Phe Gln Pro
            75                  80                  85

Lys Ser Ile Trp Val Leu Ala Tyr Gln Trp Gly Ser Ser Thr Phe Thr
        90                  95                  100

Tyr Arg Thr Ser Ser Asp Pro Thr Asn Ala Asn Gly Trp Ser Ser Glu
    105                 110                 115

Lys Ala Leu Phe Ser Gly Lys Ile Thr Gly Ser Asp Thr Gly Ala Ile
120                 125                 130                 135

Asp Gln Thr Leu Ile Gly Asp Ala Thr Asn Met Tyr Leu Phe Phe Ala
                140                 145                 150

Gly Asp Asn Gly Lys Ile Tyr Arg Ser Ser Met Pro Ile Ala Asn Phe
            155                 160                 165

Pro Gly Asp Phe Gly Thr Ala Ser Glu Val Val Leu Ser Asp Ser Arg
        170                 175                 180
```

```
Asn Asn Leu Phe Glu Ala Val Gln Val Tyr Thr Val Glu Gly Gln Asn
    185                 190                 195

Gln Tyr Leu Met Ile Val Glu Ala Ile Gly Thr Asn Gly Arg Tyr Phe
200                 205                 210                 215

Arg Ser Phe Thr Ala Ser Ser Leu Asp Gly Ser Trp Thr Glu Gln Ala
                220                 225                 230

Ala Ser Glu Asn Asn Pro Phe Ala Gly Lys Ala Asn Ser Gly Ala Thr
            235                 240                 245

Trp Thr Asn Asp Ile Ser His Gly Asp Leu Val Arg Asn Asn Pro Asp
        250                 255                 260

Gln Thr Met Thr Ile Asp Pro Cys Asn Leu Gln Phe Leu Tyr Gln Gly
    265                 270                 275

Arg Asp Ala Ser Ala Gly Gly Asn Tyr Asn Thr Leu Pro Trp Arg Pro
280                 285                 290                 295

Gly Val Leu Thr Leu Lys His
                300


<210> SEQ ID NO 48
<211> LENGTH: 302
<212> TYPE: PRT
<213> ORGANISM: Aspergillus wentii

<400> SEQUENCE: 48

Asp Cys Ala Leu Pro Ser Thr Tyr Ser Trp Thr Ser Thr Gly Ser Leu
1               5                   10                  15

Ala Asp Pro Lys Ser Gly Trp Thr Ala Leu Lys Asp Phe Thr Asn Val
            20                  25                  30

Val Ser Asn Asn Lys His Ile Val Tyr Ala Ser Thr Thr Asp Ala Ser
        35                  40                  45

Gly Asn Tyr Gly Ser Met Asn Phe Ala Ser Phe Ser Asp Trp Ser Asp
    50                  55                  60

Met Ala Ser Ala Ser Gln Ala Ala Thr Ser Phe Thr Ala Val Ala Pro
65                  70                  75                  80

Thr Leu Leu Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
            100                 105                 110

Ala Asn Gly Trp Ser Ser Glu Lys Ala Leu Phe Ser Gly Lys Ile Thr
        115                 120                 125

Gly Ser Asp Thr Gly Ala Ile Asp Gln Thr Leu Ile Gly Asp Ala Thr
    130                 135                 140

Asn Met Tyr Leu Phe Phe Ala Gly Asp Asn Gly Lys Ile Tyr Arg Ser
145                 150                 155                 160

Ser Met Pro Ile Ala Asn Phe Pro Gly Asp Phe Gly Thr Ala Ser Glu
                165                 170                 175

Val Val Leu Ser Asp Ser Arg Asn Asn Leu Phe Glu Ala Val Gln Val
            180                 185                 190

Tyr Thr Val Glu Gly Gln Asn Gln Tyr Leu Met Ile Val Glu Ala Ile
        195                 200                 205

Gly Thr Asn Gly Arg Tyr Phe Arg Ser Phe Thr Ala Ser Ser Leu Asp
    210                 215                 220

Gly Ser Trp Thr Glu Gln Ala Ala Ser Glu Asn Asn Pro Phe Ala Gly
225                 230                 235                 240

Lys Ala Asn Ser Gly Ala Thr Trp Thr Asn Asp Ile Ser His Gly Asp
```

```
                245                 250                 255

Leu Val Arg Asn Asn Pro Asp Gln Thr Met Thr Ile Asp Pro Cys Asn
            260                 265                 270

Leu Gln Phe Leu Tyr Gln Gly Arg Asp Ala Ser Ala Gly Gly Asn Tyr
        275                 280                 285

Asn Thr Leu Pro Trp Arg Pro Gly Val Leu Thr Leu Lys His
    290                 295                 300


<210> SEQ ID NO 49
<211> LENGTH: 1011
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1008)
<220> FEATURE:
<221> NAME/KEY: sig_peptide
<222> LOCATION: (1)..(75)
<220> FEATURE:
<221> NAME/KEY: mat_peptide
<222> LOCATION: (76)..(1008)

<400> SEQUENCE: 49

atg aaa ttc ttc aag gcg caa gct ggt gtg cca tct ggc ata ttc ttg       48
Met Lys Phe Phe Lys Ala Gln Ala Gly Val Pro Ser Gly Ile Phe Leu
-25                 -20                 -15                 -10

ctc tct ctg gca cca gtt gtc att gcc gac tgc gct ctt ccg tca acc       96
Leu Ser Leu Ala Pro Val Val Ile Ala Asp Cys Ala Leu Pro Ser Thr
                -5                  -1  1               5

tat agc tgg aca tca act ggc tct ctg gca gat cca aag tct gga tgg      144
Tyr Ser Trp Thr Ser Thr Gly Ser Leu Ala Asp Pro Lys Ser Gly Trp
        10                  15                  20

acg gcg ctc aag gat ttt acc aat gtg gtc tcc aac aac aaa cat atc      192
Thr Ala Leu Lys Asp Phe Thr Asn Val Val Ser Asn Asn Lys His Ile
    25                  30                  35

gtc tat gca tca acc act gac gcc agt gga aac tac ggc tcg atg aat      240
Val Tyr Ala Ser Thr Thr Asp Ala Ser Gly Asn Tyr Gly Ser Met Asn
40                  45                  50                  55

ttt gcc tcc ttt tca gac tgg tct gac atg gca tct gca agt caa gcc      288
Phe Ala Ser Phe Ser Asp Trp Ser Asp Met Ala Ser Ala Ser Gln Ala
                60                  65                  70

gcg acg agc ttt acg gca gtt gcg ccc act ttg ctc tac ttc cag cca      336
Ala Thr Ser Phe Thr Ala Val Ala Pro Thr Leu Leu Tyr Phe Gln Pro
            75                  80                  85

aag agc atc tgg gtg ctg gcc tac caa tgg ggc tcg agt acg ttt acc      384
Lys Ser Ile Trp Val Leu Ala Tyr Gln Trp Gly Ser Ser Thr Phe Thr
        90                  95                  100

tac cga acg tca agc gat cct acc aat gcc aat gga tgg tca tcc gag      432
Tyr Arg Thr Ser Ser Asp Pro Thr Asn Ala Asn Gly Trp Ser Ser Glu
    105                 110                 115

aaa gct ctt ttc tct gga aag atc acc ggc tcg gac act ggc gcc att      480
Lys Ala Leu Phe Ser Gly Lys Ile Thr Gly Ser Asp Thr Gly Ala Ile
120                 125                 130                 135

gat cag acc ctt atc ggt gac gcc acg aat atg tat ctt ttc ttt gcg      528
Asp Gln Thr Leu Ile Gly Asp Ala Thr Asn Met Tyr Leu Phe Phe Ala
                140                 145                 150

gga gat aac ggc aag atc tat cgg tcg agc atg cca atc gcc aac ttc      576
Gly Asp Asn Gly Lys Ile Tyr Arg Ser Ser Met Pro Ile Ala Asn Phe
            155                 160                 165

cct gga gac ttc gga acg gcg tca gaa gtc gtt ctt agt gac agc cgg      624
```

```
Pro Gly Asp Phe Gly Thr Ala Ser Glu Val Val Leu Ser Asp Ser Arg
        170                 175                 180

aac aat ctc ttc gaa gca gtc caa gtt tac acc gtc gaa ggg caa aac      672
Asn Asn Leu Phe Glu Ala Val Gln Val Tyr Thr Val Glu Gly Gln Asn
    185                 190                 195

cag tat ctg atg atc gtc gag gca att gga aca aac ggc cgt tat ttc      720
Gln Tyr Leu Met Ile Val Glu Ala Ile Gly Thr Asn Gly Arg Tyr Phe
200                 205                 210                 215

cgt tca ttc acc gcc agc agt ctc gac ggt tcg tgg aca gag cag gca      768
Arg Ser Phe Thr Ala Ser Ser Leu Asp Gly Ser Trp Thr Glu Gln Ala
                220                 225                 230

gcc agc gag aac aat ccc ttc gct gga aag gcc aac agc ggt gcg acc      816
Ala Ser Glu Asn Asn Pro Phe Ala Gly Lys Ala Asn Ser Gly Ala Thr
            235                 240                 245

tgg acc aac gac atc agt cac ggc gat ttg gtt cgc aat aac cct gac      864
Trp Thr Asn Asp Ile Ser His Gly Asp Leu Val Arg Asn Asn Pro Asp
        250                 255                 260

caa aca atg act atc gac cca tgc aac ctg caa ttc ctc tac cag ggg      912
Gln Thr Met Thr Ile Asp Pro Cys Asn Leu Gln Phe Leu Tyr Gln Gly
    265                 270                 275

cgc gat gcg agt gcc ggt ggt aac tac aat acc ctg ccg tgg agg cca      960
Arg Asp Ala Ser Ala Gly Gly Asn Tyr Asn Thr Leu Pro Trp Arg Pro
280                 285                 290                 295

ggt gta ctg act ctg aag cac acg cgt gcg cat cac cat cac cat cac     1008
Gly Val Leu Thr Leu Lys His Thr Arg Ala His His His His His His
                300                 305                 310

taa                                                                 1011


<210> SEQ ID NO 50
<211> LENGTH: 336
<212> TYPE: PRT
<213> ORGANISM: Artificial Sequence
<220> FEATURE:
<223> OTHER INFORMATION: Synthetic Construct

<400> SEQUENCE: 50

Met Lys Phe Phe Lys Ala Gln Ala Gly Val Pro Ser Gly Ile Phe Leu
-25                 -20                 -15                 -10

Leu Ser Leu Ala Pro Val Val Ile Ala Asp Cys Ala Leu Pro Ser Thr
                -5                  -1  1               5

Tyr Ser Trp Thr Ser Thr Gly Ser Leu Ala Asp Pro Lys Ser Gly Trp
        10                  15                  20

Thr Ala Leu Lys Asp Phe Thr Asn Val Val Ser Asn Asn Lys His Ile
    25                  30                  35

Val Tyr Ala Ser Thr Thr Asp Ala Ser Gly Asn Tyr Gly Ser Met Asn
40                  45                  50                  55

Phe Ala Ser Phe Ser Asp Trp Ser Asp Met Ala Ser Ala Ser Gln Ala
                60                  65                  70

Ala Thr Ser Phe Thr Ala Val Ala Pro Thr Leu Leu Tyr Phe Gln Pro
            75                  80                  85

Lys Ser Ile Trp Val Leu Ala Tyr Gln Trp Gly Ser Ser Thr Phe Thr
        90                  95                  100

Tyr Arg Thr Ser Ser Asp Pro Thr Asn Ala Asn Gly Trp Ser Ser Glu
    105                 110                 115

Lys Ala Leu Phe Ser Gly Lys Ile Thr Gly Ser Asp Thr Gly Ala Ile
120                 125                 130                 135

Asp Gln Thr Leu Ile Gly Asp Ala Thr Asn Met Tyr Leu Phe Phe Ala
                140                 145                 150
```

```
Gly Asp Asn Gly Lys Ile Tyr Arg Ser Ser Met Pro Ile Ala Asn Phe
            155                 160                 165

Pro Gly Asp Phe Gly Thr Ala Ser Glu Val Val Leu Ser Asp Ser Arg
        170                 175                 180

Asn Asn Leu Phe Glu Ala Val Gln Val Tyr Thr Val Glu Gly Gln Asn
    185                 190                 195

Gln Tyr Leu Met Ile Val Glu Ala Ile Gly Thr Asn Gly Arg Tyr Phe
200                 205                 210                 215

Arg Ser Phe Thr Ala Ser Ser Leu Asp Gly Ser Trp Thr Glu Gln Ala
                220                 225                 230

Ala Ser Glu Asn Asn Pro Phe Ala Gly Lys Ala Asn Ser Gly Ala Thr
            235                 240                 245

Trp Thr Asn Asp Ile Ser His Gly Asp Leu Val Arg Asn Asn Pro Asp
        250                 255                 260

Gln Thr Met Thr Ile Asp Pro Cys Asn Leu Gln Phe Leu Tyr Gln Gly
    265                 270                 275

Arg Asp Ala Ser Ala Gly Gly Asn Tyr Asn Thr Leu Pro Trp Arg Pro
280                 285                 290                 295

Gly Val Leu Thr Leu Lys His Thr Arg Ala His His His His His His
                300                 305                 310


<210> SEQ ID NO 51
<211> LENGTH: 311
<212> TYPE: PRT
<213> ORGANISM: Artificial Sequence
<220> FEATURE:
<223> OTHER INFORMATION: Mature sequence with His-tag

<400> SEQUENCE: 51

Asp Cys Ala Leu Pro Ser Thr Tyr Ser Trp Thr Ser Thr Gly Ser Leu
1               5                   10                  15

Ala Asp Pro Lys Ser Gly Trp Thr Ala Leu Lys Asp Phe Thr Asn Val
            20                  25                  30

Val Ser Asn Asn Lys His Ile Val Tyr Ala Ser Thr Thr Asp Ala Ser
        35                  40                  45

Gly Asn Tyr Gly Ser Met Asn Phe Ala Ser Phe Ser Asp Trp Ser Asp
    50                  55                  60

Met Ala Ser Ala Ser Gln Ala Ala Thr Ser Phe Thr Ala Val Ala Pro
65                  70                  75                  80

Thr Leu Leu Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
            100                 105                 110

Ala Asn Gly Trp Ser Ser Glu Lys Ala Leu Phe Ser Gly Lys Ile Thr
        115                 120                 125

Gly Ser Asp Thr Gly Ala Ile Asp Gln Thr Leu Ile Gly Asp Ala Thr
    130                 135                 140

Asn Met Tyr Leu Phe Phe Ala Gly Asp Asn Gly Lys Ile Tyr Arg Ser
145                 150                 155                 160

Ser Met Pro Ile Ala Asn Phe Pro Gly Asp Phe Gly Thr Ala Ser Glu
                165                 170                 175

Val Val Leu Ser Asp Ser Arg Asn Asn Leu Phe Glu Ala Val Gln Val
            180                 185                 190

Tyr Thr Val Glu Gly Gln Asn Gln Tyr Leu Met Ile Val Glu Ala Ile
        195                 200                 205
```

```
Gly Thr Asn Gly Arg Tyr Phe Arg Ser Phe Thr Ala Ser Ser Leu Asp
    210                 215                 220

Gly Ser Trp Thr Glu Gln Ala Ala Ser Glu Asn Asn Pro Phe Ala Gly
225                 230                 235                 240

Lys Ala Asn Ser Gly Ala Thr Trp Thr Asn Asp Ile Ser His Gly Asp
                245                 250                 255

Leu Val Arg Asn Asn Pro Asp Gln Thr Met Thr Ile Asp Pro Cys Asn
            260                 265                 270

Leu Gln Phe Leu Tyr Gln Gly Arg Asp Ala Ser Ala Gly Gly Asn Tyr
        275                 280                 285

Asn Thr Leu Pro Trp Arg Pro Gly Val Leu Thr Leu Lys His Thr Arg
    290                 295                 300

Ala His His His His His His
305                 310


<210> SEQ ID NO 52
<211> LENGTH: 1411
<212> TYPE: DNA
<213> ORGANISM: Acrophialophora fusispora
<220> FEATURE:
<221> NAME/KEY: CDS
<222> LOCATION: (1)..(318)
<220> FEATURE:
<221> NAME/KEY: sig_peptide
<222> LOCATION: (1)..(72)
<220> FEATURE:
<221> NAME/KEY: mat_peptide
<222> LOCATION: (73)..(1408)
<220> FEATURE:
<221> NAME/KEY: CDS
<222> LOCATION: (470)..(1298)
<220> FEATURE:
<221> NAME/KEY: CDS
<222> LOCATION: (1392)..(1408)

<400> SEQUENCE: 52

atg aag ttc tcc aaa tcg gat ctc ggc gct gcc gtc gcc ttc ctg gct       48
Met Lys Phe Ser Lys Ser Asp Leu Gly Ala Ala Val Ala Phe Leu Ala
                -20                 -15                 -10

tcg gcc gtc cct ctc gct gaa gcc gcg tgc tcc ttg ccg tcc agc tac       96
Ser Ala Val Pro Leu Ala Glu Ala Ala Cys Ser Leu Pro Ser Ser Tyr
            -5              -1  1               5

cgc tgg gca agc acc ggg cca ttg gcc aac ccc aag tca ggc tgg tac      144
Arg Trp Ala Ser Thr Gly Pro Leu Ala Asn Pro Lys Ser Gly Trp Tyr
    10                  15                  20

agt ctc aag gac ttt act cat gtc cct tac aac ggc aag cac ttg gtc      192
Ser Leu Lys Asp Phe Thr His Val Pro Tyr Asn Gly Lys His Leu Val
25                  30                  35                  40

tat gcg tca aac tat gcc gga tcc gcc tac ggc tcc atg aac ttc ggc      240
Tyr Ala Ser Asn Tyr Ala Gly Ser Ala Tyr Gly Ser Met Asn Phe Gly
                45                  50                  55

ctc ttc tcc aac tgg tcc gac atg gcc tcg gcg agt caa aac tct atg      288
Leu Phe Ser Asn Trp Ser Asp Met Ala Ser Ala Ser Gln Asn Ser Met
            60                  65                  70

aat gcg gcc gcc gtc gca ccc acc ctg ttt gtaagtcaga cctttgccgc       338
Asn Ala Ala Ala Val Ala Pro Thr Leu Phe
        75                  80

tttgctctat ccttaaagcc ttaaggggtt gtcattcctc tggaccctgt ttccgttaaa    398

ctgctcggac aaacaacccc cttccccccca actctccttc cccgaaaaac acatgactga    458

cagctgggca g tac ttt gca cct aag aat atc tgg gta ctt gca tcg cag     508
             Tyr Phe Ala Pro Lys Asn Ile Trp Val Leu Ala Ser Gln
```

```
                 85                  90                  95

tgg gga gct act ccc ttc ttc tac cgc acg tcg acc gac cct acg aat      556
Trp Gly Ala Thr Pro Phe Phe Tyr Arg Thr Ser Thr Asp Pro Thr Asn
            100                 105                 110

ccc aac agc tgg tcg tcg aac cag ccg ctg ttc acc ggc tcc atc tcg      604
Pro Asn Ser Trp Ser Ser Asn Gln Pro Leu Phe Thr Gly Ser Ile Ser
            115                 120                 125

gac tca tcc act ggg ccc atc gac cag acg ctc att ggt gat gcc aac      652
Asp Ser Ser Thr Gly Pro Ile Asp Gln Thr Leu Ile Gly Asp Ala Asn
        130                 135                 140

tac atg tat ctc ttc ttt gcg ggc gac aac ggc aag att tac cgc tct      700
Tyr Met Tyr Leu Phe Phe Ala Gly Asp Asn Gly Lys Ile Tyr Arg Ser
    145                 150                 155

cgg atg ccc atc gga aac ttc ccg ggc agc ttt ggc tca tcc tac gaa      748
Arg Met Pro Ile Gly Asn Phe Pro Gly Ser Phe Gly Ser Ser Tyr Glu
160                 165                 170                 175

gtc atc ctg agc ggc tcg agg aac gat ttc ttc gag gcg gtc cag gtc      796
Val Ile Leu Ser Gly Ser Arg Asn Asp Phe Phe Glu Ala Val Gln Val
            180                 185                 190

tac acc gtg aca ggc caa agc tcg ccg ctg tac ctc atg atc atc gag      844
Tyr Thr Val Thr Gly Gln Ser Ser Pro Leu Tyr Leu Met Ile Ile Glu
            195                 200                 205

agc atc ggt agc aga ggc cgg tac ttc cgc tcc tac acg gcc acc aac      892
Ser Ile Gly Ser Arg Gly Arg Tyr Phe Arg Ser Tyr Thr Ala Thr Asn
        210                 215                 220

ctc ggg ggc tcg tgg tct ccg cag gcc acg agc gag agc tcg ccg ttt      940
Leu Gly Gly Ser Trp Ser Pro Gln Ala Thr Ser Glu Ser Ser Pro Phe
    225                 230                 235

gcc ggg gcc gcg aac agc ggc gcg acc tgg acc aac gac atc agc cac      988
Ala Gly Ala Ala Asn Ser Gly Ala Thr Trp Thr Asn Asp Ile Ser His
240                 245                 250                 255

ggc gac ctg atc cgt agc ggt ccc gac cag act atg cct atc gac ccg     1036
Gly Asp Leu Ile Arg Ser Gly Pro Asp Gln Thr Met Pro Ile Asp Pro
            260                 265                 270

tgc aac ctg cag ctg ctg tac cag ggc ctg gtc ggc acc aac tcc gac     1084
Cys Asn Leu Gln Leu Leu Tyr Gln Gly Leu Val Gly Thr Asn Ser Asp
            275                 280                 285

tac aac aag ctg ccc tac cgg ccc ggc ctc ctg acg ctg cag aac cct     1132
Tyr Asn Lys Leu Pro Tyr Arg Pro Gly Leu Leu Thr Leu Gln Asn Pro
        290                 295                 300

gtg ggc ggc ggt ggc act ccg acc acg acc acg agc aag ccg ccc gcg     1180
Val Gly Gly Gly Gly Thr Pro Thr Thr Thr Thr Ser Lys Pro Pro Ala
    305                 310                 315

acg acg acg tcc acc ggc ggt ggt ggc acc gct cct cag tat gct cag     1228
Thr Thr Thr Ser Thr Gly Gly Gly Gly Thr Ala Pro Gln Tyr Ala Gln
320                 325                 330                 335

tgc ggc ggt cag gga tac acc ggc ccg acg gtg tgc gcc agc ccg tac     1276
Cys Gly Gly Gln Gly Tyr Thr Gly Pro Thr Val Cys Ala Ser Pro Tyr
            340                 345                 350

aag tgc acc tac tct aac cct t gtaagttttt ctgaaattct gttttctttt      1328
Lys Cys Thr Tyr Ser Asn Pro
            355

ctctttgtat ctcttccttt ttcatgatta cattggattg ttgctgacga tatctccaca   1388

tag gg  tat tcc cag tgc ctg taa                                     1411
    Trp Tyr Ser Gln Cys Leu
        360


<210> SEQ ID NO 53
<211> LENGTH: 388
```

```
<212> TYPE: PRT
<213> ORGANISM: Acrophialophora fusispora

<400> SEQUENCE: 53

Met Lys Phe Ser Lys Ser Asp Leu Gly Ala Ala Val Ala Phe Leu Ala
                -20                 -15                 -10

Ser Ala Val Pro Leu Ala Glu Ala Ala Cys Ser Leu Pro Ser Ser Tyr
            -5                  -1  1               5

Arg Trp Ala Ser Thr Gly Pro Leu Ala Asn Pro Lys Ser Gly Trp Tyr
    10                  15                  20

Ser Leu Lys Asp Phe Thr His Val Pro Tyr Asn Gly Lys His Leu Val
25                  30                  35                  40

Tyr Ala Ser Asn Tyr Ala Gly Ser Ala Tyr Gly Ser Met Asn Phe Gly
                45                  50                  55

Leu Phe Ser Asn Trp Ser Asp Met Ala Ser Ala Ser Gln Asn Ser Met
            60                  65                  70

Asn Ala Ala Ala Val Ala Pro Thr Leu Phe Tyr Phe Ala Pro Lys Asn
        75                  80                  85

Ile Trp Val Leu Ala Ser Gln Trp Gly Ala Thr Pro Phe Phe Tyr Arg
    90                  95                  100

Thr Ser Thr Asp Pro Thr Asn Pro Asn Ser Trp Ser Ser Asn Gln Pro
105                 110                 115                 120

Leu Phe Thr Gly Ser Ile Ser Asp Ser Ser Thr Gly Pro Ile Asp Gln
                125                 130                 135

Thr Leu Ile Gly Asp Ala Asn Tyr Met Tyr Leu Phe Phe Ala Gly Asp
            140                 145                 150

Asn Gly Lys Ile Tyr Arg Ser Arg Met Pro Ile Gly Asn Phe Pro Gly
        155                 160                 165

Ser Phe Gly Ser Ser Tyr Glu Val Ile Leu Ser Gly Ser Arg Asn Asp
    170                 175                 180

Phe Phe Glu Ala Val Gln Val Tyr Thr Val Thr Gly Gln Ser Ser Pro
185                 190                 195                 200

Leu Tyr Leu Met Ile Ile Glu Ser Ile Gly Ser Arg Gly Arg Tyr Phe
                205                 210                 215

Arg Ser Tyr Thr Ala Thr Asn Leu Gly Gly Ser Trp Ser Pro Gln Ala
            220                 225                 230

Thr Ser Glu Ser Ser Pro Phe Ala Gly Ala Ala Asn Ser Gly Ala Thr
        235                 240                 245

Trp Thr Asn Asp Ile Ser His Gly Asp Leu Ile Arg Ser Gly Pro Asp
    250                 255                 260

Gln Thr Met Pro Ile Asp Pro Cys Asn Leu Gln Leu Leu Tyr Gln Gly
265                 270                 275                 280

Leu Val Gly Thr Asn Ser Asp Tyr Asn Lys Leu Pro Tyr Arg Pro Gly
                285                 290                 295

Leu Leu Thr Leu Gln Asn Pro Val Gly Gly Gly Gly Thr Pro Thr Thr
            300                 305                 310

Thr Thr Ser Lys Pro Pro Ala Thr Thr Thr Ser Thr Gly Gly Gly Gly
        315                 320                 325

Thr Ala Pro Gln Tyr Ala Gln Cys Gly Gly Gln Gly Tyr Thr Gly Pro
    330                 335                 340

Thr Val Cys Ala Ser Pro Tyr Lys Cys Thr Tyr Ser Asn Pro Trp Tyr
345                 350                 355                 360

Ser Gln Cys Leu
```

<210> SEQ ID NO 54
<211> LENGTH: 364
<212> TYPE: PRT
<213> ORGANISM: Acrophialophora fusispora

<400> SEQUENCE: 54

```
Ala Cys Ser Leu Pro Ser Ser Tyr Arg Trp Ala Ser Thr Gly Pro Leu
1               5                   10                  15

Ala Asn Pro Lys Ser Gly Trp Tyr Ser Leu Lys Asp Phe Thr His Val
            20                  25                  30

Pro Tyr Asn Gly Lys His Leu Val Tyr Ala Ser Asn Tyr Ala Gly Ser
        35                  40                  45

Ala Tyr Gly Ser Met Asn Phe Gly Leu Phe Ser Asn Trp Ser Asp Met
    50                  55                  60

Ala Ser Ala Ser Gln Asn Ser Met Asn Ala Ala Ala Val Ala Pro Thr
65                  70                  75                  80

Leu Phe Tyr Phe Ala Pro Lys Asn Ile Trp Val Leu Ala Ser Gln Trp
                85                  90                  95

Gly Ala Thr Pro Phe Phe Tyr Arg Thr Ser Thr Asp Pro Thr Asn Pro
            100                 105                 110

Asn Ser Trp Ser Ser Asn Gln Pro Leu Phe Thr Gly Ser Ile Ser Asp
        115                 120                 125

Ser Ser Thr Gly Pro Ile Asp Gln Thr Leu Ile Gly Asp Ala Asn Tyr
    130                 135                 140

Met Tyr Leu Phe Phe Ala Gly Asp Asn Gly Lys Ile Tyr Arg Ser Arg
145                 150                 155                 160

Met Pro Ile Gly Asn Phe Pro Gly Ser Phe Gly Ser Ser Tyr Glu Val
                165                 170                 175

Ile Leu Ser Gly Ser Arg Asn Asp Phe Phe Glu Ala Val Gln Val Tyr
            180                 185                 190

Thr Val Thr Gly Gln Ser Ser Pro Leu Tyr Leu Met Ile Ile Glu Ser
        195                 200                 205

Ile Gly Ser Arg Gly Arg Tyr Phe Arg Ser Tyr Thr Ala Thr Asn Leu
    210                 215                 220

Gly Gly Ser Trp Ser Pro Gln Ala Thr Ser Glu Ser Ser Pro Phe Ala
225                 230                 235                 240

Gly Ala Ala Asn Ser Gly Ala Thr Trp Thr Asn Asp Ile Ser His Gly
                245                 250                 255

Asp Leu Ile Arg Ser Gly Pro Asp Gln Thr Met Pro Ile Asp Pro Cys
            260                 265                 270

Asn Leu Gln Leu Leu Tyr Gln Gly Leu Val Gly Thr Asn Ser Asp Tyr
        275                 280                 285

Asn Lys Leu Pro Tyr Arg Pro Gly Leu Leu Thr Leu Gln Asn Pro Val
    290                 295                 300

Gly Gly Gly Gly Thr Pro Thr Thr Thr Thr Ser Lys Pro Pro Ala Thr
305                 310                 315                 320

Thr Thr Ser Thr Gly Gly Gly Gly Thr Ala Pro Gln Tyr Ala Gln Cys
                325                 330                 335

Gly Gly Gln Gly Tyr Thr Gly Pro Thr Val Cys Ala Ser Pro Tyr Lys
            340                 345                 350

Cys Thr Tyr Ser Asn Pro Trp Tyr Ser Gln Cys Leu
        355                 360
```

<210> SEQ ID NO 55

```
<211> LENGTH: 1438
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(318)
<220> FEATURE:
<221> NAME/KEY: sig_peptide
<222> LOCATION: (1)..(72)
<220> FEATURE:
<221> NAME/KEY: mat_peptide
<222> LOCATION: (73)..(1438)
<220> FEATURE:
<221> NAME/KEY: CDS
<222> LOCATION: (470)..(1298)
<220> FEATURE:
<221> NAME/KEY: CDS
<222> LOCATION: (1392)..(1435)

<400> SEQUENCE: 55

atg aag ttc tcc aaa tcg gat ctc ggc gct gcc gtc gcc ttc ctg gct       48
Met Lys Phe Ser Lys Ser Asp Leu Gly Ala Ala Val Ala Phe Leu Ala
                -20                 -15                 -10

tcg gcc gtc cct ctc gct gaa gcc gcg tgc tcc ttg ccg tcc agc tac       96
Ser Ala Val Pro Leu Ala Glu Ala Ala Cys Ser Leu Pro Ser Ser Tyr
            -5              -1  1               5

cgc tgg gca agc acc ggg cca ttg gcc aac ccc aag tca ggc tgg tac      144
Arg Trp Ala Ser Thr Gly Pro Leu Ala Asn Pro Lys Ser Gly Trp Tyr
    10                  15                  20

agt ctc aag gac ttt act cat gtc cct tac aac ggc aag cac ttg gtc      192
Ser Leu Lys Asp Phe Thr His Val Pro Tyr Asn Gly Lys His Leu Val
25                  30                  35                  40

tat gcg tca aac tat gcc gga tcc gcc tac ggc tcc atg aac ttc ggc      240
Tyr Ala Ser Asn Tyr Ala Gly Ser Ala Tyr Gly Ser Met Asn Phe Gly
                45                  50                  55

ctc ttc tcc aac tgg tcc gac atg gcc tcg gcg agt caa aac tct atg      288
Leu Phe Ser Asn Trp Ser Asp Met Ala Ser Ala Ser Gln Asn Ser Met
            60                  65                  70

aat gcg gcc gcc gtc gca ccc acc ctg ttt gtaagtcaga cctttgccgc        338
Asn Ala Ala Ala Val Ala Pro Thr Leu Phe
        75                  80

tttgctctat ccttaaagcc ttaaggggtt gtcattcctc tggaccctgt ttccgttaaa    398

ctgctcggac aaacaacccc cttcccccca actctccttc cccgaaaaac acatgactga    458

cagctgggca g tac ttt gca cct aag aat atc tgg gta ctt gca tcg cag     508
             Tyr Phe Ala Pro Lys Asn Ile Trp Val Leu Ala Ser Gln
                     85                  90                  95

tgg gga gct act ccc ttc ttc tac cgc acg tcg acc gac cct acg aat      556
Trp Gly Ala Thr Pro Phe Phe Tyr Arg Thr Ser Thr Asp Pro Thr Asn
                100                 105                 110

ccc aac agc tgg tcg tcg aac cag ccg ctg ttc acc ggc tcc atc tcg      604
Pro Asn Ser Trp Ser Ser Asn Gln Pro Leu Phe Thr Gly Ser Ile Ser
            115                 120                 125

gac tca tcc act ggg ccc atc gac cag acg ctc att ggt gat gcc aac      652
Asp Ser Ser Thr Gly Pro Ile Asp Gln Thr Leu Ile Gly Asp Ala Asn
        130                 135                 140

tac atg tat ctc ttc ttt gcg ggc gac aac ggc aag att tac cgc tct      700
Tyr Met Tyr Leu Phe Phe Ala Gly Asp Asn Gly Lys Ile Tyr Arg Ser
    145                 150                 155

cgg atg ccc atc gga aac ttc ccg ggc agc ttt ggc tca tcc tac gaa      748
Arg Met Pro Ile Gly Asn Phe Pro Gly Ser Phe Gly Ser Ser Tyr Glu
160                 165                 170                 175
```

```
gtc atc ctg agc ggc tcg agg aac gat ttc ttc gag gcg gtc cag gtc      796
Val Ile Leu Ser Gly Ser Arg Asn Asp Phe Phe Glu Ala Val Gln Val
                180                 185                 190

tac acc gtg aca ggc caa agc tcg ccg ctg tac ctc atg atc atc gag      844
Tyr Thr Val Thr Gly Gln Ser Ser Pro Leu Tyr Leu Met Ile Ile Glu
            195                 200                 205

agc atc ggt agc aga ggc cgg tac ttc cgc tcc tac acg gcc acc aac      892
Ser Ile Gly Ser Arg Gly Arg Tyr Phe Arg Ser Tyr Thr Ala Thr Asn
        210                 215                 220

ctc ggg ggc tcg tgg tct ccg cag gcc acg agc gag agc tcg ccg ttt      940
Leu Gly Gly Ser Trp Ser Pro Gln Ala Thr Ser Glu Ser Ser Pro Phe
    225                 230                 235

gcc ggg gcc gcg aac agc ggc gcg acc tgg acc aac gac atc agc cac      988
Ala Gly Ala Ala Asn Ser Gly Ala Thr Trp Thr Asn Asp Ile Ser His
240                 245                 250                 255

ggc gac ctg atc cgt agc ggt ccc gac cag act atg cct atc gac ccg     1036
Gly Asp Leu Ile Arg Ser Gly Pro Asp Gln Thr Met Pro Ile Asp Pro
                260                 265                 270

tgc aac ctg cag ctg ctg tac cag ggc ctg gtc ggc acc aac tcc gac     1084
Cys Asn Leu Gln Leu Leu Tyr Gln Gly Leu Val Gly Thr Asn Ser Asp
            275                 280                 285

tac aac aag ctg ccc tac cgg ccc ggc ctc ctg acg ctg cag aac cct     1132
Tyr Asn Lys Leu Pro Tyr Arg Pro Gly Leu Leu Thr Leu Gln Asn Pro
        290                 295                 300

gtg ggc ggc ggt ggc act ccg acc acg acc acg agc aag ccg ccc gcg     1180
Val Gly Gly Gly Gly Thr Pro Thr Thr Thr Thr Ser Lys Pro Pro Ala
    305                 310                 315

acg acg acg tcc acc ggc ggt ggt ggc acc gct cct cag tat gct cag     1228
Thr Thr Thr Ser Thr Gly Gly Gly Gly Thr Ala Pro Gln Tyr Ala Gln
320                 325                 330                 335

tgc ggc ggt cag gga tac acc ggc ccg acg gtg tgc gcc agc ccg tac     1276
Cys Gly Gly Gln Gly Tyr Thr Gly Pro Thr Val Cys Ala Ser Pro Tyr
                340                 345                 350

aag tgc acc tac tct aac cct t gtaagttttt ctgaaattct gttttctttt      1328
Lys Cys Thr Tyr Ser Asn Pro
            355

ctctttgtat ctcttccttt ttcatgatta cattggattg ttgctgacga tatctccaca   1388

tag gg  tat tcc cag tgc ctg acg cgt gcg cat cac cat cac cat cac     1435
    Trp Tyr Ser Gln Cys Leu Thr Arg Ala His His His His His His
        360                 365                 370

taa                                                                 1438
```

<210> SEQ ID NO 56
<211> LENGTH: 397
<212> TYPE: PRT
<213> ORGANISM: Artificial Sequence
<220> FEATURE:
<223> OTHER INFORMATION: Synthetic Construct

<400> SEQUENCE: 56

```
Met Lys Phe Ser Lys Ser Asp Leu Gly Ala Ala Val Ala Phe Leu Ala
                -20                 -15                 -10

Ser Ala Val Pro Leu Ala Glu Ala Ala Cys Ser Leu Pro Ser Ser Tyr
            -5                  -1  1               5

Arg Trp Ala Ser Thr Gly Pro Leu Ala Asn Pro Lys Ser Gly Trp Tyr
    10                  15                  20

Ser Leu Lys Asp Phe Thr His Val Pro Tyr Asn Gly Lys His Leu Val
25                  30                  35                  40

Tyr Ala Ser Asn Tyr Ala Gly Ser Ala Tyr Gly Ser Met Asn Phe Gly
```

```
            45                  50                  55

Leu Phe Ser Asn Trp Ser Asp Met Ala Ser Ala Ser Gln Asn Ser Met
        60                  65                  70

Asn Ala Ala Ala Val Ala Pro Thr Leu Phe Tyr Phe Ala Pro Lys Asn
    75                  80                  85

Ile Trp Val Leu Ala Ser Gln Trp Gly Ala Thr Pro Phe Phe Tyr Arg
90                  95                  100

Thr Ser Thr Asp Pro Thr Asn Pro Asn Ser Trp Ser Ser Asn Gln Pro
105                 110                 115                 120

Leu Phe Thr Gly Ser Ile Ser Asp Ser Ser Thr Gly Pro Ile Asp Gln
                125                 130                 135

Thr Leu Ile Gly Asp Ala Asn Tyr Met Tyr Leu Phe Phe Ala Gly Asp
            140                 145                 150

Asn Gly Lys Ile Tyr Arg Ser Arg Met Pro Ile Gly Asn Phe Pro Gly
        155                 160                 165

Ser Phe Gly Ser Ser Tyr Glu Val Ile Leu Ser Gly Ser Arg Asn Asp
    170                 175                 180

Phe Phe Glu Ala Val Gln Val Tyr Thr Val Thr Gly Gln Ser Ser Pro
185                 190                 195                 200

Leu Tyr Leu Met Ile Ile Glu Ser Ile Gly Ser Arg Gly Arg Tyr Phe
                205                 210                 215

Arg Ser Tyr Thr Ala Thr Asn Leu Gly Gly Ser Trp Ser Pro Gln Ala
            220                 225                 230

Thr Ser Glu Ser Ser Pro Phe Ala Gly Ala Ala Asn Ser Gly Ala Thr
        235                 240                 245

Trp Thr Asn Asp Ile Ser His Gly Asp Leu Ile Arg Ser Gly Pro Asp
    250                 255                 260

Gln Thr Met Pro Ile Asp Pro Cys Asn Leu Gln Leu Leu Tyr Gln Gly
265                 270                 275                 280

Leu Val Gly Thr Asn Ser Asp Tyr Asn Lys Leu Pro Tyr Arg Pro Gly
                285                 290                 295

Leu Leu Thr Leu Gln Asn Pro Val Gly Gly Gly Gly Thr Pro Thr Thr
            300                 305                 310

Thr Thr Ser Lys Pro Pro Ala Thr Thr Thr Ser Thr Gly Gly Gly Gly
        315                 320                 325

Thr Ala Pro Gln Tyr Ala Gln Cys Gly Gly Gln Gly Tyr Thr Gly Pro
    330                 335                 340

Thr Val Cys Ala Ser Pro Tyr Lys Cys Thr Tyr Ser Asn Pro Trp Tyr
345                 350                 355                 360

Ser Gln Cys Leu Thr Arg Ala His His His His His His
                365                 370
```

<210> SEQ ID NO 57
<211> LENGTH: 373
<212> TYPE: PRT
<213> ORGANISM: Artificial Sequence
<220> FEATURE:
<223> OTHER INFORMATION: Mature sequence with His-tag

<400> SEQUENCE: 57

```
Ala Cys Ser Leu Pro Ser Ser Tyr Arg Trp Ala Ser Thr Gly Pro Leu
1               5                   10                  15

Ala Asn Pro Lys Ser Gly Trp Tyr Ser Leu Lys Asp Phe Thr His Val
            20                  25                  30

Pro Tyr Asn Gly Lys His Leu Val Tyr Ala Ser Asn Tyr Ala Gly Ser
```

```
        35                  40                  45

Ala Tyr Gly Ser Met Asn Phe Gly Leu Phe Ser Asn Trp Ser Asp Met
    50                  55                  60

Ala Ser Ala Ser Gln Asn Ser Met Asn Ala Ala Ala Val Ala Pro Thr
65                  70                  75                  80

Leu Phe Tyr Phe Ala Pro Lys Asn Ile Trp Val Leu Ala Ser Gln Trp
                85                  90                  95

Gly Ala Thr Pro Phe Phe Tyr Arg Thr Ser Thr Asp Pro Thr Asn Pro
            100                 105                 110

Asn Ser Trp Ser Ser Asn Gln Pro Leu Phe Thr Gly Ser Ile Ser Asp
        115                 120                 125

Ser Ser Thr Gly Pro Ile Asp Gln Thr Leu Ile Gly Asp Ala Asn Tyr
    130                 135                 140

Met Tyr Leu Phe Phe Ala Gly Asp Asn Gly Lys Ile Tyr Arg Ser Arg
145                 150                 155                 160

Met Pro Ile Gly Asn Phe Pro Gly Ser Phe Gly Ser Ser Tyr Glu Val
                165                 170                 175

Ile Leu Ser Gly Ser Arg Asn Asp Phe Phe Glu Ala Val Gln Val Tyr
            180                 185                 190

Thr Val Thr Gly Gln Ser Ser Pro Leu Tyr Leu Met Ile Ile Glu Ser
        195                 200                 205

Ile Gly Ser Arg Gly Arg Tyr Phe Arg Ser Tyr Thr Ala Thr Asn Leu
    210                 215                 220

Gly Gly Ser Trp Ser Pro Gln Ala Thr Ser Glu Ser Ser Pro Phe Ala
225                 230                 235                 240

Gly Ala Ala Asn Ser Gly Ala Thr Trp Thr Asn Asp Ile Ser His Gly
                245                 250                 255

Asp Leu Ile Arg Ser Gly Pro Asp Gln Thr Met Pro Ile Asp Pro Cys
            260                 265                 270

Asn Leu Gln Leu Leu Tyr Gln Gly Leu Val Gly Thr Asn Ser Asp Tyr
        275                 280                 285

Asn Lys Leu Pro Tyr Arg Pro Gly Leu Leu Thr Leu Gln Asn Pro Val
    290                 295                 300

Gly Gly Gly Gly Thr Pro Thr Thr Thr Thr Ser Lys Pro Pro Ala Thr
305                 310                 315                 320

Thr Thr Ser Thr Gly Gly Gly Gly Thr Ala Pro Gln Tyr Ala Gln Cys
                325                 330                 335

Gly Gly Gln Gly Tyr Thr Gly Pro Thr Val Cys Ala Ser Pro Tyr Lys
            340                 345                 350

Cys Thr Tyr Ser Asn Pro Trp Tyr Ser Gln Cys Leu Thr Arg Ala His
        355                 360                 365

His His His His His
    370
```

<210> SEQ ID NO 58
<211> LENGTH: 1404
<212> TYPE: DNA
<213> ORGANISM: Streptosporangium sp-60756
<220> FEATURE:
<221> NAME/KEY: CDS
<222> LOCATION: (1)..(1401)
<220> FEATURE:
<221> NAME/KEY: sig_peptide
<222> LOCATION: (1)..(93)
<220> FEATURE:
<221> NAME/KEY: mat_peptide
<222> LOCATION: (94)..(1401)

```
<400> SEQUENCE: 58

atg aaa atc ccc cgt ctc cgg ctc tgg ctc tcc gcc ggg gtc gcc gcc       48
Met Lys Ile Pro Arg Leu Arg Leu Trp Leu Ser Ala Gly Val Ala Ala
    -30                 -25                 -20

gcg gtc ggc gtg gtc ggc acg gtc ggc gcg gtg acc gca ccg gcc gcc       96
Ala Val Gly Val Val Gly Thr Val Gly Ala Val Thr Ala Pro Ala Ala
-15                 -10                 -5                  -1  1

ggc gcc gcc gcc gga tgc cgc gtg gac tac acg gtg agc aac cag tgg      144
Gly Ala Ala Ala Gly Cys Arg Val Asp Tyr Thr Val Ser Asn Gln Trp
            5                   10                  15

ccg ggc ggc ttc ggc gcg aac gtg aac atc acc aac ctc ggc gac ccc      192
Pro Gly Gly Phe Gly Ala Asn Val Asn Ile Thr Asn Leu Gly Asp Pro
        20                  25                  30

atc aac ggc tgg cgc ctg acc tgg tcg ttc ccc gcg ggg cag acc atc      240
Ile Asn Gly Trp Arg Leu Thr Trp Ser Phe Pro Ala Gly Gln Thr Ile
    35                  40                  45

acc cag ctg tgg agc ggc tcc cac acc cag tcc ggc tcc cag gtc acc      288
Thr Gln Leu Trp Ser Gly Ser His Thr Gln Ser Gly Ser Gln Val Thr
50                  55                  60                  65

gtg acc aac gtg gac tac aac gcc ggc ctc ccc acc ggg ggc agc gcg      336
Val Thr Asn Val Asp Tyr Asn Ala Gly Leu Pro Thr Gly Gly Ser Ala
                70                  75                  80

aac ttc ggg ttc aac ggc tcc ttc aac ggc agc aac ccg gca ccg acg      384
Asn Phe Gly Phe Asn Gly Ser Phe Asn Gly Ser Asn Pro Ala Pro Thr
            85                  90                  95

agc ttc gcc ctc aac ggt gtg acc tgc acc ggc ggc gtg acc gct tcg      432
Ser Phe Ala Leu Asn Gly Val Thr Cys Thr Gly Gly Val Thr Ala Ser
        100                 105                 110

ccc agc ccg tcc acc agc ccc tcg acc ggc ccg tcg ccg tcg tcc acg      480
Pro Ser Pro Ser Thr Ser Pro Ser Thr Gly Pro Ser Pro Ser Ser Thr
    115                 120                 125

ccg acg tcg ccc ggc acc tgc gct ctt ccg tcg acg tac cgc tgg acg      528
Pro Thr Ser Pro Gly Thr Cys Ala Leu Pro Ser Thr Tyr Arg Trp Thr
130                 135                 140                 145

tcg acg ggc ccg ctg gcg aac ccg aag tcg ggg tgg gtc tcg ctc aag      576
Ser Thr Gly Pro Leu Ala Asn Pro Lys Ser Gly Trp Val Ser Leu Lys
                150                 155                 160

gac ttc acc aac gtc gtc cac aac ggc aag cac ctc gtc tac gcc acg      624
Asp Phe Thr Asn Val Val His Asn Gly Lys His Leu Val Tyr Ala Thr
            165                 170                 175

acg cac gac acg ggg acg agc tgg ggc tcg atg aac ttc agc ccc ttc      672
Thr His Asp Thr Gly Thr Ser Trp Gly Ser Met Asn Phe Ser Pro Phe
        180                 185                 190

acg aac tgg tcc gac atg gcc tcg gcc ggc cag aac aag atg aac ttc      720
Thr Asn Trp Ser Asp Met Ala Ser Ala Gly Gln Asn Lys Met Asn Phe
    195                 200                 205

tcc acc gtc gcg ccc acg ctc ttc tac ttc gcc ccg aag aac atc tgg      768
Ser Thr Val Ala Pro Thr Leu Phe Tyr Phe Ala Pro Lys Asn Ile Trp
210                 215                 220                 225

gtg ctg gcc tac cag tgg ggc ggg acc gcc ttc tcc tac cgg acc tcc      816
Val Leu Ala Tyr Gln Trp Gly Gly Thr Ala Phe Ser Tyr Arg Thr Ser
                230                 235                 240

agt gac ccc acc aac gcc aac ggc tgg tcg gcg cag cag acc ctc ttc      864
Ser Asp Pro Thr Asn Ala Asn Gly Trp Ser Ala Gln Gln Thr Leu Phe
            245                 250                 255

acc gga agc atc tcc ggc tcc gga acc ggg ccc atc gac cag acg ctc      912
Thr Gly Ser Ile Ser Gly Ser Gly Thr Gly Pro Ile Asp Gln Thr Leu
        260                 265                 270
```

```
atc ggc gac ggc acc aac atg tac ctg ttc ttc gcc ggg gac aac ggc      960
Ile Gly Asp Gly Thr Asn Met Tyr Leu Phe Phe Ala Gly Asp Asn Gly
    275                 280                 285

aag atc tac cgg gcc agc atg ccg atc ggg aac ttc ccg ggc agc ttc     1008
Lys Ile Tyr Arg Ala Ser Met Pro Ile Gly Asn Phe Pro Gly Ser Phe
290                 295                 300                 305

ggc tcg aac tac acg acg atc atg agc gac acg acg aac aac ctg ttc     1056
Gly Ser Asn Tyr Thr Thr Ile Met Ser Asp Thr Thr Asn Asn Leu Phe
                310                 315                 320

gaa ggg gtc gag gtc tac aag ctc cag ggg cag aac aag tac ctc atg     1104
Glu Gly Val Glu Val Tyr Lys Leu Gln Gly Gln Asn Lys Tyr Leu Met
            325                 330                 335

ctc gtc gag gcg atc ggc tcg cag ggt cgc tac ttc cgc tcg ttc acg     1152
Leu Val Glu Ala Ile Gly Ser Gln Gly Arg Tyr Phe Arg Ser Phe Thr
        340                 345                 350

gcc acc agc ctg gac ggc aca tgg aca ccc cag gcc gcg acc gag ggc     1200
Ala Thr Ser Leu Asp Gly Thr Trp Thr Pro Gln Ala Ala Thr Glu Gly
    355                 360                 365

aac ccc ttc gcc ggc aag gcc aac agc ggc gcc acc tgg acc aac gac     1248
Asn Pro Phe Ala Gly Lys Ala Asn Ser Gly Ala Thr Trp Thr Asn Asp
370                 375                 380                 385

atc agc cac ggc gat ctg gtc cgc agc aac ccc gac cag acc aag acc     1296
Ile Ser His Gly Asp Leu Val Arg Ser Asn Pro Asp Gln Thr Lys Thr
                390                 395                 400

gtc gac ccc tgc aac ctg caa ctg ctc tac cag ggc cgc agc ccc aac     1344
Val Asp Pro Cys Asn Leu Gln Leu Leu Tyr Gln Gly Arg Ser Pro Asn
            405                 410                 415

tcc ggt ggc gac tac ggc ctg ctg ccc tac cgg ccg ggg gtg ctg aca     1392
Ser Gly Gly Asp Tyr Gly Leu Leu Pro Tyr Arg Pro Gly Val Leu Thr
        420                 425                 430

ctg cag cgc tga                                                     1404
Leu Gln Arg
    435


<210> SEQ ID NO 59
<211> LENGTH: 467
<212> TYPE: PRT
<213> ORGANISM: Streptosporangium sp-60756

<400> SEQUENCE: 59

Met Lys Ile Pro Arg Leu Arg Leu Trp Leu Ser Ala Gly Val Ala Ala
    -30                 -25                 -20

Ala Val Gly Val Val Gly Thr Val Gly Ala Val Thr Ala Pro Ala Ala
-15                 -10                 -5                  -1  1

Gly Ala Ala Ala Gly Cys Arg Val Asp Tyr Thr Val Ser Asn Gln Trp
            5                   10                  15

Pro Gly Gly Phe Gly Ala Asn Val Asn Ile Thr Asn Leu Gly Asp Pro
        20                  25                  30

Ile Asn Gly Trp Arg Leu Thr Trp Ser Phe Pro Ala Gly Gln Thr Ile
    35                  40                  45

Thr Gln Leu Trp Ser Gly Ser His Thr Gln Ser Gly Ser Gln Val Thr
50                  55                  60                  65

Val Thr Asn Val Asp Tyr Asn Ala Gly Leu Pro Thr Gly Gly Ser Ala
                70                  75                  80

Asn Phe Gly Phe Asn Gly Ser Phe Asn Gly Ser Asn Pro Ala Pro Thr
            85                  90                  95

Ser Phe Ala Leu Asn Gly Val Thr Cys Thr Gly Gly Val Thr Ala Ser
        100                 105                 110
```

Pro Ser Pro Ser Thr Ser Pro Ser Thr Gly Pro Ser Pro Ser Ser Thr
115 120 125

Pro Thr Ser Pro Gly Thr Cys Ala Leu Pro Ser Thr Tyr Arg Trp Thr
130 135 140 145

Ser Thr Gly Pro Leu Ala Asn Pro Lys Ser Gly Trp Val Ser Leu Lys
150 155 160

Asp Phe Thr Asn Val Val His Asn Gly Lys His Leu Val Tyr Ala Thr
165 170 175

Thr His Asp Thr Gly Thr Ser Trp Gly Ser Met Asn Phe Ser Pro Phe
180 185 190

Thr Asn Trp Ser Asp Met Ala Ser Ala Gly Gln Asn Lys Met Asn Phe
195 200 205

Ser Thr Val Ala Pro Thr Leu Phe Tyr Phe Ala Pro Lys Asn Ile Trp
210 215 220 225

Val Leu Ala Tyr Gln Trp Gly Gly Thr Ala Phe Ser Tyr Arg Thr Ser
230 235 240

Ser Asp Pro Thr Asn Ala Asn Gly Trp Ser Ala Gln Gln Thr Leu Phe
245 250 255

Thr Gly Ser Ile Ser Gly Ser Gly Thr Gly Pro Ile Asp Gln Thr Leu
260 265 270

Ile Gly Asp Gly Thr Asn Met Tyr Leu Phe Phe Ala Gly Asp Asn Gly
275 280 285

Lys Ile Tyr Arg Ala Ser Met Pro Ile Gly Asn Phe Pro Gly Ser Phe
290 295 300 305

Gly Ser Asn Tyr Thr Thr Ile Met Ser Asp Thr Thr Asn Asn Leu Phe
310 315 320

Glu Gly Val Glu Val Tyr Lys Leu Gln Gly Gln Asn Lys Tyr Leu Met
325 330 335

Leu Val Glu Ala Ile Gly Ser Gln Gly Arg Tyr Phe Arg Ser Phe Thr
340 345 350

Ala Thr Ser Leu Asp Gly Thr Trp Thr Pro Gln Ala Ala Thr Glu Gly
355 360 365

Asn Pro Phe Ala Gly Lys Ala Asn Ser Gly Ala Thr Trp Thr Asn Asp
370 375 380 385

Ile Ser His Gly Asp Leu Val Arg Ser Asn Pro Asp Gln Thr Lys Thr
390 395 400

Val Asp Pro Cys Asn Leu Gln Leu Leu Tyr Gln Gly Arg Ser Pro Asn
405 410 415

Ser Gly Gly Asp Tyr Gly Leu Leu Pro Tyr Arg Pro Gly Val Leu Thr
420 425 430

Leu Gln Arg
435

<210> SEQ ID NO 60
<211> LENGTH: 436
<212> TYPE: PRT
<213> ORGANISM: Streptosporangium sp-60756

<400> SEQUENCE: 60

Ala Gly Ala Ala Ala Gly Cys Arg Val Asp Tyr Thr Val Ser Asn Gln
1 5 10 15

Trp Pro Gly Gly Phe Gly Ala Asn Val Asn Ile Thr Asn Leu Gly Asp
20 25 30

Pro Ile Asn Gly Trp Arg Leu Thr Trp Ser Phe Pro Ala Gly Gln Thr
35 40 45

Ile Thr Gln Leu Trp Ser Gly Ser His Thr Gln Ser Gly Ser Gln Val
50 55 60

Thr Val Thr Asn Val Asp Tyr Asn Ala Gly Leu Pro Thr Gly Gly Ser
65 70 75 80

Ala Asn Phe Gly Phe Asn Gly Ser Phe Asn Gly Ser Asn Pro Ala Pro
85 90 95

Thr Ser Phe Ala Leu Asn Gly Val Thr Cys Thr Gly Gly Val Thr Ala
100 105 110

Ser Pro Ser Pro Ser Thr Ser Pro Ser Thr Gly Pro Ser Pro Ser Ser
115 120 125

Thr Pro Thr Ser Pro Gly Thr Cys Ala Leu Pro Ser Thr Tyr Arg Trp
130 135 140

Thr Ser Thr Gly Pro Leu Ala Asn Pro Lys Ser Gly Trp Val Ser Leu
145 150 155 160

Lys Asp Phe Thr Asn Val Val His Asn Gly Lys His Leu Val Tyr Ala
165 170 175

Thr Thr His Asp Thr Gly Thr Ser Trp Gly Ser Met Asn Phe Ser Pro
180 185 190

Phe Thr Asn Trp Ser Asp Met Ala Ser Ala Gly Gln Asn Lys Met Asn
195 200 205

Phe Ser Thr Val Ala Pro Thr Leu Phe Tyr Phe Ala Pro Lys Asn Ile
210 215 220

Trp Val Leu Ala Tyr Gln Trp Gly Gly Thr Ala Phe Ser Tyr Arg Thr
225 230 235 240

Ser Ser Asp Pro Thr Asn Ala Asn Gly Trp Ser Ala Gln Gln Thr Leu
245 250 255

Phe Thr Gly Ser Ile Ser Gly Ser Gly Thr Gly Pro Ile Asp Gln Thr
260 265 270

Leu Ile Gly Asp Gly Thr Asn Met Tyr Leu Phe Phe Ala Gly Asp Asn
275 280 285

Gly Lys Ile Tyr Arg Ala Ser Met Pro Ile Gly Asn Phe Pro Gly Ser
290 295 300

Phe Gly Ser Asn Tyr Thr Thr Ile Met Ser Asp Thr Thr Asn Asn Leu
305 310 315 320

Phe Glu Gly Val Glu Val Tyr Lys Leu Gln Gly Gln Asn Lys Tyr Leu
325 330 335

Met Leu Val Glu Ala Ile Gly Ser Gln Gly Arg Tyr Phe Arg Ser Phe
340 345 350

Thr Ala Thr Ser Leu Asp Gly Thr Trp Thr Pro Gln Ala Ala Thr Glu
355 360 365

Gly Asn Pro Phe Ala Gly Lys Ala Asn Ser Gly Ala Thr Trp Thr Asn
370 375 380

Asp Ile Ser His Gly Asp Leu Val Arg Ser Asn Pro Asp Gln Thr Lys
385 390 395 400

Thr Val Asp Pro Cys Asn Leu Gln Leu Leu Tyr Gln Gly Arg Ser Pro
405 410 415

Asn Ser Gly Gly Asp Tyr Gly Leu Leu Pro Tyr Arg Pro Gly Val Leu
420 425 430

Thr Leu Gln Arg
435

<210> SEQ ID NO 61
<211> LENGTH: 1416

```
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1413)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1413)

<400> SEQUENCE: 61

atg aag aaa ccg ttg ggg aaa att gtc gca agc acc gca cta ctc att       48
Met Lys Lys Pro Leu Gly Lys Ile Val Ala Ser Thr Ala Leu Leu Ile
        -25                 -20                 -15

tct gtt gct ttt agt tca tcg ata gca tca gca cat cat cat cac cat       96
Ser Val Ala Phe Ser Ser Ser Ile Ala Ser Ala His His His His His
    -10                 -5                  -1  1               5

cat cct agg gcc ggc gcc gcc gcc gga tgc cgc gtg gac tac acg gtg      144
His Pro Arg Ala Gly Ala Ala Ala Gly Cys Arg Val Asp Tyr Thr Val
                10                  15                  20

agc aac cag tgg ccg ggc ggc ttc ggc gcg aac gtg aac atc acc aac      192
Ser Asn Gln Trp Pro Gly Gly Phe Gly Ala Asn Val Asn Ile Thr Asn
            25                  30                  35

ctc ggc gac ccc atc aac ggc tgg cgc ctg acc tgg tcg ttc ccc gcg      240
Leu Gly Asp Pro Ile Asn Gly Trp Arg Leu Thr Trp Ser Phe Pro Ala
        40                  45                  50

ggg cag acc atc acc cag ctg tgg agc ggc tcc cac acc cag tcc ggc      288
Gly Gln Thr Ile Thr Gln Leu Trp Ser Gly Ser His Thr Gln Ser Gly
    55                  60                  65

tcc cag gtc acc gtg acc aac gtg gac tac aac gcc ggc ctc ccc acc      336
Ser Gln Val Thr Val Thr Asn Val Asp Tyr Asn Ala Gly Leu Pro Thr
70                  75                  80                  85

ggg ggc agc gcg aac ttc ggg ttc aac ggc tcc ttc aac ggc agc aac      384
Gly Gly Ser Ala Asn Phe Gly Phe Asn Gly Ser Phe Asn Gly Ser Asn
                90                  95                  100

ccg gca ccg acg agc ttc gcc ctc aac ggt gtg acc tgc acc ggc ggc      432
Pro Ala Pro Thr Ser Phe Ala Leu Asn Gly Val Thr Cys Thr Gly Gly
            105                 110                 115

gtg acc gct tcg ccc agc ccg tcc acc agc ccc tcg acc ggc ccg tcg      480
Val Thr Ala Ser Pro Ser Pro Ser Thr Ser Pro Ser Thr Gly Pro Ser
        120                 125                 130

ccg tcg tcc acg ccg acg tcg ccc ggc acc tgc gct ctt ccg tcg acg      528
Pro Ser Ser Thr Pro Thr Ser Pro Gly Thr Cys Ala Leu Pro Ser Thr
    135                 140                 145

tac cgc tgg acg tcg acg ggc ccg ctg gcg aac ccg aag tcg ggg tgg      576
Tyr Arg Trp Thr Ser Thr Gly Pro Leu Ala Asn Pro Lys Ser Gly Trp
150                 155                 160                 165

gtc tcg ctc aag gac ttc acc aac gtc gtc cac aac ggc aag cac ctc      624
Val Ser Leu Lys Asp Phe Thr Asn Val Val His Asn Gly Lys His Leu
                170                 175                 180

gtc tac gcc acg acg cac gac acg ggg acg agc tgg ggc tcg atg aac      672
Val Tyr Ala Thr Thr His Asp Thr Gly Thr Ser Trp Gly Ser Met Asn
            185                 190                 195

ttc agc ccc ttc acg aac tgg tcc gac atg gcc tcg gcc ggc cag aac      720
Phe Ser Pro Phe Thr Asn Trp Ser Asp Met Ala Ser Ala Gly Gln Asn
        200                 205                 210

aag atg aac ttc tcc acc gtc gcg ccc acg ctc ttc tac ttc gcc ccg      768
Lys Met Asn Phe Ser Thr Val Ala Pro Thr Leu Phe Tyr Phe Ala Pro
    215                 220                 225
```

```
aag aac atc tgg gtg ctg gcc tac cag tgg ggc ggg acc gcc ttc tcc      816
Lys Asn Ile Trp Val Leu Ala Tyr Gln Trp Gly Gly Thr Ala Phe Ser
230                 235                 240                 245

tac cgg acc tcc agt gac ccc acc aac gcc aac ggc tgg tcg gcg cag      864
Tyr Arg Thr Ser Ser Asp Pro Thr Asn Ala Asn Gly Trp Ser Ala Gln
                250                 255                 260

cag acc ctc ttc acc gga agc atc tcc ggc tcc gga acc ggg ccc atc      912
Gln Thr Leu Phe Thr Gly Ser Ile Ser Gly Ser Gly Thr Gly Pro Ile
            265                 270                 275

gac cag acg ctc atc ggc gac ggc acc aac atg tac ctg ttc ttc gcc      960
Asp Gln Thr Leu Ile Gly Asp Gly Thr Asn Met Tyr Leu Phe Phe Ala
        280                 285                 290

ggg gac aac ggc aag atc tac cgg gcc agc atg ccg atc ggg aac ttc     1008
Gly Asp Asn Gly Lys Ile Tyr Arg Ala Ser Met Pro Ile Gly Asn Phe
    295                 300                 305

ccg ggc agc ttc ggc tcg aac tac acg acg atc atg agc gac acg acg     1056
Pro Gly Ser Phe Gly Ser Asn Tyr Thr Thr Ile Met Ser Asp Thr Thr
310                 315                 320                 325

aac aac ctg ttc gaa ggg gtc gag gtc tac aag ctc cag ggg cag aac     1104
Asn Asn Leu Phe Glu Gly Val Glu Val Tyr Lys Leu Gln Gly Gln Asn
                330                 335                 340

aag tac ctc atg ctc gtc gag gcg atc ggc tcg cag ggt cgc tac ttc     1152
Lys Tyr Leu Met Leu Val Glu Ala Ile Gly Ser Gln Gly Arg Tyr Phe
            345                 350                 355

cgc tcg ttc acg gcc acc agc ctg gac ggc aca tgg aca ccc cag gcc     1200
Arg Ser Phe Thr Ala Thr Ser Leu Asp Gly Thr Trp Thr Pro Gln Ala
        360                 365                 370

gcg acc gag ggc aac ccc ttc gcc ggc aag gcc aac agc ggc gcc acc     1248
Ala Thr Glu Gly Asn Pro Phe Ala Gly Lys Ala Asn Ser Gly Ala Thr
    375                 380                 385

tgg acc aac gac atc agc cac ggc gat ctg gtc cgc agc aac ccc gac     1296
Trp Thr Asn Asp Ile Ser His Gly Asp Leu Val Arg Ser Asn Pro Asp
390                 395                 400                 405

cag acc aag acc gtc gac ccc tgc aac ctg caa ctg ctc tac cag ggc     1344
Gln Thr Lys Thr Val Asp Pro Cys Asn Leu Gln Leu Leu Tyr Gln Gly
                410                 415                 420

cgc agc ccc aac tcc ggt ggc gac tac ggc ctg ctg ccc tac cgg ccg     1392
Arg Ser Pro Asn Ser Gly Gly Asp Tyr Gly Leu Leu Pro Tyr Arg Pro
            425                 430                 435

ggg gtg ctg aca ctg cag cgc tga                                     1416
Gly Val Leu Thr Leu Gln Arg
        440


<210> SEQ ID NO 62
<211> LENGTH: 471
<212> TYPE: PRT
<213> ORGANISM: Artificial Sequence
<220> FEATURE:
<223> OTHER INFORMATION: Synthetic Construct

<400> SEQUENCE: 62

Met Lys Lys Pro Leu Gly Lys Ile Val Ala Ser Thr Ala Leu Leu Ile
        -25                 -20                 -15

Ser Val Ala Phe Ser Ser Ser Ile Ala Ser Ala His His His His His
    -10                 -5              -1  1               5

His Pro Arg Ala Gly Ala Ala Ala Gly Cys Arg Val Asp Tyr Thr Val
                10                  15                  20

Ser Asn Gln Trp Pro Gly Gly Phe Gly Ala Asn Val Asn Ile Thr Asn
            25                  30                  35
```

```
Leu Gly Asp Pro Ile Asn Gly Trp Arg Leu Thr Trp Ser Phe Pro Ala
        40                  45                  50

Gly Gln Thr Ile Thr Gln Leu Trp Ser Gly Ser His Thr Gln Ser Gly
    55                  60                  65

Ser Gln Val Thr Val Thr Asn Val Asp Tyr Asn Ala Gly Leu Pro Thr
70                  75                  80                  85

Gly Gly Ser Ala Asn Phe Gly Phe Asn Gly Ser Phe Asn Gly Ser Asn
                90                  95                  100

Pro Ala Pro Thr Ser Phe Ala Leu Asn Gly Val Thr Cys Thr Gly Gly
            105                 110                 115

Val Thr Ala Ser Pro Ser Pro Ser Thr Ser Pro Ser Thr Gly Pro Ser
        120                 125                 130

Pro Ser Ser Thr Pro Thr Ser Pro Gly Thr Cys Ala Leu Pro Ser Thr
    135                 140                 145

Tyr Arg Trp Thr Ser Thr Gly Pro Leu Ala Asn Pro Lys Ser Gly Trp
150                 155                 160                 165

Val Ser Leu Lys Asp Phe Thr Asn Val Val His Asn Gly Lys His Leu
                170                 175                 180

Val Tyr Ala Thr Thr His Asp Thr Gly Thr Ser Trp Gly Ser Met Asn
            185                 190                 195

Phe Ser Pro Phe Thr Asn Trp Ser Asp Met Ala Ser Ala Gly Gln Asn
        200                 205                 210

Lys Met Asn Phe Ser Thr Val Ala Pro Thr Leu Phe Tyr Phe Ala Pro
    215                 220                 225

Lys Asn Ile Trp Val Leu Ala Tyr Gln Trp Gly Gly Thr Ala Phe Ser
230                 235                 240                 245

Tyr Arg Thr Ser Ser Asp Pro Thr Asn Ala Asn Gly Trp Ser Ala Gln
                250                 255                 260

Gln Thr Leu Phe Thr Gly Ser Ile Ser Gly Ser Gly Thr Gly Pro Ile
            265                 270                 275

Asp Gln Thr Leu Ile Gly Asp Gly Thr Asn Met Tyr Leu Phe Phe Ala
        280                 285                 290

Gly Asp Asn Gly Lys Ile Tyr Arg Ala Ser Met Pro Ile Gly Asn Phe
    295                 300                 305

Pro Gly Ser Phe Gly Ser Asn Tyr Thr Thr Ile Met Ser Asp Thr Thr
310                 315                 320                 325

Asn Asn Leu Phe Glu Gly Val Glu Val Tyr Lys Leu Gln Gly Gln Asn
                330                 335                 340

Lys Tyr Leu Met Leu Val Glu Ala Ile Gly Ser Gln Gly Arg Tyr Phe
            345                 350                 355

Arg Ser Phe Thr Ala Thr Ser Leu Asp Gly Thr Trp Thr Pro Gln Ala
        360                 365                 370

Ala Thr Glu Gly Asn Pro Phe Ala Gly Lys Ala Asn Ser Gly Ala Thr
    375                 380                 385

Trp Thr Asn Asp Ile Ser His Gly Asp Leu Val Arg Ser Asn Pro Asp
390                 395                 400                 405

Gln Thr Lys Thr Val Asp Pro Cys Asn Leu Gln Leu Leu Tyr Gln Gly
                410                 415                 420

Arg Ser Pro Asn Ser Gly Gly Asp Tyr Gly Leu Leu Pro Tyr Arg Pro
            425                 430                 435

Gly Val Leu Thr Leu Gln Arg
        440
```

```
<210> SEQ ID NO 63
<211> LENGTH: 444
<212> TYPE: PRT
<213> ORGANISM: Artificial Sequence
<220> FEATURE:
<223> OTHER INFORMATION: Mature sequence with His-tag

<400> SEQUENCE: 63

His His His His His His Pro Arg Ala Gly Ala Ala Ala Gly Cys Arg
1               5                   10                  15

Val Asp Tyr Thr Val Ser Asn Gln Trp Pro Gly Gly Phe Gly Ala Asn
            20                  25                  30

Val Asn Ile Thr Asn Leu Gly Asp Pro Ile Asn Gly Trp Arg Leu Thr
        35                  40                  45

Trp Ser Phe Pro Ala Gly Gln Thr Ile Thr Gln Leu Trp Ser Gly Ser
    50                  55                  60

His Thr Gln Ser Gly Ser Gln Val Thr Val Thr Asn Val Asp Tyr Asn
65                  70                  75                  80

Ala Gly Leu Pro Thr Gly Gly Ser Ala Asn Phe Gly Phe Asn Gly Ser
                85                  90                  95

Phe Asn Gly Ser Asn Pro Ala Pro Thr Ser Phe Ala Leu Asn Gly Val
            100                 105                 110

Thr Cys Thr Gly Gly Val Thr Ala Ser Pro Ser Pro Ser Thr Ser Pro
        115                 120                 125

Ser Thr Gly Pro Ser Pro Ser Ser Thr Pro Thr Ser Pro Gly Thr Cys
    130                 135                 140

Ala Leu Pro Ser Thr Tyr Arg Trp Thr Ser Thr Gly Pro Leu Ala Asn
145                 150                 155                 160

Pro Lys Ser Gly Trp Val Ser Leu Lys Asp Phe Thr Asn Val Val His
                165                 170                 175

Asn Gly Lys His Leu Val Tyr Ala Thr Thr His Asp Thr Gly Thr Ser
            180                 185                 190

Trp Gly Ser Met Asn Phe Ser Pro Phe Thr Asn Trp Ser Asp Met Ala
        195                 200                 205

Ser Ala Gly Gln Asn Lys Met Asn Phe Ser Thr Val Ala Pro Thr Leu
    210                 215                 220

Phe Tyr Phe Ala Pro Lys Asn Ile Trp Val Leu Ala Tyr Gln Trp Gly
225                 230                 235                 240

Gly Thr Ala Phe Ser Tyr Arg Thr Ser Ser Asp Pro Thr Asn Ala Asn
                245                 250                 255

Gly Trp Ser Ala Gln Gln Thr Leu Phe Thr Gly Ser Ile Ser Gly Ser
            260                 265                 270

Gly Thr Gly Pro Ile Asp Gln Thr Leu Ile Gly Asp Gly Thr Asn Met
        275                 280                 285

Tyr Leu Phe Phe Ala Gly Asp Asn Gly Lys Ile Tyr Arg Ala Ser Met
    290                 295                 300

Pro Ile Gly Asn Phe Pro Gly Ser Phe Gly Ser Asn Tyr Thr Thr Ile
305                 310                 315                 320

Met Ser Asp Thr Thr Asn Asn Leu Phe Glu Gly Val Glu Val Tyr Lys
                325                 330                 335

Leu Gln Gly Gln Asn Lys Tyr Leu Met Leu Val Glu Ala Ile Gly Ser
            340                 345                 350

Gln Gly Arg Tyr Phe Arg Ser Phe Thr Ala Thr Ser Leu Asp Gly Thr
        355                 360                 365

Trp Thr Pro Gln Ala Ala Thr Glu Gly Asn Pro Phe Ala Gly Lys Ala
```

```
    370                 375                 380

Asn Ser Gly Ala Thr Trp Thr Asn Asp Ile Ser His Gly Asp Leu Val
385                 390                 395                 400

Arg Ser Asn Pro Asp Gln Thr Lys Thr Val Asp Pro Cys Asn Leu Gln
                405                 410                 415

Leu Leu Tyr Gln Gly Arg Ser Pro Asn Ser Gly Gly Asp Tyr Gly Leu
            420                 425                 430

Leu Pro Tyr Arg Pro Gly Val Leu Thr Leu Gln Arg
        435                 440


<210> SEQ ID NO 64
<211> LENGTH: 1328
<212> TYPE: DNA
<213> ORGANISM: Acrophialophora fusispora
<220> FEATURE:
<221> NAME/KEY: CDS
<222> LOCATION: (1)..(330)
<220> FEATURE:
<221> NAME/KEY: sig_peptide
<222> LOCATION: (1)..(57)
<220> FEATURE:
<221> NAME/KEY: mat_peptide
<222> LOCATION: (58)..(1325)
<220> FEATURE:
<221> NAME/KEY: CDS
<222> LOCATION: (403)..(655)
<220> FEATURE:
<221> NAME/KEY: CDS
<222> LOCATION: (795)..(948)
<220> FEATURE:
<221> NAME/KEY: CDS
<222> LOCATION: (1100)..(1325)

<400> SEQUENCE: 64

atg aag ctt ctc aac tcg ggt atc agc ctg ctg gca ttg gca gtg ggc       48
Met Lys Leu Leu Asn Ser Gly Ile Ser Leu Leu Ala Leu Ala Val Gly
                -15                 -10                 -5

gtc acg gcg cag tgc ccc ttg ccc tcc acc tac cgc tgg aaa tcg aca       96
Val Thr Ala Gln Cys Pro Leu Pro Ser Thr Tyr Arg Trp Lys Ser Thr
        -1  1               5                   10

ggg gtg ctt gcc aac cca aag tcc gga tgg gtg tcc ctc aaa gac ttt      144
Gly Val Leu Ala Asn Pro Lys Ser Gly Trp Val Ser Leu Lys Asp Phe
    15                  20                  25

acc gtc gcg ccg tac aac ggc aag cat ctc gtc tac gct acg acc cac      192
Thr Val Ala Pro Tyr Asn Gly Lys His Leu Val Tyr Ala Thr Thr His
30                  35                  40                  45

gac acg gga tcg agc tgg ggc tcc atg aac ttc ggc ctg ttc agc agc      240
Asp Thr Gly Ser Ser Trp Gly Ser Met Asn Phe Gly Leu Phe Ser Ser
                50                  55                  60

tgg tcc gac atg gcc acg gcc ccc cag aat ggg atg aac cag ggc act      288
Trp Ser Asp Met Ala Thr Ala Pro Gln Asn Gly Met Asn Gln Gly Thr
            65                  70                  75

gtt gcg ccc acc ctg ttc tac ttc aag ccg aag gat atc tgg              330
Val Ala Pro Thr Leu Phe Tyr Phe Lys Pro Lys Asp Ile Trp
        80                  85                  90

gtacgtaatt gcatcccaga cttctttcgt ttcccttcac gatgccatac tcacgagatt    390

ccccgtctca ag gtg ctc gcg tat caa tgg ggc ccg acg acc ttc tcc tac    441
              Val Leu Ala Tyr Gln Trp Gly Pro Thr Thr Phe Ser Tyr
                          95                  100

aag aca tca aag gac ccc acc aat gcg aac ggc tgg ggg tcg gcg cag      489
Lys Thr Ser Lys Asp Pro Thr Asn Ala Asn Gly Trp Gly Ser Ala Gln
105                 110                 115                 120

acc ctc ttc tcg ggg aaa atc tcg ggc tct tcc acc ggc gcc att gac      537
```

```
Thr Leu Phe Ser Gly Lys Ile Ser Gly Ser Ser Thr Gly Ala Ile Asp
                125                 130                 135

cag acc gtc att ggc gat gac acc aac atg tac ctc ttc ttc gcc ggc      585
Gln Thr Val Ile Gly Asp Asp Thr Asn Met Tyr Leu Phe Phe Ala Gly
            140                 145                 150

gac aac ggc aag atc tac cgc gcc agc atg ccc atc gac agg ttc ccc      633
Asp Asn Gly Lys Ile Tyr Arg Ala Ser Met Pro Ile Asp Arg Phe Pro
        155                 160                 165

ggc agc ttc ggc gac cag tac c gtacgtccaa tccgagttgt tcattcccct       685
Gly Ser Phe Gly Asp Gln Tyr
    170                 175

ttctaactgt ctcgtgtgcc ctgggagtcg tgtggcctct tgagaggctt gtttgccact    745

ctcgagacac ccacaaaata ggcatccaat gactgacata gctgggcag ag  acc atc    802
                                                         Gln Thr Ile

ctg agc gat agc acc aac aac ttg ttc gag gcc gtc cag gtc tac aag      850
Leu Ser Asp Ser Thr Asn Asn Leu Phe Glu Ala Val Gln Val Tyr Lys
    180                 185                 190

ctc cag ggc ttg aac aag tat ctg atg att gtc gag gcc att ggc agc      898
Leu Gln Gly Leu Asn Lys Tyr Leu Met Ile Val Glu Ala Ile Gly Ser
195                 200                 205                 210

aac ggg cgc tac ttc cgc tct ttc acg gct gac agg ttg gac ggg cag      946
Asn Gly Arg Tyr Phe Arg Ser Phe Thr Ala Asp Arg Leu Asp Gly Gln
                215                 220                 225

tg  gtacgtctat ccgctctcct ttcccccct tttaagcgac tctcatagtc           998
Trp

tcggcgtcac cttccccgca aggcgactcc gctcctccca aaccgcccct cctcagcaac   1058

ccaagtaccg taagggtttt ctgactttaa ttcttgcaca g g acc ccc cag gca     1112
                                                Thr Pro Gln Ala
                                                        230

gcc acc gag agc aat cct ttc gcg ggc aag gca aac agc gga gcg acc     1160
Ala Thr Glu Ser Asn Pro Phe Ala Gly Lys Ala Asn Ser Gly Ala Thr
            235                 240                 245

tgg acc aac gat atc agc cac ggc gag ctg atc cgc gtg agc gcc gac     1208
Trp Thr Asn Asp Ile Ser His Gly Glu Leu Ile Arg Val Ser Ala Asp
        250                 255                 260

cag acc ttt aca gtc gac ccg tgc aac ctg cag ctg ctc tac cag ggc     1256
Gln Thr Phe Thr Val Asp Pro Cys Asn Leu Gln Leu Leu Tyr Gln Gly
    265                 270                 275

cgc tcc ccc agc tcg ggc ggc gac tac ggg aag ctg ccg tac cgg ccg     1304
Arg Ser Pro Ser Ser Gly Gly Asp Tyr Gly Lys Leu Pro Tyr Arg Pro
280                 285                 290                 295

ggg ctg ttg acg ctg cag cgt taa                                     1328
Gly Leu Leu Thr Leu Gln Arg
                300


<210> SEQ ID NO 65
<211> LENGTH: 321
<212> TYPE: PRT
<213> ORGANISM: Acrophialophora fusispora

<400> SEQUENCE: 65

Met Lys Leu Leu Asn Ser Gly Ile Ser Leu Leu Ala Leu Ala Val Gly
                -15                 -10                 -5

Val Thr Ala Gln Cys Pro Leu Pro Ser Thr Tyr Arg Trp Lys Ser Thr
        -1  1               5                   10

Gly Val Leu Ala Asn Pro Lys Ser Gly Trp Val Ser Leu Lys Asp Phe
    15                  20                  25

Thr Val Ala Pro Tyr Asn Gly Lys His Leu Val Tyr Ala Thr Thr His
```

```
30                  35                  40                  45

Asp Thr Gly Ser Ser Trp Gly Ser Met Asn Phe Gly Leu Phe Ser Ser
                50                  55                  60

Trp Ser Asp Met Ala Thr Ala Pro Gln Asn Gly Met Asn Gln Gly Thr
            65                  70                  75

Val Ala Pro Thr Leu Phe Tyr Phe Lys Pro Lys Asp Ile Trp Val Leu
        80                  85                  90

Ala Tyr Gln Trp Gly Pro Thr Thr Phe Ser Tyr Lys Thr Ser Lys Asp
    95                  100                 105

Pro Thr Asn Ala Asn Gly Trp Gly Ser Ala Gln Thr Leu Phe Ser Gly
110                 115                 120                 125

Lys Ile Ser Gly Ser Ser Thr Gly Ala Ile Asp Gln Thr Val Ile Gly
                130                 135                 140

Asp Asp Thr Asn Met Tyr Leu Phe Phe Ala Gly Asp Asn Gly Lys Ile
            145                 150                 155

Tyr Arg Ala Ser Met Pro Ile Asp Arg Phe Pro Gly Ser Phe Gly Asp
        160                 165                 170

Gln Tyr Gln Thr Ile Leu Ser Asp Ser Thr Asn Asn Leu Phe Glu Ala
    175                 180                 185

Val Gln Val Tyr Lys Leu Gln Gly Leu Asn Lys Tyr Leu Met Ile Val
190                 195                 200                 205

Glu Ala Ile Gly Ser Asn Gly Arg Tyr Phe Arg Ser Phe Thr Ala Asp
                210                 215                 220

Arg Leu Asp Gly Gln Trp Thr Pro Gln Ala Ala Thr Glu Ser Asn Pro
            225                 230                 235

Phe Ala Gly Lys Ala Asn Ser Gly Ala Thr Trp Thr Asn Asp Ile Ser
        240                 245                 250

His Gly Glu Leu Ile Arg Val Ser Ala Asp Gln Thr Phe Thr Val Asp
    255                 260                 265

Pro Cys Asn Leu Gln Leu Leu Tyr Gln Gly Arg Ser Pro Ser Ser Gly
270                 275                 280                 285

Gly Asp Tyr Gly Lys Leu Pro Tyr Arg Pro Gly Leu Leu Thr Leu Gln
                290                 295                 300

Arg


<210> SEQ ID NO 66
<211> LENGTH: 302
<212> TYPE: PRT
<213> ORGANISM: Acrophialophora fusispora

<400> SEQUENCE: 66

Gln Cys Pro Leu Pro Ser Thr Tyr Arg Trp Lys Ser Thr Gly Val Leu
1               5                   10                  15

Ala Asn Pro Lys Ser Gly Trp Val Ser Leu Lys Asp Phe Thr Val Ala
            20                  25                  30

Pro Tyr Asn Gly Lys His Leu Val Tyr Ala Thr Thr His Asp Thr Gly
        35                  40                  45

Ser Ser Trp Gly Ser Met Asn Phe Gly Leu Phe Ser Ser Trp Ser Asp
    50                  55                  60

Met Ala Thr Ala Pro Gln Asn Gly Met Asn Gln Gly Thr Val Ala Pro
65                  70                  75                  80

Thr Leu Phe Tyr Phe Lys Pro Lys Asp Ile Trp Val Leu Ala Tyr Gln
                85                  90                  95

Trp Gly Pro Thr Thr Phe Ser Tyr Lys Thr Ser Lys Asp Pro Thr Asn
```

```
            100                 105                 110

Ala Asn Gly Trp Gly Ser Ala Gln Thr Leu Phe Ser Gly Lys Ile Ser
        115                 120                 125

Gly Ser Ser Thr Gly Ala Ile Asp Gln Thr Val Ile Gly Asp Asp Thr
    130                 135                 140

Asn Met Tyr Leu Phe Phe Ala Gly Asp Asn Gly Lys Ile Tyr Arg Ala
145                 150                 155                 160

Ser Met Pro Ile Asp Arg Phe Pro Gly Ser Phe Gly Asp Gln Tyr Gln
                165                 170                 175

Thr Ile Leu Ser Asp Ser Thr Asn Asn Leu Phe Glu Ala Val Gln Val
            180                 185                 190

Tyr Lys Leu Gln Gly Leu Asn Lys Tyr Leu Met Ile Val Glu Ala Ile
        195                 200                 205

Gly Ser Asn Gly Arg Tyr Phe Arg Ser Phe Thr Ala Asp Arg Leu Asp
    210                 215                 220

Gly Gln Trp Thr Pro Gln Ala Ala Thr Glu Ser Asn Pro Phe Ala Gly
225                 230                 235                 240

Lys Ala Asn Ser Gly Ala Thr Trp Thr Asn Asp Ile Ser His Gly Glu
                245                 250                 255

Leu Ile Arg Val Ser Ala Asp Gln Thr Phe Thr Val Asp Pro Cys Asn
            260                 265                 270

Leu Gln Leu Leu Tyr Gln Gly Arg Ser Pro Ser Ser Gly Gly Asp Tyr
        275                 280                 285

Gly Lys Leu Pro Tyr Arg Pro Gly Leu Leu Thr Leu Gln Arg
    290                 295                 300
```

<210> SEQ ID NO 67
<211> LENGTH: 1355
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(330)
<220> FEATURE:
<221> NAME/KEY: sig_peptide
<222> LOCATION: (1)..(57)
<220> FEATURE:
<221> NAME/KEY: mat_peptide
<222> LOCATION: (58)..(1352)
<220> FEATURE:
<221> NAME/KEY: CDS
<222> LOCATION: (403)..(655)
<220> FEATURE:
<221> NAME/KEY: CDS
<222> LOCATION: (795)..(948)
<220> FEATURE:
<221> NAME/KEY: CDS
<222> LOCATION: (1100)..(1352)

<400> SEQUENCE: 67

```
atg aag ctt ctc aac tcg ggt atc agc ctg ctg gca ttg gca gtg ggc       48
Met Lys Leu Leu Asn Ser Gly Ile Ser Leu Leu Ala Leu Ala Val Gly
                -15                 -10                 -5

gtc acg gcg cag tgc ccc ttg ccc tcc acc tac cgc tgg aaa tcg aca       96
Val Thr Ala Gln Cys Pro Leu Pro Ser Thr Tyr Arg Trp Lys Ser Thr
        -1  1               5                   10

ggg gtg ctt gcc aac cca aag tcc gga tgg gtg tcc ctc aaa gac ttt      144
Gly Val Leu Ala Asn Pro Lys Ser Gly Trp Val Ser Leu Lys Asp Phe
    15                  20                  25

acc gtc gcg ccg tac aac ggc aag cat ctc gtc tac gct acg acc cac      192
```

```
Thr Val Ala Pro Tyr Asn Gly Lys His Leu Val Tyr Ala Thr Thr His
30                  35                  40                  45

gac acg gga tcg agc tgg ggc tcc atg aac ttc ggc ctg ttc agc agc      240
Asp Thr Gly Ser Ser Trp Gly Ser Met Asn Phe Gly Leu Phe Ser Ser
                50                  55                  60

tgg tcc gac atg gcc acg gcc ccc cag aat ggg atg aac cag ggc act      288
Trp Ser Asp Met Ala Thr Ala Pro Gln Asn Gly Met Asn Gln Gly Thr
            65                  70                  75

gtt gcg ccc acc ctg ttc tac ttc aag ccg aag gat atc tgg              330
Val Ala Pro Thr Leu Phe Tyr Phe Lys Pro Lys Asp Ile Trp
        80                  85                  90

gtacgtaatt gcatcccaga cttctttcgt ttcccttcac gatgccatac tcacgagatt    390

ccccgtctca ag gtg ctc gcg tat caa tgg ggc ccg acg acc ttc tcc tac    441
              Val Leu Ala Tyr Gln Trp Gly Pro Thr Thr Phe Ser Tyr
                          95                  100

aag aca tca aag gac ccc acc aat gcg aac ggc tgg ggg tcg gcg cag      489
Lys Thr Ser Lys Asp Pro Thr Asn Ala Asn Gly Trp Gly Ser Ala Gln
105                 110                 115                 120

acc ctc ttc tcg ggg aaa atc tcg ggc tct tcc acc ggc gcc att gac      537
Thr Leu Phe Ser Gly Lys Ile Ser Gly Ser Ser Thr Gly Ala Ile Asp
                125                 130                 135

cag acc gtc att ggc gat gac acc aac atg tac ctc ttc ttc gcc ggc      585
Gln Thr Val Ile Gly Asp Asp Thr Asn Met Tyr Leu Phe Phe Ala Gly
            140                 145                 150

gac aac ggc aag atc tac cgc gcc agc atg ccc atc gac agg ttc ccc      633
Asp Asn Gly Lys Ile Tyr Arg Ala Ser Met Pro Ile Asp Arg Phe Pro
        155                 160                 165

ggc agc ttc ggc gac cag tac c gtacgtccaa tccgagttgt tcattcccct      685
Gly Ser Phe Gly Asp Gln Tyr
    170                 175

ttctaactgt ctcgtgtgcc ctgggagtcg tgtggcctct tgagaggctt gtttgccact    745

ctcgagacac ccacaaaata ggcatccaat gactgacata gctgggcag ag  acc atc    802
                                                          Gln Thr Ile

ctg agc gat agc acc aac aac ttg ttc gag gcc gtc cag gtc tac aag      850
Leu Ser Asp Ser Thr Asn Asn Leu Phe Glu Ala Val Gln Val Tyr Lys
    180                 185                 190

ctc cag ggc ttg aac aag tat ctg atg att gtc gag gcc att ggc agc      898
Leu Gln Gly Leu Asn Lys Tyr Leu Met Ile Val Glu Ala Ile Gly Ser
195                 200                 205                 210

aac ggg cgc tac ttc cgc tct ttc acg gct gac agg ttg gac ggg cag      946
Asn Gly Arg Tyr Phe Arg Ser Phe Thr Ala Asp Arg Leu Asp Gly Gln
                215                 220                 225

tg  gtacgtctat ccgctctcct ttccccccct tttaagcgac tctcatagtc           998
Trp

tcggcgtcac cttccccgca aggcgactcc gctcctccca aaccgcccct cctcagcaac   1058

ccaagtaccg taagggtttt ctgactttaa ttcttgcaca g g acc ccc cag gca     1112
                                                Thr Pro Gln Ala
                                                            230

gcc acc gag agc aat cct ttc gcg ggc aag gca aac agc gga gcg acc     1160
Ala Thr Glu Ser Asn Pro Phe Ala Gly Lys Ala Asn Ser Gly Ala Thr
            235                 240                 245

tgg acc aac gat atc agc cac ggc gag ctg atc cgc gtg agc gcc gac     1208
Trp Thr Asn Asp Ile Ser His Gly Glu Leu Ile Arg Val Ser Ala Asp
        250                 255                 260

cag acc ttt aca gtc gac ccg tgc aac ctg cag ctg ctc tac cag ggc     1256
Gln Thr Phe Thr Val Asp Pro Cys Asn Leu Gln Leu Leu Tyr Gln Gly
    265                 270                 275
```

```
cgc tcc ccc agc tcg ggc ggc gac tac ggg aag ctg ccg tac cgg ccg     1304
Arg Ser Pro Ser Ser Gly Gly Asp Tyr Gly Lys Leu Pro Tyr Arg Pro
280                 285                 290                 295

ggg ctg ttg acg ctg cag cgt acg cgt gcg cat cac cat cac cat cac     1352
Gly Leu Leu Thr Leu Gln Arg Thr Arg Ala His His His His His His
                300                 305                 310

taa                                                                 1355


<210> SEQ ID NO 68
<211> LENGTH: 330
<212> TYPE: PRT
<213> ORGANISM: Artificial Sequence
<220> FEATURE:
<223> OTHER INFORMATION: Synthetic Construct

<400> SEQUENCE: 68

Met Lys Leu Leu Asn Ser Gly Ile Ser Leu Leu Ala Leu Ala Val Gly
                -15                 -10                 -5

Val Thr Ala Gln Cys Pro Leu Pro Ser Thr Tyr Arg Trp Lys Ser Thr
        -1  1               5                   10

Gly Val Leu Ala Asn Pro Lys Ser Gly Trp Val Ser Leu Lys Asp Phe
    15                  20                  25

Thr Val Ala Pro Tyr Asn Gly Lys His Leu Val Tyr Ala Thr Thr His
30                  35                  40                  45

Asp Thr Gly Ser Ser Trp Gly Ser Met Asn Phe Gly Leu Phe Ser Ser
                50                  55                  60

Trp Ser Asp Met Ala Thr Ala Pro Gln Asn Gly Met Asn Gln Gly Thr
            65                  70                  75

Val Ala Pro Thr Leu Phe Tyr Phe Lys Pro Lys Asp Ile Trp Val Leu
        80                  85                  90

Ala Tyr Gln Trp Gly Pro Thr Thr Phe Ser Tyr Lys Thr Ser Lys Asp
    95                  100                 105

Pro Thr Asn Ala Asn Gly Trp Gly Ser Ala Gln Thr Leu Phe Ser Gly
110                 115                 120                 125

Lys Ile Ser Gly Ser Ser Thr Gly Ala Ile Asp Gln Thr Val Ile Gly
                130                 135                 140

Asp Asp Thr Asn Met Tyr Leu Phe Phe Ala Gly Asp Asn Gly Lys Ile
            145                 150                 155

Tyr Arg Ala Ser Met Pro Ile Asp Arg Phe Pro Gly Ser Phe Gly Asp
        160                 165                 170

Gln Tyr Gln Thr Ile Leu Ser Asp Ser Thr Asn Asn Leu Phe Glu Ala
    175                 180                 185

Val Gln Val Tyr Lys Leu Gln Gly Leu Asn Lys Tyr Leu Met Ile Val
190                 195                 200                 205

Glu Ala Ile Gly Ser Asn Gly Arg Tyr Phe Arg Ser Phe Thr Ala Asp
                210                 215                 220

Arg Leu Asp Gly Gln Trp Thr Pro Gln Ala Ala Thr Glu Ser Asn Pro
            225                 230                 235

Phe Ala Gly Lys Ala Asn Ser Gly Ala Thr Trp Thr Asn Asp Ile Ser
        240                 245                 250

His Gly Glu Leu Ile Arg Val Ser Ala Asp Gln Thr Phe Thr Val Asp
    255                 260                 265

Pro Cys Asn Leu Gln Leu Leu Tyr Gln Gly Arg Ser Pro Ser Ser Gly
270                 275                 280                 285

Gly Asp Tyr Gly Lys Leu Pro Tyr Arg Pro Gly Leu Leu Thr Leu Gln
                290                 295                 300
```

```
Arg Thr Arg Ala His His His His His His
            305                 310


<210> SEQ ID NO 69
<211> LENGTH: 311
<212> TYPE: PRT
<213> ORGANISM: Artificial Sequence
<220> FEATURE:
<223> OTHER INFORMATION: Mature sequence with His tag

<400> SEQUENCE: 69

Gln Cys Pro Leu Pro Ser Thr Tyr Arg Trp Lys Ser Thr Gly Val Leu
1               5                   10                  15

Ala Asn Pro Lys Ser Gly Trp Val Ser Leu Lys Asp Phe Thr Val Ala
            20                  25                  30

Pro Tyr Asn Gly Lys His Leu Val Tyr Ala Thr Thr His Asp Thr Gly
        35                  40                  45

Ser Ser Trp Gly Ser Met Asn Phe Gly Leu Phe Ser Ser Trp Ser Asp
    50                  55                  60

Met Ala Thr Ala Pro Gln Asn Gly Met Asn Gln Gly Thr Val Ala Pro
65                  70                  75                  80

Thr Leu Phe Tyr Phe Lys Pro Lys Asp Ile Trp Val Leu Ala Tyr Gln
                85                  90                  95

Trp Gly Pro Thr Thr Phe Ser Tyr Lys Thr Ser Lys Asp Pro Thr Asn
            100                 105                 110

Ala Asn Gly Trp Gly Ser Ala Gln Thr Leu Phe Ser Gly Lys Ile Ser
        115                 120                 125

Gly Ser Ser Thr Gly Ala Ile Asp Gln Thr Val Ile Gly Asp Asp Thr
    130                 135                 140

Asn Met Tyr Leu Phe Phe Ala Gly Asp Asn Gly Lys Ile Tyr Arg Ala
145                 150                 155                 160

Ser Met Pro Ile Asp Arg Phe Pro Gly Ser Phe Gly Asp Gln Tyr Gln
                165                 170                 175

Thr Ile Leu Ser Asp Ser Thr Asn Asn Leu Phe Glu Ala Val Gln Val
            180                 185                 190

Tyr Lys Leu Gln Gly Leu Asn Lys Tyr Leu Met Ile Val Glu Ala Ile
        195                 200                 205

Gly Ser Asn Gly Arg Tyr Phe Arg Ser Phe Thr Ala Asp Arg Leu Asp
    210                 215                 220

Gly Gln Trp Thr Pro Gln Ala Ala Thr Glu Ser Asn Pro Phe Ala Gly
225                 230                 235                 240

Lys Ala Asn Ser Gly Ala Thr Trp Thr Asn Asp Ile Ser His Gly Glu
                245                 250                 255

Leu Ile Arg Val Ser Ala Asp Gln Thr Phe Thr Val Asp Pro Cys Asn
            260                 265                 270

Leu Gln Leu Leu Tyr Gln Gly Arg Ser Pro Ser Ser Gly Gly Asp Tyr
        275                 280                 285

Gly Lys Leu Pro Tyr Arg Pro Gly Leu Leu Thr Leu Gln Arg Thr Arg
    290                 295                 300

Ala His His His His His His
305                 310


<210> SEQ ID NO 70
<211> LENGTH: 384
<212> TYPE: PRT
<213> ORGANISM: Aspergillus aculeatus
```

<400> SEQUENCE: 70

Val Gly Leu Asp Gln Ala Ala Val Ala Lys Gly Leu Gln Tyr Phe Gly
1               5                   10                  15

Thr Ala Thr Asp Asn Pro Glu Leu Thr Asp Ile Pro Tyr Val Thr Gln
            20                  25                  30

Leu Asn Asn Thr Ala Asp Phe Gly Gln Ile Thr Pro Gly Asn Ser Met
        35                  40                  45

Lys Trp Asp Ala Thr Glu Pro Ser Gln Gly Thr Phe Thr Phe Thr Lys
    50                  55                  60

Gly Asp Val Ile Ala Asp Leu Ala Glu Gly Asn Gly Gln Tyr Leu Arg
65                  70                  75                  80

Cys His Thr Leu Val Trp Tyr Asn Gln Leu Pro Ser Trp Val Thr Ser
                85                  90                  95

Gly Thr Trp Thr Asn Ala Thr Leu Thr Ala Ala Leu Lys Asn His Ile
            100                 105                 110

Thr Asn Val Val Ser His Tyr Lys Gly Lys Cys Leu His Trp Asp Val
        115                 120                 125

Val Asn Glu Ala Leu Asn Asp Asp Gly Thr Tyr Arg Thr Asn Ile Phe
    130                 135                 140

Tyr Thr Thr Ile Gly Glu Ala Tyr Ile Pro Ile Ala Phe Ala Ala Ala
145                 150                 155                 160

Ala Ala Ala Asp Pro Asp Ala Lys Leu Phe Tyr Asn Asp Tyr Asn Leu
                165                 170                 175

Glu Tyr Gly Gly Ala Lys Ala Ala Ser Ala Arg Ala Ile Val Gln Leu
            180                 185                 190

Val Lys Asn Ala Gly Ala Lys Ile Asp Gly Val Gly Leu Gln Ala His
        195                 200                 205

Phe Ser Val Gly Thr Val Pro Ser Thr Ser Ser Leu Val Ser Val Leu
    210                 215                 220

Gln Ser Phe Thr Ala Leu Gly Val Glu Val Ala Tyr Thr Glu Ala Asp
225                 230                 235                 240

Val Arg Ile Leu Leu Pro Thr Thr Ala Thr Thr Leu Ala Gln Gln Ser
                245                 250                 255

Ser Asp Phe Gln Ala Leu Val Gln Ser Cys Val Gln Thr Thr Gly Cys
            260                 265                 270

Val Gly Phe Thr Ile Trp Asp Trp Thr Asp Lys Tyr Ser Trp Val Pro
        275                 280                 285

Ser Thr Phe Ser Gly Tyr Gly Ala Ala Leu Pro Trp Asp Glu Asn Leu
    290                 295                 300

Val Lys Lys Pro Ala Tyr Asn Gly Leu Leu Ala Gly Met Gly Val Thr
305                 310                 315                 320

Val Thr Thr Thr Thr Thr Thr Thr Thr Ala Thr Ala Thr Gly Lys Thr
                325                 330                 335

Thr Thr Thr Thr Thr Gly Ala Thr Ser Thr Gly Thr Thr Ala Ala His
            340                 345                 350

Trp Gly Gln Cys Gly Gly Leu Asn Trp Ser Gly Pro Thr Ala Cys Ala
        355                 360                 365

Thr Gly Tyr Thr Cys Thr Tyr Val Asn Asp Tyr Tyr Ser Gln Cys Leu
    370                 375                 380

<210> SEQ ID NO 71
<211> LENGTH: 288
<212> TYPE: PRT

<213> ORGANISM: Clostridium acetobutylicum

<400> SEQUENCE: 71

Ala Met Ser His Ser Lys Phe Val Gly Asn Ile Ile Ala Gly Ser Ile
1 5 10 15

Pro Ser Asn Phe Asp Thr Tyr Trp Asn Gln Val Thr Pro Glu Asn Ala
20 25 30

Thr Lys Trp Gly Ala Ile Glu Tyr Gly Arg Gly Asn Tyr Asn Trp Gly
35 40 45

Ser Ala Asp Leu Ile Tyr Asn Tyr Ala Arg Ser Lys Asn Met Pro Phe
50 55 60

Lys Phe His Asn Leu Val Trp Gly Ser Gln Gln Leu Thr Trp Leu Ser
65 70 75 80

Asn Leu Ser Pro Gln Asp Gln Lys Ser Glu Val Ser Lys Trp Ile Ala
85 90 95

Ala Ala Gly Gln Arg Tyr Ser Gly Ser Ala Phe Val Asp Val Val Asn
100 105 110

Glu Pro Leu His Thr Gln Pro Ser Tyr Lys Asn Ala Leu Gly Gly Asp
115 120 125

Gly Ser Thr Gly Tyr Asp Trp Ile Val Trp Ser Tyr Gln Gln Ala Arg
130 135 140

Lys Ala Phe Pro Asn Ser Lys Leu Leu Ile Asn Glu Tyr Gly Ile Ile
145 150 155 160

Gly Asp Pro Asn Ala Ala Ala Asn Tyr Val Lys Ile Ile Asn Val Leu
165 170 175

Lys Ser Lys Gly Leu Ile Asp Gly Ile Gly Ile Gln Cys His Tyr Phe
180 185 190

Asn Met Asp Asn Val Ser Val Gly Thr Met Asn Tyr Val Leu Asn Met
195 200 205

Leu Ser Asn Thr Gly Leu Pro Ile Tyr Val Ser Glu Leu Asp Met Thr
210 215 220

Gly Asp Asp Ser Thr Gln Leu Ala Arg Tyr Gln Gln Lys Phe Pro Val
225 230 235 240

Leu Tyr Gln Asn Pro Asn Val Lys Gly Ile Thr Leu Trp Gly Tyr Met
245 250 255

Gln Gly Gln Thr Trp Asn Ser Gly Thr Tyr Leu Val Asn Ser Asn Gly
260 265 270

Thr Glu Arg Pro Ala Leu Lys Trp Leu Arg Ser Tyr Leu Ala Ser His
275 280 285

<210> SEQ ID NO 72
<211> LENGTH: 308
<212> TYPE: PRT
<213> ORGANISM: Aspergillus aculeatus

<400> SEQUENCE: 72

Asn Pro Ile Glu Pro Arg Gln Ala Ser Val Ser Ile Asp Ala Lys Phe
1 5 10 15

Lys Ala His Gly Lys Lys Tyr Leu Gly Thr Ile Gly Asp Gln Tyr Thr
20 25 30

Leu Asn Lys Asn Ala Lys Thr Pro Ala Ile Ile Lys Ala Asp Phe Gly
35 40 45

Gln Leu Thr Pro Glu Asn Ser Met Lys Trp Asp Ala Thr Glu Pro Asn
50 55 60

Arg Gly Gln Phe Ser Phe Ser Gly Ser Asp Tyr Leu Val Asn Phe Ala

```
65                  70                  75                  80

Gln Ser Asn Gly Lys Leu Ile Arg Gly His Thr Leu Val Trp His Ser
                85                  90                  95

Gln Leu Pro Ser Trp Val Gln Ser Ile Ser Asp Lys Asn Thr Leu Ile
            100                 105                 110

Gln Val Met Gln Asn His Ile Thr Thr Val Met Gln Arg Tyr Lys Gly
        115                 120                 125

Lys Val Tyr Ala Trp Asp Val Val Asn Glu Ile Phe Asn Glu Asp Gly
    130                 135                 140

Ser Leu Cys Gln Ser His Phe Tyr Asn Val Ile Gly Glu Asp Tyr Val
145                 150                 155                 160

Arg Ile Ala Phe Glu Thr Ala Arg Ala Val Asp Pro Asn Ala Lys Leu
                165                 170                 175

Tyr Ile Asn Asp Tyr Asn Leu Asp Ser Ala Ser Tyr Pro Lys Leu Thr
            180                 185                 190

Gly Leu Val Asn His Val Lys Lys Trp Val Ala Ala Gly Val Pro Ile
        195                 200                 205

Asp Gly Ile Gly Ser Gln Thr His Leu Ser Ala Gly Ala Gly Ala Ala
    210                 215                 220

Val Ser Gly Ala Leu Asn Ala Leu Ala Gly Ala Gly Thr Lys Glu Val
225                 230                 235                 240

Ala Ile Thr Glu Leu Asp Ile Ala Gly Ala Ser Ser Thr Asp Tyr Val
                245                 250                 255

Asn Val Val Lys Ala Cys Leu Asn Gln Pro Lys Cys Val Gly Ile Thr
            260                 265                 270

Val Trp Gly Ser Ser Asp Pro Asp Ser Trp Arg Ser Ser Ser Ser Pro
        275                 280                 285

Leu Leu Phe Asp Ser Asn Tyr Asn Pro Lys Ala Ala Tyr Thr Ala Ile
    290                 295                 300

Ala Asn Ala Leu
305


<210> SEQ ID NO 73
<211> LENGTH: 195
<212> TYPE: PRT
<213> ORGANISM: Thermomyces lanuginosus

<400> SEQUENCE: 73

Arg Gln Thr Thr Pro Asn Ser Glu Gly Trp His Asp Gly Tyr Tyr Tyr
1               5                   10                  15

Ser Trp Trp Ser Asp Gly Gly Ala Gln Ala Thr Tyr Thr Asn Leu Glu
            20                  25                  30

Gly Gly Thr Tyr Glu Ile Ser Trp Gly Asp Gly Gly Asn Leu Val Gly
        35                  40                  45

Gly Lys Gly Trp Asn Pro Gly Leu Asn Ala Arg Ala Ile His Phe Glu
    50                  55                  60

Gly Val Tyr Gln Pro Asn Gly Asn Ser Tyr Leu Ala Val Tyr Gly Trp
65                  70                  75                  80

Thr Arg Asn Pro Leu Val Glu Tyr Tyr Ile Val Glu Asn Phe Gly Thr
                85                  90                  95

Tyr Asp Pro Ser Ser Gly Ala Thr Asp Leu Gly Thr Val Glu Cys Asp
            100                 105                 110

Gly Ser Ile Tyr Arg Leu Gly Lys Thr Thr Arg Val Asn Ala Pro Ser
        115                 120                 125
```

```
Ile Asp Gly Thr Gln Thr Phe Asp Gln Tyr Trp Ser Val Arg Gln Asp
    130                 135                 140

Lys Arg Thr Ser Gly Thr Val Gln Thr Gly Cys His Phe Asp Ala Trp
145                 150                 155                 160

Ala Arg Ala Gly Leu Asn Val Asn Gly Asp His Tyr Tyr Gln Ile Val
                165                 170                 175

Ala Thr Glu Gly Tyr Phe Ser Ser Gly Tyr Ala Arg Ile Thr Val Ala
            180                 185                 190

Asp Val Gly
        195


<210> SEQ ID NO 74
<211> LENGTH: 203
<212> TYPE: PRT
<213> ORGANISM: Dictyoglomus thermophilum

<400> SEQUENCE: 74

Gln Thr Ser Ile Thr Leu Thr Ser Asn Ala Ser Gly Thr Phe Asp Gly
1               5                   10                  15

Tyr Tyr Tyr Glu Leu Trp Lys Asp Thr Gly Asn Thr Thr Met Thr Val
            20                  25                  30

Tyr Thr Gln Gly Arg Phe Ser Cys Gln Trp Ser Asn Ile Asn Asn Ala
        35                  40                  45

Leu Phe Arg Thr Gly Lys Lys Tyr Asn Gln Asn Trp Gln Ser Leu Gly
    50                  55                  60

Thr Ile Arg Ile Thr Tyr Ser Ala Thr Tyr Asn Pro Asn Gly Asn Ser
65                  70                  75                  80

Tyr Leu Cys Ile Tyr Gly Trp Ser Thr Asn Pro Leu Val Glu Phe Tyr
                85                  90                  95

Ile Val Glu Ser Trp Gly Asn Trp Arg Pro Pro Gly Ala Thr Ser Leu
            100                 105                 110

Gly Gln Val Thr Ile Asp Gly Gly Thr Tyr Asp Ile Tyr Arg Thr Thr
        115                 120                 125

Arg Val Asn Gln Pro Ser Ile Val Gly Thr Ala Thr Phe Asp Gln Tyr
    130                 135                 140

Trp Ser Val Arg Thr Ser Lys Arg Thr Ser Gly Thr Val Thr Val Thr
145                 150                 155                 160

Asp His Phe Arg Ala Trp Ala Asn Arg Gly Leu Asn Leu Gly Thr Ile
                165                 170                 175

Asp Gln Ile Thr Leu Cys Val Glu Gly Tyr Gln Ser Ser Gly Ser Ala
            180                 185                 190

Asn Ile Thr Gln Asn Thr Phe Ser Gln Gly Ser
        195                 200


<210> SEQ ID NO 75
<211> LENGTH: 182
<212> TYPE: PRT
<213> ORGANISM: Paenibacillus Pabuli

<400> SEQUENCE: 75

Thr Asp Tyr Trp Gln Asn Trp Thr Asp Gly Gly Gly Thr Val Asn Ala
1               5                   10                  15

Val Asn Gly Ser Gly Gly Asn Tyr Ser Val Asn Trp Gln Asn Thr Gly
            20                  25                  30

Asn Phe Val Val Gly Lys Gly Trp Thr Tyr Gly Thr Pro Asn Arg Val
        35                  40                  45
```

```
Val Asn Tyr Asn Ala Gly Val Phe Ser Pro Ser Gly Asn Gly Tyr Leu
    50                  55                  60

Thr Phe Tyr Gly Trp Thr Arg Asn Ala Leu Ile Glu Tyr Tyr Val Val
65                  70                  75                  80

Asp Asn Trp Gly Thr Tyr Arg Pro Thr Gly Thr Tyr Lys Gly Thr Val
                85                  90                  95

Thr Ser Asp Gly Gly Thr Tyr Asp Ile Tyr Thr Thr Met Arg Tyr Asn
            100                 105                 110

Gln Pro Ser Ile Asp Gly Tyr Ser Thr Phe Pro Gln Tyr Trp Ser Val
        115                 120                 125

Arg Gln Ser Lys Arg Pro Ile Gly Val Asn Ser Gln Ile Thr Phe Gln
    130                 135                 140

Asn His Val Asn Ala Trp Ala Ser Lys Gly Met Tyr Leu Gly Asn Ser
145                 150                 155                 160

Trp Ser Tyr Gln Val Met Ala Thr Glu Gly Tyr Gln Ser Ser Gly Ser
                165                 170                 175

Ser Asn Val Thr Val Trp
            180


<210> SEQ ID NO 76
<211> LENGTH: 633
<212> TYPE: DNA
<213> ORGANISM: Geobacillus stearothermophilus
<220> FEATURE:
<221> NAME/KEY: CDS
<222> LOCATION: (1)..(630)
<220> FEATURE:
<221> NAME/KEY: sig_peptide
<222> LOCATION: (1)..(81)
<220> FEATURE:
<221> NAME/KEY: mat_peptide
<222> LOCATION: (82)..(633)

<400> SEQUENCE: 76

atg aag tta aag aag aag atg ctt act cta ctc ctg acg gct tcg atg       48
Met Lys Leu Lys Lys Lys Met Leu Thr Leu Leu Leu Thr Ala Ser Met
        -25                 -20                 -15

agt ttc ggt tta ttt ggg gca acc tca agt gca gca acg gat tat tgg       96
Ser Phe Gly Leu Phe Gly Ala Thr Ser Ser Ala Ala Thr Asp Tyr Trp
    -10                 -5                  -1  1               5

caa tat tgg acg gat ggc ggc ggg atg gtg aat gcg gtt aat ggg ccc      144
Gln Tyr Trp Thr Asp Gly Gly Gly Met Val Asn Ala Val Asn Gly Pro
                10                  15                  20

gga ggc aat tac agt gtt acc tgg caa aat acc ggg aac ttc gtg gtc      192
Gly Gly Asn Tyr Ser Val Thr Trp Gln Asn Thr Gly Asn Phe Val Val
            25                  30                  35

ggc aaa ggc tgg acg gtt gga tcg ccg aat cgg gtg atc aac tac aat      240
Gly Lys Gly Trp Thr Val Gly Ser Pro Asn Arg Val Ile Asn Tyr Asn
        40                  45                  50

gcg ggc atc tgg gaa cct tcg ggg aac ggg tac tta acc ctt tac gga      288
Ala Gly Ile Trp Glu Pro Ser Gly Asn Gly Tyr Leu Thr Leu Tyr Gly
    55                  60                  65

tgg acg agg aac gcg ctg atc gag tat tac gtt gtg gac agc tgg ggg      336
Trp Thr Arg Asn Ala Leu Ile Glu Tyr Tyr Val Val Asp Ser Trp Gly
70                  75                  80                  85

acg tac cgg cct acc ggc aat tac aag gga acg gtg aac agc gac gga      384
Thr Tyr Arg Pro Thr Gly Asn Tyr Lys Gly Thr Val Asn Ser Asp Gly
                90                  95                  100

gga act tac gat att tat acg acc atg cgt tat aat gca cct tcc att      432
Gly Thr Tyr Asp Ile Tyr Thr Thr Met Arg Tyr Asn Ala Pro Ser Ile
            105                 110                 115
```

```
gat ggc acg cag acg ttc caa cag ttc tgg agt gtg cgg caa tcg aaa      480
Asp Gly Thr Gln Thr Phe Gln Gln Phe Trp Ser Val Arg Gln Ser Lys
        120                 125                 130

cga cct acc ggc agc aac gta tcc atc acc ttc agc aat cac gtg aat      528
Arg Pro Thr Gly Ser Asn Val Ser Ile Thr Phe Ser Asn His Val Asn
    135                 140                 145

gcc tgg aga agc aag ggc atg aac ctg ggc agc agc tgg gct tat cag      576
Ala Trp Arg Ser Lys Gly Met Asn Leu Gly Ser Ser Trp Ala Tyr Gln
150                 155                 160                 165

gtt ctg gcg acg gaa ggc tat cag agc agc gga aga tcc aac gtt acg      624
Val Leu Ala Thr Glu Gly Tyr Gln Ser Ser Gly Arg Ser Asn Val Thr
                170                 175                 180

gtt tgg taa                                                          633
Val Trp


<210> SEQ ID NO 77
<211> LENGTH: 210
<212> TYPE: PRT
<213> ORGANISM: Geobacillus stearothermophilus

<400> SEQUENCE: 77

Met Lys Leu Lys Lys Lys Met Leu Thr Leu Leu Leu Thr Ala Ser Met
        -25                 -20                 -15

Ser Phe Gly Leu Phe Gly Ala Thr Ser Ser Ala Ala Thr Asp Tyr Trp
    -10                 -5                  -1  1               5

Gln Tyr Trp Thr Asp Gly Gly Gly Met Val Asn Ala Val Asn Gly Pro
                10                  15                  20

Gly Gly Asn Tyr Ser Val Thr Trp Gln Asn Thr Gly Asn Phe Val Val
            25                  30                  35

Gly Lys Gly Trp Thr Val Gly Ser Pro Asn Arg Val Ile Asn Tyr Asn
        40                  45                  50

Ala Gly Ile Trp Glu Pro Ser Gly Asn Gly Tyr Leu Thr Leu Tyr Gly
    55                  60                  65

Trp Thr Arg Asn Ala Leu Ile Glu Tyr Tyr Val Val Asp Ser Trp Gly
70                  75                  80                  85

Thr Tyr Arg Pro Thr Gly Asn Tyr Lys Gly Thr Val Asn Ser Asp Gly
                90                  95                  100

Gly Thr Tyr Asp Ile Tyr Thr Thr Met Arg Tyr Asn Ala Pro Ser Ile
            105                 110                 115

Asp Gly Thr Gln Thr Phe Gln Gln Phe Trp Ser Val Arg Gln Ser Lys
        120                 125                 130

Arg Pro Thr Gly Ser Asn Val Ser Ile Thr Phe Ser Asn His Val Asn
    135                 140                 145

Ala Trp Arg Ser Lys Gly Met Asn Leu Gly Ser Ser Trp Ala Tyr Gln
150                 155                 160                 165

Val Leu Ala Thr Glu Gly Tyr Gln Ser Ser Gly Arg Ser Asn Val Thr
                170                 175                 180

Val Trp


<210> SEQ ID NO 78
<211> LENGTH: 183
<212> TYPE: PRT
<213> ORGANISM: Geobacillus stearothermophilus

<400> SEQUENCE: 78

Ala Thr Asp Tyr Trp Gln Tyr Trp Thr Asp Gly Gly Gly Met Val Asn
1               5                   10                  15
```

```
Ala Val Asn Gly Pro Gly Gly Asn Tyr Ser Val Thr Trp Gln Asn Thr
            20                  25                  30

Gly Asn Phe Val Val Gly Lys Gly Trp Thr Val Gly Ser Pro Asn Arg
        35                  40                  45

Val Ile Asn Tyr Asn Ala Gly Ile Trp Glu Pro Ser Gly Asn Gly Tyr
    50                  55                  60

Leu Thr Leu Tyr Gly Trp Thr Arg Asn Ala Leu Ile Glu Tyr Tyr Val
65                  70                  75                  80

Val Asp Ser Trp Gly Thr Tyr Arg Pro Thr Gly Asn Tyr Lys Gly Thr
                85                  90                  95

Val Asn Ser Asp Gly Gly Thr Tyr Asp Ile Tyr Thr Thr Met Arg Tyr
            100                 105                 110

Asn Ala Pro Ser Ile Asp Gly Thr Gln Thr Phe Gln Gln Phe Trp Ser
        115                 120                 125

Val Arg Gln Ser Lys Arg Pro Thr Gly Ser Asn Val Ser Ile Thr Phe
    130                 135                 140

Ser Asn His Val Asn Ala Trp Arg Ser Lys Gly Met Asn Leu Gly Ser
145                 150                 155                 160

Ser Trp Ala Tyr Gln Val Leu Ala Thr Glu Gly Tyr Gln Ser Ser Gly
                165                 170                 175

Arg Ser Asn Val Thr Val Trp
            180


<210> SEQ ID NO 79
<211> LENGTH: 627
<212> TYPE: DNA
<213> ORGANISM: Artificial Sequence
<220> FEATURE:
<223> OTHER INFORMATION: Synthetic construct
<220> FEATURE:
<221> NAME/KEY: CDS
<222> LOCATION: (1)..(624)
<220> FEATURE:
<221> NAME/KEY: sig_peptide
<222> LOCATION: (1)..(81)
<220> FEATURE:
<221> NAME/KEY: mat_peptide
<222> LOCATION: (82)..(624)

<400> SEQUENCE: 79

atg aag aaa ccg ttg ggg aaa att gtc gca agc acc gca cta ctc att       48
Met Lys Lys Pro Leu Gly Lys Ile Val Ala Ser Thr Ala Leu Leu Ile
        -25                 -20                 -15

tct gtt gct ttt agt tca tcg atc gca tcg gct gac tat tgg caa tac       96
Ser Val Ala Phe Ser Ser Ile Ala Ser Ala Asp Tyr Trp Gln Tyr
    -10                 -5              -1  1               5

tgg aca gat ggt ggc ggt atg gtt aac gct gtt aac ggt cct gga ggc      144
Trp Thr Asp Gly Gly Gly Met Val Asn Ala Val Asn Gly Pro Gly Gly
                10                  15                  20

aac tat tct gtt act tgg cag aac aca ggc aac ttc gtt gtt ggc aaa      192
Asn Tyr Ser Val Thr Trp Gln Asn Thr Gly Asn Phe Val Val Gly Lys
            25                  30                  35

gga tgg acg gtt ggt tct cct aac cgc gtt atc aac tac aac gct ggc      240
Gly Trp Thr Val Gly Ser Pro Asn Arg Val Ile Asn Tyr Asn Ala Gly
        40                  45                  50

atc tgg gag cct tct ggc aac ggt tac ctt acg ctt tac ggc tgg aca      288
Ile Trp Glu Pro Ser Gly Asn Gly Tyr Leu Thr Leu Tyr Gly Trp Thr
    55                  60                  65

cgc aac gct ctt atc gag tac tat gtt gtt gac tct tgg ggc act tat      336
Arg Asn Ala Leu Ile Glu Tyr Tyr Val Val Asp Ser Trp Gly Thr Tyr
```

```
70                  75                  80                  85

cgc cct acg ggc aac tac aaa ggc acg gta aac tct gat ggt ggc acg      384
Arg Pro Thr Gly Asn Tyr Lys Gly Thr Val Asn Ser Asp Gly Gly Thr
                90                  95                  100

tac gac atc tat aca aca atg cgc tac aac gct cct tct atc gac ggc      432
Tyr Asp Ile Tyr Thr Thr Met Arg Tyr Asn Ala Pro Ser Ile Asp Gly
            105                 110                 115

act cag act ttt caa cag ttt tgg tca gtt cgc caa tct aaa cgc cct      480
Thr Gln Thr Phe Gln Gln Phe Trp Ser Val Arg Gln Ser Lys Arg Pro
        120                 125                 130

aca ggc tct aac gtt tct atc aca ttc tct aac cat gtt aac gct tgg      528
Thr Gly Ser Asn Val Ser Ile Thr Phe Ser Asn His Val Asn Ala Trp
    135                 140                 145

cgc tct aaa ggc atg aac ctt ggc agc tca tgg gct tat caa gta ctt      576
Arg Ser Lys Gly Met Asn Leu Gly Ser Ser Trp Ala Tyr Gln Val Leu
150                 155                 160                 165

gca act gag ggc tac caa tct tct gga cgc tct aac gtt aca gta tgg      624
Ala Thr Glu Gly Tyr Gln Ser Ser Gly Arg Ser Asn Val Thr Val Trp
                170                 175                 180

taa                                                                  627


<210> SEQ ID NO 80
<211> LENGTH: 208
<212> TYPE: PRT
<213> ORGANISM: Artificial Sequence
<220> FEATURE:
<223> OTHER INFORMATION: Synthetic Construct

<400> SEQUENCE: 80

Met Lys Lys Pro Leu Gly Lys Ile Val Ala Ser Thr Ala Leu Leu Ile
        -25                 -20                 -15

Ser Val Ala Phe Ser Ser Ser Ile Ala Ser Ala Asp Tyr Trp Gln Tyr
    -10                 -5                  -1  1               5

Trp Thr Asp Gly Gly Gly Met Val Asn Ala Val Asn Gly Pro Gly Gly
                10                  15                  20

Asn Tyr Ser Val Thr Trp Gln Asn Thr Gly Asn Phe Val Val Gly Lys
            25                  30                  35

Gly Trp Thr Val Gly Ser Pro Asn Arg Val Ile Asn Tyr Asn Ala Gly
        40                  45                  50

Ile Trp Glu Pro Ser Gly Asn Gly Tyr Leu Thr Leu Tyr Gly Trp Thr
    55                  60                  65

Arg Asn Ala Leu Ile Glu Tyr Tyr Val Val Asp Ser Trp Gly Thr Tyr
70                  75                  80                  85

Arg Pro Thr Gly Asn Tyr Lys Gly Thr Val Asn Ser Asp Gly Gly Thr
                90                  95                  100

Tyr Asp Ile Tyr Thr Thr Met Arg Tyr Asn Ala Pro Ser Ile Asp Gly
            105                 110                 115

Thr Gln Thr Phe Gln Gln Phe Trp Ser Val Arg Gln Ser Lys Arg Pro
        120                 125                 130

Thr Gly Ser Asn Val Ser Ile Thr Phe Ser Asn His Val Asn Ala Trp
    135                 140                 145

Arg Ser Lys Gly Met Asn Leu Gly Ser Ser Trp Ala Tyr Gln Val Leu
150                 155                 160                 165

Ala Thr Glu Gly Tyr Gln Ser Ser Gly Arg Ser Asn Val Thr Val Trp
                170                 175                 180


<210> SEQ ID NO 81
```

```
<211> LENGTH: 181
<212> TYPE: PRT
<213> ORGANISM: Artificial Sequence
<220> FEATURE:
<223> OTHER INFORMATION: Mature sequence

<400> SEQUENCE: 81

Asp Tyr Trp Gln Tyr Trp Thr Asp Gly Gly Gly Met Val Asn Ala Val
1               5                   10                  15

Asn Gly Pro Gly Gly Asn Tyr Ser Val Thr Trp Gln Asn Thr Gly Asn
            20                  25                  30

Phe Val Val Gly Lys Gly Trp Thr Val Gly Ser Pro Asn Arg Val Ile
        35                  40                  45

Asn Tyr Asn Ala Gly Ile Trp Glu Pro Ser Gly Asn Gly Tyr Leu Thr
    50                  55                  60

Leu Tyr Gly Trp Thr Arg Asn Ala Leu Ile Glu Tyr Tyr Val Val Asp
65                  70                  75                  80

Ser Trp Gly Thr Tyr Arg Pro Thr Gly Asn Tyr Lys Gly Thr Val Asn
                85                  90                  95

Ser Asp Gly Gly Thr Tyr Asp Ile Tyr Thr Thr Met Arg Tyr Asn Ala
            100                 105                 110

Pro Ser Ile Asp Gly Thr Gln Thr Phe Gln Gln Phe Trp Ser Val Arg
        115                 120                 125

Gln Ser Lys Arg Pro Thr Gly Ser Asn Val Ser Ile Thr Phe Ser Asn
    130                 135                 140

His Val Asn Ala Trp Arg Ser Lys Gly Met Asn Leu Gly Ser Ser Trp
145                 150                 155                 160

Ala Tyr Gln Val Leu Ala Thr Glu Gly Tyr Gln Ser Ser Gly Arg Ser
                165                 170                 175

Asn Val Thr Val Trp
            180


<210> SEQ ID NO 82
<211> LENGTH: 1026
<212> TYPE: DNA
<213> ORGANISM: Streptomyces beijiangensis
<220> FEATURE:
<221> NAME/KEY: CDS
<222> LOCATION: (1)..(1023)
<220> FEATURE:
<221> NAME/KEY: sig_peptide
<222> LOCATION: (1)..(126)
<220> FEATURE:
<221> NAME/KEY: mat_peptide
<222> LOCATION: (127)..(1023)

<400> SEQUENCE: 82

atg agc gca ccc gtg cca ctg ccc cgc aga cgc aga ccc ggc cgc ttc      48
Met Ser Ala Pro Val Pro Leu Pro Arg Arg Arg Arg Pro Gly Arg Phe
        -40                 -35                 -30

atg acc ctg ctg aga agc tcc tgg gcg atc gcc ctg gcc gcg gtc gcc      96
Met Thr Leu Leu Arg Ser Ser Trp Ala Ile Ala Leu Ala Ala Val Ala
    -25                 -20                 -15

gtg ctg ctg ctg ccc aac gcc gcc agc gcc gac acc gtc gtc aac tcg     144
Val Leu Leu Leu Pro Asn Ala Ala Ser Ala Asp Thr Val Val Asn Ser
-10                 -5              -1  1               5

aac cag acc ggc acc aac aac ggt tac tac tac tcg cac tgg agc gat     192
Asn Gln Thr Gly Thr Asn Asn Gly Tyr Tyr Tyr Ser His Trp Ser Asp
            10                  15                  20

ggc ggc ggc tcg gtg tcg atg acg ctg ggc tcg ggc ggc aac tac ggc     240
Gly Gly Gly Ser Val Ser Met Thr Leu Gly Ser Gly Gly Asn Tyr Gly
```

```
        25                  30                  35

tac cag tgg agc aac gtc gga aac ttc gtc ggc ggc aag ggg tgg agc      288
Tyr Gln Trp Ser Asn Val Gly Asn Phe Val Gly Gly Lys Gly Trp Ser
    40                  45                  50

acc ggc gga cgc aag tcc gtg aac tac tcc ggc agt ttc aac ccg tcg      336
Thr Gly Gly Arg Lys Ser Val Asn Tyr Ser Gly Ser Phe Asn Pro Ser
55                  60                  65                  70

ggc aac gcc tac ctc gcg ctc tac ggc tgg acc acc aac ccg ctg gtc      384
Gly Asn Ala Tyr Leu Ala Leu Tyr Gly Trp Thr Thr Asn Pro Leu Val
                75                  80                  85

gag tac tac gtc gtc gag aac ttc ggc acg tac cgc ccc acc ggc acc      432
Glu Tyr Tyr Val Val Glu Asn Phe Gly Thr Tyr Arg Pro Thr Gly Thr
            90                  95                  100

ttc aag ggc acg gtc acc agc gac gga ggc acc tac gac atc tat gag      480
Phe Lys Gly Thr Val Thr Ser Asp Gly Gly Thr Tyr Asp Ile Tyr Glu
        105                 110                 115

acg acc cgg gtg aac cag ccc tcg atc gag ggc acc aag acc ttc aag      528
Thr Thr Arg Val Asn Gln Pro Ser Ile Glu Gly Thr Lys Thr Phe Lys
    120                 125                 130

cag tac tgg agc gtc cgc cag tcg aag cgg acg ggg ggc acc atc acc      576
Gln Tyr Trp Ser Val Arg Gln Ser Lys Arg Thr Gly Gly Thr Ile Thr
135                 140                 145                 150

acg ggc aac cac ttc gac gcc tgg tcg agc cac ggc atg agc atg ggt      624
Thr Gly Asn His Phe Asp Ala Trp Ser Ser His Gly Met Ser Met Gly
                155                 160                 165

tcc ttc aac tac atg atc atg gcg acc gag ggc tac cag agc agc ggc      672
Ser Phe Asn Tyr Met Ile Met Ala Thr Glu Gly Tyr Gln Ser Ser Gly
            170                 175                 180

agc tcc aac atc acc gtc agc gag ggc agt tcc ggt ggc ggg acg ggc      720
Ser Ser Asn Ile Thr Val Ser Glu Gly Ser Ser Gly Gly Gly Thr Gly
        185                 190                 195

ggt ggc ggc acg ggc ggc ggt acg ggc ggc ggc ggc tcc ggc ggc tgc      768
Gly Gly Gly Thr Gly Gly Gly Thr Gly Gly Gly Gly Ser Gly Gly Cys
    200                 205                 210

acc gcg acg ctt tcc gcg gga gac aag tgg agc gac cgc tac aac ctg      816
Thr Ala Thr Leu Ser Ala Gly Asp Lys Trp Ser Asp Arg Tyr Asn Leu
215                 220                 225                 230

aac gtc tcc gtc tcc ggc gcc ggc aac tgg acc gtc acg atg aag gtc      864
Asn Val Ser Val Ser Gly Ala Gly Asn Trp Thr Val Thr Met Lys Val
                235                 240                 245

ccc tcg ccc gag aag gtg ctg tcc acc tgg aac gtg agc gcc gcc tac      912
Pro Ser Pro Glu Lys Val Leu Ser Thr Trp Asn Val Ser Ala Ala Tyr
            250                 255                 260

ccg gac agc cag acc ctc gtg gcc aag tcc aac ggc agc ggc agc aac      960
Pro Asp Ser Gln Thr Leu Val Ala Lys Ser Asn Gly Ser Gly Ser Asn
        265                 270                 275

tgg ggg gcg acc atc cag acc aac ggc tcc tgg acg tgg ccc acg gtc     1008
Trp Gly Ala Thr Ile Gln Thr Asn Gly Ser Trp Thr Trp Pro Thr Val
    280                 285                 290

acc tgc agc gcc ggc tga                                             1026
Thr Cys Ser Ala Gly
295


<210> SEQ ID NO 83
<211> LENGTH: 341
<212> TYPE: PRT
<213> ORGANISM: Streptomyces beijiangensis

<400> SEQUENCE: 83

Met Ser Ala Pro Val Pro Leu Pro Arg Arg Arg Arg Pro Gly Arg Phe
```

```
        -40                 -35                 -30

Met Thr Leu Leu Arg Ser Ser Trp Ala Ile Ala Leu Ala Ala Val Ala
    -25                 -20                 -15

Val Leu Leu Leu Pro Asn Ala Ala Ser Ala Asp Thr Val Val Asn Ser
-10                 -5                  -1  1               5

Asn Gln Thr Gly Thr Asn Asn Gly Tyr Tyr Tyr Ser His Trp Ser Asp
            10                  15                  20

Gly Gly Gly Ser Val Ser Met Thr Leu Gly Ser Gly Gly Asn Tyr Gly
        25                  30                  35

Tyr Gln Trp Ser Asn Val Gly Asn Phe Val Gly Gly Lys Gly Trp Ser
    40                  45                  50

Thr Gly Gly Arg Lys Ser Val Asn Tyr Ser Gly Ser Phe Asn Pro Ser
55                  60                  65                  70

Gly Asn Ala Tyr Leu Ala Leu Tyr Gly Trp Thr Thr Asn Pro Leu Val
                75                  80                  85

Glu Tyr Tyr Val Val Glu Asn Phe Gly Thr Tyr Arg Pro Thr Gly Thr
            90                  95                  100

Phe Lys Gly Thr Val Thr Ser Asp Gly Gly Thr Tyr Asp Ile Tyr Glu
        105                 110                 115

Thr Thr Arg Val Asn Gln Pro Ser Ile Glu Gly Thr Lys Thr Phe Lys
    120                 125                 130

Gln Tyr Trp Ser Val Arg Gln Ser Lys Arg Thr Gly Gly Thr Ile Thr
135                 140                 145                 150

Thr Gly Asn His Phe Asp Ala Trp Ser Ser His Gly Met Ser Met Gly
                155                 160                 165

Ser Phe Asn Tyr Met Ile Met Ala Thr Glu Gly Tyr Gln Ser Ser Gly
            170                 175                 180

Ser Ser Asn Ile Thr Val Ser Glu Gly Ser Ser Gly Gly Gly Thr Gly
        185                 190                 195

Gly Gly Gly Thr Gly Gly Gly Thr Gly Gly Gly Gly Ser Gly Gly Cys
    200                 205                 210

Thr Ala Thr Leu Ser Ala Gly Asp Lys Trp Ser Asp Arg Tyr Asn Leu
215                 220                 225                 230

Asn Val Ser Val Ser Gly Ala Gly Asn Trp Thr Val Thr Met Lys Val
                235                 240                 245

Pro Ser Pro Glu Lys Val Leu Ser Thr Trp Asn Val Ser Ala Ala Tyr
            250                 255                 260

Pro Asp Ser Gln Thr Leu Val Ala Lys Ser Asn Gly Ser Gly Ser Asn
        265                 270                 275

Trp Gly Ala Thr Ile Gln Thr Asn Gly Ser Trp Thr Trp Pro Thr Val
    280                 285                 290

Thr Cys Ser Ala Gly
295


<210> SEQ ID NO 84
<211> LENGTH: 299
<212> TYPE: PRT
<213> ORGANISM: Streptomyces beijiangensis

<400> SEQUENCE: 84

Asp Thr Val Val Asn Ser Asn Gln Thr Gly Thr Asn Asn Gly Tyr Tyr
1               5                   10                  15

Tyr Ser His Trp Ser Asp Gly Gly Gly Ser Val Ser Met Thr Leu Gly
            20                  25                  30
```

```
Ser Gly Gly Asn Tyr Gly Tyr Gln Trp Ser Asn Val Gly Asn Phe Val
        35                  40                  45

Gly Gly Lys Gly Trp Ser Thr Gly Gly Arg Lys Ser Val Asn Tyr Ser
    50                  55                  60

Gly Ser Phe Asn Pro Ser Gly Asn Ala Tyr Leu Ala Leu Tyr Gly Trp
65                  70                  75                  80

Thr Thr Asn Pro Leu Val Glu Tyr Tyr Val Val Glu Asn Phe Gly Thr
                85                  90                  95

Tyr Arg Pro Thr Gly Thr Phe Lys Gly Thr Val Thr Ser Asp Gly Gly
            100                 105                 110

Thr Tyr Asp Ile Tyr Glu Thr Thr Arg Val Asn Gln Pro Ser Ile Glu
        115                 120                 125

Gly Thr Lys Thr Phe Lys Gln Tyr Trp Ser Val Arg Gln Ser Lys Arg
    130                 135                 140

Thr Gly Gly Thr Ile Thr Thr Gly Asn His Phe Asp Ala Trp Ser Ser
145                 150                 155                 160

His Gly Met Ser Met Gly Ser Phe Asn Tyr Met Ile Met Ala Thr Glu
                165                 170                 175

Gly Tyr Gln Ser Ser Gly Ser Ser Asn Ile Thr Val Ser Glu Gly Ser
            180                 185                 190

Ser Gly Gly Gly Thr Gly Gly Gly Gly Thr Gly Gly Gly Thr Gly Gly
        195                 200                 205

Gly Gly Ser Gly Gly Cys Thr Ala Thr Leu Ser Ala Gly Asp Lys Trp
    210                 215                 220

Ser Asp Arg Tyr Asn Leu Asn Val Ser Val Ser Gly Ala Gly Asn Trp
225                 230                 235                 240

Thr Val Thr Met Lys Val Pro Ser Pro Glu Lys Val Leu Ser Thr Trp
                245                 250                 255

Asn Val Ser Ala Ala Tyr Pro Asp Ser Gln Thr Leu Val Ala Lys Ser
            260                 265                 270

Asn Gly Ser Gly Ser Asn Trp Gly Ala Thr Ile Gln Thr Asn Gly Ser
        275                 280                 285

Trp Thr Trp Pro Thr Val Thr Cys Ser Ala Gly
    290                 295
```

<210> SEQ ID NO 85
<211> LENGTH: 1005
<212> TYPE: DNA
<213> ORGANISM: Artificial Sequence
<220> FEATURE:
<223> OTHER INFORMATION: Expression construct
<220> FEATURE:
<221> NAME/KEY: CDS
<222> LOCATION: (1)..(1002)
<220> FEATURE:
<221> NAME/KEY: sig_peptide
<222> LOCATION: (1)..(81)
<220> FEATURE:
<221> NAME/KEY: mat_peptide
<222> LOCATION: (82)..(1002)

<400> SEQUENCE: 85

```
atg aag aaa ccg ttg ggg aaa att gtc gca agc acc gca cta ctc att       48
Met Lys Lys Pro Leu Gly Lys Ile Val Ala Ser Thr Ala Leu Leu Ile
        -25                 -20                 -15

tct gtt gct ttt agt tca tcg ata gca tca gca cat cat cat cac cat       96
Ser Val Ala Phe Ser Ser Ser Ile Ala Ser Ala His His His His His
    -10                 -5              -1  1               5

cat cct agg gac acc gtc gtc aac tcg aac cag acc ggc acc aac aac      144
```

His Pro Arg Asp Thr Val Val Asn Ser Asn Gln Thr Gly Thr Asn Asn
10 15 20 ggt tac tac tac tcg cac tgg agc gat ggc ggc ggc tcg gtg tcg atg 192
Gly Tyr Tyr Tyr Ser His Trp Ser Asp Gly Gly Gly Ser Val Ser Met
25 30 35 acg ctg ggc tcg ggc ggc aac tac ggc tac cag tgg agc aac gtc gga 240
Thr Leu Gly Ser Gly Gly Asn Tyr Gly Tyr Gln Trp Ser Asn Val Gly
40 45 50 aac ttc gtc ggc ggc aag ggg tgg agc acc ggc gga cgc aag tcc gtg 288
Asn Phe Val Gly Gly Lys Gly Trp Ser Thr Gly Gly Arg Lys Ser Val
55 60 65 aac tac tcc ggc agt ttc aac ccg tcg ggc aac gcc tac ctc gcg ctc 336
Asn Tyr Ser Gly Ser Phe Asn Pro Ser Gly Asn Ala Tyr Leu Ala Leu
70 75 80 85 tac ggc tgg acc acc aac ccg ctg gtc gag tac tac gtc gtc gag aac 384
Tyr Gly Trp Thr Thr Asn Pro Leu Val Glu Tyr Tyr Val Val Glu Asn
90 95 100 ttc ggc acg tac cgc ccc acc ggc acc ttc aag ggc acg gtc acc agc 432
Phe Gly Thr Tyr Arg Pro Thr Gly Thr Phe Lys Gly Thr Val Thr Ser
105 110 115 gac gga ggc acc tac gac atc tat gag acg acc cgg gtg aac cag ccc 480
Asp Gly Gly Thr Tyr Asp Ile Tyr Glu Thr Thr Arg Val Asn Gln Pro
120 125 130 tcg atc gag ggc acc aag acc ttc aag cag tac tgg agc gtc cgc cag 528
Ser Ile Glu Gly Thr Lys Thr Phe Lys Gln Tyr Trp Ser Val Arg Gln
135 140 145 tcg aag cgg acg ggg ggc acc atc acc acg ggc aac cac ttc gac gcc 576
Ser Lys Arg Thr Gly Gly Thr Ile Thr Thr Gly Asn His Phe Asp Ala
150 155 160 165 tgg tcg agc cac ggc atg agc atg ggt tcc ttc aac tac atg atc atg 624
Trp Ser Ser His Gly Met Ser Met Gly Ser Phe Asn Tyr Met Ile Met
170 175 180 gcg acc gag ggc tac cag agc agc ggc agc tcc aac atc acc gtc agc 672
Ala Thr Glu Gly Tyr Gln Ser Ser Gly Ser Ser Asn Ile Thr Val Ser
185 190 195 gag ggc agt tcc ggt ggc ggg acg ggc ggt ggc ggc acg ggc ggc ggt 720
Glu Gly Ser Ser Gly Gly Gly Thr Gly Gly Gly Gly Thr Gly Gly Gly
200 205 210 acg ggc ggc ggc ggc tcc ggc ggc tgc acc gcg acg ctt tcc gcg gga 768
Thr Gly Gly Gly Gly Ser Gly Gly Cys Thr Ala Thr Leu Ser Ala Gly
215 220 225 gac aag tgg agc gac cgc tac aac ctg aac gtc tcc gtc tcc ggc gcc 816
Asp Lys Trp Ser Asp Arg Tyr Asn Leu Asn Val Ser Val Ser Gly Ala
230 235 240 245 ggc aac tgg acc gtc acg atg aag gtc ccc tcg ccc gag aag gtg ctg 864
Gly Asn Trp Thr Val Thr Met Lys Val Pro Ser Pro Glu Lys Val Leu
250 255 260 tcc acc tgg aac gtg agc gcc gcc tac ccg gac agc cag acc ctc gtg 912
Ser Thr Trp Asn Val Ser Ala Ala Tyr Pro Asp Ser Gln Thr Leu Val
265 270 275 gcc aag tcc aac ggc agc ggc agc aac tgg ggg gcg acc atc cag acc 960
Ala Lys Ser Asn Gly Ser Gly Ser Asn Trp Gly Ala Thr Ile Gln Thr
280 285 290 aac ggc tcc tgg acg tgg ccc acg gtc acc tgc agc gcc ggc tga 1005
Asn Gly Ser Trp Thr Trp Pro Thr Val Thr Cys Ser Ala Gly
295 300 305

<210> SEQ ID NO 86
<211> LENGTH: 334
<212> TYPE: PRT

<213> ORGANISM: Artificial Sequence
<220> FEATURE:
<223> OTHER INFORMATION: Synthetic Construct

<400> SEQUENCE: 86

```
Met Lys Lys Pro Leu Gly Lys Ile Val Ala Ser Thr Ala Leu Leu Ile
        -25                 -20                 -15

Ser Val Ala Phe Ser Ser Ser Ile Ala Ser Ala His His His His His
    -10                 -5                  -1  1               5

His Pro Arg Asp Thr Val Val Asn Ser Asn Gln Thr Gly Thr Asn Asn
                10                  15                  20

Gly Tyr Tyr Tyr Ser His Trp Ser Asp Gly Gly Gly Ser Val Ser Met
            25                  30                  35

Thr Leu Gly Ser Gly Gly Asn Tyr Gly Tyr Gln Trp Ser Asn Val Gly
        40                  45                  50

Asn Phe Val Gly Gly Lys Gly Trp Ser Thr Gly Gly Arg Lys Ser Val
    55                  60                  65

Asn Tyr Ser Gly Ser Phe Asn Pro Ser Gly Asn Ala Tyr Leu Ala Leu
70                  75                  80                  85

Tyr Gly Trp Thr Thr Asn Pro Leu Val Glu Tyr Tyr Val Val Glu Asn
                90                  95                  100

Phe Gly Thr Tyr Arg Pro Thr Gly Thr Phe Lys Gly Thr Val Thr Ser
            105                 110                 115

Asp Gly Gly Thr Tyr Asp Ile Tyr Glu Thr Thr Arg Val Asn Gln Pro
        120                 125                 130

Ser Ile Glu Gly Thr Lys Thr Phe Lys Gln Tyr Trp Ser Val Arg Gln
    135                 140                 145

Ser Lys Arg Thr Gly Gly Thr Ile Thr Thr Gly Asn His Phe Asp Ala
150                 155                 160                 165

Trp Ser Ser His Gly Met Ser Met Gly Ser Phe Asn Tyr Met Ile Met
                170                 175                 180

Ala Thr Glu Gly Tyr Gln Ser Ser Gly Ser Ser Asn Ile Thr Val Ser
            185                 190                 195

Glu Gly Ser Ser Gly Gly Gly Thr Gly Gly Gly Gly Thr Gly Gly Gly
        200                 205                 210

Thr Gly Gly Gly Gly Ser Gly Gly Cys Thr Ala Thr Leu Ser Ala Gly
    215                 220                 225

Asp Lys Trp Ser Asp Arg Tyr Asn Leu Asn Val Ser Val Ser Gly Ala
230                 235                 240                 245

Gly Asn Trp Thr Val Thr Met Lys Val Pro Ser Pro Glu Lys Val Leu
                250                 255                 260

Ser Thr Trp Asn Val Ser Ala Ala Tyr Pro Asp Ser Gln Thr Leu Val
            265                 270                 275

Ala Lys Ser Asn Gly Ser Gly Ser Asn Trp Gly Ala Thr Ile Gln Thr
        280                 285                 290

Asn Gly Ser Trp Thr Trp Pro Thr Val Thr Cys Ser Ala Gly
    295                 300                 305
```

<210> SEQ ID NO 87
<211> LENGTH: 307
<212> TYPE: PRT
<213> ORGANISM: Artificial Sequence
<220> FEATURE:
<223> OTHER INFORMATION: Mature sequence with His-tag

<400> SEQUENCE: 87

```
His His His His His His Pro Arg Asp Thr Val Val Asn Ser Asn Gln
1               5                   10                  15

Thr Gly Thr Asn Asn Gly Tyr Tyr Tyr Ser His Trp Ser Asp Gly Gly
            20                  25                  30

Gly Ser Val Ser Met Thr Leu Gly Ser Gly Gly Asn Tyr Gly Tyr Gln
        35                  40                  45

Trp Ser Asn Val Gly Asn Phe Val Gly Gly Lys Gly Trp Ser Thr Gly
    50                  55                  60

Gly Arg Lys Ser Val Asn Tyr Ser Gly Ser Phe Asn Pro Ser Gly Asn
65                  70                  75                  80

Ala Tyr Leu Ala Leu Tyr Gly Trp Thr Thr Asn Pro Leu Val Glu Tyr
                85                  90                  95

Tyr Val Val Glu Asn Phe Gly Thr Tyr Arg Pro Thr Gly Thr Phe Lys
            100                 105                 110

Gly Thr Val Thr Ser Asp Gly Gly Thr Tyr Asp Ile Tyr Glu Thr Thr
        115                 120                 125

Arg Val Asn Gln Pro Ser Ile Glu Gly Thr Lys Thr Phe Lys Gln Tyr
    130                 135                 140

Trp Ser Val Arg Gln Ser Lys Arg Thr Gly Gly Thr Ile Thr Thr Gly
145                 150                 155                 160

Asn His Phe Asp Ala Trp Ser Ser His Gly Met Ser Met Gly Ser Phe
                165                 170                 175

Asn Tyr Met Ile Met Ala Thr Glu Gly Tyr Gln Ser Ser Gly Ser Ser
            180                 185                 190

Asn Ile Thr Val Ser Glu Gly Ser Ser Gly Gly Gly Thr Gly Gly Gly
        195                 200                 205

Gly Thr Gly Gly Gly Thr Gly Gly Gly Gly Ser Gly Gly Cys Thr Ala
    210                 215                 220

Thr Leu Ser Ala Gly Asp Lys Trp Ser Asp Arg Tyr Asn Leu Asn Val
225                 230                 235                 240

Ser Val Ser Gly Ala Gly Asn Trp Thr Val Thr Met Lys Val Pro Ser
                245                 250                 255

Pro Glu Lys Val Leu Ser Thr Trp Asn Val Ser Ala Ala Tyr Pro Asp
            260                 265                 270

Ser Gln Thr Leu Val Ala Lys Ser Asn Gly Ser Gly Ser Asn Trp Gly
        275                 280                 285

Ala Thr Ile Gln Thr Asn Gly Ser Trp Thr Trp Pro Thr Val Thr Cys
    290                 295                 300

Ser Ala Gly
305
```

<210> SEQ ID NO 88
<211> LENGTH: 188
<212> TYPE: PRT
<213> ORGANISM: Fusarium oxysporum

<400> SEQUENCE: 88

```
Thr Gln Pro Thr Thr Gly Thr Ser Gly Gly Tyr Tyr Phe Ser Phe Trp
1               5                   10                  15

Thr Asp Thr Pro Asn Ser Val Thr Tyr Thr Asn Gly Asn Gly Gly Gln
            20                  25                  30

Phe Ser Met Gln Trp Ser Gly Asn Gly Asn His Val Gly Gly Lys Gly
        35                  40                  45

Trp Met Pro Gly Thr Ser Arg Thr Ile Lys Tyr Ser Gly Ser Tyr Asn
    50                  55                  60
```

Pro Asn Gly Asn Ser Tyr Leu Ala Val Tyr Gly Trp Thr Arg Asn Pro
65 70 75 80

Leu Ile Glu Tyr Tyr Ile Val Glu Asn Phe Gly Thr Tyr Asn Pro Ser
85 90 95

Ser Gly Gly Gln Lys Lys Gly Glu Val Asn Val Asp Gly Ser Val Tyr
100 105 110

Asp Ile Tyr Val Ser Thr Arg Val Asn Ala Pro Ser Ile Asp Gly Asn
115 120 125

Lys Thr Phe Gln Gln Tyr Trp Ser Val Arg Arg Asn Lys Arg Ser Ser
130 135 140

Gly Ser Val Asn Thr Gly Ala His Phe Gln Ala Trp Lys Asn Val Gly
145 150 155 160

Leu Asn Leu Gly Thr His Asp Tyr Gln Ile Leu Ala Val Glu Gly Tyr
165 170 175

Tyr Ser Ser Gly Ser Ala Ser Met Thr Val Ser Gln
180 185

<210> SEQ ID NO 89
<211> LENGTH: 189
<212> TYPE: PRT
<213> ORGANISM: Aspergillus clavatus

<400> SEQUENCE: 89

Ala Gly Thr Pro Ser Ser Thr Gly Trp Asn Asn Gly Tyr Tyr Tyr Ser
1 5 10 15

Phe Trp Thr Asp Asn Gly Gly Thr Val Asn Tyr Gln Asn Gly Asn Gly
20 25 30

Gly Ser Tyr Ser Val Gln Trp Lys Asp Thr Gly Asn Phe Val Gly Gly
35 40 45

Lys Gly Trp Asn Pro Gly Ser Ala Arg Thr Ile Asn Tyr Ser Gly Ser
50 55 60

Phe Asn Pro Ser Gly Asn Ala Tyr Leu Thr Val Tyr Gly Trp Thr Thr
65 70 75 80

Asn Pro Leu Val Glu Tyr Tyr Ile Val Glu Asn Tyr Gly Thr Tyr Asn
85 90 95

Pro Gly Asn Gly Gly Thr Tyr Arg Gly Ser Val Tyr Ser Asp Gly Ala
100 105 110

Asn Tyr Asn Ile Tyr Thr Ala Thr Arg Tyr Asn Ala Pro Ser Ile Glu
115 120 125

Gly Asp Lys Thr Phe Thr Gln Tyr Trp Ser Val Arg Gln Ser Lys Arg
130 135 140

Thr Gly Gly Thr Val Thr Thr Ala Asn His Phe Asn Ala Trp Ala Gln
145 150 155 160

Leu Gly Met Ser Leu Gly Thr His Asn Tyr Gln Ile Val Ala Thr Glu
165 170 175

Gly Tyr Gln Ser Ser Gly Ser Ser Ser Ile Thr Val Tyr
180 185

<210> SEQ ID NO 90
<211> LENGTH: 27
<212> TYPE: PRT
<213> ORGANISM: Artificial Sequence
<220> FEATURE:
<223> OTHER INFORMATION: Bacillus lentus secretion signal

<400> SEQUENCE: 90

Met Lys Lys Pro Leu Gly Lys Ile Val Ala Ser Thr Ala Leu Leu Ile
1 5 10 15

Ser Val Ala Phe Ser Ser Ser Ile Ala Ser Ala
20 25

<210> SEQ ID NO 91
<211> LENGTH: 8
<212> TYPE: PRT
<213> ORGANISM: Artificial Sequence
<220> FEATURE:
<223> OTHER INFORMATION: His-tag RHHHHHHP

<400> SEQUENCE: 91

Arg His His His His His His Pro
1 5

<210> SEQ ID NO 92
<211> LENGTH: 8
<212> TYPE: PRT
<213> ORGANISM: Artificial Sequence
<220> FEATURE:
<223> OTHER INFORMATION: His-tag HHHHHHPR

<400> SEQUENCE: 92

His His His His His His Pro Arg
1 5

<210> SEQ ID NO 93
<211> LENGTH: 558
<212> TYPE: PRT
<213> ORGANISM: Humicola insolens
<220> FEATURE:
<221> NAME/KEY: signal
<222> LOCATION: (1)..(18)
<220> FEATURE:
<221> NAME/KEY: mat_peptide
<222> LOCATION: (19)..(558)

<400> SEQUENCE: 93

Met Leu Gly Leu Lys Val Leu Cys Leu Ser Ala Val Val Gly Thr Ala
-15 -10 -5

Val Ser Val Pro His Ala Gly Asn Leu Pro Arg Gln Ala Ser Thr Phe
-1 1 5 10

Thr Asn Pro Val Leu Trp Glu Asp His Pro Asp Leu Glu Val Phe Arg
15 20 25 30

Val Gly Ser Val Phe Tyr Tyr Ser Ser Ser Thr Phe Ala Tyr Ser Pro
35 40 45

Gly Ala Pro Val Leu Lys Ser Tyr Asp Leu Val His Trp Thr Pro Val
50 55 60

Thr His Ser Val Pro Arg Leu Asn Phe Gly Ser Asn Tyr Asp Leu Pro
65 70 75

Ser Gly Thr Pro Gly Ala Tyr Val Lys Gly Ile Trp Ala Ser Thr Leu
80 85 90

Arg Tyr Arg Arg Ser Asn Asp Arg Phe Tyr Trp Tyr Gly Cys Val Glu
95 100 105 110

Gly Arg Thr Tyr Leu Trp Thr Ser Pro Gly Gly Asn Ala Leu Ala Asn
115 120 125

Asn Gly Glu Val Pro Pro Ser Ala Trp Asn Trp Gln His Thr Ala Thr
130 135 140

Ile Asp Asn Cys Tyr Tyr Asp Ala Gly Leu Leu Ile Asp Asp Asp Asp
145 150 155

```
Thr Met Tyr Ile Ala Tyr Gly Asn Pro Thr Ile Asn Val Ala Gln Leu
    160                 165                 170

Ser Pro Asp Gly Thr Arg Gln Val Arg Val Gln Gln Arg Val Tyr Ala
175                 180                 185                 190

His Pro Gln Gly Gln Thr Val Glu Gly Ala Arg Met Tyr Lys Ile Arg
                195                 200                 205

Gly Asn Tyr Tyr Ile Leu Val Thr Arg Pro Ala Asp Ala Glu Tyr Val
            210                 215                 220

Leu Arg Ser Thr Thr Gly Ser Pro Phe Gly Pro Tyr Glu Ala Arg Thr
        225                 230                 235

Leu Val Ser Arg Ile Gln Gly Pro Leu Ala Asn Ala Gly Phe Ala His
    240                 245                 250

Gln Gly Gly Ile Val Asp Ala Pro Asp Gly Thr Trp His Tyr Val Ala
255                 260                 265                 270

Phe Met Asp Ala Tyr Pro Gly Gly Arg Ile Pro Val Val Ala Pro Leu
                275                 280                 285

Arg Trp Thr Ala Asp Gly Trp Pro Glu Val Val Thr Asp Ser Gln Gly
            290                 295                 300

Arg Trp Gly Thr Ser Tyr Pro Ile Pro Val Arg Gly Ala Lys Asn Ala
        305                 310                 315

Thr Glu Gly Leu Ala Ser Thr Asp Leu Asp Glu Phe Arg Gly Thr Arg
    320                 325                 330

Phe Ser Glu His Trp Glu Trp Asn His Asn Pro Asp Thr Ser Lys Phe
335                 340                 345                 350

Thr Leu Leu Gly Gly Asn Glu Gly Gly Leu Ile Leu Arg Thr Ala Thr
                355                 360                 365

Val Thr Gly Asp Leu Phe Ala Ala Arg Asn Thr Leu Thr Arg Arg Ile
            370                 375                 380

Ala Gly Pro Lys Ala Ser Gly Ile Phe Arg Leu Asp Val Arg Gly Met
        385                 390                 395

Arg Asp Gly Asp Arg Ala Gly Ala Val Leu Phe Arg Asp Arg Ala Ala
    400                 405                 410

Tyr Ile Gly Val Trp Lys Gln Gly Asn Glu Ala Arg Ile Val Met Val
415                 420                 425                 430

Asp Asp Leu Arg Leu Asn Glu Asp Gly Trp Arg Thr Ala Ser Thr Gly
                435                 440                 445

Arg Val Ala Ala Asn Gly Pro Val Ile Asp Thr Asn Ala Gln Gln Asp
            450                 455                 460

Ile Trp Leu Arg Ile Asp Ala Asp Ile Thr Pro Ala Phe Gly Thr Asn
        465                 470                 475

Thr Glu Arg Thr Thr Thr Phe Tyr Tyr Ser Ile Asp Gly Gly Arg Thr
    480                 485                 490

Tyr Thr Arg Leu Gly Pro Ala Phe Ala Met Thr Asn Ser Trp Arg Tyr
495                 500                 505                 510

Phe Thr Gly Tyr Arg Phe Gly Val Phe Asn Phe Ser Thr Lys Ser Leu
                515                 520                 525

Gly Gly Glu Val Lys Val Lys Gly Phe Lys Met Asn Met Ile
            530                 535                 540
```

<210> SEQ ID NO 94
<211> LENGTH: 643
<212> TYPE: PRT
<213> ORGANISM: Meripilus giganteus
<220> FEATURE:
<221> NAME/KEY: signal

```
<222> LOCATION: (1)..(16)
<220> FEATURE:
<221> NAME/KEY: mat_peptide
<222> LOCATION: (17)..(643)

<400> SEQUENCE: 94

Met Lys Leu Leu Phe Leu Leu Gly Ala Phe Val Ala Gln Cys Leu Ala
    -15                 -10                 -5                  -1

Val Thr Val Thr Val Asn Lys Asn Pro Ser His Thr Val Pro Ser Thr
1               5                   10                  15

Leu Tyr Gly Leu Met Phe Glu Asp Ile Asn His Ser Gly Asp Gly Gly
            20                  25                  30

Leu Tyr Ala Glu Leu Leu Gln Asn Arg Ala Phe Gln Gln Val Thr Pro
        35                  40                  45

Asn Thr Ala Ala Ala Leu Ala Ala Trp His Pro Ile Ser Asn Ala Lys
    50                  55                  60

Leu Ala Val Ile Gln Asp Pro Ser Pro Val Ser Asn Ala Leu Pro Asn
65                  70                  75                  80

Ser Leu Gln Phe Ser Val Pro Ser Gly Ser Ser Gly Arg Val Gly Phe
                85                  90                  95

Thr Asn Glu Gly Phe Trp Gly Ile Lys Val Asp Ser Thr Trp Thr Tyr
            100                 105                 110

Lys Ala Ser Leu Phe Phe Arg Phe Pro Thr Ser Ser Ser Phe Ser Gly
        115                 120                 125

Ala Leu Thr Val Gly Leu Gln Thr Asn Ala Gly Arg Val Leu Ala Gln
    130                 135                 140

Asn Ser Thr Gln Ile Arg Gly Thr Thr Thr Lys Trp Thr Gln Ile Asn
145                 150                 155                 160

Leu Glu Leu His Pro Thr Ala Ser Ala Pro Asp Val Ser Asn Ser Phe
                165                 170                 175

Phe Val Thr Ile Asp Gly Ala Ala Gly Ala Gly Gln Thr Ile Asn Phe
            180                 185                 190

Ala Met Phe Ser Leu Phe Pro Pro Thr Phe Lys Asn Arg Pro Asn Gly
        195                 200                 205

Leu Arg Ala Asp Ile Ala Glu Thr Leu Ala Glu Met Gly Pro Ser Phe
    210                 215                 220

Phe Arg Phe Pro Gly Gly Asn Asn Leu Glu Gly Gln Thr Thr Ala Thr
225                 230                 235                 240

Arg Trp Gln Trp Asn Ala Thr Val Gly Ser Leu Leu Asp Arg Pro Gly
                245                 250                 255

Arg Val Gly Asp Trp Gly Tyr Val Asn Thr Asp Gly Leu Gly Leu Leu
            260                 265                 270

Glu Tyr Leu Gln Phe Phe Glu Asp Thr Gly Met Glu Pro Ile Met Ala
        275                 280                 285

Val Trp Ala Gly Tyr Ser Leu Gly Gly Thr Ser Leu Ala Glu Asn Gln
    290                 295                 300

Leu Ala Pro Tyr Ile Gln Gln Ala Ile Asp Gln Ile Asn Phe Val Ile
305                 310                 315                 320

Gly Asp Pro Ala Lys Ser Ala Pro Ala Ala Leu Arg Ala Ser Leu Gly
                325                 330                 335

His Pro Glu Pro Phe Thr Leu Arg Phe Val Glu Val Gly Asn Glu Asp
            340                 345                 350

Phe Phe Ala Ala Gly Ser Tyr Pro Tyr Arg Trp His Asp Phe Val Thr
        355                 360                 365
```

```
Ala Leu Gln Ala Gln Phe Pro Gln Ile Arg Phe Ile Ala Thr Thr Asn
    370                 375                 380

Ala Trp Asn Pro Val Leu Ser Pro Val Pro Gln Ser Tyr Asp Val His
385                 390                 395                 400

Val Tyr Gln Thr Pro Thr Trp Phe Tyr Gln Asn Ala Phe Tyr Tyr Asp
                405                 410                 415

Gly Phe Gln Arg Asn Gly Thr Thr Tyr Phe Glu Gly Glu Tyr Ala Ala
            420                 425                 430

Ile Ser Thr Asn Ala Asn Asp Leu Phe Gly Thr Val Ala Asp Gly Arg
        435                 440                 445

Leu Ala Phe Pro Thr Val Gln Ser Ala Thr Gly Glu Ala Ala Phe Met
    450                 455                 460

Thr Gly Leu Glu Arg Asn Ser Asp Ile Val Phe Ala Ala Ser Tyr Ala
465                 470                 475                 480

Pro Leu Leu Gln His Val Asn Ser Thr Gln Trp Thr Pro Asp Leu Val
                485                 490                 495

Ser Tyr Asp Ala Gly Ser Val Ile Lys Ser Thr Ser Phe Phe Ala Gln
            500                 505                 510

Lys Leu Phe Ala Leu Asn Lys Gly Asp Gln Tyr Leu Pro Ser Thr Leu
        515                 520                 525

Pro Thr Asn Gly Gly Thr Leu His Trp Ser Ile Thr Arg Ala Ser Ser
    530                 535                 540

Ser Gly Lys Thr Phe Ile Lys Ile Ala Asn Ala Gly Ser Ser Ala Gln
545                 550                 555                 560

Ser Leu Thr Phe Gln Leu Thr Gln Phe Asn Ser Val Ser Ser Thr Gly
                565                 570                 575

Thr Leu Gln Val Leu Thr Gly Pro Glu Thr Ala Ser Asn Thr Pro Glu
            580                 585                 590

Ala Pro Gln Ala Ile Val Pro Lys Thr Ser Thr Ile Gly Thr Gly Lys
        595                 600                 605

Thr Phe Thr Tyr Asn Ala Pro Ala Phe Ser Val Ser Val Ile Thr Val
    610                 615                 620

Thr Thr Asn
625
```

<210> SEQ ID NO 95
<211> LENGTH: 1430
<212> TYPE: DNA
<213> ORGANISM: Talaroymces leycettanus

<400> SEQUENCE: 95

```
gccgactact cgggcaccta cggagtgacc accagcggca actccctccg cctcaacttc     60

gtcacccagg cgtcacagaa gaacgtcggc tcccgtcttt acctgatgga gaatgacaca    120

acctaccaga tcttcaagct gctgaaccag gagttcacct ttgatgtcga tgtgtccaac    180

ctgccgtaag tgacttacca tgaacccctg acgctatctt cttgttggct cccagctgac    240

tggccaattc aagctgcggc ttgaacggtg ctctctacct ggtggccatg gacgccgatg    300

gtggcatggc caagtacccc accaacaagg ctggtgccaa gtacggtacc gggtactgcg    360

actcccagtg tccccgcgac ctcaagttca tcaatggcga ggccaacgtc gagggctggc    420

agccgtcgtc caacgatccc aactctggca ttggcaacca cggatcctgc tgcgcggaga    480

tggatatctg ggaggccaac agcatctcca atgctgtcac tccccacccg tgcgacactc    540

ccggccaggt gatgtgcacc ggtaacaact gcggtggcac atacagcact actcgctatg    600
```

cgggcacttg cgatcccgac ggctgcgact tcaaccccta ccgcatgggc aaccacagct 660
tctacggccc taaacagatc gtcgatacca gctcgaagtt caccgtcgtg acgcagttcc 720
tcacggatga cggcacctcc accggcaccc tctctgaaat ccgccgcttc tatgtccaga 780
acggccaggt gatcccgaac tcggtgtcga ccatcagtgg cgtgagcggc aactccatca 840
ccaccgagtt ctgcactgcc cagaagcagg ccttcggcga cacggacgac ttctcaaagc 900
acggcggcct gtccggcatg agcgctgccc tctctcaggg tatggttctg gtcatgagtc 960
tgtgggatga tgtgagtttg atggacaaac atgcgcgttg acaaagagtc aagcagctga 1020
ctgagatgtt acagcacgcc gccaacatgc tctggctcga cagcacctac ccgaccaacg 1080
cgacctcctc cacccccggt gccgcccgtg gaacctgcga catctcgtcc ggtgtccctg 1140
cggatgtcga atccaacgac cccaacgcct acgtggtcta ctcgaacatc aaggttggtc 1200
ccatcggctc gaccttcagc agcagcggct ctggatcttc ttcctctagc tccaccacta 1260
ccacgaccac cgcttcccca accaccacga cctcctccgc atcgagcacc ggcactggag 1320
tggcacagca ctggggccag tgtggtggac agggctggac cggcccccaca acctgcgtca 1380 gcccttatac ttgccaggag ctgaaccctt actactacca gtgtctgtaa 1430

<210> SEQ ID NO 96
<211> LENGTH: 532
<212> TYPE: PRT
<213> ORGANISM: Talaromyces leycettanus

<400> SEQUENCE: 96

Met Ala Ser Leu Phe Ser Phe Lys Met Tyr Lys Ala Ala Leu Val Leu
1 5 10 15

Ser Ser Leu Leu Ala Ala Thr Gln Ala Gln Gln Ala Gly Thr Leu Thr
20 25 30

Thr Glu Thr His Pro Ser Leu Thr Trp Gln Gln Cys Ser Ala Gly Gly
35 40 45

Ser Cys Thr Thr Gln Asn Gly Lys Val Val Ile Asp Ala Asn Trp Arg
50 55 60

Trp Val His Ser Thr Ser Gly Ser Asn Asn Cys Tyr Thr Gly Asn Thr
65 70 75 80

Trp Asp Ala Thr Leu Cys Pro Asp Asp Val Thr Cys Ala Ala Asn Cys
85 90 95

Ala Leu Asp Gly Ala Asp Tyr Ser Gly Thr Tyr Gly Val Thr Thr Ser
100 105 110

Gly Asn Ser Leu Arg Leu Asn Phe Val Thr Gln Ala Ser Gln Lys Asn
115 120 125

Val Gly Ser Arg Leu Tyr Leu Met Glu Asn Asp Thr Thr Tyr Gln Ile
130 135 140

Phe Lys Leu Leu Asn Gln Glu Phe Thr Phe Asp Val Asp Val Ser Asn
145 150 155 160

Leu Pro Cys Gly Leu Asn Gly Ala Leu Tyr Leu Val Ala Met Asp Ala
165 170 175

Asp Gly Gly Met Ala Lys Tyr Pro Thr Asn Lys Ala Gly Ala Lys Tyr
180 185 190

Gly Thr Gly Tyr Cys Asp Ser Gln Cys Pro Arg Asp Leu Lys Phe Ile
195 200 205

Asn Gly Glu Ala Asn Val Glu Gly Trp Gln Pro Ser Ser Asn Asp Pro
210 215 220

Asn Ser Gly Ile Gly Asn His Gly Ser Cys Cys Ala Glu Met Asp Ile

```
225                 230                 235                 240

Trp Glu Ala Asn Ser Ile Ser Asn Ala Val Thr Pro His Pro Cys Asp
                245                 250                 255

Thr Pro Gly Gln Val Met Cys Thr Gly Asn Asn Cys Gly Gly Thr Tyr
            260                 265                 270

Ser Thr Thr Arg Tyr Ala Gly Thr Cys Asp Pro Asp Gly Cys Asp Phe
        275                 280                 285

Asn Pro Tyr Arg Met Gly Asn His Ser Phe Tyr Gly Pro Lys Gln Ile
    290                 295                 300

Val Asp Thr Ser Ser Lys Phe Thr Val Val Thr Gln Phe Leu Thr Asp
305                 310                 315                 320

Asp Gly Thr Ser Thr Gly Thr Leu Ser Glu Ile Arg Arg Phe Tyr Val
                325                 330                 335

Gln Asn Gly Gln Val Ile Pro Asn Ser Val Ser Thr Ile Ser Gly Val
            340                 345                 350

Ser Gly Asn Ser Ile Thr Thr Glu Phe Cys Thr Ala Gln Lys Gln Ala
        355                 360                 365

Phe Gly Asp Thr Asp Asp Phe Ser Lys His Gly Gly Leu Ser Gly Met
    370                 375                 380

Ser Ala Ala Leu Ser Gln Gly Met Val Leu Val Met Ser Leu Trp Asp
385                 390                 395                 400

Asp His Ala Ala Asn Met Leu Trp Leu Asp Ser Thr Tyr Pro Thr Asn
                405                 410                 415

Ala Thr Ser Ser Thr Pro Gly Ala Ala Arg Gly Thr Cys Asp Ile Ser
            420                 425                 430

Ser Gly Val Pro Ala Asp Val Glu Ser Asn Asp Pro Asn Ala Tyr Val
        435                 440                 445

Val Tyr Ser Asn Ile Lys Val Gly Pro Ile Gly Ser Thr Phe Ser Ser
    450                 455                 460

Ser Gly Ser Gly Ser Ser Ser Ser Ser Ser Thr Thr Thr Thr Thr Thr
465                 470                 475                 480

Ala Ser Pro Thr Thr Thr Thr Ser Ser Ala Ser Ser Thr Gly Thr Gly
                485                 490                 495

Val Ala Gln His Trp Gly Gln Cys Gly Gly Gln Gly Trp Thr Gly Pro
            500                 505                 510

Thr Thr Cys Val Ser Pro Tyr Thr Cys Gln Glu Leu Asn Pro Tyr Tyr
        515                 520                 525

Tyr Gln Cys Leu
    530


<210> SEQ ID NO 97
<211> LENGTH: 1898
<212> TYPE: DNA
<213> ORGANISM: Taloromyces leycettanus

<400> SEQUENCE: 97

atgcggtctc tcctggctct tgcccctacc ctgctcgcgc ctgttgttca ggctcagcaa      60

accatgtggg gtcaatgtaa gttcttttca ctgcttacca tgtataatct ttgatatcaa     120

gcatcatatc tgactcacgt tttaggcggt ggtcagggct ggaccggacc taccatctgt     180

gtagcaggcg cgacatgcag cacacagaac ccttgtaagt cgggccttca tcaaaacttc     240

aacatcacca cctcgatgga gcaggagttg acctgatctt taccccttagg gtatgcgcag     300

tgcaccccag cacctaccgc gccgacgacc ttgcaaacaa caactacgac gagctcgaaa     360
```

```
tcgtccacga ccacgagctc gaagtcgtcc acgaccacag gtggaagtgg cggtggaact    420
acgacctcaa cgtcagccac catcaccgcg gctccatctg gtaacccata ctccggatac    480
cagctctatg tgaaccagga atactcgtcc gaggtgtacg cgtctgctat tccttccctt    540
accggcactc tggtcgcgaa ggcaagcgcc gcggcagagg tgccatcttt cctgtggctg    600
taagtttttt tgaccttgaa tgaacgccct gtcctctacg agtggccgca ggagctaatt    660
gagatgccaa tgaacaggga cactgcctcc aaggtgccac tgatgggcac ttacttgcag    720
gatatccagg cgaagaacgc tgctggcgcc aaccccccat atgccggtca attcgtggtt    780
tacgacttgc cggatcgtga ttgcgctgca ttggccagca atggagagta ctccattgct    840
aacaatggtg ttgccaacta caaggcttac atcgactcca tccgcgcgct tcttgttcaa    900
tactcgaacg tccatgtcat ccttgtgatc ggtgagctat tgcagtctcg ctttaaagca    960
tttgactaga tcaatgtcgc taatggtacc taccgcacag agcccgacag cttggccaac   1020
cttgtcacca acctgaatgt tcagaagtgt gctaatgctc agagtgctta cctggagtgc   1080
atcaactatg ccctcactca gttgaacctc aagaacgttg ctatgtacat cgatgctggt   1140
gcgtgaacct tccctagtca gcccaaaata actgaaataa agagacggag tgtactgatt   1200
gtcatgcagg tcatgctgga tggctcggct ggcccgccaa ccttagcccg gccgctcaac   1260
tctttgcttc cgtataccag aatgcaagct ccccagctgc cgttcgcggc ctggcaacca   1320
acgtggccaa ctataatgcc tggtcgatcg ccacttgccc atcttacacc caaggcgacc   1380
ccaactgcga cgagcagaaa tacatcaacg ctctggctcc attgcttcag caacagggat   1440
ggtcatcagt tcactttatc accgataccg gtaagtctgc ctgtcctgcc aaccatgcgt   1500
tcaagagcgt tgcaatccta accatgctgg tatcttccag gccgtaacgg tgtccagcct   1560
accaagcaga atgcctgggg tgactggtgc aacgttatcg gaaccggctt cggtgtccgt   1620
cccaccacca acactggcga tccattggag gatgctttcg tctgggtcaa gcctggtggt   1680
gagagtgatg gtacttccaa ctccacttcg cctcgctacg acgcccactg cggttacagt   1740
gatgctcttc agcctgctcc tgaggctggt acctggttcg aggtaagctt ctgcatactg   1800
agatcgagaa tcctgaaagg gttaacctgc taatgcttcg gtgtttgata taggcttact   1860
ttgagcaact ccttaccaac gccaacccct ctttctaa                           1898
```

<210> SEQ ID NO 98
<211> LENGTH: 464
<212> TYPE: PRT
<213> ORGANISM: Taloromyces leycettanus

<400> SEQUENCE: 98

```
Met Arg Ser Leu Leu Ala Leu Ala Pro Thr Leu Leu Ala Pro Val Val
1               5                   10                  15

Gln Ala Gln Gln Thr Met Trp Gly Gln Cys Gly Gly Gln Gly Trp Thr
            20                  25                  30

Gly Pro Thr Ile Cys Val Ala Gly Ala Thr Cys Ser Thr Gln Asn Pro
        35                  40                  45

Trp Tyr Ala Gln Cys Thr Pro Ala Pro Thr Ala Pro Thr Thr Leu Gln
    50                  55                  60

Thr Thr Thr Thr Thr Ser Ser Lys Ser Ser Thr Thr Thr Ser Ser Lys
65                  70                  75                  80

Ser Ser Thr Thr Thr Gly Gly Ser Gly Gly Gly Thr Thr Thr Ser Thr
                85                  90                  95

Ser Ala Thr Ile Thr Ala Ala Pro Ser Gly Asn Pro Tyr Ser Gly Tyr
```

```
            100                 105                 110

Gln Leu Tyr Val Asn Gln Glu Tyr Ser Ser Glu Val Tyr Ala Ser Ala
        115                 120                 125

Ile Pro Ser Leu Thr Gly Thr Leu Val Ala Lys Ala Ser Ala Ala Ala
    130                 135                 140

Glu Val Pro Ser Phe Leu Trp Leu Asp Thr Ala Ser Lys Val Pro Leu
145                 150                 155                 160

Met Gly Thr Tyr Leu Gln Asp Ile Gln Ala Lys Asn Ala Ala Gly Ala
                165                 170                 175

Asn Pro Pro Tyr Ala Gly Gln Phe Val Val Tyr Asp Leu Pro Asp Arg
            180                 185                 190

Asp Cys Ala Ala Leu Ala Ser Asn Gly Glu Tyr Ser Ile Ala Asn Asn
        195                 200                 205

Gly Val Ala Asn Tyr Lys Ala Tyr Ile Asp Ser Ile Arg Ala Leu Leu
    210                 215                 220

Val Gln Tyr Ser Asn Val His Val Ile Leu Val Ile Glu Pro Asp Ser
225                 230                 235                 240

Leu Ala Asn Leu Val Thr Asn Leu Asn Val Gln Lys Cys Ala Asn Ala
                245                 250                 255

Gln Ser Ala Tyr Leu Glu Cys Ile Asn Tyr Ala Leu Thr Gln Leu Asn
            260                 265                 270

Leu Lys Asn Val Ala Met Tyr Ile Asp Ala Gly His Ala Gly Trp Leu
        275                 280                 285

Gly Trp Pro Ala Asn Leu Ser Pro Ala Ala Gln Leu Phe Ala Ser Val
    290                 295                 300

Tyr Gln Asn Ala Ser Ser Pro Ala Ala Val Arg Gly Leu Ala Thr Asn
305                 310                 315                 320

Val Ala Asn Tyr Asn Ala Trp Ser Ile Ala Thr Cys Pro Ser Tyr Thr
                325                 330                 335

Gln Gly Asp Pro Asn Cys Asp Glu Gln Lys Tyr Ile Asn Ala Leu Ala
            340                 345                 350

Pro Leu Leu Gln Gln Gln Gly Trp Ser Ser Val His Phe Ile Thr Asp
        355                 360                 365

Thr Gly Arg Asn Gly Val Gln Pro Thr Lys Gln Asn Ala Trp Gly Asp
    370                 375                 380

Trp Cys Asn Val Ile Gly Thr Gly Phe Gly Val Arg Pro Thr Thr Asn
385                 390                 395                 400

Thr Gly Asp Pro Leu Glu Asp Ala Phe Val Trp Val Lys Pro Gly Gly
                405                 410                 415

Glu Ser Asp Gly Thr Ser Asn Ser Thr Ser Pro Arg Tyr Asp Ala His
            420                 425                 430

Cys Gly Tyr Ser Asp Ala Leu Gln Pro Ala Pro Glu Ala Gly Thr Trp
        435                 440                 445

Phe Glu Ala Tyr Phe Glu Gln Leu Leu Thr Asn Ala Asn Pro Ser Phe
    450                 455                 460
```

<210> SEQ ID NO 99
<211> LENGTH: 3060
<212> TYPE: DNA
<213> ORGANISM: Aspergillus fumigatus

<400> SEQUENCE: 99

```
atgagattcg gttggctcga ggtggccgct ctgacggccg cttctgtagc caatgcccag      60

gtttgtgatg ctttcccgtc attgtttcgg atatagttga caatagtcat ggaaataatc     120
```

```
aggaattggc tttctctcca ccattctacc cttcgccttg ggctgatggc cagggagagt    180
gggcagatgc ccatcgacgc gccgtcgaga tcgtttctca gatgacactg gcggagaagg    240
ttaaccttac aacgggtact gggtgggttg cgactttttt gttgacagtg agctttcttc    300
actgaccatc tacacagatg ggaaatggac cgatgcgtcg gtcaaaccgg cagcgttccc    360
aggtaagctt gcaattctgc aacaacgtgc aagtgtagtt gctaaaacgc ggtggtgcag    420
acttggtatc aactggggtc tttgtggcca ggattcccct ttgggtatcc gtttctgtga    480
gctataccccg cggagtcttt cagtccttgt attatgtgct gatgattgtc tctgtatagc    540
tgacctcaac tccgccttcc ctgctggtac taatgtcgcc gcgacatggg acaagacact    600
cgcctacctt cgtggcaagg ccatgggtga ggaattcaac gacaagggcg tggacatttt    660
gctggggcct gctgctggtc ctctcggcaa atacccggac ggcggcagaa tctgggaagg    720
cttctctcct gatccggttc tcactggtgt acttttcgcc gaaactatca agggtatcca    780
agacgcgggt gtgattgcta ctgccaagca ttacattctg aatgaacagg agcatttccg    840
acaggttggc gaggcccagg gatatggtta caacatcacg gagacgatca gctccaacgt    900
ggatgacaag accatgcacg agttgtacct ttggtgagta gttgacactg caaatgagga    960
ccttgattga tttgactgac ctggaatgca ggccctttgc agatgctgtg cgcggtaaga   1020
ttttccgtag acttgacctc gcgacgaaga aatcgctgac gaaccatcgt agctggcgtt   1080
ggcgctgtca tgtgttccta caatcaaatc aacaacagct acggttgtca aaacagtcaa   1140
actctcaaca agctcctcaa ggctgagctg ggcttccaag gcttcgtcat gagtgactgg   1200
agcgctcacc acagcggtgt cggcgctgcc ctcgctgggt tggatatgtc gatgcctgga   1260
gacatttcct tcgacgacgg actctccttc tggggcacga acctaactgt cagtgttctt   1320
aacggcaccg ttccagcctg gcgtgtcgat gacatggctg ttcgtatcat gaccgcgtac   1380
tacaaggttg gtcgtgaccg tcttcgtatt cccccctaact tcagctcctg gacccgggat   1440
gagtacggct gggagcattc tgctgtctcc gagggagcct ggaccaaggt gaacgacttc   1500
gtcaatgtgc agcgcagtca ctctcagatc atccgtgaga ttggtgccgc tagtacagtg   1560
ctcttgaaga acacgggtgc tcttcctttg accggcaagg aggttaaagt gggtgttctc   1620
ggtgaagacg ctggttccaa cccgtggggt gctaacggct gccccgaccg cggctgtgat   1680
aacggcactc ttgctatggc ctggggtagt ggtactgcca acttccctta ccttgtcacc   1740
cccgagcagg ctatccagcg agaggtcatc agcaacggcg gcaatgtctt tgctgtgact   1800
gataacgggg ctctcagcca gatggcagat gttgcatctc aatccaggtg agtgcgggct   1860
cttagaaaaa gaacgttctc tgaatgaagt tttttaacca ttgcgaacag cgtgtctttg   1920
gtgtttgtca acgccgactc tggagagggt ttcatcagtg tcgacggcaa cgagggtgac   1980
cgcaaaaatc tcactctgtg gaagaacggc gaggccgtca ttgacactgt tgtcagccac   2040
tgcaacaaca cgattgtggt tattcacagt gttgggcccg tcttgatcga ccggtggtat   2100
gataacccca acgtcactgc catcatctgg gccggcttgc ccggtcagga gagtggcaac   2160
tccctggtcg acgtgctcta tggccgcgtc aaccccagcg ccaagacccc gttcacctgg   2220
ggcaagactc gggagtctta cggggctccc ttgctcaccg agcctaacaa tggcaatggt   2280
gctccccagg atgatttcaa cgagggcgtc ttcattgact accgtcactt tgacaagcgc   2340
aatgagaccc ccatttatga gtttggccat ggcttgagct acaccacctt tggttactct   2400
caccttcggg ttcaggccct caatagttcg agttcggcat atgtcccgac tagcggagag   2460
```

```
accaagcctg cgccaaccta tggtgagatc ggtagtgccg ccgactacct gtatcccgag   2520

ggtctcaaaa gaattaccaa gtttatttac ccttggctca actcgaccga cctcgaggat   2580

tcttctgacg acccgaacta cggctgggag gactcggagt acattcccga aggcgctagg   2640

gatgggtctc ctcaacccct cctgaaggct ggcggcgctc ctggtggtaa ccctaccctt   2700

tatcaggatc ttgttagggt gtcggccacc ataaccaaca ctggtaacgt cgccggttat   2760

gaagtccctc aattggtgag tgacccgcat gttccttgcg ttgcaatttg gctaactcgc   2820

ttctagtatg tttcactggg cggaccgaac gagcctcggg tcgttctgcg caagttcgac   2880

cgaatcttcc tggctcctgg ggagcaaaag gtttggacca cgactcttaa ccgtcgtgat   2940

ctcgccaatt gggatgtgga ggctcaggac tgggtcatca caaagtaccc caagaaagtg   3000

cacgtcggca gctcctcgcg taagctgcct ctgagagcgc ctctgccccg tgtctactag   3060
```

<210> SEQ ID NO 100
<211> LENGTH: 863
<212> TYPE: PRT
<213> ORGANISM: Aspergillus fumigatus

<400> SEQUENCE: 100

```
Met Arg Phe Gly Trp Leu Glu Val Ala Ala Leu Thr Ala Ala Ser Val
1               5                   10                  15

Ala Asn Ala Gln Glu Leu Ala Phe Ser Pro Pro Phe Tyr Pro Ser Pro
            20                  25                  30

Trp Ala Asp Gly Gln Gly Glu Trp Ala Asp Ala His Arg Arg Ala Val
        35                  40                  45

Glu Ile Val Ser Gln Met Thr Leu Ala Glu Lys Val Asn Leu Thr Thr
    50                  55                  60

Gly Thr Gly Trp Glu Met Asp Arg Cys Val Gly Gln Thr Gly Ser Val
65                  70                  75                  80

Pro Arg Leu Gly Ile Asn Trp Gly Leu Cys Gly Gln Asp Ser Pro Leu
                85                  90                  95

Gly Ile Arg Phe Ser Asp Leu Asn Ser Ala Phe Pro Ala Gly Thr Asn
            100                 105                 110

Val Ala Ala Thr Trp Asp Lys Thr Leu Ala Tyr Leu Arg Gly Lys Ala
        115                 120                 125

Met Gly Glu Glu Phe Asn Asp Lys Gly Val Asp Ile Leu Leu Gly Pro
    130                 135                 140

Ala Ala Gly Pro Leu Gly Lys Tyr Pro Asp Gly Gly Arg Ile Trp Glu
145                 150                 155                 160

Gly Phe Ser Pro Asp Pro Val Leu Thr Gly Val Leu Phe Ala Glu Thr
                165                 170                 175

Ile Lys Gly Ile Gln Asp Ala Gly Val Ile Ala Thr Ala Lys His Tyr
            180                 185                 190

Ile Leu Asn Glu Gln Glu His Phe Arg Gln Val Gly Glu Ala Gln Gly
        195                 200                 205

Tyr Gly Tyr Asn Ile Thr Glu Thr Ile Ser Ser Asn Val Asp Asp Lys
    210                 215                 220

Thr Met His Glu Leu Tyr Leu Trp Pro Phe Ala Asp Ala Val Arg Ala
225                 230                 235                 240

Gly Val Gly Ala Val Met Cys Ser Tyr Asn Gln Ile Asn Asn Ser Tyr
                245                 250                 255

Gly Cys Gln Asn Ser Gln Thr Leu Asn Lys Leu Leu Lys Ala Glu Leu
            260                 265                 270
```

```
Gly Phe Gln Gly Phe Val Met Ser Asp Trp Ser Ala His His Ser Gly
        275                 280                 285

Val Gly Ala Ala Leu Ala Gly Leu Asp Met Ser Met Pro Gly Asp Ile
    290                 295                 300

Ser Phe Asp Asp Gly Leu Ser Phe Trp Gly Thr Asn Leu Thr Val Ser
305                 310                 315                 320

Val Leu Asn Gly Thr Val Pro Ala Trp Arg Val Asp Asp Met Ala Val
                325                 330                 335

Arg Ile Met Thr Ala Tyr Tyr Lys Val Gly Arg Asp Arg Leu Arg Ile
            340                 345                 350

Pro Pro Asn Phe Ser Ser Trp Thr Arg Asp Glu Tyr Gly Trp Glu His
        355                 360                 365

Ser Ala Val Ser Glu Gly Ala Trp Thr Lys Val Asn Asp Phe Val Asn
    370                 375                 380

Val Gln Arg Ser His Ser Gln Ile Ile Arg Glu Ile Gly Ala Ala Ser
385                 390                 395                 400

Thr Val Leu Leu Lys Asn Thr Gly Ala Leu Pro Leu Thr Gly Lys Glu
                405                 410                 415

Val Lys Val Gly Val Leu Gly Glu Asp Ala Gly Ser Asn Pro Trp Gly
            420                 425                 430

Ala Asn Gly Cys Pro Asp Arg Gly Cys Asp Asn Gly Thr Leu Ala Met
        435                 440                 445

Ala Trp Gly Ser Gly Thr Ala Asn Phe Pro Tyr Leu Val Thr Pro Glu
    450                 455                 460

Gln Ala Ile Gln Arg Glu Val Ile Ser Asn Gly Gly Asn Val Phe Ala
465                 470                 475                 480

Val Thr Asp Asn Gly Ala Leu Ser Gln Met Ala Asp Val Ala Ser Gln
                485                 490                 495

Ser Ser Val Ser Leu Val Phe Val Asn Ala Asp Ser Gly Glu Gly Phe
            500                 505                 510

Ile Ser Val Asp Gly Asn Glu Gly Asp Arg Lys Asn Leu Thr Leu Trp
        515                 520                 525

Lys Asn Gly Glu Ala Val Ile Asp Thr Val Val Ser His Cys Asn Asn
    530                 535                 540

Thr Ile Val Val Ile His Ser Val Gly Pro Val Leu Ile Asp Arg Trp
545                 550                 555                 560

Tyr Asp Asn Pro Asn Val Thr Ala Ile Ile Trp Ala Gly Leu Pro Gly
                565                 570                 575

Gln Glu Ser Gly Asn Ser Leu Val Asp Val Leu Tyr Gly Arg Val Asn
            580                 585                 590

Pro Ser Ala Lys Thr Pro Phe Thr Trp Gly Lys Thr Arg Glu Ser Tyr
        595                 600                 605

Gly Ala Pro Leu Leu Thr Glu Pro Asn Asn Gly Asn Gly Ala Pro Gln
    610                 615                 620

Asp Asp Phe Asn Glu Gly Val Phe Ile Asp Tyr Arg His Phe Asp Lys
625                 630                 635                 640

Arg Asn Glu Thr Pro Ile Tyr Glu Phe Gly His Gly Leu Ser Tyr Thr
                645                 650                 655

Thr Phe Gly Tyr Ser His Leu Arg Val Gln Ala Leu Asn Ser Ser Ser
            660                 665                 670

Ser Ala Tyr Val Pro Thr Ser Gly Glu Thr Lys Pro Ala Pro Thr Tyr
        675                 680                 685

Gly Glu Ile Gly Ser Ala Ala Asp Tyr Leu Tyr Pro Glu Gly Leu Lys
```

```
    690                 695                 700

Arg Ile Thr Lys Phe Ile Tyr Pro Trp Leu Asn Ser Thr Asp Leu Glu
705                 710                 715                 720

Asp Ser Ser Asp Asp Pro Asn Tyr Gly Trp Glu Asp Ser Glu Tyr Ile
                725                 730                 735

Pro Glu Gly Ala Arg Asp Gly Ser Pro Gln Pro Leu Leu Lys Ala Gly
            740                 745                 750

Gly Ala Pro Gly Gly Asn Pro Thr Leu Tyr Gln Asp Leu Val Arg Val
        755                 760                 765

Ser Ala Thr Ile Thr Asn Thr Gly Asn Val Ala Gly Tyr Glu Val Pro
    770                 775                 780

Gln Leu Tyr Val Ser Leu Gly Gly Pro Asn Glu Pro Arg Val Val Leu
785                 790                 795                 800

Arg Lys Phe Asp Arg Ile Phe Leu Ala Pro Gly Glu Gln Lys Val Trp
                805                 810                 815

Thr Thr Thr Leu Asn Arg Arg Asp Leu Ala Asn Trp Asp Val Glu Ala
            820                 825                 830

Gln Asp Trp Val Ile Thr Lys Tyr Pro Lys Lys Val His Val Gly Ser
        835                 840                 845

Ser Ser Arg Lys Leu Pro Leu Arg Ala Pro Leu Pro Arg Val Tyr
    850                 855                 860
```

<210> SEQ ID NO 101
<211> LENGTH: 835
<212> TYPE: DNA
<213> ORGANISM: Penicillium sp. emersonii

<400> SEQUENCE: 101

```
atgctgtctt cgacgactcg caccctcgcc tttacaggcc ttgcgggcct tctgtccgct     60

cccctggtca aggcccatgg ctttgtccag ggcattgtca tcggtgacca attgtaagtc    120

cctctcttgc agttctgtcg attaactgct ggactgcttg cttgactccc tgctgactcc    180

caacagctac agcgggtaca tcgtcaactc gttcccctac gaatccaacc caccccccgt    240

catcggctgg gccacgaccg ccaccgacct gggcttcgtc gacggcacag gataccaagg    300

cccggacatc atctgccacc ggaatgcgac gcccgcgccg ctgacagccc ccgtggccgc    360

cggcggcacc gtcgagctgc agtggacgcc gtggccggac agccaccacg gacccgtcat    420

cacctacctg gcgccgtgca acggcaactg ctcgaccgtc gacaagacga cgctggagtt    480

cttcaagatc gaccagcagg gcctgatcga cgacacgagc ccgccgggca cctgggcgtc    540

ggacaacctc atcgccaaca acaatagctg gaccgtcacc attcccaaca gcgtcgcccc    600

cggcaactac gtcctgcgcc acgagatcat cgccctgcac tcggccaaca acaaggacgg    660

cgcccagaac tacccccagt gcatcaacat cgaggtcacg ggcggcggct ccgacgcgcc    720

tgagggtact ctgggcgagg atctctacca tgacaccgac ccgggcattc tggtcgacat    780

ttacgagccc attgcgacgt ataccattcc ggggccgcct gagccgacgt tctag         835
```

<210> SEQ ID NO 102
<211> LENGTH: 253
<212> TYPE: PRT
<213> ORGANISM: Penicillium sp. Emersonii

<400> SEQUENCE: 102

```
Met Leu Ser Ser Thr Thr Arg Thr Leu Ala Phe Thr Gly Leu Ala Gly
1               5                   10                  15
```

```
Leu Leu Ser Ala Pro Leu Val Lys Ala His Gly Phe Val Gln Gly Ile
            20                  25                  30

Val Ile Gly Asp Gln Phe Tyr Ser Gly Tyr Ile Val Asn Ser Phe Pro
        35                  40                  45

Tyr Glu Ser Asn Pro Pro Pro Val Ile Gly Trp Ala Thr Thr Ala Thr
    50                  55                  60

Asp Leu Gly Phe Val Asp Gly Thr Gly Tyr Gln Gly Pro Asp Ile Ile
65                  70                  75                  80

Cys His Arg Asn Ala Thr Pro Ala Pro Leu Thr Ala Pro Val Ala Ala
                85                  90                  95

Gly Gly Thr Val Glu Leu Gln Trp Thr Pro Trp Pro Asp Ser His His
            100                 105                 110

Gly Pro Val Ile Thr Tyr Leu Ala Pro Cys Asn Gly Asn Cys Ser Thr
        115                 120                 125

Val Asp Lys Thr Thr Leu Glu Phe Phe Lys Ile Asp Gln Gln Gly Leu
    130                 135                 140

Ile Asp Asp Thr Ser Pro Pro Gly Thr Trp Ala Ser Asp Asn Leu Ile
145                 150                 155                 160

Ala Asn Asn Asn Ser Trp Thr Val Thr Ile Pro Asn Ser Val Ala Pro
                165                 170                 175

Gly Asn Tyr Val Leu Arg His Glu Ile Ile Ala Leu His Ser Ala Asn
            180                 185                 190

Asn Lys Asp Gly Ala Gln Asn Tyr Pro Gln Cys Ile Asn Ile Glu Val
        195                 200                 205

Thr Gly Gly Gly Ser Asp Ala Pro Glu Gly Thr Leu Gly Glu Asp Leu
    210                 215                 220

Tyr His Asp Thr Asp Pro Gly Ile Leu Val Asp Ile Tyr Glu Pro Ile
225                 230                 235                 240

Ala Thr Tyr Thr Ile Pro Gly Pro Pro Glu Pro Thr Phe
                245                 250
```

```
<210> SEQ ID NO 103
<211> LENGTH: 1520
<212> TYPE: DNA
<213> ORGANISM: Talaromyces leycettanus

<400> SEQUENCE: 103

atggtccatc tttcttccct ggccctggct ttggccgccg gctcgcagct gtatgtgatc      60

catgccatga ctcgagaagt gctcccaaaa ctgactccaa gtctcaatct tagtgcccaa     120

gctgcaggtc ttaacactgc tgccaaagcg attggaaagc tctatttcgg taccgcaacc     180

gacaacccgg agctgtccga cagcacatac atgcaggaga cggataacac cgatgatttc     240

ggccaactca ccccagctaa ctccatgaag gttcgctgac atcttagttc cccccccctt     300

ttgggaatct gcgcggagat atgctgagcc ttcaaaacta gtgggatgcc accgagccct     360

ctcagaacac cttcaccttc accaacggtg atcagatcgc aaaccttgct aagagcaacg     420

gtcagatgct gagatgccac aacctggtgt ggtacaacca gttgcccagc tggggtaagc     480

aaccggttct gttaatatca tcagcgtgac cgcatcgatc gtattgcgcg gagattggaa     540

agatttgcaa gctaatgtca ctacagtcac cagcggatct tggaccaatg ccacgcttct     600

tgcggccatg aagaaccaca tcaccaacgt tgtgacccac tacaagggac agtgctacgc     660

ttgggatgtt gtcaacgaag gtacgtttcg attcggcttc cctcggaccg tatctgcagg     720

caaaaaggtc aatcaattga caatcgtgat ccccagctct caacgatgat ggcacctacc     780
```

```
gatccaatgt cttctatcag tacatcggcg aggcatacat tcccattgcc tttgcgaccg    840

ctgccgccgc cgatccaaac gcgaagctct actacaacga ctacaacatt gagtaccccg    900

gcgccaaggc caccgccgcc cagaacatcg tcaagatggt caaggcttac ggcgcgaaaa    960

tcgacggtgt cggtctgcaa tctcacttca tcgttggcag cacccctagc cagagctccc   1020

agcagagcaa catggctgct ttcaccgcgc tcggcgtcga ggtcgccatc accgaactgg   1080

atatccgcat gacgttgcct tccaccagtg ctctcttggc ccagcaatcc accgattacc   1140

agagcactgt gtcggcttgc gtgaacactc cgaagtgcat tggtatcacc ctctgggact   1200

ggaccgacaa gtactcctgg gttcccaaca ccttctccgg ccaaggtgac gcctgcccct   1260

gggattctaa ctaccagaag aagcctgcct actacggtat cttgactgcg ctcggaggca   1320

gcgcttccac ctccaccacc accactctgg tgacctccac caggacttcg actacgacca   1380

gcacttcggc cacctccacg tctactggcg ttgctcagca ctggggccag tgcggtggta   1440

tcggctggac agggccgact acctgcgcta gcccctacac ctgccaggaa ctgaatccct   1500

actactacca gtgcctgtaa                                                1520
```

<210> SEQ ID NO 104
<211> LENGTH: 405
<212> TYPE: PRT
<213> ORGANISM: Talaromyces leycettanus

<400> SEQUENCE: 104

```
Met Val His Leu Ser Ser Leu Ala Leu Ala Leu Ala Ala Gly Ser Gln
1               5                   10                  15

Leu Ala Gln Ala Ala Gly Leu Asn Thr Ala Ala Lys Ala Ile Gly Lys
            20                  25                  30

Leu Tyr Phe Gly Thr Ala Thr Asp Asn Pro Glu Leu Ser Asp Ser Thr
        35                  40                  45

Tyr Met Gln Glu Thr Asp Asn Thr Asp Asp Phe Gly Gln Leu Thr Pro
    50                  55                  60

Ala Asn Ser Met Lys Trp Asp Ala Thr Glu Pro Ser Gln Asn Thr Phe
65                  70                  75                  80

Thr Phe Thr Asn Gly Asp Gln Ile Ala Asn Leu Ala Lys Ser Asn Gly
                85                  90                  95

Gln Met Leu Arg Cys His Asn Leu Val Trp Tyr Asn Gln Leu Pro Ser
            100                 105                 110

Trp Val Thr Ser Gly Ser Trp Thr Asn Ala Thr Leu Leu Ala Ala Met
        115                 120                 125

Lys Asn His Ile Thr Asn Val Val Thr His Tyr Lys Gly Gln Cys Tyr
    130                 135                 140

Ala Trp Asp Val Val Asn Glu Ala Leu Asn Asp Asp Gly Thr Tyr Arg
145                 150                 155                 160

Ser Asn Val Phe Tyr Gln Tyr Ile Gly Glu Ala Tyr Ile Pro Ile Ala
                165                 170                 175

Phe Ala Thr Ala Ala Ala Ala Asp Pro Asn Ala Lys Leu Tyr Tyr Asn
            180                 185                 190

Asp Tyr Asn Ile Glu Tyr Pro Gly Ala Lys Ala Thr Ala Ala Gln Asn
        195                 200                 205

Ile Val Lys Met Val Lys Ala Tyr Gly Ala Lys Ile Asp Gly Val Gly
    210                 215                 220

Leu Gln Ser His Phe Ile Val Gly Ser Thr Pro Ser Gln Ser Ser Gln
225                 230                 235                 240
```

```
Gln Ser Asn Met Ala Ala Phe Thr Ala Leu Gly Val Glu Val Ala Ile
                245                 250                 255

Thr Glu Leu Asp Ile Arg Met Thr Leu Pro Ser Thr Ser Ala Leu Leu
            260                 265                 270

Ala Gln Gln Ser Thr Asp Tyr Gln Ser Thr Val Ser Ala Cys Val Asn
        275                 280                 285

Thr Pro Lys Cys Ile Gly Ile Thr Leu Trp Asp Trp Thr Asp Lys Tyr
    290                 295                 300

Ser Trp Val Pro Asn Thr Phe Ser Gly Gln Gly Asp Ala Cys Pro Trp
305                 310                 315                 320

Asp Ser Asn Tyr Gln Lys Lys Pro Ala Tyr Tyr Gly Ile Leu Thr Ala
                325                 330                 335

Leu Gly Gly Ser Ala Ser Thr Ser Thr Thr Thr Thr Leu Val Thr Ser
            340                 345                 350

Thr Arg Thr Ser Thr Thr Thr Ser Thr Ser Ala Thr Ser Thr Ser Thr
        355                 360                 365

Gly Val Ala Gln His Trp Gly Gln Cys Gly Gly Ile Gly Trp Thr Gly
    370                 375                 380

Pro Thr Thr Cys Ala Ser Pro Tyr Thr Cys Gln Glu Leu Asn Pro Tyr
385                 390                 395                 400

Tyr Tyr Gln Cys Leu
                405


<210> SEQ ID NO 105
<211> LENGTH: 1197
<212> TYPE: DNA
<213> ORGANISM: Trichophaea sacatta

<400> SEQUENCE: 105

atgcgtacct tctcgtctct tctcggtgtt gcccttctct tgggtgcagc taatgcccag     60

gtcgcggttt ggggacagtg tggtggcatt ggttactctg gctcgacaac ctgcgctgcg    120

ggaacgactt gtgttaagct gaacgactac tactcccaat gccaacccgg cggtaccact    180

ttgacaacca ccaccaaacc cgccaccact accactacca ccacggcaac ttctccctca    240

tcttctcccg gattaaatgc cctggcacaa aagagcggcc ggtacttcgg tagtgcaact    300

gacaacccag agctctccga tgcggcatac attgccatcc tgagcaacaa aaacgagttt    360

gggatcatca cgcctggaaa ctcgatgaaa tgggatgcta ctgaaccgtc ccgcgggagt    420

ttctcgttca ctggtggaca gcaaattgtt gattttgcgc agggcaatgg gcaggctatc    480

agaggccata ctcttgtctg gtactcccag ttgccgtcct gggttactag cggaaacttc    540

gataaagcta cattgacatc gatcatgcaa aatcacatta caactcttgt cagccactgg    600

aagggccagc tcgcctactg ggatgttgtc aacgaagcat tcaacgatga tggcactttc    660

cgtcaaaacg tgttctacac aaccattgga gaggactaca tccagctcgc cttcgaagcc    720

gcccgtgccg ccgacccgac cgcaaagctc tgcatcaacg actacaacat cgagggcact    780

ggagccaagt caacagccat gtacaatctc gtctcgaagc tgaaatccgc cggcgttccc    840

atcgactgta ttggtgttca gggacacctc atcgtcggtg aagttcccac caccatccaa    900

gcaaaccttg cccagtttgc gtctttgggt gtggatgtcg cgatcacgga gctagatatc    960

agaatgacgc tgccatctac gactgcattg ctccagcagc aggctaagga ttacgtctcg   1020

gttgttacag cctgcatgaa tgttcccagg tgtatcggta tcaccatctg ggactacact   1080

gataaatact cttgggtgcc acaaaccttc agcggccagg gcgatgcttg cccatgggat   1140
```

gccaacctgc agaagaagcc agcctactcc gctattgcgt ctgctcttgc ggcttga 1197

<210> SEQ ID NO 106
<211> LENGTH: 398
<212> TYPE: PRT
<213> ORGANISM: Trichophaea saccata

<400> SEQUENCE: 106

Met Arg Thr Phe Ser Ser Leu Leu Gly Val Ala Leu Leu Leu Gly Ala
1 5 10 15

Ala Asn Ala Gln Val Ala Val Trp Gly Gln Cys Gly Gly Ile Gly Tyr
20 25 30

Ser Gly Ser Thr Thr Cys Ala Ala Gly Thr Thr Cys Val Lys Leu Asn
35 40 45

Asp Tyr Tyr Ser Gln Cys Gln Pro Gly Gly Thr Thr Leu Thr Thr Thr
50 55 60

Thr Lys Pro Ala Thr Thr Thr Thr Thr Thr Thr Ala Thr Ser Pro Ser
65 70 75 80

Ser Ser Pro Gly Leu Asn Ala Leu Ala Gln Lys Ser Gly Arg Tyr Phe
85 90 95

Gly Ser Ala Thr Asp Asn Pro Glu Leu Ser Asp Ala Ala Tyr Ile Ala
100 105 110

Ile Leu Ser Asn Lys Asn Glu Phe Gly Ile Ile Thr Pro Gly Asn Ser
115 120 125

Met Lys Trp Asp Ala Thr Glu Pro Ser Arg Gly Ser Phe Ser Phe Thr
130 135 140

Gly Gly Gln Gln Ile Val Asp Phe Ala Gln Gly Asn Gly Gln Ala Ile
145 150 155 160

Arg Gly His Thr Leu Val Trp Tyr Ser Gln Leu Pro Ser Trp Val Thr
165 170 175

Ser Gly Asn Phe Asp Lys Ala Thr Leu Thr Ser Ile Met Gln Asn His
180 185 190

Ile Thr Thr Leu Val Ser His Trp Lys Gly Gln Leu Ala Tyr Trp Asp
195 200 205

Val Val Asn Glu Ala Phe Asn Asp Asp Gly Thr Phe Arg Gln Asn Val
210 215 220

Phe Tyr Thr Thr Ile Gly Glu Asp Tyr Ile Gln Leu Ala Phe Glu Ala
225 230 235 240

Ala Arg Ala Ala Asp Pro Thr Ala Lys Leu Cys Ile Asn Asp Tyr Asn
245 250 255

Ile Glu Gly Thr Gly Ala Lys Ser Thr Ala Met Tyr Asn Leu Val Ser
260 265 270

Lys Leu Lys Ser Ala Gly Val Pro Ile Asp Cys Ile Gly Val Gln Gly
275 280 285

His Leu Ile Val Gly Glu Val Pro Thr Thr Ile Gln Ala Asn Leu Ala
290 295 300

Gln Phe Ala Ser Leu Gly Val Asp Val Ala Ile Thr Glu Leu Asp Ile
305 310 315 320

Arg Met Thr Leu Pro Ser Thr Thr Ala Leu Leu Gln Gln Gln Ala Lys
325 330 335

Asp Tyr Val Ser Val Val Thr Ala Cys Met Asn Val Pro Arg Cys Ile
340 345 350

Gly Ile Thr Ile Trp Asp Tyr Thr Asp Lys Tyr Ser Trp Val Pro Gln
355 360 365

Thr Phe Ser Gly Gln Gly Asp Ala Cys Pro Trp Asp Ala Asn Leu Gln
    370                 375                 380

Lys Lys Pro Ala Tyr Ser Ala Ile Ala Ser Ala Leu Ala Ala
385                 390                 395

<210> SEQ ID NO 107
<211> LENGTH: 2391
<212> TYPE: DNA
<213> ORGANISM: Talaromyces emersonii

<400> SEQUENCE: 107
atgatgactc ccacggcgat tctcaccgca gtggcggcgc tcctgcccac cgcgacatgg 60
gcacaggata accaaaccta tgccaattac tcgtcgcagt ctcagccgga cctgtttccc 120
cggaccgtcg cgaccatcga cctgtccttc cccgactgtg agaatggccc gctcagcacg 180
aacctggtgt gcaacaaatc ggccgatccc tgggcccgag ctgaggccct catctcgctc 240
tttaccctcg aagagctgat taacaacacc cagaacaccg ctcctggcgt gccccgtttg 300
ggtctgcccc agtatcaggt gtggaatgaa gctctgcacg gactggaccg cgccaatttc 360
tcccattcgg gcgaatacag ctgggccacg tccttcccca tgcccatcct gtcgatggcg 420
tccttcaacc ggaccctcat caaccagatt gcctccatca ttgcaacgca agcccgtgcc 480
ttcaacaacg ccggccgtta cggccttgac agctatgcgc ccaacatcaa tggcttccgc 540
agtcccctct ggggccgtgg acaggagacg cctggtgagg atgcgttctt cttgagttcc 600
acctatgcgt acgagtacat cacaggcctg cagggcggtg tcgacccaga gcatgtcaag 660
atcgtcgcga cggcgaagca cttcgccggc tatgatctgg agaactgggg caacgtctct 720
cggctggggt tcaatgctat catcacgcag caggatctct ccgagtacta cacccctcag 780
ttcctggcgt ctgctcgata cgccaagacg cgcagcatca tgtgctccta caatgcagtg 840
aatggagtcc caagctgtgc caactccttc ttcctccaga cgcttctccg agaaaacttt 900
gacttcgttg acgacgggta cgtctcgtcg gattgcgacg ccgtctacaa cgtcttcaac 960
ccacacggtt acgcccttaa ccagtcggga gccgctgcgg actcgctcct agcaggtacc 1020
gatatcgact gtggtcagac cttgccgtgg cacctgaatg agtccttcgt agaaggatac 1080
gtctcccgcg gtgatatcga gaaatccctc acccgtctct actcaaacct ggtgcgtctc 1140
ggctactttg acggcaacaa cagcgagtac cgcaacctca actggaacga cgtcgtgact 1200
acggacgcct ggaacatctc gtacgaggcc gcggtggaag gtatcaccct gctcaagaac 1260
gacggaacgc tgccgctgtc caagaaggtc cgcagcattg cgctcatcgg tccttgggcc 1320
aatgccacgg tgcagatgca gggtaactac tatggaacgc caccgtatct gatcagtccg 1380
ctggaagccg ccaaggccag tgggttcacg gtcaactatg cattcggtac caacatctcg 1440
accgattcta cccagtggtt cgcggaagcc atcgcggcgg cgaagaagtc ggacgtgatc 1500
atctacgccg gtggtattga caacacgatc gaggcagagg gacaggaccg cacggatctc 1560
aagtggccgg ggaaccagct ggatctgatc gagcagctca gccaggtggg caagcccttg 1620
gtcgtcctgc agatgggcgg tggccaggtg gattcgtcgt cactcaaggc caacaagaat 1680
gtcaacgctc tggtgtgggg tggctatccc ggacagtcgg gtggtgcggc cctgtttgac 1740
atccttacgg gcaagcgtgc gccggccggt cgtctggtga gcacgcagta cccggccgag 1800
tatgcgacgc agttcccggc caacgacatg aacctgcgtc cgaacggcag caacccggga 1860
cagacataca tctggtacac gggcacgccc gtgtatgagt tcggccacgg tctgttctac 1920
acggagttcc aggagtcggc tgcggcgggc acgaacaaga cgtcgacttt cgacattctg 1980

```
gacctttct ccacccctca tccgggatac gagtacatcg agcaggttcc gttcatcaac   2040

gtgactgtgg acgtgaagaa cgtcggccac acgccatcgc cgtacacggg tctgttgttc   2100

gcgaacacga cagccgggcc caagccgtac ccgaacaaat ggctcgtcgg gttcgactgg   2160

ctgccgacga tccagccggg cgagactgcc aagttgacga tcccggtgcc gttgggcgcg   2220

attgcgtggg cggacgagaa cggcaacaag gtggtcttcc cgggcaacta cgaattggca   2280

ctgaacaatg agcgatcggt agtggtgtcg ttcacgctga cgggcgatgc ggcgactcta   2340

gagaaatggc ctttgtggga gcaggcggtt ccgggggtgc tgcagcaata a            2391
```

<210> SEQ ID NO 108
<211> LENGTH: 796
<212> TYPE: PRT
<213> ORGANISM: Talaromyces emersonii

<400> SEQUENCE: 108

```
Met Met Thr Pro Thr Ala Ile Leu Thr Ala Val Ala Ala Leu Leu Pro
1               5                   10                  15

Thr Ala Thr Trp Ala Gln Asp Asn Gln Thr Tyr Ala Asn Tyr Ser Ser
            20                  25                  30

Gln Ser Gln Pro Asp Leu Phe Pro Arg Thr Val Ala Thr Ile Asp Leu
        35                  40                  45

Ser Phe Pro Asp Cys Glu Asn Gly Pro Leu Ser Thr Asn Leu Val Cys
    50                  55                  60

Asn Lys Ser Ala Asp Pro Trp Ala Arg Ala Glu Ala Leu Ile Ser Leu
65                  70                  75                  80

Phe Thr Leu Glu Glu Leu Ile Asn Asn Thr Gln Asn Thr Ala Pro Gly
                85                  90                  95

Val Pro Arg Leu Gly Leu Pro Gln Tyr Gln Val Trp Asn Glu Ala Leu
            100                 105                 110

His Gly Leu Asp Arg Ala Asn Phe Ser His Ser Gly Glu Tyr Ser Trp
        115                 120                 125

Ala Thr Ser Phe Pro Met Pro Ile Leu Ser Met Ala Ser Phe Asn Arg
    130                 135                 140

Thr Leu Ile Asn Gln Ile Ala Ser Ile Ile Ala Thr Gln Ala Arg Ala
145                 150                 155                 160

Phe Asn Asn Ala Gly Arg Tyr Gly Leu Asp Ser Tyr Ala Pro Asn Ile
                165                 170                 175

Asn Gly Phe Arg Ser Pro Leu Trp Gly Arg Gly Gln Glu Thr Pro Gly
            180                 185                 190

Glu Asp Ala Phe Phe Leu Ser Ser Thr Tyr Ala Tyr Glu Tyr Ile Thr
        195                 200                 205

Gly Leu Gln Gly Gly Val Asp Pro Glu His Val Lys Ile Val Ala Thr
    210                 215                 220

Ala Lys His Phe Ala Gly Tyr Asp Leu Glu Asn Trp Gly Asn Val Ser
225                 230                 235                 240

Arg Leu Gly Phe Asn Ala Ile Ile Thr Gln Gln Asp Leu Ser Glu Tyr
                245                 250                 255

Tyr Thr Pro Gln Phe Leu Ala Ser Ala Arg Tyr Ala Lys Thr Arg Ser
            260                 265                 270

Ile Met Cys Ser Tyr Asn Ala Val Asn Gly Val Pro Ser Cys Ala Asn
        275                 280                 285

Ser Phe Phe Leu Gln Thr Leu Leu Arg Glu Asn Phe Asp Phe Val Asp
    290                 295                 300
```

```
Asp Gly Tyr Val Ser Ser Asp Cys Asp Ala Val Tyr Asn Val Phe Asn
305                 310                 315                 320

Pro His Gly Tyr Ala Leu Asn Gln Ser Gly Ala Ala Ala Asp Ser Leu
                325                 330                 335

Leu Ala Gly Thr Asp Ile Asp Cys Gly Gln Thr Leu Pro Trp His Leu
            340                 345                 350

Asn Glu Ser Phe Val Glu Gly Tyr Val Ser Arg Gly Asp Ile Glu Lys
        355                 360                 365

Ser Leu Thr Arg Leu Tyr Ser Asn Leu Val Arg Leu Gly Tyr Phe Asp
    370                 375                 380

Gly Asn Asn Ser Glu Tyr Arg Asn Leu Asn Trp Asn Asp Val Val Thr
385                 390                 395                 400

Thr Asp Ala Trp Asn Ile Ser Tyr Glu Ala Ala Val Glu Gly Ile Thr
                405                 410                 415

Leu Leu Lys Asn Asp Gly Thr Leu Pro Leu Ser Lys Lys Val Arg Ser
            420                 425                 430

Ile Ala Leu Ile Gly Pro Trp Ala Asn Ala Thr Val Gln Met Gln Gly
        435                 440                 445

Asn Tyr Tyr Gly Thr Pro Pro Tyr Leu Ile Ser Pro Leu Glu Ala Ala
    450                 455                 460

Lys Ala Ser Gly Phe Thr Val Asn Tyr Ala Phe Gly Thr Asn Ile Ser
465                 470                 475                 480

Thr Asp Ser Thr Gln Trp Phe Ala Glu Ala Ile Ala Ala Ala Lys Lys
                485                 490                 495

Ser Asp Val Ile Ile Tyr Ala Gly Gly Ile Asp Asn Thr Ile Glu Ala
            500                 505                 510

Glu Gly Gln Asp Arg Thr Asp Leu Lys Trp Pro Gly Asn Gln Leu Asp
        515                 520                 525

Leu Ile Glu Gln Leu Ser Gln Val Gly Lys Pro Leu Val Val Leu Gln
    530                 535                 540

Met Gly Gly Gly Gln Val Asp Ser Ser Ser Leu Lys Ala Asn Lys Asn
545                 550                 555                 560

Val Asn Ala Leu Val Trp Gly Gly Tyr Pro Gly Gln Ser Gly Gly Ala
                565                 570                 575

Ala Leu Phe Asp Ile Leu Thr Gly Lys Arg Ala Pro Ala Gly Arg Leu
            580                 585                 590

Val Ser Thr Gln Tyr Pro Ala Glu Tyr Ala Thr Gln Phe Pro Ala Asn
        595                 600                 605

Asp Met Asn Leu Arg Pro Asn Gly Ser Asn Pro Gly Gln Thr Tyr Ile
    610                 615                 620

Trp Tyr Thr Gly Thr Pro Val Tyr Glu Phe Gly His Gly Leu Phe Tyr
625                 630                 635                 640

Thr Glu Phe Gln Glu Ser Ala Ala Ala Gly Thr Asn Lys Thr Ser Thr
                645                 650                 655

Phe Asp Ile Leu Asp Leu Phe Ser Thr Pro His Pro Gly Tyr Glu Tyr
            660                 665                 670

Ile Glu Gln Val Pro Phe Ile Asn Val Thr Val Asp Val Lys Asn Val
        675                 680                 685

Gly His Thr Pro Ser Pro Tyr Thr Gly Leu Leu Phe Ala Asn Thr Thr
    690                 695                 700

Ala Gly Pro Lys Pro Tyr Pro Asn Lys Trp Leu Val Gly Phe Asp Trp
705                 710                 715                 720
```

```
Leu Pro Thr Ile Gln Pro Gly Glu Thr Ala Lys Leu Thr Ile Pro Val
                725                 730                 735

Pro Leu Gly Ala Ile Ala Trp Ala Asp Glu Asn Gly Asn Lys Val Val
            740                 745                 750

Phe Pro Gly Asn Tyr Glu Leu Ala Leu Asn Asn Glu Arg Ser Val Val
        755                 760                 765

Val Ser Phe Thr Leu Thr Gly Asp Ala Ala Thr Leu Glu Lys Trp Pro
    770                 775                 780

Leu Trp Glu Gln Ala Val Pro Gly Val Leu Gln Gln
785                 790                 795
```

<210> SEQ ID NO 109
<211> LENGTH: 1507
<212> TYPE: DNA
<213> ORGANISM: Trichoderma reesei

<400> SEQUENCE: 109

```
atggcgccct cagttacact gccgttgacc acggccatcc tggccattgc ccggctcgtc      60

gccgcccagc aaccgggtac cagcaccccc gaggtccatc ccaagttgac aacctacaag     120

tgtacaaagt ccggggggtg cgtggcccag gacacctcgg tggtccttga ctggaactac     180

cgctggatgc acgacgcaaa ctacaactcg tgcaccgtca acggcggcgt caacaccacg     240

ctctgccctg acgaggcgac ctgtggcaag aactgcttca tcgagggcgt cgactacgcc     300

gcctcgggcg tcacgacctc gggcagcagc ctcaccatga accagtacat gcccagcagc     360

tctggcggct acagcagcgt ctctcctcgg ctgtatctcc tggactctga cggtgagtac     420

gtgatgctga agctcaacgg ccaggagctg agcttcgacg tcgacctctc tgctctgccg     480

tgtggagaga acggctcgct ctacctgtct cagatggacg agaacggggg cgccaaccag     540

tataacacgg ccggtgccaa ctacgggagc ggctactgcg atgctcagtg ccccgtccag     600

acatggagga acggcaccct caacactagc caccagggct tctgctgcaa cgagatggat     660

atcctggagg gcaactcgag ggcgaatgcc ttgacccctc actcttgcac ggccacggcc     720

tgcgactctg ccggttgcgg cttcaacccc tatggcagcg gctacaaaag gtgagcctga     780

tgccactact acccctttcc tggcgctctc gcggttttcc atgctgacat ggttttccag     840

ctactacggc cccggagata ccgttgacac ctccaagacc ttcaccatca tcacccagtt     900

caacacggac aacggctcgc cctcgggcaa ccttgtgagc atcacccgca agtaccagca     960

aaacggcgtc gacatcccca gcgcccagcc cggcggcgac accatctcgt cctgcccgtc    1020

cgcctcagcc tacggcggcc tcgccaccat gggcaaggcc ctgagcagcg gcatggtgct    1080

cgtgttcagc atttggaacg acaacagcca gtacatgaac tggctcgaca gcggcaacgc    1140

cggcccctgc agcagcaccg agggcaaccc atccaacatc ctggccaaca accccaacac    1200

gcacgtcgtc ttctccaaca tccgctgggg agacattggg tctactacga actcgactgc    1260

gcccccgccc ccgcctgcgt ccagcacgac gttttcgact acacggagga gctcgacgac    1320

ttcgagcagc ccgagctgca cgcagactca ctgggggcag tgcggtggca ttgggtacag    1380

cgggtgcaag acgtgcacgt cgggcactac gtgccagtat agcaacgact gttcgtatcc    1440

ccatgcctga cgggagtgat tttgagatgc taaccgctaa aatacagact actcgcaatg    1500

cctttag                                                              1507
```

<210> SEQ ID NO 110
<211> LENGTH: 459
<212> TYPE: PRT

<213> ORGANISM: Trichoderma reseei

<400> SEQUENCE: 110

```
Met Ala Pro Ser Val Thr Leu Pro Leu Thr Thr Ala Ile Leu Ala Ile
1               5                   10                  15

Ala Arg Leu Val Ala Ala Gln Gln Pro Gly Thr Ser Thr Pro Glu Val
            20                  25                  30

His Pro Lys Leu Thr Thr Tyr Lys Cys Thr Lys Ser Gly Gly Cys Val
        35                  40                  45

Ala Gln Asp Thr Ser Val Val Leu Asp Trp Asn Tyr Arg Trp Met His
    50                  55                  60

Asp Ala Asn Tyr Asn Ser Cys Thr Val Asn Gly Gly Val Asn Thr Thr
65                  70                  75                  80

Leu Cys Pro Asp Glu Ala Thr Cys Gly Lys Asn Cys Phe Ile Glu Gly
                85                  90                  95

Val Asp Tyr Ala Ala Ser Gly Val Thr Thr Ser Gly Ser Ser Leu Thr
            100                 105                 110

Met Asn Gln Tyr Met Pro Ser Ser Ser Gly Gly Tyr Ser Ser Val Ser
        115                 120                 125

Pro Arg Leu Tyr Leu Leu Asp Ser Asp Gly Glu Tyr Val Met Leu Lys
    130                 135                 140

Leu Asn Gly Gln Glu Leu Ser Phe Asp Val Asp Leu Ser Ala Leu Pro
145                 150                 155                 160

Cys Gly Glu Asn Gly Ser Leu Tyr Leu Ser Gln Met Asp Glu Asn Gly
                165                 170                 175

Gly Ala Asn Gln Tyr Asn Thr Ala Gly Ala Asn Tyr Gly Ser Gly Tyr
            180                 185                 190

Cys Asp Ala Gln Cys Pro Val Gln Thr Trp Arg Asn Gly Thr Leu Asn
        195                 200                 205

Thr Ser His Gln Gly Phe Cys Cys Asn Glu Met Asp Ile Leu Glu Gly
    210                 215                 220

Asn Ser Arg Ala Asn Ala Leu Thr Pro His Ser Cys Thr Ala Thr Ala
225                 230                 235                 240

Cys Asp Ser Ala Gly Cys Gly Phe Asn Pro Tyr Gly Ser Gly Tyr Lys
                245                 250                 255

Ser Tyr Tyr Gly Pro Gly Asp Thr Val Asp Thr Ser Lys Thr Phe Thr
            260                 265                 270

Ile Ile Thr Gln Phe Asn Thr Asp Asn Gly Ser Pro Ser Gly Asn Leu
        275                 280                 285

Val Ser Ile Thr Arg Lys Tyr Gln Gln Asn Gly Val Asp Ile Pro Ser
    290                 295                 300

Ala Gln Pro Gly Gly Asp Thr Ile Ser Ser Cys Pro Ser Ala Ser Ala
305                 310                 315                 320

Tyr Gly Gly Leu Ala Thr Met Gly Lys Ala Leu Ser Ser Gly Met Val
                325                 330                 335

Leu Val Phe Ser Ile Trp Asn Asp Asn Ser Gln Tyr Met Asn Trp Leu
            340                 345                 350

Asp Ser Gly Asn Ala Gly Pro Cys Ser Ser Thr Glu Gly Asn Pro Ser
        355                 360                 365

Asn Ile Leu Ala Asn Asn Pro Asn Thr His Val Val Phe Ser Asn Ile
    370                 375                 380

Arg Trp Gly Asp Ile Gly Ser Thr Thr Asn Ser Thr Ala Pro Pro Pro
385                 390                 395                 400
```

```
Pro Pro Ala Ser Ser Thr Thr Phe Ser Thr Thr Arg Arg Ser Ser Thr
                405                 410                 415

Thr Ser Ser Ser Pro Ser Cys Thr Gln Thr His Trp Gly Gln Cys Gly
            420                 425                 430

Gly Ile Gly Tyr Ser Gly Cys Lys Thr Cys Thr Ser Gly Thr Thr Cys
        435                 440                 445

Gln Tyr Ser Asn Asp Tyr Tyr Ser Gln Cys Leu
    450                 455
```

<210> SEQ ID NO 111
<211> LENGTH: 1507
<212> TYPE: DNA
<213> ORGANISM: Tirchoderma reesei

<400> SEQUENCE: 111

```
atggcgccct cagttacact gccgttgacc acggccatcc tggccattgc ccggctcgtc     60

gccgcccagc aaccgggtac cagcaccccc gaggtccatc ccaagttgac aacctacaag    120

tgtacaaagt ccggggggtg cgtggcccag gacacctcgg tggtccttga ctggaactac    180

cgctggatgc acgacgcaaa ctacaactcg tgcaccgtca acggcggcgt caacaccacg    240

ctctgccctg acgaggcgac ctgtggcaag aactgcttca tcgagggcgt cgactacgcc    300

gcctcgggcg tcacgacctc gggcagcagc ctcaccatga accagtacat gcccagcagc    360

tctggcggct acagcagcgt ctctcctcgg ctgtatctcc tggactctga cggtgagtac    420

gtgatgctga agctcaacgg ccaggagctg agcttcgacg tcgacctctc tgctctgccg    480

tgtggagaga acggctcgct ctacctgtct cagatggacg agaacggggg cgccaaccag    540

tataacacgg ccggtgccaa ctacgggagc ggctactgcg atgctcagtg ccccgtccag    600

acatggagga acggcaccct caacactagc caccagggct tctgctgcaa cgagatggat    660

atcctggagg gcaactcgag ggcgaatgcc ttgacccctc actcttgcac ggccacggcc    720

tgcgactctg ccggttgcgg cttcaacccc tatggcagcg gctacaaaag gtgagcctga    780

tgccactact accccttcc tggcgctctc gcggttttcc atgctgacat ggttttccag    840

ctactacggc cccggagata ccgttgacac ctccaagacc ttcaccatca tcacccagtt    900

caacacggac aacggctcgc cctcgggcaa ccttgtgagc atcacccgca agtaccagca    960

aaacggcgtc gacatcccca gcgcccagcc cggcggcgac accatctcgt cctgcccgtc   1020

cgcctcagcc tacggcggcc tcgccaccat gggcaaggcc ctgagcagcg gcatggtgct   1080

cgtgttcagc atttggaacg acaacagcca gtacatgaac tggctcgaca gcggcaacgc   1140

cggcccctgc agcagcaccg agggcaaccc atccaacatc ctggccaaca accccaacac   1200

gcacgtcgtc ttctccaaca tccgctgggg agacattggg tctactacga actcgactgc   1260

gcccccgccc ccgcctgcgt ccagcacgac gttttcgact acacggagga gctcgacgac   1320

ttcgagcagc ccgagctgca cgcagactca ctgggggcag tgcggtggca ttgggtacag   1380

cgggtgcaag acgtgcacgt cggcactac gtgccagtat agcaacgact gttcgtatcc   1440

ccatgcctga cgggagtgat tttgagatgc taaccgctaa aatacagact actcgcaatg   1500

cctttag                                                             1507
```

<210> SEQ ID NO 112
<211> LENGTH: 418
<212> TYPE: PRT
<213> ORGANISM: Trichoderma Reesei

<400> SEQUENCE: 112

```
Met Asn Lys Ser Val Ala Pro Leu Leu Leu Ala Ala Ser Ile Leu Tyr
1               5                   10                  15

Gly Gly Ala Ala Ala Gln Gln Thr Val Trp Gly Gln Cys Gly Gly Ile
            20                  25                  30

Gly Trp Ser Gly Pro Thr Asn Cys Ala Pro Gly Ser Ala Cys Ser Thr
        35                  40                  45

Leu Asn Pro Tyr Tyr Ala Gln Cys Ile Pro Gly Ala Thr Thr Ile Thr
    50                  55                  60

Thr Ser Thr Arg Pro Pro Ser Gly Pro Thr Thr Thr Thr Arg Ala Thr
65                  70                  75                  80

Ser Thr Ser Ser Ser Thr Pro Pro Thr Ser Ser Gly Val Arg Phe Ala
                85                  90                  95

Gly Val Asn Ile Ala Gly Phe Asp Phe Gly Cys Thr Thr Asp Gly Thr
            100                 105                 110

Cys Val Thr Ser Lys Val Tyr Pro Pro Leu Lys Asn Phe Thr Gly Ser
        115                 120                 125

Asn Asn Tyr Pro Asp Gly Ile Gly Gln Met Gln His Phe Val Asn Asp
    130                 135                 140

Asp Gly Met Thr Ile Phe Arg Leu Pro Val Gly Trp Gln Tyr Leu Val
145                 150                 155                 160

Asn Asn Asn Leu Gly Gly Asn Leu Asp Ser Thr Ser Ile Ser Lys Tyr
                165                 170                 175

Asp Gln Leu Val Gln Gly Cys Leu Ser Leu Gly Ala Tyr Cys Ile Val
            180                 185                 190

Asp Ile His Asn Tyr Ala Arg Trp Asn Gly Gly Ile Ile Gly Gln Gly
        195                 200                 205

Gly Pro Thr Asn Ala Gln Phe Thr Ser Leu Trp Ser Gln Leu Ala Ser
    210                 215                 220

Lys Tyr Ala Ser Gln Ser Arg Val Trp Phe Gly Ile Met Asn Glu Pro
225                 230                 235                 240

His Asp Val Asn Ile Asn Thr Trp Ala Ala Thr Val Gln Glu Val Val
                245                 250                 255

Thr Ala Ile Arg Asn Ala Gly Ala Thr Ser Gln Phe Ile Ser Leu Pro
            260                 265                 270

Gly Asn Asp Trp Gln Ser Ala Gly Ala Phe Ile Ser Asp Gly Ser Ala
        275                 280                 285

Ala Ala Leu Ser Gln Val Thr Asn Pro Asp Gly Ser Thr Thr Asn Leu
    290                 295                 300

Ile Phe Asp Val His Lys Tyr Leu Asp Ser Asp Asn Ser Gly Thr His
305                 310                 315                 320

Ala Glu Cys Thr Thr Asn Asn Ile Asp Gly Ala Phe Ser Pro Leu Ala
                325                 330                 335

Thr Trp Leu Arg Gln Asn Asn Arg Gln Ala Ile Leu Thr Glu Thr Gly
            340                 345                 350

Gly Gly Asn Val Gln Ser Cys Ile Gln Asp Met Cys Gln Gln Ile Gln
        355                 360                 365

Tyr Leu Asn Gln Asn Ser Asp Val Tyr Leu Gly Tyr Val Gly Trp Gly
    370                 375                 380

Ala Gly Ser Phe Asp Ser Thr Tyr Val Leu Thr Glu Thr Pro Thr Gly
385                 390                 395                 400

Ser Gly Asn Ser Trp Thr Asp Thr Ser Leu Val Ser Ser Cys Leu Ala
                405                 410                 415
```

Arg Lys

<210> SEQ ID NO 113
<211> LENGTH: 1599
<212> TYPE: DNA
<213> ORGANISM: Aspergillus Fumigatus

<400> SEQUENCE: 113
atgctggcct ccaccttctc ctaccgcatg tacaagaccg cgctcatcct ggccgccctt 60
ctgggctctg gccaggctca gcaggtcggt acttcccagg cggaagtgca tccgtccatg 120
acctggcaga gctgcacggc tggcggcagc tgcaccacca acaacggcaa ggtggtcatc 180
gacgcgaact ggcgttgggt gcacaaagtc ggcgactaca ccaactgcta caccggcaac 240
acctgggaca cgactatctg ccctgacgat gcgacctgcg catccaactg cgcccttgag 300
ggtgccaact acgaatccac ctatggtgtg accgccagcg gcaattccct ccgcctcaac 360
ttcgtcacca ccagccagca gaagaacatt ggctcgcgtc tgtacatgat gaaggacgac 420
tcgacctacg agatgtttaa gctgctgaac caggagttca ccttcgatgt cgatgtctcc 480
aacctcccct gcggtctcaa cggtgctctg tactttgtcg ccatggacgc cgacggtggc 540
atgtccaagt acccaaccaa caaggccggt gccaagtacg gtactggata ctgtgactcg 600
cagtgccctc gcgacctcaa gttcatcaac ggtcaggcca acgtcgaagg gtggcagccc 660
tcctccaacg atgccaatgc gggtaccggc aaccacgggt cctgctgcgc ggagatggat 720
atctgggagg ccaacagcat ctccacggcc ttcaccccc atccgtgcga cacgcccggc 780
caggtgatgt gcaccggtga tgcctgcggt ggcacctaca gctccgaccg ctacggcggc 840
acctgcgacc ccgacggatg tgatttcaac tccttccgcc agggcaacaa gaccttctac 900
ggccctggca tgaccgtcga caccaagagc aagtttaccg tcgtcaccca gttcatcacc 960
gacgacggca cctccagcgg caccctcaag gagatcaagc gcttctacgt gcagaacggc 1020
aaggtgatcc ccaactcgga gtcgacctgg accggcgtca gcggcaactc catcaccacc 1080
gagtactgca ccgcccagaa gagcctgttc caggaccaga acgtcttcga aaagcacggc 1140
ggcctcgagg gcatgggtgc tgccctcgcc cagggtatgg ttctcgtcat gtccctgtgg 1200
gatgatcact cggccaacat gctctggctc gacagcaact acccgaccac tgcctcttcc 1260
accactcccg gcgtcgcccg tggtacctgc gacatctcct ccggcgtccc tgcggatgtc 1320
gaggcgaacc accccgacgc ctacgtcgtc tactccaaca tcaaggtcgg ccccatcggc 1380
tcgaccttca acagcggtgg ctcgaacccc ggtggcggaa ccaccacgac aactaccacc 1440
cagcctacta ccaccacgac cacggctgga aaccctggcg gcaccggagt cgcacagcac 1500
tatggccagt gtggtggaat cggatggacc ggacccacaa cctgtgccag cccttatacc 1560
tgccagaagc tgaatgatta ttactctcag tgcctgtag 1599

<210> SEQ ID NO 114
<211> LENGTH: 532
<212> TYPE: PRT
<213> ORGANISM: Aspergillus fumigatus

<400> SEQUENCE: 114

Met Leu Ala Ser Thr Phe Ser Tyr Arg Met Tyr Lys Thr Ala Leu Ile
1 5 10 15

Leu Ala Ala Leu Leu Gly Ser Gly Gln Ala Gln Gln Val Gly Thr Ser
20 25 30

Gln Ala Glu Val His Pro Ser Met Thr Trp Gln Ser Cys Thr Ala Gly

```
        35                  40                  45

Gly Ser Cys Thr Thr Asn Asn Gly Lys Val Val Ile Asp Ala Asn Trp
    50                  55                  60

Arg Trp Val His Lys Val Gly Asp Tyr Thr Asn Cys Tyr Thr Gly Asn
65                  70                  75                  80

Thr Trp Asp Thr Thr Ile Cys Pro Asp Asp Ala Thr Cys Ala Ser Asn
                85                  90                  95

Cys Ala Leu Glu Gly Ala Asn Tyr Glu Ser Thr Tyr Gly Val Thr Ala
            100                 105                 110

Ser Gly Asn Ser Leu Arg Leu Asn Phe Val Thr Thr Ser Gln Gln Lys
        115                 120                 125

Asn Ile Gly Ser Arg Leu Tyr Met Met Lys Asp Asp Ser Thr Tyr Glu
    130                 135                 140

Met Phe Lys Leu Leu Asn Gln Glu Phe Thr Phe Asp Val Asp Val Ser
145                 150                 155                 160

Asn Leu Pro Cys Gly Leu Asn Gly Ala Leu Tyr Phe Val Ala Met Asp
                165                 170                 175

Ala Asp Gly Gly Met Ser Lys Tyr Pro Thr Asn Lys Ala Gly Ala Lys
            180                 185                 190

Tyr Gly Thr Gly Tyr Cys Asp Ser Gln Cys Pro Arg Asp Leu Lys Phe
        195                 200                 205

Ile Asn Gly Gln Ala Asn Val Glu Gly Trp Gln Pro Ser Ser Asn Asp
    210                 215                 220

Ala Asn Ala Gly Thr Gly Asn His Gly Ser Cys Cys Ala Glu Met Asp
225                 230                 235                 240

Ile Trp Glu Ala Asn Ser Ile Ser Thr Ala Phe Thr Pro His Pro Cys
                245                 250                 255

Asp Thr Pro Gly Gln Val Met Cys Thr Gly Asp Ala Cys Gly Gly Thr
            260                 265                 270

Tyr Ser Ser Asp Arg Tyr Gly Gly Thr Cys Asp Pro Asp Gly Cys Asp
        275                 280                 285

Phe Asn Ser Phe Arg Gln Gly Asn Lys Thr Phe Tyr Gly Pro Gly Met
    290                 295                 300

Thr Val Asp Thr Lys Ser Lys Phe Thr Val Val Thr Gln Phe Ile Thr
305                 310                 315                 320

Asp Asp Gly Thr Ser Ser Gly Thr Leu Lys Glu Ile Lys Arg Phe Tyr
                325                 330                 335

Val Gln Asn Gly Lys Val Ile Pro Asn Ser Glu Ser Thr Trp Thr Gly
            340                 345                 350

Val Ser Gly Asn Ser Ile Thr Thr Glu Tyr Cys Thr Ala Gln Lys Ser
        355                 360                 365

Leu Phe Gln Asp Gln Asn Val Phe Glu Lys His Gly Gly Leu Glu Gly
    370                 375                 380

Met Gly Ala Ala Leu Ala Gln Gly Met Val Leu Val Met Ser Leu Trp
385                 390                 395                 400

Asp Asp His Ser Ala Asn Met Leu Trp Leu Asp Ser Asn Tyr Pro Thr
                405                 410                 415

Thr Ala Ser Ser Thr Thr Pro Gly Val Ala Arg Gly Thr Cys Asp Ile
            420                 425                 430

Ser Ser Gly Val Pro Ala Asp Val Glu Ala Asn His Pro Asp Ala Tyr
        435                 440                 445

Val Val Tyr Ser Asn Ile Lys Val Gly Pro Ile Gly Ser Thr Phe Asn
    450                 455                 460
```

```
Ser Gly Gly Ser Asn Pro Gly Gly Gly Thr Thr Thr Thr Thr Thr Thr
465                 470                 475                 480

Gln Pro Thr Thr Thr Thr Thr Thr Ala Gly Asn Pro Gly Gly Thr Gly
                485                 490                 495

Val Ala Gln His Tyr Gly Gln Cys Gly Gly Ile Gly Trp Thr Gly Pro
            500                 505                 510

Thr Thr Cys Ala Ser Pro Tyr Thr Cys Gln Lys Leu Asn Asp Tyr Tyr
        515                 520                 525

Ser Gln Cys Leu
    530


<210> SEQ ID NO 115
<211> LENGTH: 1713
<212> TYPE: DNA
<213> ORGANISM: Aspergillus fumigatus

<400> SEQUENCE: 115

atgaagcacc ttgcatcttc catcgcattg actctactgt tgcctgccgt gcaggcccag     60

cagaccgtat ggggccaatg tatgttctgg ctgtcactgg aataagactg tatcaactgc    120

tgatatgctt ctaggtggcg gccaaggctg gtctggcccg acgagctgtg ttgccggcgc    180

agcctgtagc acactgaatc cctgtatgtt agatatcgtc ctgagtggag acttatactg    240

acttccttag actacgctca gtgtatcccg ggagccaccg cgacgtccac caccctcacg    300

acgacgacgg cggcgacgac gacatcccag accaccacca aacctaccac gactggtcca    360

actacatccg cacccaccgt gaccgcatcc ggtaaccctt tcagcggcta ccagctgtat    420

gccaacccct actactcctc cgaggtccat actctggcca tgccttctct gcccagctcg    480

ctgcagccca aggctagtgc tgttgctgaa gtgccctcat ttgtttggct gtaagtggcc    540

ttatcccaat actgagacca actctctgac agtcgtagcg acgttgccgc caaggtgccc    600

actatgggaa cctacctggc cgacattcag gccaagaaca aggccggcgc caaccctcct    660

atcgctggta tcttcgtggt ctacgacttg ccggaccgtg actgcgccgc tctggccagt    720

aatggcgagt actcaattgc caacaacggt gtggccaact acaaggcgta cattgacgcc    780

atccgtgctc agctggtgaa gtactctgac gttcacacca tcctcgtcat cggtaggccg    840

tacacctccg ttgcgcgccg cctttctctg acatcttgca gaacccgaca gcttggccaa    900

cctggtgacc aacctcaacg tcgccaaatg cgccaatgcg cagagcgcct acctggagtg    960

tgtcgactat gctctgaagc agctcaacct gcccaacgtc gccatgtacc tcgacgcagg   1020

tatgcctcac ttcccgcatt ctgtatccct tccagacact aactcatcag gccatgcggg   1080

ctggctcgga tggcccgcca acttgggccc cgccgcaaca ctcttcgcca aagtctacac   1140

cgacgcgggt tcccccgcgg ctgttcgtgg cctggccacc aacgtcgcca actacaacgc   1200

ctggtcgctc agtacctgcc cctcctacac ccagggagac cccaactgcg acgagaagaa   1260

gtacatcaac gccatggcgc ctcttctcaa ggaagccggc ttcgatgccc acttcatcat   1320

ggatacctgt aagtgcttat tccaatcgcc gatgtgtgcc gactaatcaa tgtttcagcc   1380

cggaatggcg tccagcccac gaagcaaaac gcctggggtg actggtgcaa cgtcatcggc   1440

accggcttcg gtgttcgccc ctcgactaac accggcgatc cgctccagga tgcctttgtg   1500

tggatcaagc ccggtggaga gagtgatggc acgtccaact cgacttcccc ccggtatgac   1560

gcgcactgcg gatatagtga tgctctgcag cctgctcctg aggctggtac ttggttccag   1620

gtatgtcatc cattagccag atgagggata agtgactgac ggacctaggc ctactttgag   1680
```

```
cagcttctga ccaacgctaa cccgtccttt taa                              1713


<210> SEQ ID NO 116
<211> LENGTH: 454
<212> TYPE: PRT
<213> ORGANISM: Aspergillus fumigatus

<400> SEQUENCE: 116

Met Lys His Leu Ala Ser Ser Ile Ala Leu Thr Leu Leu Leu Pro Ala
1               5                   10                  15

Val Gln Ala Gln Gln Thr Val Trp Gly Gln Cys Gly Gly Gln Gly Trp
            20                  25                  30

Ser Gly Pro Thr Ser Cys Val Ala Gly Ala Ala Cys Ser Thr Leu Asn
        35                  40                  45

Pro Tyr Tyr Ala Gln Cys Ile Pro Gly Ala Thr Ala Thr Ser Thr Thr
    50                  55                  60

Leu Thr Thr Thr Thr Ala Ala Thr Thr Thr Ser Gln Thr Thr Thr Lys
65                  70                  75                  80

Pro Thr Thr Thr Gly Pro Thr Thr Ser Ala Pro Thr Val Thr Ala Ser
                85                  90                  95

Gly Asn Pro Phe Ser Gly Tyr Gln Leu Tyr Ala Asn Pro Tyr Tyr Ser
            100                 105                 110

Ser Glu Val His Thr Leu Ala Met Pro Ser Leu Pro Ser Ser Leu Gln
        115                 120                 125

Pro Lys Ala Ser Ala Val Ala Glu Val Pro Ser Phe Val Trp Leu Asp
    130                 135                 140

Val Ala Ala Lys Val Pro Thr Met Gly Thr Tyr Leu Ala Asp Ile Gln
145                 150                 155                 160

Ala Lys Asn Lys Ala Gly Ala Asn Pro Pro Ile Ala Gly Ile Phe Val
                165                 170                 175

Val Tyr Asp Leu Pro Asp Arg Asp Cys Ala Ala Leu Ala Ser Asn Gly
            180                 185                 190

Glu Tyr Ser Ile Ala Asn Asn Gly Val Ala Asn Tyr Lys Ala Tyr Ile
        195                 200                 205

Asp Ala Ile Arg Ala Gln Leu Val Lys Tyr Ser Asp Val His Thr Ile
    210                 215                 220

Leu Val Ile Glu Pro Asp Ser Leu Ala Asn Leu Val Thr Asn Leu Asn
225                 230                 235                 240

Val Ala Lys Cys Ala Asn Ala Gln Ser Ala Tyr Leu Glu Cys Val Asp
                245                 250                 255

Tyr Ala Leu Lys Gln Leu Asn Leu Pro Asn Val Ala Met Tyr Leu Asp
            260                 265                 270

Ala Gly His Ala Gly Trp Leu Gly Trp Pro Ala Asn Leu Gly Pro Ala
        275                 280                 285

Ala Thr Leu Phe Ala Lys Val Tyr Thr Asp Ala Gly Ser Pro Ala Ala
    290                 295                 300

Val Arg Gly Leu Ala Thr Asn Val Ala Asn Tyr Asn Ala Trp Ser Leu
305                 310                 315                 320

Ser Thr Cys Pro Ser Tyr Thr Gln Gly Asp Pro Asn Cys Asp Glu Lys
                325                 330                 335

Lys Tyr Ile Asn Ala Met Ala Pro Leu Leu Lys Glu Ala Gly Phe Asp
            340                 345                 350

Ala His Phe Ile Met Asp Thr Ser Arg Asn Gly Val Gln Pro Thr Lys
        355                 360                 365
```

```
Gln Asn Ala Trp Gly Asp Trp Cys Asn Val Ile Gly Thr Gly Phe Gly
    370                 375                 380

Val Arg Pro Ser Thr Asn Thr Gly Asp Pro Leu Gln Asp Ala Phe Val
385                 390                 395                 400

Trp Ile Lys Pro Gly Gly Glu Ser Asp Gly Thr Ser Asn Ser Thr Ser
                405                 410                 415

Pro Arg Tyr Asp Ala His Cys Gly Tyr Ser Asp Ala Leu Gln Pro Ala
            420                 425                 430

Pro Glu Ala Gly Thr Trp Phe Gln Ala Tyr Phe Glu Gln Leu Leu Thr
        435                 440                 445

Asn Ala Asn Pro Ser Phe
    450


<210> SEQ ID NO 117
<211> LENGTH: 332
<212> TYPE: PRT
<213> ORGANISM: Aspergillus Niger
<220> FEATURE:
<221> NAME/KEY: SIGNAL
<222> LOCATION: (1)..(26)
<220> FEATURE:
<221> NAME/KEY: mat_peptide
<222> LOCATION: (27)..(332)

<400> SEQUENCE: 117

Met Lys Phe Phe Asn Ala Lys Gly Ser Leu Leu Ser Ser Gly Ile Tyr
    -25                 -20                 -15

Leu Ile Ala Leu Thr Pro Phe Val Asn Ala Lys Cys Ser Leu Pro Ser
-10                 -5                  -1  1               5

Ser Tyr Ser Trp Ser Ser Thr Asp Ala Leu Ala Thr Pro Lys Ser Gly
            10                  15                  20

Trp Thr Ala Leu Lys Asp Phe Thr Asp Val Val Ser Asp Gly Lys His
        25                  30                  35

Ile Val Tyr Ala Ser Thr Thr Asp Glu Ala Gly Asn Tyr Gly Ser Met
    40                  45                  50

Thr Phe Gly Ala Phe Ser Glu Trp Ser Asn Met Ala Ser Ala Ser Gln
55                  60                  65                  70

Thr Ala Thr Pro Phe Asn Ala Val Ala Pro Thr Leu Phe Tyr Phe Lys
                75                  80                  85

Pro Lys Ser Ile Trp Val Leu Ala Tyr Gln Trp Gly Ser Ser Thr Phe
            90                  95                  100

Thr Tyr Arg Thr Ser Gln Asp Pro Thr Asn Val Asn Gly Trp Ser Ser
        105                 110                 115

Glu Gln Ala Leu Phe Thr Gly Lys Leu Ser Asp Ser Ser Thr Gly Ala
    120                 125                 130

Ile Asp Gln Thr Val Ile Gly Asp Asp Thr Asn Met Tyr Leu Phe Phe
135                 140                 145                 150

Ala Gly Asp Asn Gly Lys Ile Tyr Arg Ser Ser Met Ser Ile Asp Glu
                155                 160                 165

Phe Pro Gly Ser Phe Gly Ser Gln Tyr Glu Glu Ile Leu Ser Gly Ala
            170                 175                 180

Thr Asn Asp Leu Phe Glu Ala Val Gln Val Tyr Thr Val Asp Gly Gly
        185                 190                 195

Glu Gly Asn Ser Lys Tyr Leu Met Ile Val Glu Ala Ile Gly Ser Thr
    200                 205                 210

Gly His Arg Tyr Phe Arg Ser Phe Thr Ala Ser Ser Leu Gly Gly Glu
```

```
215                 220                 225                 230

Trp Thr Ala Gln Ala Ala Ser Glu Asp Lys Pro Phe Ala Gly Lys Ala
                235                 240                 245

Asn Ser Gly Ala Thr Trp Thr Glu Asp Ile Ser His Gly Asp Leu Val
            250                 255                 260

Arg Asn Asn Pro Asp Gln Thr Met Thr Val Asp Pro Cys Asn Leu Gln
        265                 270                 275

Leu Leu Tyr Gln Gly His Asp Pro Asn Ser Ser Gly Asp Tyr Asn Leu
    280                 285                 290

Leu Pro Trp Lys Pro Gly Val Leu Thr Leu Lys Gln
295                 300                 305


<210> SEQ ID NO 118
<211> LENGTH: 332
<212> TYPE: PRT
<213> ORGANISM: Aspergillus Niger
<220> FEATURE:
<221> NAME/KEY: SIGNAL
<222> LOCATION: (1)..(26)
<220> FEATURE:
<221> NAME/KEY: mat_peptide
<222> LOCATION: (27)..(332)

<400> SEQUENCE: 118

Met Lys Phe Leu Lys Ala Lys Gly Ser Leu Leu Ser Ser Gly Ile Tyr
    -25                 -20                 -15

Leu Ile Ala Leu Ala Pro Phe Val Asn Ala Lys Cys Ala Leu Pro Ser
-10                 -5                  -1  1               5

Thr Tyr Ser Trp Thr Ser Thr Asp Ala Leu Ala Thr Pro Lys Ser Gly
            10                  15                  20

Trp Thr Ala Leu Lys Asp Phe Thr Asp Val Val Ser Asn Gly Lys His
        25                  30                  35

Ile Val Tyr Ala Ser Thr Thr Asp Thr Gln Gly Asn Tyr Gly Ser Met
    40                  45                  50

Gly Phe Gly Ala Phe Ser Asp Trp Ser Asp Met Ala Ser Ala Ser Gln
55                  60                  65                  70

Thr Ala Thr Ser Phe Ser Ala Val Ala Pro Thr Leu Phe Tyr Phe Gln
                75                  80                  85

Pro Lys Ser Ile Trp Val Leu Ala Tyr Gln Trp Gly Ser Ser Thr Phe
            90                  95                  100

Thr Tyr Arg Thr Ser Gln Asp Pro Thr Asn Val Asn Gly Trp Ser Ser
        105                 110                 115

Glu Gln Ala Leu Phe Thr Gly Lys Ile Ser Gly Ser Ser Thr Gly Ala
    120                 125                 130

Ile Asp Gln Thr Val Ile Gly Asp Asp Thr Asn Met Tyr Leu Phe Phe
135                 140                 145                 150

Ala Gly Asp Asn Gly Lys Ile Tyr Arg Ser Ser Met Ser Ile Asn Asp
                155                 160                 165

Phe Pro Gly Ser Phe Gly Ser Gln Tyr Glu Glu Ile Leu Ser Gly Ala
            170                 175                 180

Thr Asn Asp Leu Phe Glu Ala Val Gln Val Tyr Thr Val Asp Gly Gly
        185                 190                 195

Glu Gly Asp Ser Lys Tyr Leu Met Ile Val Glu Ala Ile Gly Ser Thr
    200                 205                 210

Gly His Arg Tyr Phe Arg Ser Phe Thr Ala Ser Ser Leu Gly Gly Glu
215                 220                 225                 230
```

Trp Thr Ala Gln Ala Ala Ser Glu Asp Gln Pro Phe Ala Gly Lys Ala
235 240 245

Asn Ser Gly Ala Thr Trp Thr Asp Asp Ile Ser His Gly Asp Leu Val
250 255 260

Arg Asn Asn Pro Asp Gln Thr Met Thr Val Asp Pro Cys Asn Leu Gln
265 270 275

Leu Leu Tyr Gln Gly His Asp Pro Asn Ser Asn Ser Asp Tyr Asn Leu
280 285 290

Leu Pro Trp Lys Pro Gly Val Leu Thr Leu Lys Gln
295 300 305

<210> SEQ ID NO 119
<211> LENGTH: 319
<212> TYPE: PRT
<213> ORGANISM: Aspergillus Niger
<220> FEATURE:
<221> NAME/KEY: SIGNAL
<222> LOCATION: (1)..(19)
<220> FEATURE:
<221> NAME/KEY: mat_peptide
<222> LOCATION: (20)..(319)

<400> SEQUENCE: 119

Met Val Gln Ile Lys Val Ala Ala Leu Ala Met Leu Phe Ala Ser Gln
-15 -10 -5

Val Leu Ser Glu Pro Ile Glu Pro Arg Gln Ala Ser Val Ser Ile Asp
-1 1 5 10

Thr Lys Phe Lys Ala His Gly Lys Lys Tyr Leu Gly Asn Ile Gly Asp
15 20 25

Gln Tyr Thr Leu Thr Lys Asn Ser Lys Thr Pro Ala Ile Ile Lys Ala
30 35 40 45

Asp Phe Gly Ala Leu Thr Pro Glu Asn Ser Met Lys Trp Asp Ala Thr
50 55 60

Glu Pro Ser Arg Gly Gln Phe Ser Phe Ser Gly Ser Asp Tyr Leu Val
65 70 75

Asn Phe Ala Gln Ser Asn Asn Lys Leu Ile Arg Gly His Thr Leu Val
80 85 90

Trp His Ser Gln Leu Pro Ser Trp Val Gln Ser Ile Thr Asp Lys Asn
95 100 105

Thr Leu Ile Glu Val Met Glu Asn His Ile Thr Thr Val Met Gln His
110 115 120 125

Tyr Lys Gly Lys Ile Tyr Ala Trp Asp Val Val Asn Glu Ile Phe Asn
130 135 140

Glu Asp Gly Ser Leu Arg Asp Ser Val Phe Tyr Lys Val Ile Gly Glu
145 150 155

Asp Tyr Val Arg Ile Ala Phe Glu Thr Ala Arg Ala Ala Asp Pro Asn
160 165 170

Ala Lys Leu Tyr Ile Asn Asp Tyr Asn Leu Asp Ser Ala Ser Tyr Pro
175 180 185

Lys Leu Thr Gly Met Val Ser His Val Lys Lys Trp Ile Ala Ala Gly
190 195 200 205

Ile Pro Ile Asp Gly Ile Gly Ser Gln Thr His Leu Ser Ala Ala Leu
210 215 220

Asn Ala Leu Ala Gly Ala Gly Thr Lys Glu Ile Ala Val Thr Glu Leu
225 230 235

Asp Ile Ala Gly Ala Ser Ser Thr Asp Tyr Val Glu Val Val Glu Ala
240 245 250

```
Cys Leu Asn Gln Pro Lys Cys Ile Gly Ile Thr Val Trp Gly Val Ala
    255                 260                 265

Asp Pro Asp Ser Trp Arg Ser Ser Ser Thr Pro Leu Leu Phe Asp Ser
270                 275                 280                 285

Asn Tyr Asn Pro Lys Pro Ala Tyr Thr Ala Ile Ala Asn Ala Leu
                290                 295                 300
```

WET MILLING PROCESS

CROSS-REFERENCE TO RELATED APPLICATIONS

This application is a division of U.S. application Ser. No. 15/773,083 filed May 2, 2018, now U.S. Pat. No. 10,836,837, which is a 35 U.S.C. 371 national application of PCT/CN2016/107282 filed Nov. 25, 2016, which claims priority or the benefit of international application no. PCT/CN2015/095621 filed Nov. 26, 2015. The content of each application is fully incorporated herein by reference.

REFERENCE TO A SEQUENCE LISTING

This application contains a Sequence Listing in computer readable form, which is incorporated herein by reference.

BACKGROUND OF THE INVENTION

Field of the Invention

The present invention relates to an improved process of treating crop kernels to provide a starch product of high quality suitable for conversion of starch into mono- and oligosaccharides, ethanol, sweeteners, etc. Further, the invention also relates to an enzyme composition comprising one or more enzyme activities suitable for the process of the invention and to the use of the composition of the invention.

Description of the Related Art

Before starch, which is an important constituent in the kernels of most crops, such as corn, wheat, rice, sorghum bean, barley or fruit hulls, can be used for conversion of starch into saccharides, such as dextrose, fructose; alcohols, such as ethanol; and sweeteners, the starch must be made available and treated in a manner to provide a high purity starch. If starch contains more than 0.5% impurities, including the proteins, it is not suitable as starting material for starch conversion processes. To provide such pure and high quality starch product starting out from the kernels of crops, the kernels are often milled, as will be described further below.

Wet milling is often used for separating corn kernels into its four basic components: starch, germ, fiber and protein.

Typically, wet milling processes comprise four basic steps. First the kernels are soaked or steeped for about 30 minutes to about 48 hours to begin breaking the starch and protein bonds. The next step in the process involves a coarse grind to break the pericarp and separate the germ from the rest of the kernel. The remaining slurry consisting of fiber, starch and protein is finely ground and screened to separate the fiber from the starch and protein. The starch is separated from the remaining slurry in hydrocyclones. The starch then can be converted to syrup or alcohol, or dried and sold as corn starch or chemically or physically modified to produce modified corn starch.

The use of enzymes has been suggested for the steeping step of wet milling processes. The commercial enzyme product Steepzyme® (available from Novozymes A/S) has been shown suitable for the first step in wet milling processes, i.e., the steeping step where corn kernels are soaked in water.

More recently, "enzymatic milling", a modified wet-milling process that uses proteases to significantly reduce the total processing time during corn wet milling and eliminates the need for sulfur dioxide as a processing agent, has been developed. Johnston et al., 2004, *Cereal Chem.* 81: 626-632.

U.S. Pat. No. 6,566,125 discloses a method for obtaining starch from maize involving soaking maize kernels in water to produce soaked maize kernels, grinding the soaked maize kernels to produce a ground maize slurry, and incubating the ground maize slurry with enzyme (e.g., protease).

U.S. Pat. No. 5,066,218 discloses a method of milling grain, especially corn, comprising cleaning the grain, steeping the grain in water to soften it, and then milling the grain with a cellulase enzyme.

WO 02/00731 discloses a process of treating crop kernels, comprising soaking the kernels in water for 1-12 hours, wet milling the soaked kernels and treating the kernels with one or more enzymes including an acidic protease.

WO 02/00911 discloses a process of starch gluten separation, comprising subjecting mill starch to an acidic protease.

WO 02/02644 discloses a process of washing a starch slurry obtained from the starch gluten separation step of a milling process, comprising washing the starch slurry with an aqueous solution comprising an effective amount of acidic protease.

There remains a need for improvement of processes for providing starch suitable for conversion into mono- and oligo-saccharides, ethanol, sweeteners, etc.

SUMMARY OF THE INVENTION

The invention provides a process for treating crop kernels, comprising the steps of a) soaking kernels in water to produce soaked kernels; b) grinding the soaked kernels; c) treating the soaked kernels in the presence of one or more GH62 polypeptides having arabinofuranosidase activity, wherein step c) is performed before, during or after step b).

In one embodiment, the invention provides a process for treating crop kernels, comprising the steps of a) soaking kernels in water to produce soaked kernels; b) grinding the soaked kernels; c) treating the soaked kernels in the presence of one or more GH62 polypeptides having arabinofuranosidase activity and one or more GH10 or GH11 polypeptides having xylanase activity, wherein step c) is performed before, during or after step b).

In one embodiment, the invention provides the use of a GH62 polypeptide having arabinofuranosidase activity to enhance the wet milling benefit of one or more enzymes.

The invention provides a process for treating crop kernels, comprising the steps of a) soaking kernels in water to produce soaked kernels; b) grinding the soaked kernels; c) treating the soaked kernels in the presence of one or more GH43 polypeptides having arabinofuranosidase activity, wherein step c) is performed before, during or after step b).

In one embodiment, the invention provides a process for treating crop kernels, comprising the steps of a) soaking kernels in water to produce soaked kernels; b) grinding the soaked kernels; c) treating the soaked kernels in the presence of one or more GH43 polypeptides having arabinofuranosidase activity and one or more GH10 or GH11 polypeptides having xylanase activity, wherein step c) is performed before, during or after step b).

In one embodiment, step c) mentioned above is performed during fiber washing step.

In one embodiment, the invention provides the use of a GH43 polypeptide having arabinofuranosidase activity to enhance the wet milling benefit of one or more enzymes.

Definitions

Auxiliary Activity 9 polypeptide: The term "Auxiliary Activity 9 polypeptide" or "AA9 polypeptide" means a polypeptide classified as a lytic polysaccharide monooxygenase (Quinlan et al., 2011, *Proc. Natl. Acad. Sci. USA* 208: 15079-15084; Phillips et al., 2011, *ACS Chem. Biol.* 6: 1399-1406; Lin et al., 2012, *Structure* 20: 1051-1061). AA9 polypeptides were formerly classified into the glycoside hydrolase Family 61 (GH61) according to Henrissat, 1991, *Biochem. J.* 280: 309-316, and Henrissat and Bairoch, 1996, *Biochem. J.* 316: 695-696.

AA9 polypeptides enhance the hydrolysis of a cellulosic material by an enzyme having cellulolytic activity. Cellulolytic enhancing activity can be determined by measuring the increase in reducing sugars or the increase of the total of cellobiose and glucose from the hydrolysis of a cellulosic material by cellulolytic enzyme under the following conditions: 1-50 mg of total protein/g of cellulose in pretreated corn stover (PCS), wherein total protein is comprised of 50-99.5% w/w cellulolytic enzyme protein and 0.5-50% w/w protein of an AA9 polypeptide for 1-7 days at a suitable temperature, such as 40° C.-80° C., e.g., 40° C., 45° C., 50° C., 55° C., 60° C., 65° C., 70° C., 75° C., or 80° C., and a suitable pH, such as 4-9, e.g., 4.0, 4.5, 5.0, 5.5, 6.0, 6.5, 7.0, 7.5, 8.0, 8.5, or 9.0, compared to a control hydrolysis with equal total protein loading without cellulolytic enhancing activity (1-50 mg of cellulolytic protein/g of cellulose in PCS).

AA9 polypeptide enhancing activity can be determined using a mixture of CELLUCLAST® 1.5L (Novozymes A/S, Bagsvaerd, Denmark) and beta-glucosidase as the source of the cellulolytic activity, wherein the beta-glucosidase is present at a weight of at least 2-5% protein of the cellulase protein loading. In one aspect, the beta-glucosidase is an Aspergillus oryzae beta-glucosidase (e.g., recombinantly produced in Aspergillus oryzae according to WO 02/095014). In another aspect, the beta-glucosidase is an Aspergillus fumigatus beta-glucosidase (e.g., recombinantly produced in Aspergillus oryzae as described in WO 02/095014).

AA9 polypeptide enhancing activity can also be determined by incubating an AA9 polypeptide with 0.5% phosphoric acid swollen cellulose (PASO), 100 mM sodium acetate pH 5, 1 mM $MnSO_4$, 0.1% gallic acid, 0.025 mg/ml of Aspergillus fumigatus beta-glucosidase, and 0.01% TRITON® X-100 (4-(1,1,3,3-tetramethylbutyl)phenyl-polyethylene glycol) for 24-96 hours at 40° C. followed by determination of the glucose released from the PASO.

AA9 polypeptide enhancing activity can also be determined according to WO 2013/028928 for high temperature compositions.

AA9 polypeptides enhance the hydrolysis of a cellulosic material catalyzed by enzyme having cellulolytic activity by reducing the amount of cellulolytic enzyme required to reach the same degree of hydrolysis preferably at least 1.01-fold, e.g., at least 1.05-fold, at least 1.10-fold, at least 1.25-fold, at least 1.5-fold, at least 2-fold, at least 3-fold, at least 4-fold, at least 5-fold, at least 10-fold, or at least 20-fold.

The AA9 polypeptide can also be used in the presence of a soluble activating divalent metal cation according to WO 2008/151043 or WO 2012/122518, e.g., manganese or copper.

The AA9 polypeptide can be used in the presence of a dioxy compound, a bicylic compound, a heterocyclic compound, a nitrogen-containing compound, a quinone compound, a sulfur-containing compound, or a liquor obtained from a pretreated cellulosic or hemicellulosic material such as pretreated corn stover (WO 2012/021394, WO 2012/021395, WO 2012/021396, WO 2012/021399, WO 2012/021400, WO 2012/021401, WO 2012/021408, and WO 2012/021410).

Allelic variant: The term "allelic variant" means any of two or more alternative forms of a gene occupying the same chromosomal locus. Allelic variation arises naturally through mutation and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

Arabinofuranosidase: The term "arabinofuranosidase" means an alpha-L-arabinofuranoside arabinofuranohydrolase (EC 3.2.1.55) that catalyzes the hydrolysis of terminal non-reducing alpha-L-arabinofuranoside residues in alpha-L-arabinosides. The enzyme acts on alpha-L-arabinofuranosides, alpha-L-arabinans containing (1,3)—and/or (1,2)-and/or (1,5)-linkages, arabinoxylans, and arabinogalactans. Alpha-L-arabinofuranosidase is also known as arabinosidase, alpha-arabinosidase, alpha-L-arabinosidase, alpha-arabinofuranosidase, polysaccharide alpha-L-arabinofuranosidase, alpha-L-arabinofuranoside hydrolase, L-arabinosidase, or alpha-L-arabinanase. Arabinofuranosidase activity can be determined using 5 mg of medium viscosity wheat arabinoxylan (Megazyme International Ireland, Ltd., Bray, Co. Wicklow, Ireland) per ml of 100 mM sodium acetate pH 5 in a total volume of 200 µl for 30 minutes at 40° C. followed by arabinose analysis by AMINEX® HPX-87H column chromatography (Bio-Rad Laboratories, Inc., Hercules, Calif., USA).

The arabinofuranosidases of the present invention have at least 50% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66 and SEQ ID NO: 69. In a preferred embodiment, the arabinofuranosidase of the present invention have at least 70% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In a more preferred embodiment, the arabinofuranosidase of the present invention have at least 80% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In an even more preferred embodiment, the arabinofuranosidase of the present invention have at least 90% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118. In a most preferred embodiment, the arabinofuranosidase of the present invention have at least 95% of the arabinofuranosidase activity of one or more of the polypeptides selected from the list consisting of SEQ ID NO: 9, SEQ ID NO: 12, SEQ ID NO: 15, SEQ ID NO: 18, SEQ ID NO: 21, SEQ ID NO: 24, SEQ ID NO: 27, SEQ ID NO: 30, SEQ ID NO: 33, SEQ ID NO: 36, SEQ ID NO: 39, SEQ ID NO: 42, SEQ ID NO: 45, SEQ ID NO: 48, SEQ ID NO: 51, SEQ ID NO: 54, SEQ ID NO: 57, SEQ ID NO: 60, SEQ ID NO: 63, SEQ ID NO: 66, SEQ ID NO: 69, SEQ ID NO: 117 and SEQ ID NO: 118.

Arabinoxylan-containing material: The term "Arabinoxylan-containing material" means any material containing arabinoxylan. Arabinoxylan is a hemicellulose found in both the primary and secondary cell walls of plants, including woods and cereal grains, consisting of copolymers of two pentose sugars, arabinose and xylose. The arabinoxylan chain contains a large number of 1,4-linked xylose units. Many xylose units are substituted with 2-, 3- or 2,3-substituted arabinose residues.

Examples of arabinoxylan-containing material are forage, roughage, seeds and grains (either whole or prepared by crushing, milling, etc from, e.g., corn, oats, rye, barley, wheat), trees or hard woods (such as poplar, willow, eucalyptus, palm, maple, birch), bamboo, herbaceous and/or woody energy crops, agricultural food and feed crops, animal feed products, cassava peels, cocoa pods, sugar cane, sugar beet, locust bean pulp, vegetable or fruit pomaces, wood waste, bark, shavings, sawdust, wood pulp, pulping liquor, waste paper, cardboard, construction and demolition wood waste, industrial or municipal waste water solids or sludge, manure, by-product from brewing and/or fermentation processes, wet distillers grain, dried distillers grain, spent grain, vinasse and bagasse.

Forage as defined herein also includes roughage. Forage is fresh plant material such as hay and silage from forage plants, grass and other forage plants, grass and other forage plants, seaweed, sprouted grains and legumes, or any combination thereof. Examples of forage plants are Alfalfa (Lucerne), birdsfoot trefoil, brassica (e.g., kale, rapeseed (canola), rutabaga (swede), turnip), clover (e.g., alsike clover, red clover, subterranean clover, white clover), grass (e.g., Bermuda grass, brome, false oat grass, fescue, heath grass, meadow grasses, miscanthus, orchard grass, ryegrass, switchgrass, Timothy-grass), corn (maize), hemp, millet, barley, oats, rye, sorghum, soybeans and wheat and vegetables such as beets. Crops suitable for ensilage are the ordinary grasses, clovers, alfalfa, vetches, oats, rye and maize. Forage further includes crop residues from grain production (such as corn stover; straw from wheat, barley, oat, rye and other grains); residues from vegetables like beet tops; residues from oilseed production like stems and leaves form soy beans, rapeseed and other legumes; and fractions from the refining of grains for animal or human consumption or from fuel production or other industries.

Roughage is generally dry plant material with high levels of fiber, such as fiber, bran, husks from seeds and grains and crop residues (such as stover, copra, straw, chaff, sugar beet waste). Preferred sources of arabinoxylan-containing materials are forage, roughage, seeds and grains, sugar cane, sugar beet and wood pulp.

Beta-glucosidase: The term "beta-glucosidase" means a beta-D-glucoside glucohydrolase (E.C. 3.2.1.21) that catalyzes the hydrolysis of terminal non-reducing beta-D-glucose residues with the release of beta-D-glucose. Beta-glucosidase activity can be determined using p-nitrophenyl-beta-D-glucopyranoside as substrate according to the procedure of Venturi et al., 2002, *J. Basic Microbiol.* 42: 55-66. One unit of beta-glucosidase is defined as 1.0 μmole of p-nitrophenolate anion produced per minute at 25° C., pH 4.8 from 1 mM p-nitrophenyl-beta-D-glucopyranoside as substrate in 50 mM sodium citrate containing 0.01% TWEEN® 20.

Beta-xylosidase: The term "beta-xylosidase" means a beta-D-xyloside xylohydrolase (E.C. 3.2.1.37) that catalyzes the exo-hydrolysis of short beta (1→4)-xylooligosaccharides to remove successive D-xylose residues from non-reducing termini. Beta-xylosidase activity can be determined using 1 mM p-nitrophenyl-beta-D-xyloside as substrate in 100 mM sodium citrate containing 0.01% TWEEN® 20 at pH 5, 40° C. One unit of beta-xylosidase is defined as 1.0 μmole of p-nitrophenolate anion produced per minute at 40° C., pH 5 from 1 mM p-nitrophenyl-beta-D-xyloside in 100 mM sodium citrate containing 0.01% TWEEN® 20.

cDNA: The term "cDNA" means a DNA molecule that can be prepared by reverse transcription from a mature, spliced, mRNA molecule obtained from a eukaryotic or prokaryotic cell. cDNA lacks intron sequences that may be present in the corresponding genomic DNA. The initial, primary RNA transcript is a precursor to mRNA that is processed through a series of steps, including splicing, before appearing as mature spliced mRNA.

Cellobiohydrolase: The term "cellobiohydrolase" means a 1,4-beta-D-glucan cellobiohydrolase (E.C. 3.2.1.91 and E.C. 3.2.1.176) that catalyzes the hydrolysis of 1,4-beta-D-glucosidic linkages in cellulose, cellooligosaccharides, or any beta-1,4-linked glucose containing polymer, releasing cellobiose from the reducing end (cellobiohydrolase I) or non-reducing end (cellobiohydrolase II) of the chain (Teeri, 1997, *Trends in Biotechnology* 15: 160-167; Teeri et al., 1998, *Biochem. Soc. Trans.* 26: 173-178). Cellobiohydrolase activity can be determined according to the procedures described by Lever et al., 1972, *Anal. Biochem.* 47: 273-279; van Tilbeurgh et al., 1982, FEBS Letters 149: 152-156; van Tilbeurgh and Claeyssens, 1985, *FEBS Letters* 187: 283-288; and Tomme et al., 1988, *Eur. J. Biochem.* 170: 575-581.

Cellulolytic enzyme or cellulase: The term "cellulolytic enzyme" or "cellulase" means one or more (e.g., several) enzymes that hydrolyze a cellulosic material. Such enzymes include endoglucanase(s), cellobiohydrolase(s), beta-glucosidase(s), or combinations thereof. The two basic approaches for measuring cellulolytic enzyme activity include: (1) measuring the total cellulolytic enzyme activity, and (2) measuring the individual cellulolytic enzyme activities (endoglucanases, cellobiohydrolases, and beta-glucosidases) as reviewed in Zhang et al., 2006, *Biotechnology Advances* 24: 452-481. Total cellulolytic enzyme activity can be measured using insoluble substrates, including Whatman No 21 filter paper, microcrystalline cellulose, bacterial cellulose, algal cellulose, cotton, pretreated lignocellulose, etc. The most common total cellulolytic activity assay is the filter paper assay using Whatman No 21 filter paper as the substrate. The assay was established by the International Union of Pure and Applied Chemistry (IUPAC) (Ghose, 1987, *Pure Appl. Chem.* 59: 257-68).

Cellulolytic enzyme activity can be determined by measuring the increase in production/release of sugars during hydrolysis of a cellulosic material by cellulolytic enzyme(s) under the following conditions: 1-50 mg of cellulolytic enzyme protein/g of cellulose in pretreated corn stover (PCS) (or other pretreated cellulosic material) for 3-7 days at a suitable temperature such as 40° C.-80° C., e.g., 40° C., 45° C., 50° C., 55° C., 60° C., 65° C., 70° C., 75° C., or 80° C., and a suitable pH, such as 4-9, e.g., 4.0, 4.5, 5.0, 5.5, 6.0, 6.5, 7.0, 7.5, 8.0, 8.5, or 9.0, compared to a control hydrolysis without addition of cellulolytic enzyme protein. Typical conditions are 1 ml reactions, washed or unwashed PCS, 5% insoluble solids (dry weight), 50 mM sodium acetate pH 5, 1 mM $MnSO_4$, 50° C., 55° C., or 60° C., 72 hours, sugar analysis by AMINEX® HPX-87H column chromatography (Bio-Rad Laboratories, Inc., Hercules, Calif., USA).

Cellulosic material: The term "cellulosic material" means any material containing cellulose. Cellulose is a homopolymer of anyhdrocellobiose and thus a linear beta-(1-4)-D-glucan, while hemicelluloses include a variety of compounds, such as xylans, xyloglucans, arabinoxylans, and mannans in complex branched structures with a spectrum of substituents. Although generally polymorphous, cellulose is found in plant tissue primarily as an insoluble crystalline matrix of parallel glucan chains. Hemicelluloses usually hydrogen bond to cellulose, as well as to other hemicelluloses, which help stabilize the cell wall matrix.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Control sequences: The term "control sequences" means nucleic acid sequences necessary for expression of a polynucleotide encoding a mature polypeptide of the present invention. Each control sequence may be native (i.e., from the same gene) or foreign (i.e., from a different gene) to the polynucleotide encoding the polypeptide or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Crop kernels: The term "crop kernels" includes kernels from, e.g., corn (maize), rice, barley, sorghum bean, fruit hulls, and wheat. Corn kernels are exemplary. A variety of corn kernels are known, including, e.g., dent corn, flint corn, pod corn, striped maize, sweet corn, waxy corn and the like. In an embodiment, the corn kernel is yellow dent corn kernel. Yellow dent corn kernel has an outer covering referred to as the "Pericarp" that protects the germ in the kernels. It resists water and water vapour and is undesirable to insects and microorganisms. The only area of the kernels not covered by the "Pericarp" is the "Tip Cap", which is the attachment point of the kernel to the cob.

Dry solids: The term "dry solids" is the total solids of a slurry in percent on a dry weight basis.

Endoglucanase: The term "endoglucanase" means a 4-(1,3;1,4)-beta-D-glucan 4-glucanohydrolase (E.C. 3.2.1.4) that catalyzes endohydrolysis of 1,4-beta-D-glycosidic linkages in cellulose, cellulose derivatives (such as carboxymethyl cellulose and hydroxyethyl cellulose), lichenin, beta-1,4 bonds in mixed beta-1,3-1,4 glucans such as cereal beta-D-glucans or xyloglucans, and other plant material containing cellulosic components. Endoglucanase activity can be determined by measuring reduction in substrate viscosity or increase in reducing ends determined by a reducing sugar assay (Zhang et al., 2006, *Biotechnology Advances* 24: 452-481). Endoglucanase activity can also be determined using carboxymethyl cellulose (CMC) as substrate according to the procedure of Ghose, 1987, *Pure and Appl. Chem.* 59: 257-268, at pH 5, 40° C.

Expression: The term "expression" includes any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Fragment: The term "fragment" means a polypeptide having one or more (e.g., several) amino acids absent from the amino and/or carboxyl terminus of a mature polypeptide, wherein the fragment has enzyme activity. In one aspect, a fragment contains at least 85%, e.g., at least 90% or at least 95% of the amino acid residues of the mature polypeptide of an enzyme.

Germ: The "Germ" is the only living part of the corn kernel. It contains the essential genetic information, enzymes, vitamins, and minerals for the kernel to grow into a corn plant. In yellow dent corn, about 25 percent of the germ is corn oil. The endosperm covered or surrounded by the germ comprises about 82 percent of the kernel dry weight and is the source of energy (starch) and protein for the germinating seed. There are two types of endosperm, soft and hard. In the hard endosperm, starch is packed tightly together. In the soft endosperm, the starch is loose.

Grind or grinding: The term "grinding" means any process that breaks the pericarp and opens the crop kernel.

Hemicellulolytic enzyme or hemicellulase: The term "hemicellulolytic enzyme" or "hemicellulase" means one or more (e.g., several) enzymes that hydrolyze a hemicellulosic material. See, for example, Shallom and Shoham, 2003, *Current Opinion In Microbiology* 6(3): 219-228). Hemicellulases are key components in the degradation of plant biomass. Examples of hemicellulases include, but are not limited to, an acetylmannan esterase, an acetylxylan esterase, an arabinanase, an arabinofuranosidase, a coumaric acid esterase, a feruloyl esterase, a galactosidase, a glucuronidase, a glucuronoyl esterase, a mannanase, a mannosidase, a xylanase, and a xylosidase. The substrates for these enzymes, hemicelluloses, are a heterogeneous group of branched and linear polysaccharides that are bound via hydrogen bonds to the cellulose microfibrils in the plant cell wall, crosslinking them into a robust network. Hemicelluloses are also covalently attached to lignin, forming together with cellulose a highly complex structure. The variable structure and organization of hemicelluloses require the concerted action of many enzymes for its complete degradation. The catalytic modules of hemicellulases are either glycoside hydrolases (GHs) that hydrolyze glycosidic bonds, or carbohydrate esterases (CEs), which hydrolyze ester linkages of acetate or ferulic acid side groups. These catalytic modules, based on homology of their primary sequence, can be assigned into GH and CE families. Some families, with an overall similar fold, can be further grouped into clans, marked alphabetically (e.g., GH-A). A most informative and updated classification of these and other carbohydrate active enzymes is available in the Carbohydrate-Active Enzymes (CAZy) database. Hemicellulolytic enzyme activities can be measured according to Ghose and Bisaria, 1987, *Pure & Appl. Chem.* 59: 1739-1752, at a suitable temperature such as 40° C.-80° C., e.g., 40° C., 45° C., 50° C., 55° C., 60° C., 65° C., 70° C., 75° C., or 80° C., and a suitable pH such as 4-9, e.g., 4.0, 4.5, 5.0, 5.5, 6.0, 6.5, 7.0, 7.5, 8.0, 8.5, or 9.0.

Highly branched xylan: The term "highly branched xylan" means that more than 50% of xylosyl units in the arabinoxylan backbone are substituted. This is preferably calculated from linkage analysis as performed in Huismann et al., 2000, *Carbohydrate Polymers* 42:269-279.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g., recombinant production in a host cell; multiple copies of a gene encoding the substance; and use of a stronger promoter than the promoter naturally associated with the gene encoding the substance).

Milled: The term "milled" refers to plant material which has been broken down into smaller particles, e.g., by crushing, fractionating, grinding, pulverizing, etc.

Mature polypeptide: The term "mature polypeptide" means a polypeptide in its final form following translation and any post-translational modifications, such as N-terminal processing, C-terminal truncation, glycosylation, phosphorylation, etc.

In one aspect, the mature polypeptide is amino acids 1 to 302 of SEQ ID NO: 8 and amino acids −26 to −1 of SEQ ID NO: 2 are a signal peptide. In another aspect, the mature polypeptide is amino acids 1 to 302 of SEQ ID NO: 9.

In one aspect, the mature polypeptide is amino acids 1 to 303 of SEQ ID NO: 11 and amino acids −26 to −1 of SEQ ID NO: 11 are a signal peptide. In another aspect, the mature polypeptide is amino acids 1 to 303 of SEQ ID NO: 12.

In one aspect, the mature polypeptide is amino acids 1 to 382 of SEQ ID NO: 14 and amino acids −21 to −1 of SEQ ID NO: 15 are a signal peptide. In another aspect, the mature polypeptide is amino acids 1 to 382 of SEQ ID NO: 15.

In one aspect, the mature polypeptide is amino acids 1 to 378 of SEQ ID NO: 17 and amino acids −17 to −1 of SEQ ID NO: 17 are a signal peptide. In another aspect, the mature polypeptide is amino acids 1 to 378 of SEQ ID NO: 18.

In one aspect, the mature polypeptide is amino acids 1 to 311 of SEQ ID NO: 20 and amino acids −20 to −1 of SEQ ID NO: 20 are a signal peptide. In another aspect, the mature polypeptide is amino acids 1 to 311 of SEQ ID NO: 21.

In one aspect, the mature polypeptide is amino acids 1 to 302 of SEQ ID NO: 23 and amino acids −29 to −1 of SEQ ID NO: 23 are a signal peptide. In another aspect, the mature polypeptide is amino acids 1 to 302 of SEQ ID NO: 24.

In one aspect, the mature polypeptide is amino acids 1 to 309 of SEQ ID NO: 26 and amino acids −16 to −1 of SEQ ID NO: 26 are a signal peptide. In another aspect, the mature polypeptide is amino acids 1 to 309 of SEQ ID NO: 27.

In one aspect, the mature polypeptide is amino acids 1 to 438 of SEQ ID NO: 29 and amino acids −36 to −1 of SEQ ID NO: 29 are a signal peptide. In another aspect, the mature polypeptide is amino acids 1 to 438 of SEQ ID NO: 30. In one aspect, the mature polypeptide is amino acids 1 to 446 of SEQ ID NO: 32 and amino acids −27 to −1 of SEQ ID NO: 32 are a signal peptide. In another aspect, the mature polypeptide is amino acids 1 to 446 of SEQ ID NO: 33.

In one aspect, the mature polypeptide is amino acids 1 to 438 of SEQ ID NO: 35 and amino acids −36 to −1 of SEQ ID NO: 35 are a signal peptide. In another aspect, the mature polypeptide is amino acids 1 to 438 of SEQ ID NO: 36. In one aspect, the mature polypeptide is amino acids 1 to 446 of SEQ ID NO: 38 and amino acids −27 to −1 of SEQ ID NO: 38 are a signal peptide. In another aspect, the mature polypeptide is amino acids 1 to 446 of SEQ ID NO: 39.

In one aspect, the mature polypeptide is amino acids 1 to 318 of SEQ ID NO: 41 and amino acids −18 to −1 of SEQ ID NO: 41 are a signal peptide. In another aspect, the mature polypeptide is amino acids 1 to 318 of SEQ ID NO: 42. In one aspect, the mature polypeptide is amino acids 1 to 326 of SEQ ID NO: 44 and amino acids −18 to −1 of SEQ ID NO: 44 are a signal peptide. In another aspect, the mature polypeptide is amino acids 1 to 326 of SEQ ID NO: 45.

In one aspect, the mature polypeptide is amino acids 1 to 302 of SEQ ID NO: 47 and amino acids −25 to −1 of SEQ ID NO: 47 are a signal peptide. In another aspect, the mature polypeptide is amino acids 1 to 302 of SEQ ID NO: 48. In one aspect, the mature polypeptide is amino acids 1 to 311 of SEQ ID NO: 50 and amino acids −25 to −1 of SEQ ID NO: 50 are a signal peptide. In another aspect, the mature polypeptide is amino acids 1 to 311 of SEQ ID NO: 51.

In one aspect, the mature polypeptide is amino acids 1 to 364 of SEQ ID NO: 53 and amino acids −24 to −1 of SEQ ID NO: 53 are a signal peptide. In another aspect, the mature polypeptide is amino acids 1 to 364 of SEQ ID NO: 54. In one aspect, the mature polypeptide is amino acids 1 to 373 of SEQ ID NO: 56 and amino acids −24 to −1 of SEQ ID NO: 56 are a signal peptide. In another aspect, the mature polypeptide is amino acids 1 to 373 of SEQ ID NO: 57.

In one aspect, the mature polypeptide is amino acids 1 to 436 of SEQ ID NO: 59 and amino acids −31 to −1 of SEQ ID NO: 59 are a signal peptide. In another aspect, the mature polypeptide is amino acids 1 to 436 of SEQ ID NO: 60. In one aspect, the mature polypeptide is amino acids 1 to 444 of SEQ ID NO: 62 and amino acids −27 to −1 of SEQ ID NO: 62 are a signal peptide. In another aspect, the mature polypeptide is amino acids 1 to 444 of SEQ ID NO: 63.

In one aspect, the mature polypeptide is amino acids 1 to 302 of SEQ ID NO: 65 and amino acids −19 to −1 of SEQ ID NO: 65 are a signal peptide. In another aspect, the mature polypeptide is amino acids 1 to 302 of SEQ ID NO: 66. In one aspect, the mature polypeptide is amino acids 1 to 311 of SEQ ID NO: 68 and amino acids −19 to −1 of SEQ ID NO: 68 are a signal peptide. In another aspect, the mature polypeptide is amino acids 1 to 311 of SEQ ID NO: 69.

In one aspect, the mature polypeptide is amino acids 1 to 183 of SEQ ID NO: 77 and amino acids −27 to −1 of SEQ ID NO: 77 are a signal peptide. In another aspect, the mature polypeptide is amino acids 1 to 302 of SEQ ID NO: 78. In one aspect, the mature polypeptide is amino acids 1 to 181 of SEQ ID NO: 80 and amino acids −27 to −1 of SEQ ID NO: 80 are a signal peptide. In another aspect, the mature polypeptide is amino acids 1 to 181 of SEQ ID NO: 81.

In one aspect, the mature polypeptide is amino acids 1 to 299 of SEQ ID NO: 83 and amino acids −42 to −1 of SEQ ID NO: 83 are a signal peptide. In another aspect, the mature polypeptide is amino acids 1 to 299 of SEQ ID NO: 84. In one aspect, the mature polypeptide is amino acids 1 to 307 of SEQ ID NO: 86 and amino acids −27 to −1 of SEQ ID NO: 86 are a signal peptide. In another aspect, the mature polypeptide is amino acids 1 to 307 of SEQ ID NO: 87.

In one aspect, the mature polypeptide is amino acids 1 to 306 of SEQ ID NO: 117 and amino acids −26 to −1 of SEQ ID NO: 117 are a signal peptide.

In one aspect, the mature polypeptide is amino acids 1 to 306 of SEQ ID NO: 118 and amino acids −26 to −1 of SEQ ID NO: 118 are a signal peptide.

In one aspect, the mature polypeptide is amino acids 1 to 300 of SEQ ID NO: 119 and amino acids −19 to −1 of SEQ ID NO: 119 are a signal peptide.

In one aspect, the mature polypeptide of a cellobiohydrolase I is amino acids 26 to 532 of SEQ ID NO: 96 based on the SignalP 3.0 program (Bendtsen et al., 2004, *J. Mol. Biol.* 340: 783-795) that predicts amino acids 1 to 25 of SEQ ID NO: 96 are a signal peptide. In another aspect, the mature polypeptide of a cellobiohydrolase II is amino acids 19 to 464 of SEQ ID NO: 98 based on the SignalP 3.0 program that predicts amino acids 1 to 18 of SEQ ID NO: 98 are a signal peptide. In another aspect, the mature polypeptide of a beta-glucosidase is amino acids 20 to 863 of SEQ ID NO: 100 based on the SignalP 3.0 program that predicts amino acids 1 to 19 of SEQ ID NO: 100 are a signal peptide. In another aspect, the mature polypeptide of an AA9 polypeptide is amino acids 26 to 253 of SEQ ID NO: 102 based on the SignalP 3.0 program that predicts amino acids 1 to 25 of SEQ ID NO: 102 are a signal peptide. In another aspect, the mature polypeptide of a GH10 xylanase is amino acids 21 to 405 of SEQ ID NO: 104 based on the SignalP 3.0 program that predicts amino acids 1 to 20 of SEQ ID NO: 104 are a signal peptide. In another aspect, the mature polypeptide of a GH10 xylanase is amino acids 20 to 398 of SEQ ID NO: 106 based on the SignalP 3.0 program that predicts amino acids 1 to 19 of SEQ ID NO: 106 are a signal peptide. In another aspect, the mature polypeptide of a beta-xylosidase is amino acids 22 to 796 of SEQ ID NO: 108 based on the SignalP 3.0 program that predicts amino acids 1 to 21 of SEQ ID NO: 108 are a signal peptide. In another aspect, the mature polypeptide of an endoglucanase I is amino acids 23 to 459 of SEQ ID NO: 110 based on the SignalP 3.0 program that predicts amino acids 1 to 22 of SEQ ID NO: 110 are a signal peptide. In another aspect, the mature polypeptide of an endoglucanase II is amino acids 22 to 418 of SEQ ID NO: 112 based on the SignalP 3.0 program that predicts amino acids 1 to 21 of SEQ ID NO: 112 are a signal peptide. In one aspect, the mature polypeptide of an *A. fumigatus* cellobiohydrolase I is amino acids 27 to 532 of SEQ ID NO: 114 based on the SignalP 3.0 program (Bendtsen et al., 2004, *J. Mol. Biol.* 340: 783-795) that predicts amino acids 1 to 26 of SEQ ID NO: 114 are a signal peptide. In another aspect, the mature polypeptide of an A. fumigatus cellobiohydrolase II is amino acids 20 to 454 of SEQ ID NO: 116 based on the SignalP 3.0 program that predicts amino acids 1 to 19 of SEQ ID NO: 116 are a signal peptide.

It is known in the art that a host cell may produce a mixture of two of more different mature polypeptides (i.e., with a different C-terminal and/or N-terminal amino acid) expressed by the same polynucleotide. It is also known in the art that different host cells process polypeptides differently, and thus, one host cell expressing a polynucleotide may produce a different mature polypeptide (e.g., having a different C-terminal and/or N-terminal amino acid) as compared to another host cell expressing the same polynucleotide.

Mature polypeptide coding sequence: The term "mature polypeptide coding sequence" means a polynucleotide that encodes a mature polypeptide. In one aspect, the mature polypeptide coding sequence is nucleotides 79 to 987 of SEQ ID NO: 10 and nucleotides 1 to 78 of SEQ ID NO: 10 encodes a signal peptide.

In one aspect, the mature polypeptide coding sequence is the joined sequence of nucleotides 49 to 70 and nucleotides 123 to 1027 of SEQ ID NO: 25 or the cDNA sequence thereof and nucleotides 1 to 48 of SEQ ID NO: 25 encode a signal peptide.

In one aspect, the mature polypeptide coding sequence is nucleotides 109 to 1422 of SEQ ID NO: 28 and nucleotides 1 to 108 of SEQ ID NO: 28 encodes a signal peptide.

In one aspect, the mature polypeptide coding sequence is nucleotides 82 to 1419 of SEQ ID NO: 31 and nucleotides 1 to 81 of SEQ ID NO: 31 encodes a signal peptide.

In one aspect, the mature polypeptide coding sequence is nucleotides 109 to 1422 of SEQ ID NO: 34 and nucleotides 1 to 108 of SEQ ID NO: 34 encodes a signal peptide.

In one aspect, the mature polypeptide coding sequence is nucleotides 82 to 1419 of SEQ ID NO: 37 and nucleotides 1 to 81 of SEQ ID NO: 37 encodes a signal peptide.

In one aspect, the mature polypeptide coding sequence is nucleotides 76 to 981 of SEQ ID NO: 46 and nucleotides 1 to 75 of SEQ ID NO: 46 encodes a signal peptide.

In one aspect, the mature polypeptide coding sequence is nucleotides 76 to 1008 of SEQ ID NO: 49 and nucleotides 1 to 75 of SEQ ID NO: 49 encodes a signal peptide.

In one aspect, the mature polypeptide coding sequence is the joined sequence of nucleotides 73 to 318, nucleotides 470 to 1298 and nucleotides 1392 to 1408 of SEQ ID NO: 52 and nucleotides 1 to 72 of SEQ ID NO: 52 encodes a signal peptide.

In one aspect, the mature polypeptide coding sequence is the joined sequence of nucleotides 73 to 318, nucleotides 470 to 1298 and nucleotides 1392 to 1435 of SEQ ID NO: 55 and nucleotides 1 to 72 of SEQ ID NO: 55 encodes a signal peptide.

In one aspect, the mature polypeptide coding sequence is nucleotides 94 to 1401 of SEQ ID NO: 58 and nucleotides 1 to 93 of SEQ ID NO: 58 encodes a signal peptide.

In one aspect, the mature polypeptide coding sequence is nucleotides 82 to 1413 of SEQ ID NO: 61 and nucleotides 1 to 81 of SEQ ID NO: 61 encodes a signal peptide.

In one aspect, the mature polypeptide coding sequence is the joined sequence of nucleotides 58 to 330, nucleotides 403 to 655, nucleotides 795 to 948 and nucleotides 1100 to 1325 of SEQ ID NO: 64 and nucleotides 1 to 57 of SEQ ID NO: 64 encodes a signal peptide.

In one aspect, the mature polypeptide coding sequence is the joined sequence of nucleotides 58 to 330, nucleotides 403 to 655, nucleotides 795 to 948 and nucleotides 1100 to 1352 of SEQ ID NO: 67 and nucleotides 1 to 57 of SEQ ID NO: 67 encodes a signal peptide.

In one aspect, the mature polypeptide coding sequence is nucleotides 127 to 1023 of SEQ ID NO: 83 and nucleotides 1 to 126 of SEQ ID NO: 83 encodes a signal peptide.

In one aspect, the mature polypeptide coding sequence of a cellobiohydrolase I is nucleotides 76 to 1727 of SEQ ID NO: 95 or the cDNA sequence thereof based on the SignalP 3.0 program (Bendtsen et al., 2004, supra) that predicts nucleotides 1 to 75 of SEQ ID NO: 95 encode a signal peptide. In another aspect, the mature polypeptide coding sequence of a cellobiohydrolase II is nucleotides 55 to 1895 of SEQ ID NO: 97 or the cDNA sequence thereof based on the SignalP 3.0 program that predicts nucleotides 1 to 54 of SEQ ID NO: 97 encode a signal peptide. In another aspect, the mature polypeptide coding sequence of a beta-glucosidase is nucleotides 58 to 3057 of SEQ ID NO: 99 or the cDNA sequence thereof based on the SignalP 3.0 program that predicts nucleotides 1 to 57 of SEQ ID NO: 99 encode a signal peptide. In another aspect, the mature polypeptide coding sequence of an AA9 polypeptide is nucleotides 76 to 832 of SEQ ID NO: 101 or the cDNA sequence thereof based on the SignalP 3.0 program that predicts nucleotides 1 to 75 of SEQ ID NO: 101 encode a signal peptide. In another aspect, the mature polypeptide coding sequence of a GH10 xylanase is nucleotides 124 to 1517 of SEQ ID NO: 103 or the cDNA sequence thereof based on the SignalP 3.0 program that predicts nucleotides 1 to 123 of SEQ ID NO: 103 encode a signal peptide. In another aspect, the mature polypeptide coding sequence of a GH10 xylanase is nucleotides 58 to 1194 of SEQ ID NO: 105 based on the SignalP 3.0 program that predicts nucleotides 1 to 57 of SEQ ID NO: 105 encode a signal peptide. In another aspect, the mature polypeptide coding sequence of a beta-xylosidase is nucleotides 64 to 2388 of SEQ ID NO: 107 based on the SignalP 3.0 program that predicts nucleotides 1 to 63 of SEQ ID NO: 107 encode a signal peptide. In another aspect, the mature polypeptide coding sequence of an endoglucanase I is nucleotides 67 to 1504 of SEQ ID NO: 109 or the cDNA sequence thereof based on the SignalP 3.0 program that predicts nucleotides 1 to 66 of SEQ ID NO: 109 encode a signal peptide. In another aspect, the mature polypeptide coding sequence of an endoglucanase II is nucleotides 64 to 1504 of SEQ ID NO: 111 based on the SignalP 3.0 program that predicts nucleotides 1 to 63 of SEQ ID NO: 111 encode a signal peptide. In one aspect, the mature polypeptide coding sequence of an *A. fumigatus* cellobiohydrolase I is nucleotides 79 to 1596 of SEQ ID NO: 113 based on the SignalP 3.0 program (Bendtsen et al., 2004, supra) that predicts nucleotides 1 to 78 of SEQ ID NO: 113 encode a signal peptide. In another aspect, the mature polypeptide coding sequence of an A. fumigatus cellobiohydrolase II is nucleotides 58 to 1700 of SEQ ID NO: 115 or the cDNA sequence thereof based on the SignalP 3.0 program that predicts nucleotides 1 to 57 of SEQ ID NO: 115 encode a signal peptide.

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Oligosaccharide: The term "oligosaccharide" is a compound having 2 to 10 monosaccharide units.

Operably linked: The term "operably linked" means a configuration in which a control sequence is placed at an appropriate position relative to the coding sequence of a polynucleotide such that the control sequence directs expression of the coding sequence.

Protease: The term "proteolytic enzyme" or "protease" means one or more (e.g., several) enzymes that break down the amide bond of a protein by hydrolysis of the peptide bonds that link amino acids together in a polypeptide chain. A protease may include, e.g., a metalloprotease, a trypsin-like serine protease, a subtilisin-like serine protease, and aspartic protease.

Sequence Identity: The relatedness between two amino acid sequences or between two nucleotide sequences is described by the parameter "sequence identity". For purposes of the present invention, the degree of sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 3.0.0 or later. Version 6.1.0 was used. The optional parameters used are gap open penalty of 10, gap extension penalty of 0.5, and the EBLOSUM62 (EMBOSS version of BLOSUM62) substitution matrix. The output of Needle labelled "longest identity" (obtained using the—nobrief option) is used as the percent identity and is calculated as follows:

$$(\text{Identical Residues}\times 100)/(\text{Length of Alignment}-\text{Total Number of Gaps in Alignment})$$

For purposes of the present invention, the degree of sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 3.0.0 or later. Version 6.1.0 was used. The optional parameters used are gap open penalty of 10, gap extension penalty of 0.5, and the EDNAFULL (EMBOSS version of NCBI NUC4.4) substitution matrix. The output of Needle labelled "longest identity" (obtained using the—nobrief option) is used as the percent identity and is calculated as follows:

$$(\text{Identical Deoxyribonucleotides}\times 100)/(\text{Length of Alignment}-\text{Total Number of Gaps in Alignment})$$

Starch: The term "starch" means any material comprised of complex polysaccharides of plants, composed of glucose units that occurs widely in plant tissues in the form of storage granules, consisting of amylose and amylopectin, and represented as $(C_6H_{10}O_5)_n$, where n is any number.

Steep or steeping: The term "steeping" means soaking the crop kernel with water and optionally $SO_2$. Stringency conditions: The different stringency conditions are defined as follows.

The term "very low stringency conditions" means for probes of at least 100 nucleotides in length, prehybridization and hybridization at 42° C. in 5× SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 2.0× SSC, 0.2% SDS at 60° C.

The term "low stringency conditions" means for probes of at least 100 nucleotides in length, prehybridization and hybridization at 42° C. in 5× SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 1.0× SSC, 0.2% SDS at 60° C.

The term "medium stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 1.0× SSC, 0.2% SDS at 65° C.

The term "medium-high stringency conditions" means for probes of at least 100 nucleotides in length, prehybridization and hybridization at 42° C. in 5× SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 1.0×SSC, 0.2% SDS at 70° C.

The term "high stringency conditions" means for probes of at least 100 nucleotides in length, prehybridization and hybridization at 42° C. in 5× SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 0.5× SSC, 0.2% SDS at 70° C.

The term "very high stringency conditions" means for probes of at least 100 nucleotides in length, prehybridization and hybridization at 42° C. in 5× SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 0.5× SSC, 0.2% SDS at 75° C.

Subsequence: The term "subsequence" means a polynucleotide having one or more (e.g., several) nucleotides absent from the 5' and/or 3' end of a mature polypeptide coding sequence; wherein the subsequence encodes a fragment having arabinofuranosidase or xylanase activity.

Substantially pure polypeptide: The term "substantially pure polypeptide" means a preparation that contains at most 10%, at most 8%, at most 6%, at most 5%, at most 4%, at most 3%, at most 2%, at most 1%, and at most 0.5% by weight of other polypeptide material with which it is natively or recombinantly associated. Preferably, the polypeptide is at least 92% pure, e.g., at least 94% pure, at least 95% pure, at least 96% pure, at least 97% pure, at least 98% pure, at least 99%, at least 99.5% pure, and 100% pure by weight of the total polypeptide material present in the preparation. The polypeptides of the present invention are preferably in a substantially pure form. This can be accomplished, for example, by preparing the polypeptide by well-known recombinant methods or by classical purification methods.

Variant: The term "variant" means a polypeptide having xylanase or arabinofuranosidase activity comprising an alteration, i.e., a substitution, insertion, and/or deletion of one or more (several) amino acid residues at one or more (several) positions. A substitution means a replacement of an amino acid occupying a position with a different amino acid; a deletion means removal of an amino acid occupying a position; and an insertion means adding 1-3 amino acids adjacent to an amino acid occupying a position.

Wet milling benefit: The term "wet milling benefit" means one or more of improved starch yield and/or purity, improved gluten quality and/or yield, improved fiber, gluten, or steep water filtration, dewatering and evaporation, easier germ separation and/or better post-saccharification filtration, and process energy savings thereof.

Xylan degrading activity or xylanolytic activity: The term "xylan degrading activity" or "xylanolytic activity" means a biological activity that hydrolyzes xylan-containing material. The two basic approaches for measuring xylanolytic activity include: (1) measuring the total xylanolytic activity, and (2) measuring the individual xylanolytic activities (e.g., endoxylanases, beta-xylosidases, arabinofuranosidases, alpha-glucuronidases, acetylxylan esterases, feruloyl esterases, and alpha-glucuronyl esterases). Recent progress in assays of xylanolytic enzymes was summarized in several publications including Biely and Puchard, 2006, *Journal of the Science of Food and Agriculture* 86(11): 1636-1647; Spanikova and Biely, 2006, *FEBS Letters* 580(19): 4597-4601; Herrmann et al., 1997, *Biochemical Journal* 321: 375-381.

Total xylan degrading activity can be measured by determining the reducing sugars formed from various types of xylan, including, for example, oat spelt, beechwood, and larchwood xylans, or by photometric determination of dyed xylan fragments released from various covalently dyed xylans. A common total xylanolytic activity assay is based on production of reducing sugars from polymeric 4-O-methyl glucuronoxylan as describe Bailey et al., 1992, Interlaboratory testing of methods for assay of xylanase activity, *Journal of Biotechnology* 23(3): 257-270. Xylanase activity can also be determined with 0.2% AZCL-arabinoxylan as substrate in 0.01% TRITON® X-100 and 200 mM sodium phosphate pH 6 at 37° C. One unit of xylanase activity is defined as 1.0 pmole of azurine produced per minute at 37° C., pH 6 from 0.2% AZCL-arabinoxylan as substrate in 200 mM sodium phosphate pH 6.

Xylan degrading activity can be determined by measuring the increase in hydrolysis of birchwood xylan (Sigma Chemical Co., Inc., St. Louis, Mo., USA) by xylan-degrading enzyme(s) under the following typical conditions: 1 ml reactions, 5 mg/ml substrate (total solids), 5 mg of xylanolytic protein/g of substrate, 50 mM sodium acetate pH 5, 50° C., 24 hours, sugar analysis using p-hydroxybenzoic acid hydrazide (PHBAH) assay as described by Lever, 1972, Anal. Biochem. 47: 273-279.

Xylanase: The term "xylanase" means a 1,4-beta-D-xylan-xylohydrolase (E.C. 3.2.1.8) that catalyses the endohydrolysis of 1,4-beta-D-xylosidic linkages in xylans. Xylanase activity can be determined with 0.2% AZCL-arabinoxylan as substrate in 0.01% TRITON® X-100 and 200 mM sodium phosphate pH 6 at 37° C. One unit of xylanase activity is defined as 1.0 μmole of azurine produced per minute at 37° C., pH 6 from 0.2% AZCL-arabinoxylan as substrate in 200 mM sodium phosphate pH 6.

Nomenclature

For purposes of the present invention, the nomenclature [Y/F] means that the amino acid at this position may be a tyrosine (Try, Y) or a phenylalanine (Phe, F). Likewise the nomenclature [V/G/A/I] means that the amino acid at this position may be a valine (Val, V), glycine (Gly, G), alanine (Ala, A) or isoleucine (Ile, I), and so forth for other combinations as described herein. Unless otherwise limited further, the amino acid X is defined such that it may be any of the 20 natural amino acids.

DETAILED DESCRIPTION OF THE INVENTION

Accordingly, it is an object of the invention to provide improved processes of treating crop kernels to provide starch of high quality.

In one embodiment, the enzyme compositions useful in the processes of the invention provide benefits including, improving starch yield and/or purity, improving gluten quality and/or yield, improving fiber, gluten, or steep water filtration, dewatering and evaporation, easier germ separation and/or better post-saccharification filtration, and process energy savings thereof.

Moreover, the present inventors have surprisingly found that the enzymes useful according to the invention provide reduction in fiber mass and lower protein content of the fiber due to better separation of both starch and protein fractions from the fiber fraction. Separating starch and gluten from fiber is valuable to the industry because fiber is the least valuable product of the wet milling process, and higher purity starch and protein is desirable.

Surprisingly, the present inventors have discovered that replacing some of the protease activity in an enzyme composition can provide an improvement over an otherwise similar composition containing predominantly protease activity alone. This can provide a benefit to the industry, e.g., on the basis of cost and ease of use.

The Milling Process

The kernels are milled in order to open up the structure and to allow further processing and to separate the kernels into the four main constituents: starch, germ, fiber and protein.

In one embodiment, a wet milling process is used. Wet milling gives a very good separation of germ and meal (starch granules and protein) and is often applied at locations where there is a parallel production of syrups.

The inventors of the present invention have surprisingly found that the quality of the starch final product may be improved by treating crop kernels in the processes as described herein. The processes of the invention result in comparison to traditional processes in a higher starch quality, in that the final starch product is more pure and/or a higher yield is obtained and/or less process time is used. Another advantage may be that the amount of chemicals, such as SO2 and NaHSO3, which need to be used, may be reduced or even fully removed.

Wet Milling

Starch is formed within plant cells as tiny granules insoluble in water. When put in cold water, the starch granules may absorb a small amount of the liquid and swell. At temperatures up to about 50° C. to 75° C. the swelling may be reversible. However, with higher temperatures an irreversible swelling called "gelatinization" begins. Granular starch to be processed according to the present invention may be a crude starch-containing material comprising (e.g., milled) whole grains including non-starch fractions such as germ residues and fibers. The raw material, such as whole grains, may be reduced in particle size, e.g., by wet milling, in order to open up the structure and allowing for further processing. Wet milling gives a good separation of germ and meal (starch granules and protein) and is often applied at locations where the starch hydrolyzate is used in the production of, e.g., syrups.

In an embodiment the particle size is reduced to between 0.05-3.0 mm, preferably 0.1-0.5 mm, or so that at least 30%, preferably at least 50%, more preferably at least 70%, even more preferably at least 90% of the starch-containing material fits through a sieve with a 0.05-3.0 mm screen, preferably 0.1-0.5 mm screen.

More particularly, degradation of the kernels of corn and other crop kernels into starch suitable for conversion of starch into mono- and oligo-saccharides, ethanol, sweeteners, etc. consists essentially of four steps:

1. Steeping and germ separation,
2. Fiber washing and drying,
3. Starch gluten separation, and
4. Starch washing.

1. Steeping and Germ Separation

Corn kernels are softened by soaking in water for between about 30 minutes to about 48 hours, preferably 30 minutes to about 15 hours, such as about 1 hour to about 6 hours at a temperature of about 50° C., such as between about 45° C. to 60° C. During steeping, the kernels absorb water, increasing their moisture levels from 15 percent to 45 percent and more than doubling in size. The optional addition of, e.g., 0.1 percent sulfur dioxide ($SO_2$) and/or $NaHSO_3$ to the water prevents excessive bacteria growth in the warm environment. As the corn swells and softens, the mild acidity of the steepwater begins to loosen the gluten bonds within the corn and release the starch. After the corn kernels are steeped they are cracked open to release the germ. The germ contains the valuable corn oil. The germ is separated from the heavier density mixture of starch, hulls and fiber essentially by "floating" the germ segment free of the other substances under closely controlled conditions. This method serves to eliminate any adverse effect of traces of corn oil in later processing steps.

In an embodiment of the invention the kernels are soaked in water for 2-10 hours, preferably about 3-5 hours at a temperature in the range between 40 and 60° C., preferably around 50° C.

In one embodiment, 0.01-1%, preferably 0.05-0.3%, especially 0.1% $SO_2$ and/or NaHSO3 may be added during soaking.

2. Fiber washing and drying

To get maximum starch recovery, while keeping any fiber in the final product to an absolute minimum, it is necessary to wash the free starch from the fiber during processing. The fiber is collected, slurried and screened to reclaim any residual starch or protein.

3. Starch gluten separation

The starch-gluten suspension from the fiber-washing step, called mill starch, is separated into starch and gluten. Gluten has a low density compared to starch. By passing mill starch through a centrifuge, the gluten is readily spun out.

4. Starch washing

The starch slurry from the starch separation step contains some insoluble protein and much of solubles. They have to be removed before a top quality starch (high purity starch) can be made. The starch, with just one or two percent protein remaining, is diluted, washed 8 to 14 times, re-diluted and washed again in hydroclones to remove the last trace of protein and produce high quality starch, typically more than 99.5% pure.

Products

Wet milling can be used to produce, without limitation, corn steep liquor, corn gluten feed, germ, corn oil, corn gluten meal, corn starch, modified corn starch, syrups such as corn syrup, and corn ethanol.

Polypeptides Having Arabinofuranosidase Activity

Preferred embodiments of the aspect of the invention relating to the GH62 polypeptide having arabinofuranosidase activity are disclosed herein below. Additional details of preferred GH62 polypeptides having arabinofuranosidase activity are found in PCT/CN2015/071015 filed 19 January 2015.

In an embodiment, the GH62 polypeptide having arabinofuranosidase activity has a sequence identity to the mature polypeptide of SEQ ID NO: 8 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 9 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 11 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 12 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 14 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 15 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 17 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has sequence identity to SEQ ID NO: 18 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 20 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 21 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 23 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 24 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 26 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 27 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, GH62 polypeptide having arabinofuranosidase activity has a sequence identity to the mature polypeptide of SEQ ID NO: 29 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 30 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 35 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 36 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 41 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide has arabinofuranosidase activity having a sequence identity to SEQ ID NO: 42 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 47 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide has arabinofuranosidase activity having a sequence identity to SEQ ID NO: 48 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 53 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 54 of at least 80% of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 59 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 60 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In another embodiment, the GH62 polypeptide having arabinofuranosidase activity has a sequence identity to the mature polypeptide of SEQ ID NO: 65 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 66 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 117 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH62 polypeptide having arabinofuranosidase activity has a sequence identity to SEQ ID NO: 118 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

Sources of Polypeptides

A polypeptide having arabinofuranosidase or xylanase activity of the present invention may be obtained from microorganisms of any genus. For purposes of the present invention, the term "obtained from" as used herein in connection with a given source shall mean that the polypeptide encoded by a polynucleotide is produced by the source or by a strain in which the polynucleotide from the source has been inserted. In one aspect, the polypeptide obtained from a given source is secreted extracellularly.

The polypeptide may be a fungal polypeptide. In one embodiment, the polypeptide is from a fungus of the order Eurotiales, or from the family Aspergillaceae, or from the genus *Penicillium* or from the species *Penicillium aurantiogriseum, Penicillium oxalicum* or *Penicillium capsulatum.*

In one embodiment, the polypeptide is from a fungus of the order Eurotiales, or from the family Aspergillaceae, or from the genus Aspergillus or from the species Aspergillus clavatus or *Aspergillus wentii* or Aspergillus niger. In one embodiment, the polypeptide is from a fungus of the order Eurotiales, or from the family Aspergillaceae, or from the genus *Neosartorya* or from the species *Neosartorya fischeri.*

In one embodiment, the polypeptide is from a fungus of the order Eurotiales, or from the family Trichocomaceae, or from the genus *Talaromyces* or from the species *Talaromyces pinophilus.*

In one embodiment, the polypeptide is from a fungus of the order Ustilaginales, or from the family Ustilaginaceae, or from the genus *Ustilago* or from the species *Ustilago maydis.*

In one embodiment, the polypeptide is from a fungus of the phylum Ascomycota, or from the genus *Acrophialophora* or from the species *Acrophialophora fusispora.*

The polypeptide may be a bacterial polypeptide. In one embodiment, the polypeptide is from a bacterium of the order Actinomycetales, or from the family Streptomycetaceae, or from the genus *Streptomyces* or from the species *Streptomyces nitrosporeus* or *Streptomyces beijiangensis.*

In one embodiment, the polypeptide is from a bacterium of the order Actinomycetales, or from the family Streptosporangiaceae, or from the genus *Streptosporangium* or from the species *Streptosporangium* sp-60756.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and Agricultural Research Service Patent Culture Collection, Northern Regional Research Center (NRRL).

The polypeptide may be identified and obtained from other sources including microorganisms isolated from nature (e.g., soil, composts, water, etc.) or DNA samples obtained directly from natural materials (e.g., soil, composts, water, etc.) using the above-mentioned probes. Techniques for isolating microorganisms and DNA directly from natural habitats are well known in the art. A polynucleotide encoding the polypeptide may then be obtained by similarly screening a genomic DNA or cDNA library of another microorganism or mixed DNA sample. Once a polynucleotide encoding a polypeptide has been detected with the probe(s), the polynucleotide can be isolated or cloned by utilizing techniques that are known to those of ordinary skill in the art (see, e.g., Sambrook et al., 1989, supra).

Enzyme Compositions Preferably, the compositions are enriched in the polypeptides useful according to the invention. The term "enriched" indicates that the enzymatic activity of the composition has been increased, e.g., with an enrichment factor of at least 1.1, such as at least 1.2, at least 1.3, at least 1.4, at least 1.5, at least 2.0, at least 3.0, at least 4.0, at least 5.0, at least 10. In an embodiment, the composition comprises the polypeptides of the first aspect of the invention and one or more formulating agents, as described in the 'formulating agent' section below.

The compositions may comprise a polypeptide of the present invention as the major enzymatic component, e.g., a mono-component composition. Such a composition may further comprise a formulating agent, as described in the 'formulating agent' section below. Alternatively, the compositions may comprise multiple enzymatic activities, such as one or more (e.g., several) enzymes selected from the group consisting of phytase, xylanase, galactanase, alpha-galactosidase, protease, phospholipase, glucoronidase, lysophospholipase, amylase, beta-glucanase, arabinofuranosidase, beta-xylosidase, endo-1,4-beta-xylanase acetyl xylan esterase, feruloyl esterase, cellulase, cellobiohydrolase, beta-glycosidase, pullulanase, or any mixture thereof. Additional cellulolytic activities are particularly contemplated, as further outlined below.

Where arabinofuranosidase and xylanase activity are contemplated, it is at present contemplated that the xylanase is used in one or more of the following amounts (dosage ranges): 0.01-200; 0.05-100; 0.1-50; 0.2-20; 0.1-1; 0.2-2; 0.5-5; or 1-10 wherein all these ranges are mg xylanase protein per kg substrate (ppm). It is at present contemplated that the arabinofuranosidase is administered in one or more of the following amounts (dosage ranges): 0.01-200; 0.05-100; 0.1-50; 0.2-20; 0.1-1; 0.2-2; 0.5-5; or 1-10 wherein all these ranges are mg arabinofuranosidase protein per kg substrate (ppm). It is further contemplated that the ratio of the GH10 or 11 xylanase to GH62 arabinofuranosidase is in the range of 100:1 to 1:100 xylanase: arabinofuranosidase such as the ranges 50:1 to 1:50, 50:1 to 1:10, 25:1 to 1:5, 10:1 to 1:2 or such as 10:1 to 1:50, 5:1 to 1:25, 2:1 to 1:10 xylanase: arabinofuranosidase.

Formulating Agent

The enzyme of the invention may be formulated as a liquid or a solid. For a liquid formulation, the formulating agent may comprise a polyol (such as, e.g., glycerol, ethylene glycol or propylene glycol), a salt (such as, e.g., sodium chloride, sodium benzoate, potassium sorbate) or a sugar or sugar derivative (such as, e.g., dextrin, glucose, sucrose, and sorbitol). Thus, in one embodiment, the composition is a liquid composition comprising the polypeptide of the invention and one or more formulating agents selected from the list consisting of glycerol, ethylene glycol, 1,2-propylene glycol, 1,3-propylene glycol, sodium chloride, sodium benzoate, potassium sorbate, dextrin, glucose, sucrose, and sorbitol.

For a solid formulation, the formulation may be for example as a granule, spray dried powder or agglomerate. The formulating agent may comprise a salt (organic or inorganic zinc, sodium, potassium or calcium salts such as, e.g., such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as, e.g., sucrose, dextrin, glucose, lactose, sorbitol).

In an embodiment, the solid composition is in granulated form. The granule may have a matrix structure where the components are mixed homogeneously. However, the granule typically comprises a core particle and one or more coatings, which typically are salt and/or wax coatings. The core particle can either be a homogeneous blend of xylanase of the invention optionally combined with one or more additional enzymes and optionally together with one or more salts or an inert particle with the xylanase of the invention optionally combined with one or more additional enzymes applied onto it.

In an embodiment, the material of the core particles are selected from the group consisting of inorganic salts (such as calcium acetate, calcium benzoate, calcium carbonate, calcium chloride, calcium citrate, calcium sorbate, calcium sulfate, potassium acetate, potassium benzoate, potassium carbonate, potassium chloride, potassium citrate, potassium sorbate, potassium sulfate, sodium acetate, sodium benzoate, sodium carbonate, sodium chloride, sodium citrate, sodium sulfate, zinc acetate, zinc benzoate, zinc carbonate, zinc chloride, zinc citrate, zinc sorbate, zinc sulfate), starch or a sugar or sugar derivative (such as, e.g., sucrose, dextrin, glucose, lactose, sorbitol), sugar or sugar derivative (such as, e.g., sucrose, dextrin, glucose, lactose, sorbitol), small organic molecules, starch, flour, cellulose and minerals.

The salt coating is typically at least 1 μm thick and can either be one particular salt or a mixture of salts, such as $Na_2SO_4$, $K_2SO_4$, $MgSO_4$ and/or sodium citrate. Other examples are those described in, e.g., WO 2008/017659, WO 2006/034710, WO 97/05245, WO 98/54980, WO 98/55599, WO 00/70034 or polymer coating such as described in WO 01/00042.

In another embodiment, the composition is a solid composition comprising the xylanase of the invention and one or more formulating agents selected from the list consisting of sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch and cellulose. In a preferred embodiment, the formulating agent is selected from one or more of the following compounds: sodium sulfate, dextrin, cellulose, sodium thiosulfate and calcium carbonate. In a preferred embodiment, the solid composition is in granulated form. In an embodiment, the solid composition is in granulated form and comprises a core particle, an enzyme layer comprising the xylanase of the invention and a salt coating.

In a further embodiment, the formulating agent is selected from one or more of the following compounds: glycerol, ethylene glycol, 1,2-propylene glycol or 1,3-propylene glycol, sodium chloride, sodium benzoate, potassium sorbate, sodium sulfate, potassium sulfate, magnesium sulfate, sodium thiosulfate, calcium carbonate, sodium citrate, dextrin, glucose, sucrose, sorbitol, lactose, starch and cellulose. In a preferred embodiment, the formulating agent is selected from one or more of the following compounds: 1,2-propylene glycol, 1,3-propy propylene glycol, sodium sulfate, dextrin, cellulose, sodium thiosulfate and calcium carbonate.

Plant based material from the sub-family Panicoideae

In one embodiment, the plant based material from the sub-family Panicoideae is from the tribe Andropogoneae such as the rank Andropogon or Andropterum or Apluda or Apocopis or Arthraxon or Bothriochloa or Capillipedium or Chionachne or Chrysopogon or Coelorachis or Coix or Cymbopogon or Dichanthium or Diheteropogon or Dimeria or Elionurus or Eremochloa or Euclasta or Eulalia or Germainia or Hemarthria or Heteropholis or Heteropogon or Hyparrhenia or Hyperthelia or Imperata or Ischaemum or Iseilema or Kerriochloa or Microstegium or Miscanthidium or Miscanthus or Mnesithea or Ophiuros or Oxyrhachis or Phacelurus or Pholiurus or Pogonatherum or Polytoca or Polytrias or Pseudopogonatherum or Pseudosorghum or Rhytachne or Rottboellia or Saccharum or Sarga or Schizachyrium or Sehima or Sorghastrum or Sorghum or Spodiopogon or Thaumastochloa or Thelepogon or Themeda or Trachypogon or Triarrhena or Tripsacum or Urelytrum or Vetiveria or Vossia or Xerochloa or Zea.

In a preferred embodiment, the plant based material from the sub-family Panicoideae is from the rank Zea, such as the species Zea diploperennis, Zea luxurians, Zea mays, Zea nicaraguensis or Zea perennis.

In a preferred embodiment, the plant based material from the sub-family Panicoideae is from the rank Sorghum, such as the species Sorghum amplum, Sorghum angustum, Sorghum arundinaceum, Sorghum australiense, Sorghum bicolor, Sorghum brachypodum, Sorghum bulbosum, Sorghum ecarinatum, Sorghum exstans, Sorghum grande, Sorghum halepense, Sorghum hybrid cultivar, Sorghum interjectum, Sorghum intrans, Sorghum laxiflorum, Sorghum leiocladum, Sorghum macrospermum, Sorghum matarankense, Sorghum nitidum, Sorghum plumosum, Sorghum propinquum, Sorghum purpureosericeum, Sorghum stipoideum, Sorghum sudanense, Sorghum timorense, Sorghum versicolor, Sorghum sp. 'Silk' or Sorghum sp. as defined in WO 2007/002267.

In another embodiment, the plant based material from the sub-family Panicoideae is from the tribe Paniceae such as the rank Acritochaete, Acroceras, Alexfloydia, Alloteropsis, Amphicarpum, Ancistrachne, Anthephora, Brachiaria, Calyptochloa, Cenchrus, Chaetium, Chaetopoa, Chamaeraphis, Chlorocalymma, Cleistochloa, Cyphochlaena, Cyrtococcum, Dichanthelium, Digitaria, Dissochondrus, Echinochloa, Entolasia, Eriochloa, Homopholis, Hygrochloa, Hylebates, lxophorus, Lasiacis, Leucophrys, Louisiella, Megaloprotachne, Megathyrsus, Melinis, Microcalamus, Moorochloa, Neurachne, Odontelytrum, Oplismenus, Ottochloa, Panicum, Paractaenum, Paraneurachne, Paratheria, Parodiophyllochlloa, Paspalidium, Pennisetum, Plagiosetum, Poecilostachys, Pseudechinolaena, Pseudochaetochloa, Pseudoraphis, Rupichloa, Sacciolepis, Scutachne, Setaria, Setariopsis, Snowdenia, Spinifex, Stenotaphrum, Stereochlaena, Thrasya, Thuarea, Thyridolepis, Tricholaena, unclassified Paniceae, Uranthoecium, Urochloa, Walwhalleya, Whiteochloa, Yakirra, Yvesia, Zuloagaea or Zygochloa.

In a preferred embodiment, the plant based material from the sub-family Panicoideae is from the rank Panicum, such as the species Panicum adenophorum, Panicum aff. aquaticum JKT-2012, Panicum amarum, Panicum antidotale, Panicum aquaticum, Panicum arctum, Panicum arundinariae, Panicum atrosanguineum, Panicum auricomum, Panicum auritum, Panicum bartlettii, Panicum Panicum bisulcatum, Panicum boliviense, Panicum brazzavillense, Panicum brevifolium, Panicum caaguazuense, Panicum campestre, Panicum capillare, Panicum cayennense, Panicum cayoense, Panicum cervicatum, Panicum chloroleucum, Panicum claytonii, Panicum coloratum, Panicum cyanescens, Panicum decompositum, Panicum deustum, Panicum dichotomiflorum, Panicum dinklagei, Panicum distichophyllum, Panicum dregeanum, Panicum elephantipes, Panicum fauriei, Panicum flexile, Panicum fluviicola, Panicum gouinii Panicum gracilicaule, Panicum granuliferum, Panicum guatemalense, Panicum hallii, Panicum heterostachyum, Panicum hirticaule, Panicum hirtum, Panicum hylaeicum, Panicum incumbens, Panicum infestum, Panicum italicum, Panicum laetum, Panicum laevinode, Panicum lanipes, Panicum larcomianum, Panicum longipedicellatum, Panicum machrisianum, Panicum malacotrichum, Panicum margaritiferum, Panicum micranthum, Panicum miliaceum, Panicum milioides, Panicum millegrana, Panicum mystasipum, Panicum natalense, Panicum nephelophilum, Panicum nervosum, Panicum notatum, Panicum olyroides, Panicum paludosum, Panicum pansum, Panicum pantrichum, Panicum parvifolium, Panicum parviglume, Panicum pedersenii, Panicum penicillatum, Panicum petersonii, Panicum phragmitoides, Panicum piauiense, Panicum pilosum, Panicum pleianthum, Panicum polycomum, Panicum polygonatum, Panicum pseudisachne, Panicum pygmaeum, Panicum pyrularium, Panicum queenslandicum, Panicum racemosum, Panicum repens, Panicum rhizogonum, Panicum rigidulum, Panicum rivale, Panicum rude, Panicum rudgei, Panicum Panicum schwackeanum, Panicum sellowii, Panicum seminudum, Panicum stapfianum, Panicum stenodes, Panicum stramineum, Panicum subalbidum, Panicum subtiramulosum, Panicum sumatrense, Panicum tenellum, Panicum tenuifolium, Panicum trichanthum, Panicum trichidiachne, Panicum trichoides, Panicum tricholaenoides, Panicum tuerckheimii, Panicum turgidum, Panicum urvilleanum, Panicum validum, Panicum venezuelae, Panicum verrucosum, Panicum virgatum, Panicum wettsteinii, Panicum sp., Panicum sp. Christin 16-200, Panicum sp. ELS-2011, Panicum sp. EM389 or Panicum sp. Forest 761.

In a further embodiment, the plant based material from the sub-family Panicoideae is maize (Zea), corn (Zea), sorghum (Sorghum), switchgrass (Panicum virgatum), millet (Panicum miliaceum), pearl millet (Cenchrus violaceus also called Pennisetum glaucum), foxtail millet (Setaria italica also called Panicum italicum) or in a processed form such as milled corn, milled maize, defatted maize, defatted destarched maize, milled sorghum, milled switchgrass, milled millet, milled foxtail millet, milled pearl millet, or any combination thereof.

In an embodiment, the plant based material from the sub-family Panicoideae is from the seed of the plant. In a preferred embodiment, the plant based material from the sub-family Panicoideae is from the seed of maize (Zea), corn (Zea), sorghum (Sorghum), switchgrass (Panicum virgatum), millet (Panicum miliaceum), pearl millet (Cenchrus violaceus also called Pennisetum glaucum), foxtail millet (Setaria italica also called Panicum italicum) or wherein the seed has been processed such as milled corn, milled maize, defatted maize, defatted destarched maize, milled sorghum, milled switchgrass, milled millet, milled foxtail millet, milled pearl millet, or any combination thereof.

Additional Enzymes

In an embodiment, enzymatic activities aside from or in addition to polypeptides having arabinofuranosidase activity useful according to the invention are contemplated. In particular, protease and additional cellulolytic activities are contemplated.

In an embodiment the invention comprises the use of a GH62 polypeptide having arabinofuranosidase activity and a GH10 xylanase.

In an embodiment the invention comprises the use of a GH62 polypeptide having arabinofuranosidase activity and a GH11 xylanase.

In an embodiment the invention comprises the use of a GH43 polypeptide having arabinofuranosidase activity and a GH10 xylanase.

In an embodiment the invention comprises the use of a GH43 polypeptide having arabinofuranosidase activity and a GH11 xylanase.

Proteases

The protease may be any protease. Suitable proteases include microbial proteases, such as fungal and bacterial proteases. Preferred proteases are acidic proteases, i.e., proteases characterized by the ability to hydrolyze proteins under acidic conditions below pH 7. Preferred proteases are acidic endoproteases. An acid fungal protease is preferred, but also other proteases can be used.

The acid fungal protease may be derived from *Aspergillus, Candida, Coriolus, Endothia, Enthomophtra, lrpex, Mucor, Penicillium, Rhizopus, Sclerotium, and Torulopsis*. In particular, the protease may be derived from Aspergillus aculeatus (WO 95/02044), Aspergillus awamori (Hayashida et al., 1977, *Agric. Biol. Chem.* 42(5), 927-933), Aspergillus niger (see, e.g., Koaze et al., 1964, *Agr. Biol. Chem. Japan* 28: 216), *Aspergillus saitoi* (see, e.g., Yoshida, 1954, *J. Agr. Chem. Soc. Japan* 28: 66), or Aspergillus oryzae, such as the pepA protease; and acidic proteases from Mucor miehei or Mucor pusillus.

In an embodiment the acidic protease is a protease complex from *A. oryzae* sold under the tradename Flavourzyme® (from Novozymes AlS) or an aspartic protease from Rhizomucor miehei or Spezyme® FAN or GC 106 from Genencor Int.

In a preferred embodiment the acidic protease is an aspartic protease, such as an aspartic protease derived from a strain of *Aspergillus*, in particular, *A. aculeatus*, especially *A. aculeatus* CBD 101.43.

Preferred acidic proteases are aspartic proteases, which retain activity in the presence of an inhibitor selected from the group consisting of pepstatin, Pefabloc, PMSF, or EDTA. Protease I derived from A. aculeatus CBS 101.43 is such an acidic protease.

In a preferred embodiment the process of the invention is carried out in the presence of the acidic Protease I derived from A. aculeatus CBS 101.43 in an effective amount.

In another embodiment the protease is derived from a strain of the genus Aspergillus, such as a strain of *Aspergillus aculaetus*, such as Aspergillus aculeatus CBS 101.43, such as the one disclosed in WO 95/02044, or a protease having at least 80%, such as at least 85%, such as at least 90%, preferably at least 95%, such as at least 96%, such as 97%, such as at least 98%, such as at least 99% identity to protease of WO 95/02044. In one aspect, the protease differs by up to 10 amino acids, e.g., 1, 2, 3, 4, 5, 6, 7, 8, 9, or 10, from the mature polypeptide of WO 95/02044. In another embodiment, the present invention relates to variants of the mature polypeptide of WO 95/02044 comprising a substitution, deletion, and/or insertion at one or more (e.g., several) positions. In an embodiment, the number of amino acid substitutions, deletions and/or insertions introduced into the mature polypeptide of WO 95/02044 is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function. The protease may be a neutral or alkaline protease, such as a protease derived from a strain of *Bacillus*. A particular protease is derived from *Bacillus amyloliquefaciens* and has the sequence obtainable at Swissprot as Accession No. P06832. The proteases may have at least 90% sequence identity to the amino acid sequence disclosed in the Swissprot Database, Accession No. P06832 such as at least 92%, at least 95%, at least 96%, at least 97%, at least 98%, or particularly at least 99% identity.

The protease may have at least 90% sequence identity to the amino acid sequence disclosed as sequence 1 in WO 2003/048353 such as at 92%, at least 95%, at least 96%, at least 97%, at least 98%, or particularly at least 99% identity.

The protease may be a papain-like protease selected from the group consisting of proteases within EC 3.4.22.* (cysteine protease), such as EC 3.4.22.2 (papain), EC 3.4.22.6 (chymopapain), EC 3.4.22.7 (asclepain), EC 3.4.22.14 (actinidain), EC 3.4.22.15 (cathepsin L), EC 3.4.22.25 (glycyl endopeptidase) and EC 3.4.22.30 (caricain).

In an embodiment, the protease is a protease preparation derived from a strain of *Aspergillus*, such as *Aspergillus oryzae*. In another embodiment the protease is derived from a strain of Rhizomucor, preferably Rhizomucor miehei. In another embodiment the protease is a protease preparation, preferably a mixture of a proteolytic preparation derived from a strain of *Aspergillus*, such as *Aspergillus oryzae*, and a protease derived from a strain of Rhizomucor, preferably Rhizomucor miehei.

Aspartic acid proteases are described in, for example, Handbook of Proteolytic Enzymes, Edited by A.J. Barrett, N.D. Rawlings and J.F. Woessner, Academic Press, San Diego, 1998, Chapter 270. Examples of aspartic acid proteases include, e.g., those disclosed in Berka et al., 1990, Gene 96: 313; Berka et al., 1993, Gene 125: 195-198; and Gomi et al., 1993, Biosci. Biotech. Biochem. 57: 1095-1100, which are hereby incorporated by reference.

The protease also may be a metalloprotease, which is defined as a protease selected from the group consisting of:

(a) proteases belonging to EC 3.4.24 (metalloendopeptidases); preferably EC 3.4.24.39 (acid metallo proteinases);

(b) metalloproteases belonging to the M group of the above Handbook;

(c) metalloproteases not yet assigned to clans (designation: Clan MX), or belonging to either one of clans MA, MB, MC, MD, ME, MF, MG, MH (as defined at pp. 989-991 of the above Handbook);

(d) other families of metalloproteases (as defined at pp. 1448-1452 of the above Handbook);

(e) metalloproteases with a HEXXH motif;

(f) metalloproteases with an HEFTH motif;

(g) metalloproteases belonging to either one of families M3, M26, M27, M32, M34, M35, M36, M41, M43, or M47 (as defined at pp. 1448-1452 of the above Handbook);

(h) metalloproteases belonging to the M28E family; and (i) metalloproteases belonging to family M35 (as defined at pp. 1492-1495 of the above Handbook).

In other particular embodiments, metalloproteases are hydrolases in which the nucleophilic attack on a peptide bond is mediated by a water molecule, which is activated by a divalent metal cation. Examples of divalent cations are zinc, cobalt or manganese. The metal ion may be held in place by amino acid ligands. The number of ligands may be five, four, three, two, one or zero. In a particular embodiment, the number is two or three, preferably three.

There are no limitations on the origin of the metalloprotease used in a process of the invention. In an embodiment the metalloprotease is classified as EC 3.4.24, preferably EC 3.4.24.39. In one embodiment, the metalloprotease is an acid-stable metalloprotease, e.g., a fungal acid-stable metalloprotease, such as a metalloprotease derived from a strain of the genus *Thermoascus*, preferably a strain of *Thermoascus aurantiacus*, especially *Thermoascus aurantiacus* CGMCC No. 0670 (classified as EC 3.4.24.39). In another embodiment, the metalloprotease is derived from a strain of the genus *Aspergillus*, preferably a strain of *Aspergillus oryzae*.

In one embodiment the metalloprotease has a degree of sequence identity to amino acids-159 to 177, or preferably amino acids+1 to 177 (the mature polypeptide) of Sequence Number 1 of WO 2010/008841 (a *Thermoascus aurantiacus* metalloprotease) of at least 80%, at least 82%, at least 85%, at least 90%, at least 95%, or at least 97%; and which have metalloprotease activity.

The *Thermoascus aurantiacus* metalloprotease is a preferred example of a metalloprotease suitable for use in a process of the invention. Another metalloprotease is derived from Aspergillus oryzae and comprises Sequence Number 11 disclosed in WO 2003/048353, or amino acids 23-353; 23-374; 23-397; 1-353; 1-374; 1-397; 177-353; 177-374; or 177-397 thereof, and Sequence Number 10 disclosed in WO 2003/048353.

Another metalloprotease suitable for use in a process of the invention is the *Aspergillus oryzae* metalloprotease comprising Sequence Number 5 of WO 2010/008841, or a metalloprotease is an isolated polypeptide which has a degree of identity to Sequence Number 5 of at least about 80%, at least 82%, at least 85%, at least 90%, at least 95%, or at least 97%; and which have metalloprotease activity. In particular embodiments, the metalloprotease consists of the amino acid sequence of Sequence Number 5.

In a particular embodiment, a metalloprotease has an amino acid sequence that differs by forty, thirty-five, thirty, twenty-five, twenty, or by fifteen amino acids from amino acids −159 to 177, or +1 to 177 of the amino acid sequences of the Thermoascus aurantiacus or Aspergillus oryzae metalloprotease.

In another embodiment, a metalloprotease has an amino acid sequence that differs by ten, or by nine, or by eight, or by seven, or by six, or by five amino acids from amino acids −159 to 177, or +1 to 177 of the amino acid sequences of these metalloproteases, e.g., by four, by three, by two, or by one amino acid.

In particular embodiments, the metalloprotease a) comprises or b) consists of i) the amino acid sequence of amino acids −159 to 177, or +1 to 177 of Sequence Number 1 of WO 2010/008841;

ii) the amino acid sequence of amino acids 23-353, 23-374, 23-397, 1-353, 1-374, 1-397, 177-353, 177-374, or 177-397 of Sequence Number 3 of WO 2010/008841;

iii) the amino acid sequence of Sequence Number 5 of WO 2010/008841; or allelic variants, or fragments, of the sequences of i), ii), and iii) that have protease activity.

A fragment of amino acids −159 to 177, or +1 to 177 of Sequence Number 1 of WO 2010/008841 or of amino acids 23-353, 23-374, 23-397, 1-353, 1-374, 1-397, 177-353, 177-374, or 177-397 of Sequence Number 3 of WO 2010/008841; is a polypeptide having one or more amino acids deleted from the amino and/or carboxyl terminus of these amino acid sequences. In one embodiment a fragment contains at least 75 amino acid residues, or at least 100 amino acid residues, or at least 125 amino acid residues, or at least 150 amino acid residues, or at least 160 amino acid residues, or at least 165 amino acid residues, or at least 170 amino acid residues, or at least 175 amino acid residues.

In another embodiment, the metalloprotease is combined with another protease, such as a fungal protease, preferably an acid fungal protease.

In another embodiment, the protease is selected from the group consisting of:

(a) proteases belonging to the EC 3.4.21. enzyme group; and/or (b) proteases belonging to the EC 3.4.14. enzyme group; and/or (c) Serine proteases of the peptidase family S53 that comprises two different types of peptidases: tripeptidyl aminopeptidases (exo-type) and endo-peptidases; as described in 1993, *Biochem. J.* 290:205-218 and in MEROPS protease database, release, 9.4 (31 Jan. 2011) (www.merops.ac.uk). The database is described in Rawlings, Barrett and Bateman, 2010, "MEROPS: the peptidase database", Nucl. Acids Res. 38: D227-D233. See also PCT/CN2013/087861 filed 26 Nov. 2013.

Commercially available products include ALCALASE®, ESPERASE™, FLAVOURZYME™, NEUTRASE®, RENNILASE®, NOVOZYM™ FM 2.0L, and iZyme BA (available from Novozymes A/S, Denmark) and GC106™ M and SPEZYME™ FAN from Genencor International, Inc., USA.

The protease may be present in an amount of 0.0001-1 mg enzyme protein per g dry solids (DS) kernels, preferably 0.001 to 0.1 mg enzyme protein per g DS kernels.

In an embodiment, the protease is an acidic protease added in an amount of 1-20,000 HUT/100 g DS kernels, such as 1-10,000 HUT/100 g DS kernels, preferably 300-8,000 HUT/100 g DS kernels, especially 3,000-6,000 HUT/100 g DS kernels, or 4,000-20,000 HUT/100 g DS kernels acidic protease, preferably 5,000-10,000 HUT/100 g, especially from 6,000-16,500 HUT/100 g DS kernels.

Cellulolytic Compositions

In further embodiments, the invention relates to use of combinations with cellulolytic compositions.

Exemplary cellulolytic compositions are as described in e.g., WO 2015/081139 and PCT/US2015/034179.

In an embodiment the cellulolytic composition is derived from a strain of Trichoderma, such as a strain of Trichoderma reesei; a strain of Humicola, such as a strain of Humicola insolens, and/or a strain of Chrysosporium, such as a strain of Chrysosporium lucknowense.

In a preferred embodiment the cellulolytic composition is derived from a strain of Trichoderma reesei.

The cellulolytic composition may comprise one or more of the following polypeptides, including enzymes: GH61 polypeptide having cellulolytic enhancing activity, beta-glucosidase, beta-xylosidase, CBHI and CBHII, endoglucanase, xylanase, or a mixture of two, three, or four thereof.

In an embodiment the cellulolytic composition comprises a GH61 polypeptide having cellulolytic enhancing activity and a beta-glucosidase.

In an embodiment the cellulolytic composition comprises a GH61 polypeptide having cellulolytic enhancing activity and a beta-xylosidase.

In an embodiment, the cellulolytic composition comprises a GH61 polypeptide having cellulolytic enhancing activity and an endoglucanase.

In an embodiment, the cellulolytic composition comprises a GH61 polypeptide having cellulolytic enhancing activity and a xylanase.

In an embodiment, the cellulolytic composition comprises a GH61 polypeptide having cellulolytic enhancing activity, an endoglucanase, and a xylanase.

In an embodiment the cellulolytic composition comprises a GH61 polypeptide having cellulolytic enhancing activity, a beta-glucosidase, and a beta-xylosidase. In an embodiment the cellulolytic composition comprises a GH61 polypeptide having cellulolytic enhancing activity, a beta-glucosidase, and an endoglucanase. In an embodiment the cellulolytic composition comprises a GH61 polypeptide having cellulolytic enhancing activity, a beta-glucosidase, and a xylanase.

In an embodiment the cellulolytic composition comprises a GH61 polypeptide having cellulolytic enhancing activity, a beta-xylosidase, and an endoglucanase. In an embodiment the cellulolytic composition comprises a GH61 polypeptide having cellulolytic enhancing activity, a beta-xylosidase, and a xylanase.

In an embodiment the cellulolytic composition comprises a GH61 polypeptide having cellulolytic enhancing activity, a beta-glucosidase, a beta-xylosidase, and an endoglucanase. In an embodiment the cellulolytic composition comprises a GH61 polypeptide having cellulolytic enhancing activity, a beta-glucosidase, a beta-xylosidase, and a xylanase. In an embodiment the cellulolytic composition comprises a GH61 polypeptide having cellulolytic enhancing activity, a beta-glucosidase, an endoglucanase, and a xylanase.

In an embodiment the cellulolytic composition comprises a GH61 polypeptide having cellulolytic enhancing activity, a beta-xylosidase, an endoglucanase, and a xylanase.

In an embodiment the cellulolytic composition comprises a GH61 polypeptide having cellulolytic enhancing activity, a beta-glucosidase, a beta-xylosidase, an endoglucanase, and a xylanase.

In an embodiment the endoglucanase is an endoglucanase I.

In an embodiment the endoglucanase is an endoglucanase II.

In an embodiment, the cellulolytic composition comprises a GH61 polypeptide having cellulolytic enhancing activity, an endoglucanase I, and a xylanase.

In an embodiment, the cellulolytic composition comprises a GH61 polypeptide having cellulolytic enhancing activity, an endoglucanase II, and a xylanase.

In another embodiment the cellulolytic composition comprises a GH61 polypeptide having cellulolytic enhancing activity, a beta-glucosidase, and a CBHI.

In another embodiment the cellulolytic composition comprises a GH61 polypeptide having cellulolytic enhancing activity, a beta-glucosidase, a CBHI and a CBHII.

The cellulolytic composition may further comprise one or more enzymes selected from the group consisting of an esterase, an expansin, a laccase, a ligninolytic enzyme, a pectinase, a peroxidase, a protease, a swollenin, and a phytase.

Xylanase (GH10 and GH11 Polypeptides)

Exemplary embodiments relating to the GH10 or GH11 polypeptide having xylanase activity are disclosed herein below, alternatively referred to as Family 10 xylanase and Family 11 xylanase, respectively.

In an embodiment, the GH10 polypeptide having xylanase activity such as the xylanase from *Aspergillus aculeatus* (Xyl II) as disclosed in WO 1994/021785 as SEQ ID NO: 5 and disclosed herein as SEQ ID NO: 70.

In an embodiment, the GH10 polypeptide having xylanase activity has a sequence identity to SEQ ID NO: 70 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity such as the xylanase from Clostridium acetobutylicum as disclosed in *J. Bacteriol.* 183(16):4823 (2001) as Swissprot:Q97TP5 and disclosed herein as SEQ ID NO: 71.

In an embodiment, the GH10 polypeptide having xylanase activity has a sequence identity to SEQ ID NO: 71 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity such as the xylanase from Aspergillus aculeatus as disclosed as SEQ ID NO: 8 in WO 2005/059084 and disclosed herein as SEQ ID NO: 72.

In an embodiment, the GH10 polypeptide having xylanase activity has a sequence identity to SEQ ID NO: 72 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from Thermomyces lanuginosus as disclosed as SEQ ID NO: 2 in WO 96/23062 and disclosed herein as SEQ ID NO: 73.

In an embodiment, the GH10 polypeptide having xylanase activity has a sequence identity to SEQ ID NO: 73 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from Dictyoglomus thermophilum as disclosed as SEQ ID NO: 305 in WO 2011/057140 and disclosed herein as SEQ ID NO: 74.

In an embodiment, GH10 polypeptide having xylanase activity has a sequence identity to SEQ ID NO: 74 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from Paenibacillus pabuli as disclosed as SEQ ID NO: 2 in WO 2005/079585 and disclosed herein as SEQ ID NO: 75.

In an embodiment, the GH10 polypeptide having xylanase activity has a sequence identity to SEQ ID NO: 75 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Geobacillus stearothermophilus* as disclosed herein as SEQ ID NO: 78. In an embodiment, the composition comprises a GH10 polypeptide having xylanase activity having a sequence identity to the mature polypeptide of SEQ ID NO: 77 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity has a sequence identity to SEQ ID NO: 78 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Streptomyces beijiangensis* as disclosed herein as SEQ ID NO: 84. In an embodiment, the composition comprises a GH10 polypeptide having xylanase activity having a sequence identity to the mature polypeptide of SEQ ID NO: 83 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity has a sequence identity to SEQ ID NO: 84 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Fusarium oxysporum* called FoxXyn6 as disclosed as SEQ ID NO: 2 in WO 2014/019220 and as disclosed herein as SEQ ID NO: 88.

In an embodiment, the composition comprises a GH10 polypeptide having xylanase activity having a sequence identity to SEQ ID NO: 88 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity such as the xylanase from *Fusarium oxysporum* called AclXyn5 as disclosed as SEQ ID NO: 7 in WO 2014/020143 and as disclosed herein as SEQ ID NO: 89.

In an embodiment, the GH10 polypeptide having xylanase activity has a sequence identity to SEQ ID NO: 89 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH11 polypeptide having xylanase activity is the xylanase from Cornyascus such as Corynascus thermophilus, from Scytalidium such as Scytalidium thermophilum, from Penicillium such as Penicillium oxalicum as disclosed in WO 2013/075642, or a GH11 polypeptide having xylanase activity having a sequenc identity of at least at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to any of these.

In an embodiment, the GH10 polypeptide having xylanase activity includes the xylanase from Talaromyces leycettanus as disclosed in WO 2013/019827 and disclosed herein as SEQ ID NO: 104. In an embodiment, the GH10 polypeptide having xylanase activity has a sequence identity to SEQ ID NO: 104 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In an embodiment, the GH10 polypeptide having xylanase activity includes the xylanase from Trichophaea saccata as disclosed in WO 2011/057083 and disclosed herein as SEQ ID NO: 106. In an embodiment, the GH10 polypeptide having xylanase activity has a sequence identity to SEQ ID NO: 106 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

In one embodiment, the cellulolytic composition comprises a xylanase. In a preferred aspect, the xylanase is a Family 10 xylanase.

Examples of xylanases useful in the processes of the present invention include, but are not limited to, xylanases from Aspergillus aculeatus (GeneSeqP:AAR63790; WO 94/21785), Aspergillus fumigatus (WO 2006/078256), Penicillium pinophilum (WO 2011/041405), Penicillium sp. (WO 2010/126772), Thielavia terrestris NRRL 8126 (WO 2009/079210), and Trichophaea saccata GH10 (WO 2011/057083).

In one embodiment the GH10 xylanase is derived from the genus Aspergillus, such as a strain of Aspergillus aculeatus, such as the one described in WO 94/021785 as Sequence Number 5 (referred to as Xyl II; or a GH10 xylanase having at least 80%, such as at least 85%, such as at least 90%, preferably at least 95%, such as at least 96%, such as 97%, such as at least 98%, such as at least 99% identity to Sequence Number 5 in WO 94/21785. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function. In one embodiment the GH10 xylanase is derived from the genus Aspergillus, such as a strain of *Aspergillus fumigatus*, such as described in WO 2006/078256 as Xyl III, or a GH10 xylanase having at least 80%, such as at least 85%, such as at least 90%, preferably at least 95%, such as at least 96%, such as 97%, such as at least 98%, such as at least 99% identity to Xyl III in WO 2006/078256. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In an embodiment, the GH10 polypeptide having xylanase activity such as the xylanase from *Aspergillus niger* as disclosed herein as SEQ ID NO: 119.

In an embodiment, the GH10 polypeptide having xylanase activity has a sequence identity to SEQ ID NO: 119 of at least 80%, e.g., at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100%.

AA9 (GH61) polypeptide having cellulolytic enhancing activity

The cellulolytic composition may in one embodiment comprise one or more AA9 (GH61) polypeptide having cellulolytic enhancing activity.

In one aspect, the AA9 (GH61) polypeptide is any AA9 polypeptide having cellulolytic enhancing activity. Examples of AA9 polypeptides include, but are not limited to, AA9 polypeptides from Thielavia terrestris (WO 2005/074647, WO 2008/148131, and WO 2011/035027), Thermoascus aurantiacus (WO 2005/074656 and WO 2010/065830), Trichoderma reesei (WO 2007/089290 and WO 2012/149344), Myceliophthora thermophila (WO 2009/085935, WO 2009/085859, WO 2009/085864, WO 2009/085868, WO 2009/033071, WO 2012/027374, and WO 2012/068236), Aspergillus fumigatus (WO 2010/138754), Penicillium pinophilum (WO 2011/005867), Thermoascus sp. (WO 2011/039319), Penicillium sp. (emersonii) (WO 2011/041397 and WO 2012/000892), Thermoascus crustaceous (WO 2011/041504), Aspergillus aculeatus (WO 2012/125925), Thermomyces lanuginosus (WO 2012/113340, WO 2012/129699, WO 2012/130964, and WO 2012/129699), Aurantiporus alborubescens (WO 2012/122477), Trichophaea saccata (WO 2012/122477), Penicillium thomii (WO 2012/122477), Talaromyces stipitatus (WO 2012/135659), Humicola insolens (WO 2012/146171), Malbranchea cinnamomea (WO 2012/101206), Talaromyces leycettanus (WO 2012/101206), and Chaetomium thermophilum (WO 2012/101206), Talaromyces emersonii (WO 2012/000892), Trametes versicolor (WO 2012/092676 and WO 2012/093149), and Talaromyces thermophilus (WO 2012/129697 and WO 2012/130950); which are incorporated herein by reference in their entireties.

In another aspect, the AA9 polypeptide having cellulolytic enhancing activity is selected from the group consisting of: (i) an AA9 polypeptide having cellulolytic enhancing activity comprising or consisting of the mature polypeptide of SEQ ID NO: 102; (ii) an AA9 polypeptide having cellulolytic enhancing activity comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 102; (iii) an AA9 polypeptide having cellulolytic enhancing activity encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 101; and (iv) an AA9 polypeptide having cellulolytic enhancing activity encoded by a polynucleotide that hybridizes under at least high stringency conditions, e.g., very high stringency conditions, with the mature polypeptide coding sequence of SEQ ID NO: 101 or the full-length complement thereof.

In another aspect, the Penicillium sp. (emersonii) AA9 polypeptide having cellulolytic enhancing activity or a homolog thereof is selected from the group consisting of: (i) an AA9 polypeptide having cellulolytic enhancing activity comprising or consisting of the mature polypeptide of SEQ ID NO: 102; (ii) an AA9 polypeptide having cellulolytic enhancing activity comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 102; (iii) an AA9 polypeptide having cellulolytic enhancing activity encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 101; and (iv) an AA9 polypeptide having cellulolytic enhancing activity encoded by a polynucleotide that hybridizes under at least high stringency conditions, e.g., very high stringency conditions, with the mature polypeptide coding sequence of SEQ ID NO: 101 or the full-length complement thereof.

In one embodiment GH61 polypeptide having cellulolytic enhancing activity, is derived from the genus Thermoascus, such as a strain of Thermoascus aurantiacus, such as the one described in WO 2005/074656 as Sequence Number 2; or a GH61 polypeptide having cellulolytic enhancing activity having at least 80%, such as at least 85%, such as at least 90%, preferably at least 95%, such as at least 96%, such as 97%, such as at least 98%, such as at least 99% identity to Sequence Number 2 in WO 2005/074656. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment, the GH61 polypeptide having cellulolytic enhancing activity, is derived from a strain derived from Penicillium, such as a strain of Penicillium emersonii, such as the one disclosed in WO 2011/041397, or a GH61 polypeptide having cellulolytic enhancing activity having at least 80%, such as at least 85%, such as at least 90%, preferably at least 95%, such as at least 96%, such as 97%, such as at least 98%, such as at least 99% identity to Sequence Number 2 in WO 2011/041397. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the GH61 polypeptide having cellulolytic enhancing activity is derived from the genus Thielavia, such as a strain of Thielavia terrestris, such as the one described in WO 2005/074647 as Sequence Number 7 or Sequence Number 8; or one derived from a strain of Aspergillus, such as a strain of Aspergillus fumigatus, such as the one described in WO 2010/138754 as Sequence Number 2, or a GH61 polypeptide having cellulolytic enhancing activity having at least 80%, such as at least 85%, such as at least 90%, preferably at least 95%, such as at least 96%, such as 97%, such as at least 98%, such as at least 99% identity to any of these.

Endoducanase

In one embodiment, the cellulolytic composition comprises an endoglucanase, such as an endoglucanase I or endoglucanase II.

Examples of bacterial endoglucanases that can be used in the processes of the present invention, include, but are not limited to, an Acidothermus cellulolyticus endoglucanase (WO 91/05039; WO 93/15186; U.S. Pat. No. 5,275,944; WO 96/02551; U.S. Pat. No. 5,536,655, WO 00/70031, WO 2005/093050); Thermobifida fusca endoglucanase III (WO 05/093050); and Thermobifida fusca endoglucanase V (WO 2005/093050).

Examples of fungal endoglucanases that can be used in the present invention, include, but are not limited to, a Trichoderma reesei endoglucanase I (Penttila et al., 1986, Gene 45: 253-263, Trichoderma reesei Cel7B endoglucanase I (GENBANK™ accession no. M15665), Trichoderma reesei endoglucanase II (Saloheimo, et al., 1988, Gene 63:11-22), Trichoderma reesei Cel5A endoglucanase II (GENBANK™ accession no. M19373), Trichoderma reesei endoglucanase III (Okada et al., 1988, Appl. Environ. Microbiol. 64: 555-563, GENBANK™ accession no. AB003694), Trichoderma reesei endoglucanase V (Saloheimo et al., 1994, Molecular Microbiology 13: 219-228, GENBANK™ accession no. Z33381), Aspergillus aculeatus endoglucanase (Ooi et al., 1990, Nucleic Acids Research 18: 5884), Aspergillus kawachii endoglucanase (Sakamoto et al., 1995, Current Genetics 27: 435-439), Erwinia carotovara endoglucanase (Saarilahti et al., 1990, Gene 90: 9-14), Fusarium oxysporum endoglucanase (GENBANK™ accession no. L29381), Humicola grisea var. thermoidea endoglucanase (GENBANK™ accession no. AB003107), Melanocarpus albomyces endoglucanase (GENBANK™ accession no. MAL515703), Neurospora crassa endoglucanase (GENBANK™ accession no. XM_324477), Humicola insolens endoglucanase V, Myceliophthora thermophila CBS 117.65 endoglucanase, basidiomycete CBS 495.95endoglucanase, basidiomycete CBS 494.95 endoglucanase, Thielavia terrestris NRRL 8126 CEL6B endoglucanase, Thielavia terrestris NRRL 8126 CEL6C endoglucanase, Thielavia terrestris NRRL 8126 CEL7C endoglucanase, Thielavia terrestris NRRL 8126 CEL7E endoglucanase, Thielavia terrestris NRRL 8126 CEL7F endoglucanase, Cladorrhinum foecundissimum ATCC 62373 CEL7A endoglucanase, and Trichoderma reesei strain No. VTT-D-80133 endoglucanase (GENBANK™ accession no. M15665).

In one embodiment, the endoglucanase is an endoglucanase II, such as one derived from Trichoderma, such as a strain of Trichoderma reesei, such as the one described in WO 2011/057140 as Sequence Number 22; or an endoglucanase having at least 80%, such as at least 85%, such as at least 90%, preferably at least 95%, such as at least 96%, such as 97%, such as at least 98%, such as at least 99% identity to Sequence Number 22 in WO 2011/057140. In one aspect, the protease differs by up to 10 amino acids, e.g., 1, 2, 3, 4, 5, 6, 7, 8, 9, or 10, from the mature polypeptide 3. In another embodiment, the present invention relates to variants of the mature polypeptide comprising a substitution, deletion, and/or insertion at one or more (e.g., several) positions. In an embodiment, the number of amino acid substitutions, deletions and/or insertions introduced into the mature polypeptide is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one aspect, the endoglucanase I is selected from the group consisting of: (i) an endoglucanase I comprising or consisting of the mature polypeptide of SEQ ID NO: 110; (ii) an endoglucanase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 110; (iii) an endoglucanase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 109; and (iv) an endoglucanase I encoded by a polynucleotide that hybridizes under at least high stringency conditions, e.g., very high stringency conditions, with the mature polypeptide coding sequence of SEQ ID NO: 109 or the full-length complement thereof.

In another aspect, the endoglucanase II is selected from the group consisting of: (i) an endoglucanase II comprising or consisting of the mature polypeptide of SEQ ID NO: 112; (ii) an endoglucanase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 112; (iii) an endoglucanase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 111;

and (iv) an endoglucanase II encoded by a polynucleotide that hybridizes under at least high stringency conditions, e.g., very high stringency conditions, with the mature polypeptide coding sequence of SEQ ID NO: 111 or the full-length complement thereof.

Beta-xylosidase

Examples of beta-xylosidases useful in the processes of the present invention include, but are not limited to, beta-xylosidases from Neurospora crassa (SwissProt accession number Q7SOW4), Trichoderma reesei (UniProtKB/TrEMBL accession number Q92458), and Talaromyces emersonii (SwissProt accession number Q8X212).

In one embodiment the beta-xylosidase is derived from the genus Aspergillus, such as a strain of Aspergillus fumigatus, such as the one described in WO 2011/057140 as Sequence Number 206; or a beta-xylosidase having at least 80%, such as at least 85%, such as at least 90%, preferably at least 95%, such as at least 96%, such as 97%, such as at least 98%, such as at least 99% identity to Sequence Number 206 in WO 2011/057140. In one aspect, the protease differs by up to 10 amino acids, e.g., 1, 2, 3, 4, 5, 6, 7, 8, 9, or 10, from the mature polypeptide. In another embodiment, the present invention relates to variants of the mature polypeptide of SEQ ID NO: 6 comprising a substitution, deletion, and/or insertion at one or more (e.g., several) positions. In an embodiment, the number of amino acid substitutions, deletions and/or insertions introduced into the mature polypeptide of SEQ ID NO: 6 is up to 10, e.g., 1, 2, 3, 4, 5, 6, 7, 8, 9, or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function.

In one embodiment the beta-xylosidase is derived from a strain of the genus *Aspergillus*, such as a strain of Aspergillus fumigatus, such as the one disclosed in US provisional # 61/526,833 or PCT/US12/052163 (Examples 16 and 17), or derived from a strain of Trichoderma, such as a strain of Trichoderma reesei, such as the mature polypeptide of Sequence Number 58 in WO 2011/057140 or a beta-xylosidase having at least 80%, such as at least 85%, such as at least 90%, preferably at least 95%, such as at least 96%, such as 97%, such as at least 98%, such as at least 99% identity thereto. In another aspect, the Talaromyces emersonii beta-xylosidase or a homolog thereof is selected from the group consisting of: (i) a beta-xylosidase comprising or consisting of the mature polypeptide of SEQ ID NO: 108; (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 108; (iii) a beta-xylosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 107; and (iv) a beta-xylosidase encoded by a polynucleotide that hybridizes under at least high stringency conditions, e.g., very high stringency conditions, with the mature polypeptide coding sequence of SEQ ID NO: 107 or the full-length complement thereof.

Beta-Glucosidase

The cellulolytic composition may in one embodiment comprise one or more beta-glucosidase. The beta-glucosidase may in one embodiment be one derived from a strain of the genus Aspergillus, such as Aspergillus oryzae, such as the one disclosed in WO 2002/095014 or the fusion protein having beta-glucosidase activity disclosed in WO 2008/057637, or Aspergillus fumigatus, such as the one disclosed in WO 2005/047499 or an Aspergillus fumigatus beta-glucosidase variant, such as disclosed in PCT application WO 2012/044915, such as the one with the following substitutions: F100D, S283G, N456E, F512Y.

In one embodiment the beta-glucosidase is derived from the genus *Aspergillus*, such as a strain of Aspergillus fumigatus, such as the one described in WO 2005/047499, or a beta-glucosidase having at least 80%, such as at least 85%, such as at least 90%, preferably at least 95%, such as at least 96%, such as 97%, such as at least 98%, such as at least 99% identity thereto.

In one embodiment the beta-glucosidase is derived from the genus *Aspergillus*, such as a strain of Aspergillus fumigatus, such as the one described in WO 2012/044915, or a beta-xylosidase having at least 80%, such as at least 85%, such as at least 90%, preferably at least 95%, such as at least 96%, such as 97%, such as at least 98%, such as at least 99% identity thereto.

In another aspect, the Aspergillus fumigatus beta-glucosidase or a homolog thereof is selected from the group consisting of: (i) a beta-glucosidase comprising or consisting of the mature polypeptide of SEQ ID NO: 100; (ii) a beta-glucosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 100; (iii) a beta-glucosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 99; and (iv) a beta-glucosidase encoded by a polynucleotide that hybridizes under at least high stringency conditions, e.g., very high stringency conditions, with the mature polypeptide coding sequence of SEQ ID NO: 99 or the full-length complement thereof.

Cellobiohydrolase I

The cellulolytic composition may in one embodiment may comprise one or more CBH I (cellobiohydrolase I). In one embodiment the cellulolytic composition comprises a cellobiohydrolase I (CBHI), such as one derived from a strain of the genus Aspergillus, such as a strain of Aspergillus fumigatus, such as the Cel7A CBHI disclosed in Sequence Number 2 in WO 2011/057140, or a strain of the genus Trichoderma, such as a strain of Trichoderma reesei.

In one embodiment the cellobiohydrolyase I is derived from the genus Aspergillus, such as a strain of Aspergillus fumigatus, such as the one described in WO 2011/057140, or a CBHI having at least 80%, such as at least 85%, such as at least 90%, preferably at least 95%, such as at least 96%, such as 97%, such as at least 98%, such as at least 99% identity thereto.

In one aspect, the Aspergillus fumigatus cellobiohydrolase I or a homolog thereof is selected from the group consisting of: (i) a cellobiohydrolase I comprising or consisting of the mature polypeptide of SEQ ID NO: 114; (ii) a cellobiohydrolase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 114; (iii) a cellobiohydrolase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 113; and (iv) a cellobiohydrolase I encoded by a polynucleotide that hybridizes under at least high stringency conditions, e.g., very high stringency conditions, with the mature polypeptide coding sequence of SEQ ID NO: 113 or the full-length complement thereof.

Cellobiohydrolase II

The cellulolytic composition may in one embodiment comprise one or more CBH II (cellobiohydrolase II). In one embodiment the cellobiohydrolase II (CBHII), such as one derived from a strain of the genus Aspergillus, such as a strain of Aspergillus fumigatus, or a strain of the genus Trichoderma, such as Trichoderma reesei, or a strain of the genus Thielavia, such as a strain of Thielavia terrestris, such as cellobiohydrolase II CEL6A from Thielavia terrestris.

In one embodiment the cellobiohydrolyase II is derived from the genus Aspergillus, such as a strain of Aspergillus fumigatus, such as the one described in WO 2011/057140, or a CBHII having at least 80%, such as at least 85%, such as at least 90%, preferably at least 95%, such as at least 96%, such as 97%, such as at least 98%, such as at least 99% identity thereto.

In another aspect, the Aspergillus fumigatus cellobiohydrolase II or a homolog thereof is selected from the group consisting of: (i) a cellobiohydrolase II comprising or consisting of the mature polypeptide of SEQ ID NO: 116; (ii) a cellobiohydrolase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 116; (iii) a cellobiohydrolase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide coding sequence of SEQ ID NO: 115; and (iv) a cellobiohydrolase II encoded by a polynucleotide that hybridizes under at least high stringency conditions, e.g., very high stringency conditions, with the mature polypeptide coding sequence of SEQ ID NO: 115 or the full-length complement thereof.

Exemplary Cellulolytic Compositions

In particular, according to an embodiment, the present invention relates to use of enzyme compositions, comprising: (A) (i) a cellobiohydrolase I, (ii) a cellobiohydrolase II, and (iii) at least one enzyme selected from the group consisting of a beta-glucosidase or a variant thereof, an AA9 polypeptide having cellulolytic enhancing activity, a GH10 xylanase, and a beta-xylosidase; (B) (i) a GH10 xylanase and (ii) a beta-xylosidase; or (C) (i) a cellobiohydrolase I, (ii) a cellobiohydrolase II, (iii) a GH10 xylanase, and (iv) a beta-xylosidase; wherein the cellobiohydrolase I is selected from the group consisting of: (i) a cellobiohydrolase I comprising or consisting of the mature polypeptide of SEQ ID NO: 96; (ii) a cellobiohydrolase I comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 96; (iii) a cellobiohydrolase I encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 95; and (iv) a cellobiohydrolase I encoded by a polynucleotide that hybridizes under at least high stringency conditions, e.g., very high stringency conditions, with the mature polypeptide coding sequence of SEQ ID NO: 95 or the full-length complement thereof;

the cellobiohydrolase II is selected from the group consisting of: (i) a cellobiohydrolase II comprising or consisting of the mature polypeptide of SEQ ID NO: 98; (ii) a cellobiohydrolase II comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 98; (iii) a cellobiohydrolase II encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 97; and (iv) a cellobiohydrolase II encoded by a polynucleotide that hybridizes under at least high stringency conditions, e.g., very high stringency conditions, with the mature polypeptide coding sequence of SEQ ID NO: 97 or the full-length complement thereof;

the beta-glucosidase is selected from the group consisting of: (i) a beta-glucosidase comprising or consisting of the mature polypeptide of SEQ ID NO: 100; (ii) a beta-glucosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 100; (iii) a beta-glucosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 99; and (iv) a beta-glucosidase encoded by a polynucleotide that hybridizes under at least high stringency conditions, e.g., very high stringency conditions, with the mature polypeptide coding sequence of SEQ ID NO: 99 or the full-length complement thereof;

the xylanase is selected from the group consisting of: (i) a xylanase comprising or consisting of the mature polypeptide of SEQ ID NO: 104 or the mature polypeptide of SEQ ID NO: 106; (ii) a xylanase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 104 or the mature polypeptide of SEQ ID NO: 106; (iii) a xylanase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 103 or the mature polypeptide coding sequence of SEQ ID NO: 105; and (iv) a xylanase encoded by a polynucleotide that hybridizes under at least high stringency conditions, e.g., very high stringency conditions, with the mature polypeptide coding sequence of SEQ ID NO: 103 or the mature polypeptide coding sequence of SEQ ID NO: 105; or the full-length complement thereof; and the beta-xylosidase is selected from the group consisting of: (i) a beta-xylosidase comprising or consisting of the mature polypeptide of SEQ ID NO: 108; (ii) a beta-xylosidase comprising or consisting of an amino acid sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, or at least 99% sequence identity to the mature polypeptide of SEQ ID NO: 108; (iii) a beta-xylosidase encoded by a polynucleotide comprising or consisting of a nucleotide sequence having at least 70%, e.g., at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% sequence identity to the mature polypeptide coding sequence of SEQ ID NO: 107; and (iv) a beta-xylosidase encoded by a polynucleotide that hybridizes under at least high stringency conditions, e.g., very high stringency conditions, with the mature polypeptide coding sequence of SEQ ID NO: 107 or the full-length complement thereof.

In particular, according to an embodiment, the present invention relates to the use of enzyme compositions, comprising: (A) (i) an Aspergillus fumigatus cellobiohydrolase I; (ii) an Aspergillus fumigatus cellobiohydrolase II; (iii) an Aspergillus fumigatus beta-glucosidase or variant thereof; (iv) a Penicillium sp. AA9 polypeptide having cellulolytic enhancing activity; (v) a Trichophaea saccata GH10 xylanase; and (vi) a Talaromyces emersonii beta-xylosidase; or homologs thereof; (B) (i) an Aspergillus fumigatus cellobiohydrolase I; (ii) an Aspergillus fumigatus cellobiohydrolase II; (iii) a Trichophaea saccata GH10 xylanase; and (iv) a Talaromyces emersonii beta-xylosidase; or homologs thereof; or (C) (i) a Trichophaea saccata GH10 xylanase; and (ii) a Talaromyces emersonii beta-xylosidase; or homologs thereof.

In one embodiment, the amount of cellobiohydrolase I in an enzyme composition of the present invention is 5% to 60% of the total protein of the enzyme composition, e.g., 7.5% to 55%, 10% to 50%, 12.5% to 45%, 15% to 40%, 17.5% to 35%, and 20% to 30% of the total protein of the enzyme composition.

In another embodiment, the amount of cellobiohydrolase II in an enzyme composition of the present invention is 2.0-40% of the total protein of the enzyme composition, e.g., 3.0% to 35%, 4.0% to 30%, 5% to 25%, 6% to 20%, 7% to 15%, and 7.5% to 12% of the total protein of the enzyme composition.

In another embodiment, the amount of beta-glucosidase in an enzyme composition of the present invention is 0% to 30% of the total protein of the enzyme composition, e.g., 1% to 27.5%, 1.5% to 25%, 2% to 22.5%, 3% to 20%, 4% to 19%, % 4.5 to 18%, 5% to 17%, and 6% to 16% of the total protein of the enzyme composition.

In another embodiment, the amount of AA9 polypeptide in an enzyme composition of the present invention is 0% to 50% of the total protein of the enzyme composition, e.g., 2.5% to 45%, 5% to 40%, 7.5% to 35%, 10% to 30%, 12.5% to 25%, and 15% to 25% of the total protein of the enzyme composition.

In another embodiment, the amount of xylanase in an enzyme composition of the present invention is 0% to 30% of the total protein of the enzyme composition, e.g., 0.5% to 30%, 1.0% to 27.5%, 1.5% to 25%, 2% to 22.5%, 2.5% to 20%, 3% to 19%, 3.5% to 18%, and 4% to 17% of the total protein of the enzyme composition.

In another embodiment, the amount of beta-xylosidase in an enzyme composition of the present invention is 0% to 50% of the total protein of the enzyme composition, e.g., 0.5% to 30%, 1.0% to 27.5%, 1.5% to 25%, 2% to 22.5%, 2.5% to 20%, 3% to 19%, 3.5% to 18%, and 4% to 17% of the total protein of the enzyme composition.

In another embodiment, the amount of endoglucanase I in an enzyme composition of the present invention is 0.5% to 30% of the total protein of the enzyme composition, e.g., 1.0% to 25%, 2% to 20%, 4% to 25%, 5% to 20%, 16% to 15%, and 7% to 12% of the total protein of the enzyme composition.

In another embodiment, the amount of endoglucanase II in an enzyme composition of the present invention is 0.5% to 30% of the total protein of the enzyme composition, e.g., 1.0% to 25%, 2% to 20%, 4% to 25%, 5% to 20%, 16% to 15%, and 7% to 12% of the total protein of the enzyme composition.

As mentioned above the cellulolytic composition may comprise a number of different polypeptides, such as enzymes.

In an embodiment, the cellulolytic composition comprises a Trichoderma reesei cellulase preparation containing Aspergillus oryzae beta-glucosidase fusion protein (WO 2008/057637) and Thermoascus aurantiacus GH61A polypeptide (WO 2005/074656).

In an embodiment, the cellulolytic composition comprises a blend of an Aspergillus aculeatus GH10 xylanase (WO 94/021785) and a Trichoderma reesei cellulase preparation containing Aspergillus fumigatus beta-glucosidase (WO 2005/047499) and Thermoascus aurantiacus GH61A polypeptide (WO 2005/074656).

In an embodiment, the cellulolytic composition comprises a blend of an Aspergillus fumigatus GH10 xylanase (WO 2006/078256) and Aspergillus fumigatus beta-xylosidase (WO 2011/057140) with a Trichoderma reesei cellulase preparation containing Aspergillus fumigatus cellobiohydrolase I (WO 2011/057140), Aspergillus fumigatus cellobiohydrolase II (WO 2011/057140), Aspergillus fumigatus beta-glucosidase variant (WO 2012/044915), and Penicillium sp. (emersonii) GH61 polypeptide (WO 2011/041397).

In an embodiment the cellulolytic composition comprises a Trichoderma reesei cellulolytic enzyme composition, further comprising Thermoascus aurantiacus GH61A polypeptide having cellulolytic enhancing activity (WO 2005/074656) and Aspergillus oryzae beta-glucosidase fusion protein (WO 2008/057637).

In another embodiment the cellulolytic composition comprises a Trichoderma reesei cellulolytic enzyme composition, further comprising Thermoascus aurantiacus GH61A polypeptide having cellulolytic enhancing activity (Sequence Number 2 in WO 2005/074656) and Aspergillus fumigatus beta-glucosidase (Sequence Number 2 of WO 2005/047499).

In another embodiment the cellulolytic composition comprises a Trichoderma reesei cellulolytic enzyme composition, further comprising Penicillium emersonii GH61A polypeptide having cellulolytic enhancing activity disclosed in WO 2011/041397, Aspergillus fumigatus beta-glucosidase (Sequence Number 2 of WO 2005/047499) or a variant thereof with the following substitutions: F100D, S283G, N456E, F512Y.

In an embodiment, the cellulolytic composition comprises Aspergillus aculeatus Family 10 xylanase and cellulolytic composition derived from Trichoderma reesei RutC30.

In an embodiment, the cellulolytic composition comprises Aspergillus aculeatus Family 10 xylanase.

In an embodiment, the cellulolytic composition is derived from Trichoderma reesei RutC30.

In an embodiment, the cellulolytic composition comprises a blend of a Trichophaea saccata GH10 xylanase (WO 2011/057083) and Talaromyces emersonii beta-xylosidase with a Trichoderma reesei cellulase preparation containing Aspergillus fumigatus cellobiohydrolase I (WO 2011/057140), Aspergillus fumigatus cellobiohydrolase II (WO 2011/057140), Aspergillus fumigatus beta-glucosidase variant (WO 2012/044915), and Penicillium sp. (emersonii) GH61 polypeptide (WO 2011/041397).

In an embodiment, the cellulolytic composition comprises a Trichoderma reesei cellulase preparation containing Trichophaea saccata GH10 xylanase (WO 2011/057083) and Talaromyces emersonii beta-xylosidase.

In an embodiment, the celluloytic composition comprises a Talaromyces leycettanus GH10 xylanase (WO 2013/019827).

In an embodiment, the cellulolytic composition comprises a Trichophaea saccata GH10 xylanase (WO 2011/057083).

In an embodiment, the celluloytic composition is as described in PCT/US2015/034179.

The enzyme composition of the present invention may be in any form suitable for use, such as, for example, a crude fermentation broth with or without cells removed, a cell lysate with or without cellular debris, a semi-purified or purified enzyme composition, or a host cell, e.g., Trichoderma host cell, as a source of the enzymes.

The enzyme composition may be a dry powder or granulate, a non-dusting granulate, a liquid, a stabilized liquid, or a stabilized protected enzyme. Liquid enzyme compositions may, for instance, be stabilized by adding stabilizers such as a sugar, a sugar alcohol or another polyol, and/or lactic acid or another organic acid according to established processes.

According to the invention an effective amount of one or more of the following activities may also be present or added during treatment of the kernels: acetylxylan esterase, pentosanase, pectinase, arabinanase, arabinofurasidase, xyloglucanase, phytase activity.

It is believed that after the division of the kernels into finer particles the enzyme(s) can act more directly and thus more efficiently on cell wall and protein matrix of the kernels. Thereby the starch is washed out more easily in the subsequent steps.

Enzymatic Amount

Enzymes may be added in an effective amount, which can be adjusted according to the practitioner and particular process needs. In general, enzyme may be present in an amount of 0.0001-1 mg enzyme protein per g dry solids (DS) kernels, such as 0.001-0.1 mg enzyme protein per g DS kernels. In particular embodiments, the enzyme may be present in an amount of, e.g., 1 μg, 2.5 μg, 5 μg, 10 μg, 20 μg, 25 μg, 30 μg, 35 μg, 40 μg, 45 μg, 50 μg, 75 μg, 100 μg, 125 μg, 150 μg, 175 μg, 200 μg, 225 μg, 250 μg, 275 μg, 300 μg, 325 μg, 350 μg, 375 μg, 400 μg, 450 μg, 500 μg, 550 μg, 600 μg, 650 μg, 700 μg, 750 μg, 800 μg, 850 μg, 900 μg, 950 μg, 1000 μg enzyme protein per g DS kernels.

The present invention is further described by the following examples that should not be construed as limiting the scope of the invention.

EXAMPLES

Materials and Methods Enzymes

GH62 Arabinofuranosidase A: GH62 arabinofuranosidase from Penicillium capsulatum (WO 2006/125438).

GH62 Arabinofuranosidase B: GH62 arabinofuranosidase from Penicillium oxalicum (SEQ ID NO: 24).

GH62 Arabinofuranosidase C: GH62 arabinofuranosidase from Talaromyces pinophilus (SEQ ID NO: 27).

GH62 Arabinofuranosidase D: GH62 arabinofuranosidase derived from Aspergillus niger (SEQ ID NO: 117).

GH62 Arabinofuranosidase E: GH62 arabinofuranosidase derived from Aspergillus niger (SEQ ID NO: 118).

Enzymes having arabinofuranosidase activity are useful alone or in combination with, e.g., any of Celluclast, Cellulase A, Cellulase B, Cellulase C, Cellulase D, Cellulase E, Cellulase F, Cellulase G, Cellulase H, Cellulase J, Cellulase K, Cellulase L, Cellulase M, GH10 Xylanase A, Protease A, Protease B, Protease C and/or Protease D.

Celluclast: Cellulase derived from Celluclast 1.5 L, commercial product available in Novozymes A/S.

Cellulase A: A blend of an Aspergillus aculeatus GH10 xylanase (WO 94/021785) and a Trichoderma reesei cellulase preparation containing Aspergillus fumigatus beta-glucosidase (WO 2005/047499) and Thermoascus aurantiacus GH61A polypeptide (WO 2005/074656).

Cellulase B: A Trichoderma reesei cellulase preparation containing Aspergillus oryzae beta-glucosidase fusion protein (WO 2008/057637) and Thermoascus aurantiacus GH61A polypeptide (WO 2005/074656).

Cellulase C: A blend of an Aspergillus fumigatus GH10 xylanase (WO 2006/078256) and Aspergillus fumigatus beta-xylosidase (WO 2011/057140) with a Trichoderma reesei cellulase preparation containing Aspergillus fumigatus cellobiohydrolase I (WO 2011/057140), Aspergillus fumigatus cellobiohydrolase II (WO 2011/057140), Aspergillus fumigatus beta-glucosidase variant (WO 2012/044915), and Penicillium sp. (emersonii) GH61 polypeptide (WO 2011/041397).

Cellulase D: Aspergillus aculeatus GH10 xylanase (WO 94/21785).

Cellulase E: A Trichoderma reesei cellulase preparation containing Aspergillus aculeatus GH10 xylanase (WO 94/21785).

Cellulase F: A Trichoderma reesei cellulase preparation containing Aspergillus fumigatus GH10 xylanase (WO 2006/078256) and Aspergillus fumigatus beta-xylosidase (WO 2011/057140).

Cellulase G: A cellulolytic enzyme composition containing Aspergillus aculeatus Family 10 xylanase (WO 94/21785) and cellulolytic enzyme composition derived from Trichoderma reesei RutC30.

Cellulase H: A cellulolytic composition derived from Trichoderma reesei RutC30.

Cellulase J: A blend of a Trichophaea saccata GH10 xylanase (WO 2011/057083) and Talaromyces emersonii beta-xylosidase with a Trichoderma reesei cellulase preparation containing Aspergillus fumigatus cellobiohydrolase I (WO 2011/057140), Aspergillus fumigatus cellobiohydrolase II (WO 2011/057140), Aspergillus fumigatus beta-glucosidase variant (WO 2012/044915), and Penicillium sp. (emersonii) GH61 polypeptide (WO 2011/041397).

Cellulase K: A Trichoderma reesei cellulase preparation containing Trichophaea saccata GH10 xylanase (WO 2011/057083) and Talaromyces emersonii beta-xylosidase.

Cellulase L: A Trichoderma reesei cellulase preparation containing a GH10 xylanase of SEQ ID NO: 104.

Cellulase M: A Trichoderma reesei cellulase preparation containing a GH10 xylanase of SEQ ID NO: 106.

Cellulase N: A Trichoderma reesei cellulase preparation containing a cellobiohydrolase I of SEQ ID NO: 96, a cellobiohydrolase II of SEQ ID NO: 98, a GH10 xylanase of SEQ ID NO: 104, and a beta-xylosidase of SEQ ID NO: 108.

Cellulase P: A Trichoderma reesei cellulase preparation containing a cellobiohydrolase I of SEQ ID NO: 96, a cellobiohydrolase II of SEQ ID NO: 98, a beta-glucosidase variant of SEQ ID NO: 100, and a AA9 (GH61) of SEQ ID NO: 102.

Cellulase Q: A Trichoderma reesei cellulase preparation containing a cellobiohydrolase I of SEQ ID NO: 96, a cellobiohydrolase II of SEQ ID NO: 98, and a AA9 (GH61) of SEQ ID NO: 102.

GH10 Xylanase A: GH10 xylanase derived from Aspergillus niger (SEQ ID NO: 119).

Protease I: Acidic protease from Aspergillus aculeatus, CBS 101.43 disclosed in WO 95/02044.

Protease A: Aspergillus oryzae aspergillopepsin A, disclosed in Gene 125(2): 195-198 (30 Mar. 1993).

Protease B: A metalloprotease from Thermoascus aurantiacus (AP025) having the mature acid sequence shown as amino acids 1-177 SEQ ID NO: 2 in WO 2003/048353.

Protease C: Rhizomucor miehei derived aspartic endopeptidase produced in Aspergillus oryzae (Novoren™) available from Novozymes A/S, Denmark.

Protease D: S53 protease 3 from Meripilus giganteus disclosed in WO 2014/037438 (SEQ ID NO: 6).

Methods

Determination of protease HUT activity:

1 HUT is the amount of enzyme which, at 40° C. and pH 4.7 over 30 minutes forms a hydrolysate from digesting denatured hemoglobin equivalent in absorbancy at 275 nm to a solution of 1.10 μg/ml tyrosine in 0.006 N HCl which absorbancy is 0.0084. The denatured hemoglobin substrate is digested by the enzyme in a 0.5 M acetate buffer at the given conditions. Undigested hemoglobin is precipitated with trichloroacetic acid and the absorbance at 275 nm is measured of the hydrolysate in the supernatant.

Xylose Assay

A xylose standard curve from 0 to 125 μg xylose/mL was prepared from a stock solution of 2.5 mg xylose/mL (prepared by dissolving 0.125 g xylose in 50 mL de-ionised water). Assay principle. The interconversion of the α- and β-anomeric forms of D-xylose is catalysed by xylose mutarotase (XMR) using the D-xylose assay kit from Megazyme International Ireland. The β-D-xylose is oxidised by NAD+ to D-xylonic acid in the presence of β-xylose dehydrogenase (β-XDH) at pH 7.5. The amount of NADH formed in this reaction is stoichiometric with the amount of D-xylose and is measured by the increase in absorbance at 340 nm.

$$\alpha\text{-D-Xylose} \xrightleftharpoons{\text{(XMR)}} \beta\text{-D-xylose}$$

$$\beta\text{-D-Xylose} + \text{NAD}^{+} \xrightarrow{(\beta\text{-XDH})} \text{D-xylonic acid} + \text{NADH} + \text{H}^{+}$$

Example 1

The 10-g fiber assay generally includes incubating wet fiber samples obtained from wet-milling plant, in the presence of enzymes, at conditions relevant to the process (pH 3.5 to 4, temperature around 52° C.) and over a time period of between 1 to 4 hours. After incubation the fiber is transferred and pressed over a screen (typically 100 microns or smaller), where the filtrates consisting mainly of the separated starch and gluten are then collected. A number of washes are done over the screen, and the washings are collected together with the initial filtrate. The collected filtrates are then passed over a funnel filter (glass filter with 0.45 micron opening) to further separate the insoluble solids (starch and gluten) from the rest of the filtrates (mostly dissolved solids). These retained insoluble solids are washed and then oven dried to dryness. The insoluble dry mass is weighed and then analyzed for starch content.

10-g fiber assay is performed at pH 3.8, incubating at 52° C. for 1 hour at dose of 30 ug EP/g corn. Blends of GH62 Arabinofuranosidase B+Cellulase L, GH62 Arabinofuranosidase B+Cellulase M, GH62 Arabinofuranosidase C+Cellulase L, and GH62 Arabinofuranosidase C+Cellulase M are utilized. Release of starch+gluten (dry substance) from corn fiber at dose of 30 ug/g corn is measured.

More particularly according to an exemplary 10-g fiber assay, the below equipment and reagents are used to analyze pressed corn fiber sample (sourced from wet-milling plant), which is stored frozen and thawed prior to use, according to the steps in the table:

150 μm Opening Sieves and Catch pan (Retsch GmbH)
250 ml Erlenmeyer Flask with caps
150 ml Bottles
Glass Micro filter Paper (Whatman 150 mm-Diameter)
Vacuum Filtration apparatus
Small aluminum pans
2000 ml plastic beaker
600 ml glass beaker
Funnel
Moisture analyzer
Glass vials and caps for HPLC system
HPLC system
0.45 μm pore size polypropylene syringe filters (Whatman)
3 ml plastic syringes
Oven (Capable to heat to 105° C.)
Ice bath
Analytical balance
Rubber Spatula
0.4 M HCI
1 M Sodium Acetate buffer (pH 4)
1 M Acetic Acid
1 M pH 7 Sodium Acetate

| Step | Action |
|---|---|
| 1 | Determine moisture of ~1 g corn fiber using the Moisture balance<br>Collect the DS % |
| 2 | Weigh out items and record initial weights of<br>Flasks, Bottles, Small Aluminum pans, Glass Micro Filter paper |
| 3 | Determine the amount of fiber that needs to be weighed out for each replicate to obtain a dry solids of 5 grams |
| 4 | After adding the fiber into the flask, store them into the cold room until ready for use<br>Fiber can last about 2-3 days in the cold room |
| 6 | Add 98 ml of water to each flask of fiber to achieve desired % DS |
| 7 | Add 2 ml of buffer (1M pH 4.0 Sodium Acetate) to adjust pH to 4.0 (the final buffer concentration is 0.02M) |
| 8 | Add enzyme into the flask |
| 9 | Place flask into Incubator (New Brunswick Scientific/Innova 42) and set at 150 RPM @50° C. for 4 hours |
| 10 | After the incubation place the flask into ice bath to slow enzyme activity<br>Let flask sit in the ice bath for a minimum of 5 minutes |
| 11 | For each sample flask, pour out the content onto the 150 μm sieve with catch pan below |
| 12 | Measure about ~200 ml of tap water into a beaker and pour into the flask to rinse any remaining fiber, then pour the rinse water back into the beaker |
| 13 | Using the spatula, press the fiber against the screen to release water and insolubles into the catching pan. |
| 14 | Once a majority of the water has been pressed out, place the fiber back in the beaker containing the 200 ml of rinse water in Step 12 |
| 15 | Stir the fiber in the beaker with the spatula, then pour onto the 150 μm sieve<br>Considered 1$^{st}$ Wash |
| 16 | Measure out ~200 ml of water into the rinse beaker |
| 17 | Press the fiber again with spatula until majority of water has been pressed out, then dump fiber back into the rinse beaker |
| 18 | Remove the sieve pan and pour the liquid from the catching pan into 1 Liter Plastic Bottle<br>Give a gentle swirl to the pan before pouring to get the sediments to go into the bottle |
| 19 | Repeat Steps 15 to 18 two more times (for a total of 3 wash steps)<br>At the end of the 3$^{rd}$ wash, the fiber may be discarded unless saved for additional analysis. |
| 20 | Take the 1 L bottles containing the sieve-throughs to the Manifold Vacuum Filtration setup |
| 25 | After rinsing the filter funnels with tap water, place the preweighed glass filter paper into the funnel and spray DI water to keep filter in place |
| 27 | Turn on the vacuum, then pour the entire bottle content gradually into the funnel |
| 28 | As the samples are filtering, fill the emptied bottle with ~200 ml of DI water and pour into the filter with the rest of sample<br>Turn the Vacuum off once the solution is filter through then add the DI water to the funnel and turn the Vacuum back on |
| 29 | Once the solution is finish before the filter dry out<br>Turn off the vacuum and pour the water into the funnel and turn the vacuum back on |
| 30 | This is removing the remaining solvents in the bottle and also rinsing the filter keeping the insoluble |
| 32 | To remove the filters use a metal spatula to lift the edge of filters up and to scrape any remaining insolubles off the sides. |
| 33 | Take the filter and fold twice and place them into the pre-weighed pan |
| 34 | Remember to weigh the pan now with the Filter paper |
| 35 | Place the pan into the 105° C. oven overnight to dry |
| 36 | Weigh out the pan with the dry filtered matter.<br>This weight is used to calculate insoluble solids yield. |
| 37 | Remove the filter from the pan taking care that no filtered solids are lost, then cut each into strips and further into small squares to go into the glass bottle<br>Make sure that you cut the filters into smaller pieces so that they can be remove once finish |
| 38 | Measure out 50 ml of 0.4M of HCL into each bottle<br>Let the filter paper sit in the solution for at least 2 hours; No more than 24 hours |
| 39 | Place into the autoclave for Residual Starch procedure<br>Autoclave needs to be set @230° F. for 80 minutes |

-continued

| Step | Action |
|---|---|
| 40 | Once autoclave is done let the bottle cool down before touching |
| 41 | Filter the solution into HPLC vials and send them off to be analyzed for glucose. NOTE: The glucose concentrations are used to calculate the amount of starch in the insoluble solids |

12985-US-PCD[2]

Example 2

10-g fiber assay is performed at pH 4.0, incubating at 52° C. for 4 hours at doses of 35 ug EP/ g corn, using a blend of Cellulase K, Cellulase L, or Cellulase N, in further combination with Protease D and GH62 Arabinofuranosidase C. Blend consists of 10% (w/w) Protease D, 10% (w/w) of GH62 Arabinofuranosidase C, and the remaining 80% (w/w) from Cellulase K/Cellulase L/Cellulase N. For comparison, a blend containing Cellulase K and GH62 Arabinofuranosidase C only (no GH62) was included. Release of starch+gluten (dry substance) from corn fiber at the specified doses below was measured.

| Treatments | Dose (ug enzyme protein/g corn) | Starch + Gluten Recovered |
|---|---|---|
| No Enzyme | 0 | 15.1% |
| Cellulase K + Protease D | 35 | 18.7% |
| Cellulase K + Protease D | 70 | 19.4% |
| Cellulase K + Protease D + GH62 Arabinofuranosidase C | 35 | 20.8% |
| Cellulase N + Protease D + GH62 Arabinofuranosidase C | 35 | 20.4% |
| Cellulase L + Protease D + GH62 Arabinofuranosidase C | 35 | 20.6% |

Example 3

10-g fiber assay is performed at pH 4.0, incubating at 52° C. for 4 hours at doses of 35 ug EP/ g corn or 50 ug EP/g corn or 70 ug EP/g corn, using a blend of either Cellulase L or Cellulase N, in combination with Protease D and GH62 Arabinofuranosidase B. Blend consists of 10% (w/w) Protease D, 10% (w/w) of GH62 Arabinofuranosidase B, and the remaining 80% (w/w) from either Cellulase L or Cellulase N. For comparison, a blend containing no GH62 was included. Release of starch+gluten (dry substance) from corn fiber at the specified doses below was measured.

| Treatments | Dose (ug enzyme protein/g corn) | Starch + Gluten Recovered |
|---|---|---|
| Cellulase N + Protease D | 70 | 21.9% |
| Cellulase N + Protease D + GH62 Arabinofuranosidase B | 35 | 20.9% |
| Cellulase N + Protease D + GH62 Arabinofuranosidase B | 50 | 22.0% |
| Cellulase N + Protease D + GH62 Arabinofuranosidase B | 70 | 24.9% |
| Cellulase L + Protease D + GH62 Arabinofuranosidase B | 35 | 20.9% |
| Cellulase L + Protease D + GH62 Arabinofuranosidase B | 50 | 23.2% |

Example 4

The 10-g fiber assay generally includes incubating wet fiber samples obtained from wet-milling plant, in the presence of enzymes, at conditions relevant to the process (pH 3.5 to 4, Temp around 52° C.) and over a time period of between 1 to 4 hours. After incubation the fiber is transferred and pressed over a screen (typically 100 microns or smaller), where the filtrates consisting mainly of the separated starch and gluten are then collected. A number of washes are done over the screen, and the washings are collected together with the initial filtrate. The collected filtrates are then passed over a funnel filter (glass filter with 0.45 micron opening) to further separate the insoluble solids (starch and gluten) from the rest of the filtrates (mostly dissolved solids). These retained insoluble solids are washed and then oven dried to dryness. The insoluble dry mass is weighed and then analyzed for starch content.

10-g fiber assay is performed at pH 4.0, incubating at 52° C. for 4 hours at a dose of 35 ug EP/ g corn, using a blend of Cellulase N, with or without inclusion of GH62 Arabinofuranosidase B, and with or without Protease D. Blend consists of 10% (w/w) Protease D when included, 10% (w/w) of GH62 Arabinofuranosidase B when included, and the remaining amount (80, 90 or 100% (w/w)) of Cellulase N. Release of starch+gluten (dry substance) from corn fiber was measured.

| Treatments | Starch + Gluten Recovered |
|---|---|
| No Enzyme | 9.81% |
| Cellulase N | 13.3% |
| Cellulase N + Protease D | 13.5% |
| Cellulase N + GH62 Arabinofuranosidase B | 20.5% |
| Cellulase N + Protease D + GH62 Arabinofuranosidase B | 19.2% |

Example 5

10-g fiber assay is performed at pH 3.8, incubating at 52° C. for 1 hour at dose of 35 ug EP/ g corn, using a blend including Celluclast and GH10 Xylanase A, in combination with either GH62 Arabinofuranosidase D or GH62 Arabinofuranosidase E. Blend consists of 5% (w/w) GH62 Arabinofuranosidase D or GH62 Arabinofuranosidase E, 15% (w/w) of GH10 Xylanase A, and the remaining 80% (w/w) from Celluclast. For comparison, blend containing Celluclast and GH10 Xylanase D only (no GH62) was included. Release of starch+gluten (dry substance) from corn fiber at the specified doses below was measured.

| Treatments | Dose (ug enzyme protein/g corn) | Starch + Gluten Recovered |
|---|---|---|
| No Enzyme | 0 | 6.55% |
| Celluclast + GH10 Xylanase A | 35 | 8.90% |
| Celluclast + GH10 Xylanase A | 33.25 | 8.90% |
| Celluclast + GH10 Xylanase A + GH62 Arabinofuranosidase D | 35 | 10.57% |
| Celluclast + GH10 Xylanase A + GH62 Arabinofuranosidase E | 35 | 10.73% |

Therefore, the addition of GH62 Arabinofuranosidase D and GH62 Arabinofuranosidase E on top of Celluclast+GH10 Xylanase A can significantly increase the yield of starch+gluten in corn wet-milling process.

Example 6

A full-scale industrial trial was conducted in a wet-mill facility milling 1400 MT of corn per day. The trial was conducted over a span of months, which can be roughly divided into a pre-enzyme baseline (Baseline 1), Blend 1 phase, post-Blend 1 baseline (Baseline 2), and Blend 2 phase. The enzymes that were tested and the relevant dose used are given in Table 1 below. The enzymes were directly added into the fiber washing stage, after the 3rd grind step.

TABLE 1

| Enzyme Blend | Enzyme | Dose (kg prod/ MT corn) | Total enzyme protein (mg protein/kg corn) |
|---|---|---|---|
| 1 | Cellulase F | 0.5 | 105 |
| 2 | A *Trichoderma reesei* cellulase preparation containing a GH10 xylanase of SEQ ID NO: 104 and a GH62 arabinofuranosidase of SEQ ID NO: 27 | 0.1 | 24 |

The main difference in composition between the two enzyme blends used in the trial was the addition of a GH62 arabinofuranosidase, and the source organism of the xylanase (Family GH10) used differed between these two blends.

Table 1 shows the difference in dose between these blends during the trial. Blend 1 was dosed four-folds higher in total enzyme proteins compared with Blend 2. Tables 2 and 3 below show the effect of enzyme addition in the process compared with their baselines, both in terms of fiber composition and the actual yields realized. These yield numbers and fiber composition were averaged over a two weeks' worth data where the conditions were relatively stable, and the overall residence time in the fiber wash was consistently around 80-90 minutes.

The combination of 4x lower dose and better performance of Blend 2 as judged from the higher reduction in starch in fiber (10 versus 6 percentage points difference) strongly points to the boosting effect of the GH62 in the blend. Both showed about the same reduction in protein and moisture in the fiber. As for realized yields, the better performance of Blend 2 is again shown by the higher starch yields realized (a difference of about 1 percentage points in starch yield). Gluten reduction between these enzymes was about the same (0.2 to 0.3 percentage points difference from baseline, with Blend 2 probably slightly better). This was shown as well when normalized to the protein content of the incoming corn (total recovery seems slightly better with Blend 2.

TABLE 2

| Fiber Composition | | | | |
|---|---|---|---|---|
| Fiber Stream Composition | Baseline 1 | Blend 1 | Baseline 2 (Post-Blend 1) | Blend 2 |
| Total starch (%) | 25.85 | 19.25 | 25.5 | 15.5 |
| Protein (%) | 11.44 | 10.35 | 11.2 | 10.7 |
| Moisture (%) | 61.5 | 56.95 | 62.2 | 57.3 |

TABLE 3

| Realized Yields/Energy Reduction | | | |
|---|---|---|---|
| Plant Metrics | Baseline | Blend 1 | Blend 2 |
| Starch Yield (%) | 70.3 | 70.9 | 72.1 |
| Gluten Yield (%) | 4.9 | 5.1 | 5.2 |
| Total Recovery Protein | 39% | 41% | 42% |
| Fiber dryer energy use (KWh/tn fiber) | 824 | 700 | 620 |

What is claimed is:

1. A process for treating crop kernels, comprising:

a) soaking kernels in water to produce soaked kernels;

b) grinding the soaked kernels to form ground kernels;

c) separating the germ from the ground kernels to produce a slurry comprising fiber, starch and protein; and d) treating the slurry in a fiber washing step to separate fiber from the starch and protein in the presence of an effective amount of a polypeptide having arabinofuranosidase activity, wherein the polypeptide having arabinofuranosidase activity comprises an amino acid sequence having at least 60% sequence identity to SEQ ID NO: 27.

2. The process of claim 1, wherein step d) further comprises treating the slurry in the presence of a protease.

3. The process of claim 1, wherein step d) further comprises treating the slurry in the presence of a cellulolytic enzyme.

4. The process of claim 1, wherein step d) further comprises treating the slurry in the presence of an enzyme selected from the group consisting of an endoglucanase, a xylanase, a cellobiohydrolase I, a cellobiohydrolase II, a GH61, or a combination thereof.

5. The process of claim 4, wherein the enzyme is an endoglucanase.

6. The process of claim 4, wherein the enzyme is a xylanase.

7. The process of claim 1, wherein the kernels are soaked in water for about 2-10 hours.

8. The process of claim 1, wherein the soaking is carried out at a temperature between about 40° C. and about 60° C.

9. The process of claim 1, wherein the soaking is carried out at an acidic pH.

10. The process of claim 1, wherein the soaking is performed in the presence of between 0.01-1% $SO_2$ and/or $NaHSO_3$.

11. The process of claim 1, wherein the crop kernels are from corn (maize), rice, barley, sorghum bean, or fruit hulls, or wheat.

12. The process of claim 1, wherein step d) further comprises treating the slurry in the presence of a GH10 xylanase or a GH11 xylanase.

13. The process of claim 12, wherein the GH10 xylanase is a *Talaromyces, Trichophaea*, or *Aspergillus* GH10 xylanase.

14. The process of claim 1, further treating the slurry in the presence of a GH10 xylanase, an endoglucanase, a cellobiohydrolase I, a cellobiohydrolase II, and a GH61.

15. The process of claim 1, further comprising separating the starch from the protein.

16. The process of claim 15, further comprising washing the starch to produce a pure starch.

17. The process of claim 16, wherein the starch is 99.5% pure.

18. The process of claim 16, further comprising converting the starch to syrup or alcohol.

* * * * *